(12) United States Patent
Shiraishi et al.

(10) Patent No.: US 12,539,561 B2
(45) Date of Patent: Feb. 3, 2026

(54) PROCESSING APPARATUS, PROCESSING METHOD AND PROCESSING SYSTEM

(71) Applicant: NIKON CORPORATION, Tokyo (JP)

(72) Inventors: Masayuki Shiraishi, Kumagaya (JP); Kenta Sudo, Yokohama (JP); Yosuke Tatsuzaki, Kumagaya (JP); Baku Ogasawara, Kumagaya (JP)

(73) Assignee: NIKON CORPORATION, Tokyo (JP)

( * ) Notice: Subject to any disclaimer, the term of this patent is extended or adjusted under 35 U.S.C. 154(b) by 1108 days.

(21) Appl. No.: 17/604,252

(22) PCT Filed: Apr. 24, 2019

(86) PCT No.: PCT/JP2019/017483
§ 371 (c)(1),
(2) Date: Feb. 18, 2022

(87) PCT Pub. No.: WO2020/217353
PCT Pub. Date: Oct. 29, 2020

(65) Prior Publication Data
US 2022/0203477 A1 Jun. 30, 2022

(51) Int. Cl.
B23K 26/359 (2014.01)
B23K 26/067 (2006.01)
(Continued)

(52) U.S. Cl.
CPC ........ B23K 26/359 (2015.10); B23K 26/0673 (2013.01); B23K 26/082 (2015.10); B23K 26/362 (2013.01); B23K 2101/34 (2018.08)

(58) Field of Classification Search
CPC .............. B23K 26/359; B23K 26/0673; B23K 26/082; B23K 26/362; B23K 2101/34;
(Continued)

(56) References Cited

U.S. PATENT DOCUMENTS 4,958,900 A 9/1990 Ortiz, Jr.
4,994,639 A 2/1991 Dickinson et al.
(Continued)

FOREIGN PATENT DOCUMENTS

DE 196 36 458 C1 4/1998
DE 10 2017 206 968 A1 10/2018
(Continued)

OTHER PUBLICATIONS

Jul. 16, 2019 International Search Report issued in International Patent Application No. PCT/JP2019/017483.
(Continued)

Primary Examiner — Robert G Bachner
(74) Attorney, Agent, or Firm — Oliff PLC

(57) ABSTRACT

A processing apparatus is a processing apparatus that irradiates a surface of an object with processing light to process an object and is provided with: a light irradiation apparatus that emits first processing light to form a first irradiation area on the surface and emits second processing light to form a second irradiation area, at least a part of which overlaps with the first irradiation area, on the surface, and has a change member that is configured to change a state of an overlap between the first and second irradiation areas.

18 Claims, 54 Drawing Sheets

(51) Int. Cl.
*B23K 26/082* (2014.01)
*B23K 26/362* (2014.01)
*B23K 101/34* (2006.01)

(58) Field of Classification Search
CPC .............. B23K 26/123; B23K 26/127; B23K 2101/006; B23K 26/0006; B23K 26/0624; B23K 26/14; B23K 26/1476; B23K 26/16; B23K 26/355; B23K 26/402; B23K 2103/172; B23K 2103/42; B23K 26/0676; B23K 26/064
See application file for complete search history.

(56) References Cited

U.S. PATENT DOCUMENTS

| | | |
|---|---|---|
| 6,180,913 B1 | 1/2001 | Kolmeder et al. |
| 2012/0018412 A1* | 1/2012 | Ito .................... B23K 26/0853 362/19 |
| 2015/0226975 A1 | 8/2015 | Le Gros et al. |
| 2015/0267727 A1 | 9/2015 | Segawa et al. |
| 2017/0044002 A1 | 2/2017 | Hariyama et al. |
| 2017/0144255 A1* | 5/2017 | Song .................... B23K 26/364 |
| 2017/0248793 A1 | 8/2017 | Sukhman et al. |
| 2020/0139488 A1 | 5/2020 | Jetter et al. |
| 2020/0263704 A1 | 8/2020 | Miyazaki et al. |
| 2022/0281104 A1 | 9/2022 | Sato |

FOREIGN PATENT DOCUMENTS

| | | |
|---|---|---|
| JP | H02-284783 A | 11/1990 |
| JP | H10-193156 A | 7/1998 |
| JP | 2005-230872 A | 9/2005 |
| JP | 2012-024784 A | 2/2012 |
| JP | 2013-119106 A | 6/2013 |
| JP | 2018-159379 A | 10/2018 |
| WO | 2018/139049 A1 | 8/2018 |
| WO | 2020/208808 A1 | 10/2020 |

OTHER PUBLICATIONS

Jul. 16, 2019 Written Opinion issued in International Patent Application No. PCT/JP2019/017483.

Nov. 8, 2023 Office Action issued in European Patent Application No. 19926011.8.

Jan. 8, 2023 Search Report issued in European Patent Application No. 19926011.8.

Feb. 7, 2023 Office Action issued in Japanese Patent Application No. 2021-515384.

Oct. 8, 2024, Office Action issued in Japanese Patent Application No. 2023-144342.

Sep. 24, 2025 Search Report issued in European Patent Application No. 24 216 416.8.

* cited by examiner

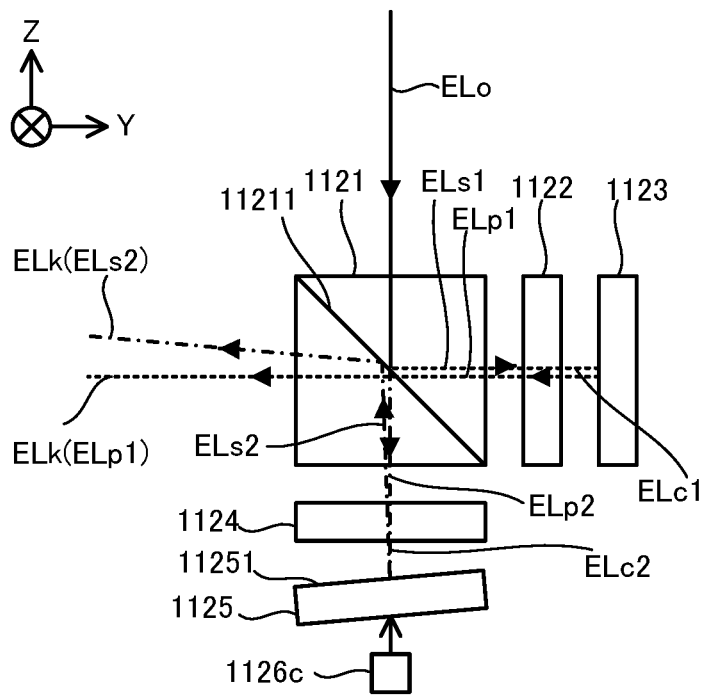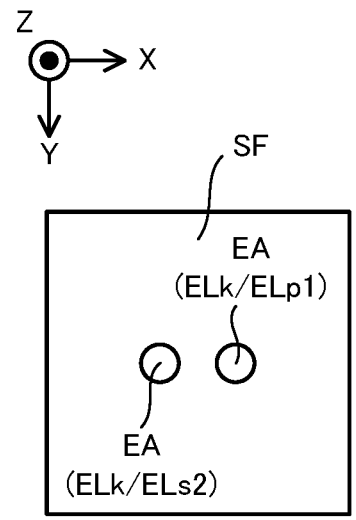
FIG. 24A  FIG. 24B
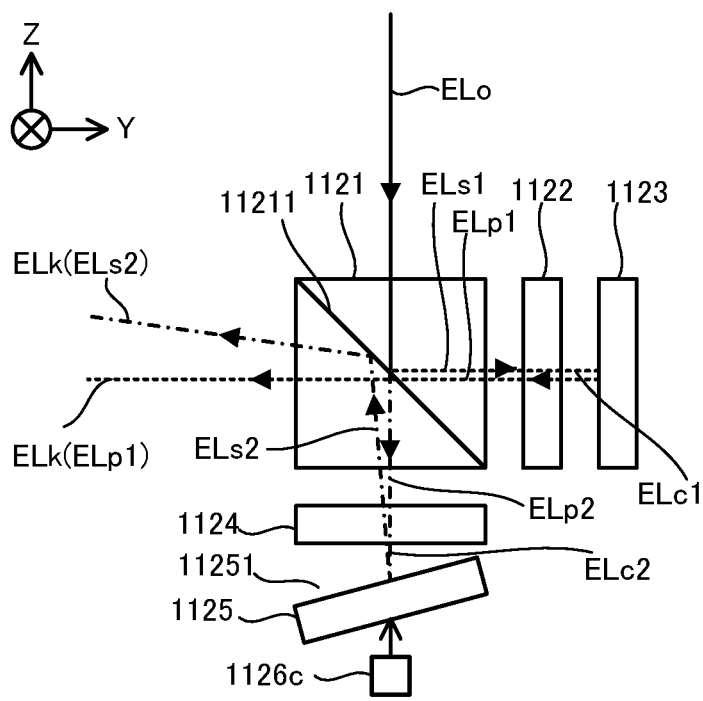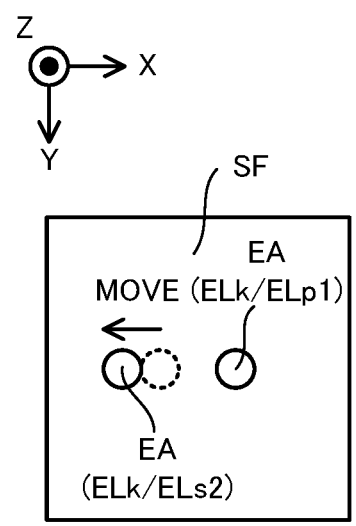
FIG. 24C  FIG. 24D

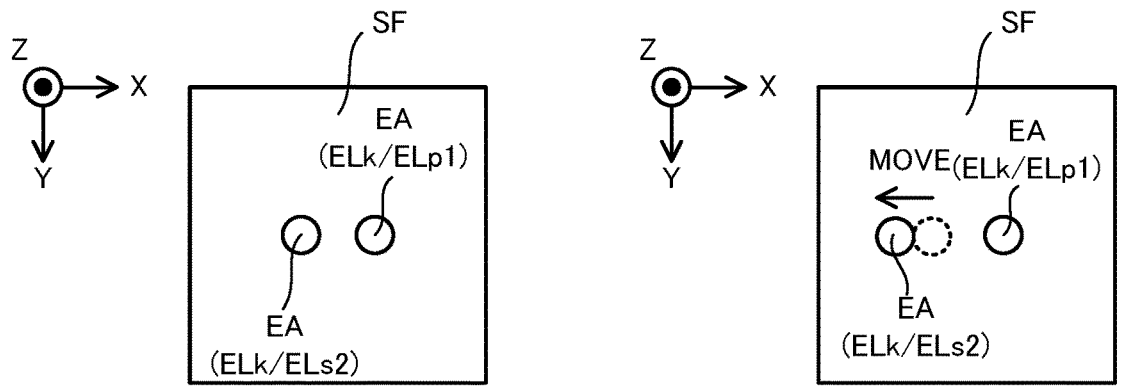
FIG. 25A
FIG. 25C
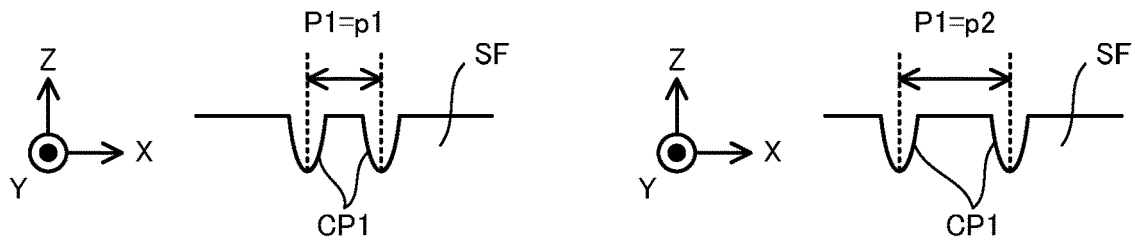
FIG. 25B
FIG. 25D
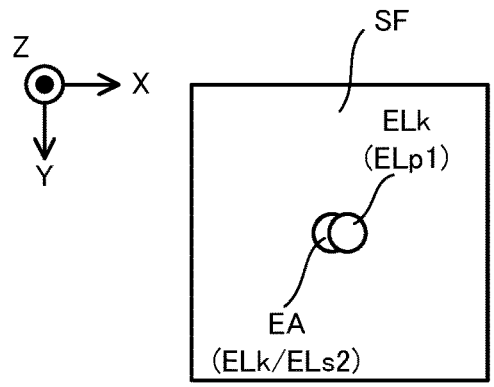
FIG. 26A
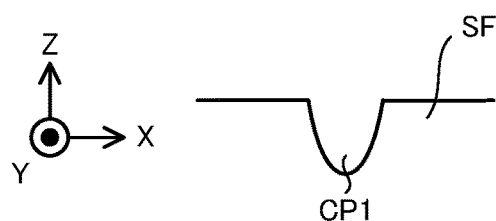
FIG. 26B

PROCESSING APPARATUS, PROCESSING METHOD AND PROCESSING SYSTEM

TECHNICAL FIELD

The present invention relates to a processing apparatus, a processing method and a processing system that are configured to process an object by an irradiation of processing light.

BACKGROUND ART

A Patent Literature 1 discloses, as a processing apparatus that is configured to process an object, a processing apparatus that forms a structure by irradiating a surface of an object with laser light beam. This type of processing apparatus is required to properly form the structure on the object.

CITATION LIST

Patent Literature

Patent Literature 1: U.S. Pat. No. 4,994,639B

SUMMARY OF INVENTION

A first aspect provides a processing apparatus that irradiates a surface of an object with processing light to process an object, the processing apparatus is provided with a light irradiation apparatus that emits first processing light to form a first irradiation area on the surface and emits second processing light to form a second irradiation area, at least a part of which overlaps with the first irradiation area, on the surface, the light irradiation apparatus has a change member that is configured to change a state of an overlap between the first and second irradiation areas.

A second aspect provides a processing method of irradiating a surface of an object with processing light to process an object, the processing method includes: emitting first processing light to form a first irradiation area on the surface; emitting second processing light to form a second irradiation area, at least a part of which overlaps with the first irradiation area, on the surface; and changing a state of an overlap between the first and second irradiation areas.

A third aspect provides a processing apparatus that irradiates an object with processing light to process an object, the processing apparatus is provided with: a first optical system that divides incident light into first light and second light; a second optical system that returns the first light, which is from the first optical system, to the first optical system as third light; and a third optical system that returns the second light, which is from the first optical system, to the first optical system as fourth light, the first optical system emits the third light from the second optical system and the fourth light from the third optical system as a plurality of processing lights with which different positions on a surface of the object area irradiated, respectively.

A fourth aspect provides a processing apparatus that is provided with: a light irradiation apparatus that irradiates an object with a plurality of processing lights to process the object; and an irradiation position change apparatus that changes a relative positional relationship between irradiation positions of the plurality of processing lights on a surface of the object so that a desired pattern structure is formed at the object.

A fifth aspect provides a processing system that irradiates an object with processing light to process the object so that a pattern structure that extends in a desired direction is formed at the object, the processing system is provided with: a first movable apparatus that is movable to change a relative position of an irradiation position of the processing light and a surface of the object in a first direction that is along the surface of the object; and a second movable apparatus that is heavier and/or larger than the first movable apparatus and that is movable to change the relative position of the irradiation position of the processing light and the surface of the object in a second direction that is along the surface of the object and that intersects with the first direction, the first and second movable apparatuses are aligned relative to the surface so that a first angle between an axis extending in the desired direction and an axis extending in the first direction is shorter than a second angle between the axis extending in the desired direction and an axis extending in the second direction.

A sixth aspect provides a processing system that is provided with: a processing apparatus that irradiates an object with processing light to process the object so that a pattern structure that extends in a desired direction is formed at a surface of the object; and a control apparatus that controls the processing apparatus to form the pattern structure on the basis of pattern information relating to the pattern structure that is generated from a simulation model for simulating the object at which the pattern structure is formed.

A seventh aspect provides a processing system that is provided with: a light irradiation apparatus that irradiates a surface of an object with processing light; and a position change apparatus that changes a relative position of a target irradiation area of the processing light and the surface on the surface of the object, the processing system alternately repeats a first operation that scans the surface with the processing light along a first axis that is along the surface and a second operation that changes a relative position of the processing light and the surface along a second axis that intersects with the first axis and that is along the surface by using the light irradiation apparatus and the position change apparatus, the first operation includes a first scan operation that scans the surface with the processing light so that the target irradiation position relatively moves relative to the surface toward a first direction that is along the first axis and a second scan operation that scans the surface with the processing light so that the target irradiation position relatively moves relative to the surface toward a second direction that is along the first axis and that is a direction opposite to the first direction.

An eighth aspect provides a processing system that irradiates a surface of an object with processing light from a light source to process the surface, the processing system is provided with: a first optical system that is disposed on an optical path of the processing light from the optical source; and a second optical system that is disposed on the optical path of the processing light from the optical source and that condenses the processing light on the surface, a size of a beam cross-section at a converged position of the processing light through the first and second optical systems is larger than a size of a beam cross-section at a converged position of the processing light through the second optical system.

BRIEF DESCRIPTION OF DRAWINGS

Each of FIG. 2A

Each of FIG. 7A

FIG. 24A is a cross-sectional view that illustrates the multibeam optical system before a reflective mirror moves, FIG. 24B is a plan view that illustrates beam spots that are formed on a predetermined optical plane by the plurality of processing lights emitted from the multibeam optical system that is in a state illustrated in FIG. 24A, FIG. 24C is a cross-sectional view that illustrates the multibeam optical system after the reflective mirror moves, and FIG. 24D is a plan view that illustrates beam spots that are formed on the predetermined optical plane by the plurality of processing lights emitted from the multibeam optical system that is in a state illustrated in FIG. 24C.

FIG. 25A is a plan view that illustrates a positional relationship between a plurality of irradiation areas before the reflective mirror moves, FIG. 25B is a cross-sectional view that illustrates a concave structure that is formed when the plurality of irradiation areas illustrated in FIG. 25A are formed, FIG. 25C is a plan view that illustrates a positional relationship between the plurality of irradiation areas after the reflective mirror moves, and FIG. 25D is a cross-sectional view that illustrates the concave structure that is formed when the plurality of irradiation areas illustrated in FIG. 25C are formed.

FIG. 26A is a plan view that illustrates a positional relationship between the plurality of irradiation areas that partially overlap and FIG. 26B is a cross-sectional view that illustrates the concave structure that is formed when the plurality of irradiation areas illustrated in FIG. 26A.

Figure 33A:
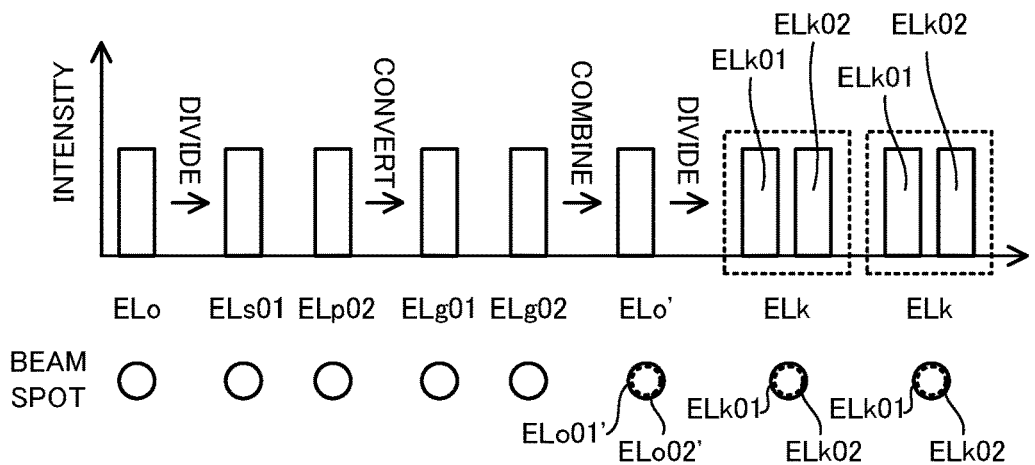
Figure 33B:
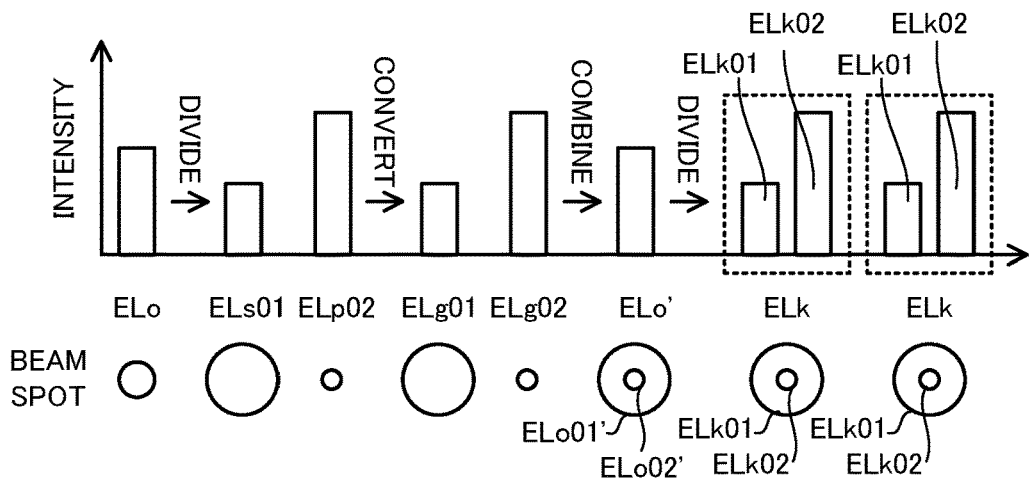
Figure 33C:
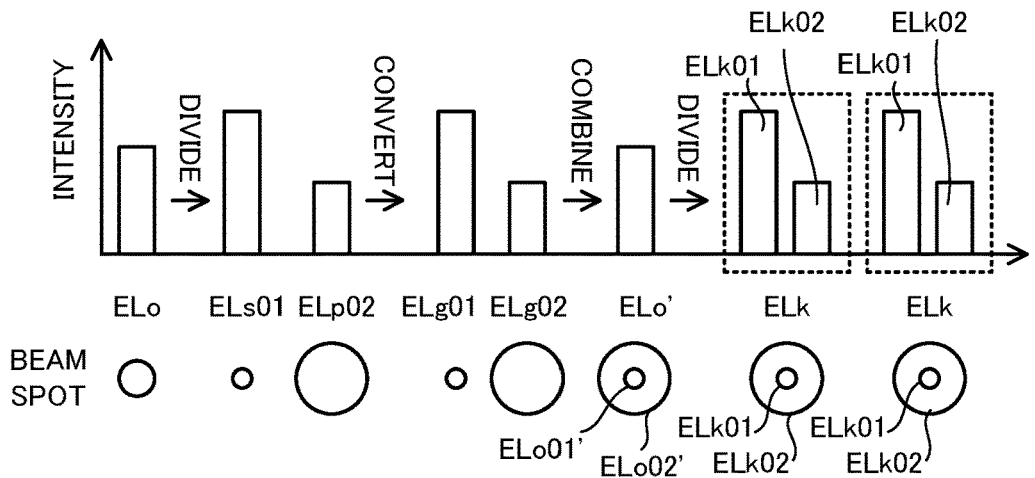

Each of FIG. 33A to FIG. 33C illustrates a process of dividing the source light into the plurality of processing lights through the intensity adjust apparatus and the multibeam optical system together with the intensity of the lights generated in that process and the beam spots formed on the coat of paint by the lights.

Figure 34A:
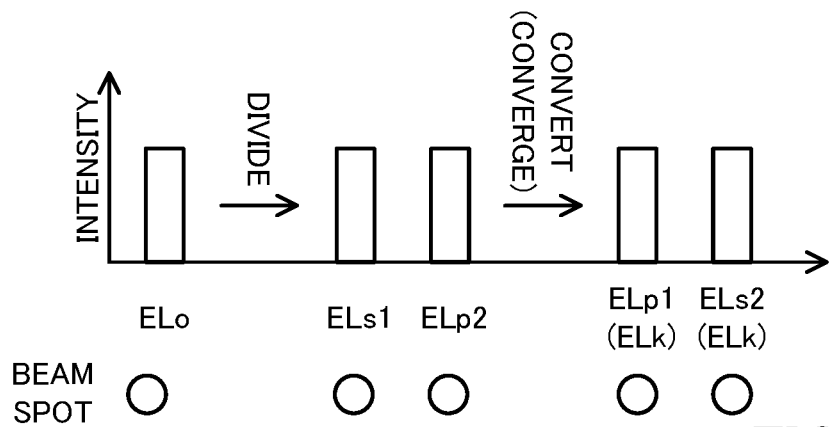
Figure 34B:
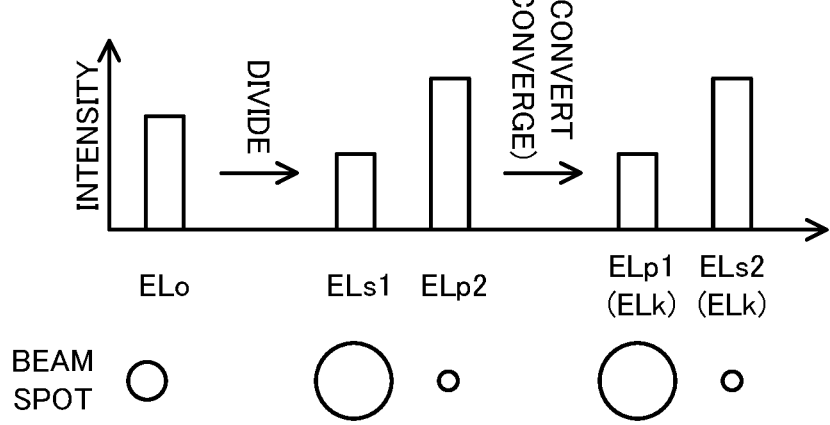
Figure 34C:
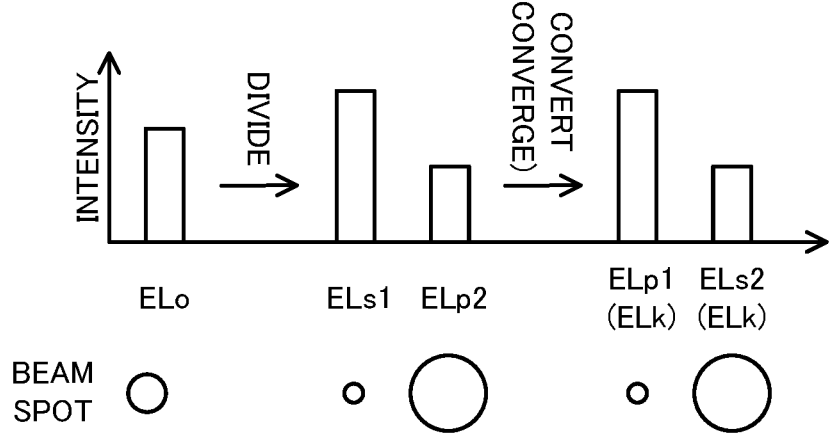

Each of FIG. 34A to FIG. 34C illustrates a process of dividing the source light into the plurality of processing lights without the intensity adjust apparatus together with the intensity of the lights generated in that process and the beam spots formed on the coat of paint by the lights.

Figure 35:
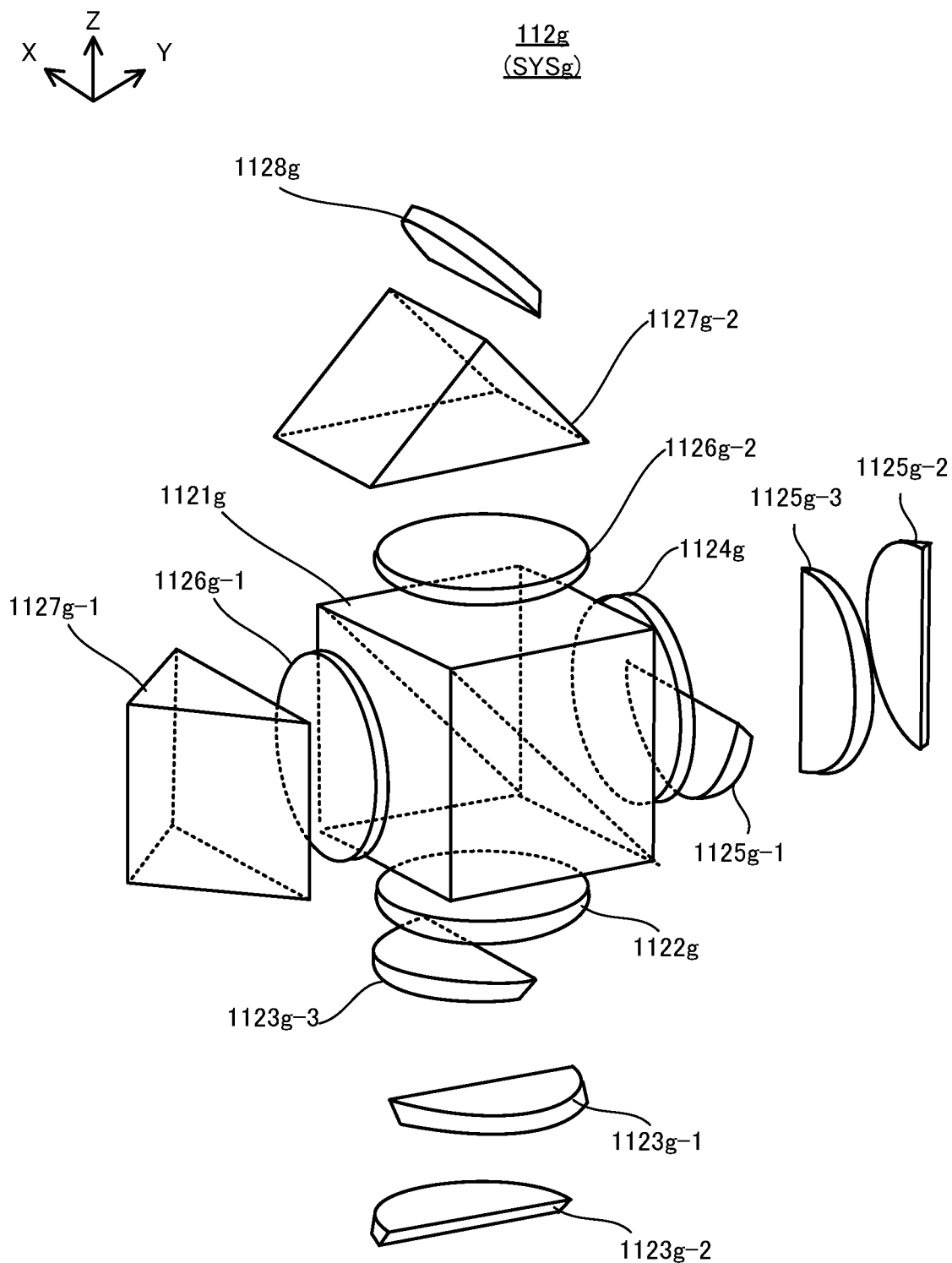

FIG. 35 is a perspective view that illustrates a multibeam optical system in a seventh embodiment.

Figure 36:
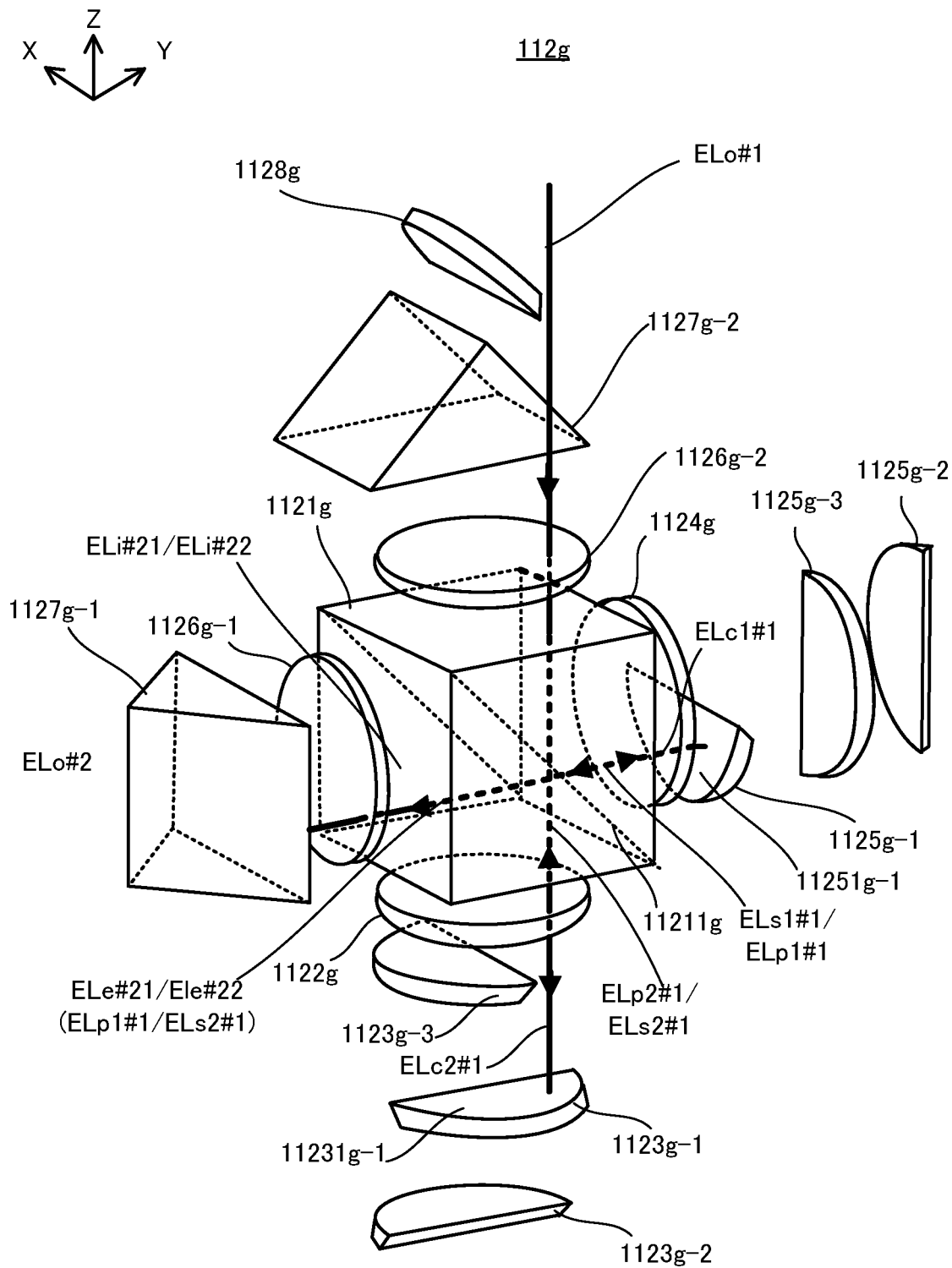

FIG. 36 is a perspective view that illustrates a process of dividing the source light into the plurality of processing lights by the multibeam optical system in the seventh embodiment.

Figure 37:
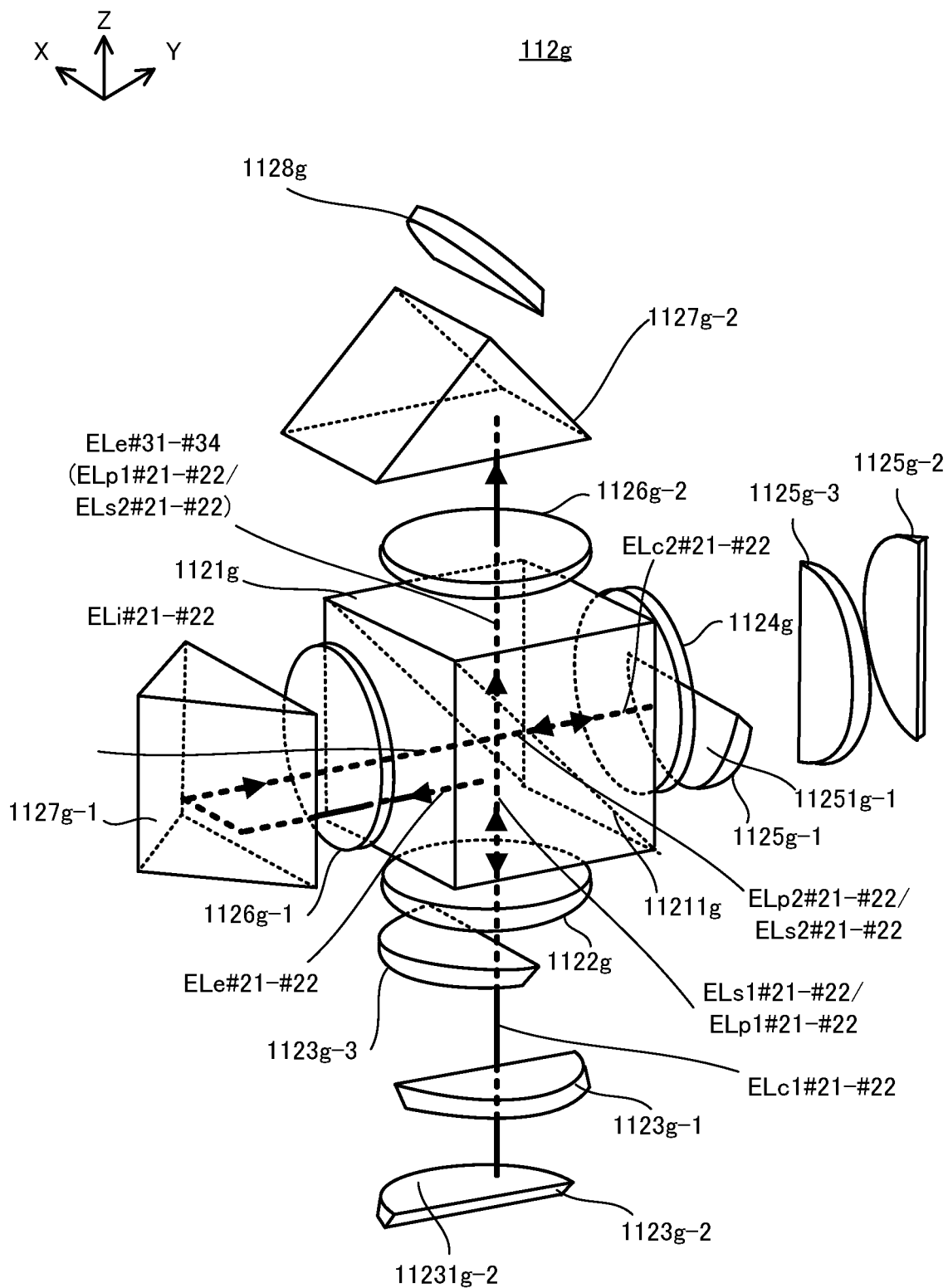

FIG. 37 is a perspective view that illustrates a process of dividing the source light into the plurality of processing lights by the multibeam optical system in the seventh embodiment.

Figure 38:
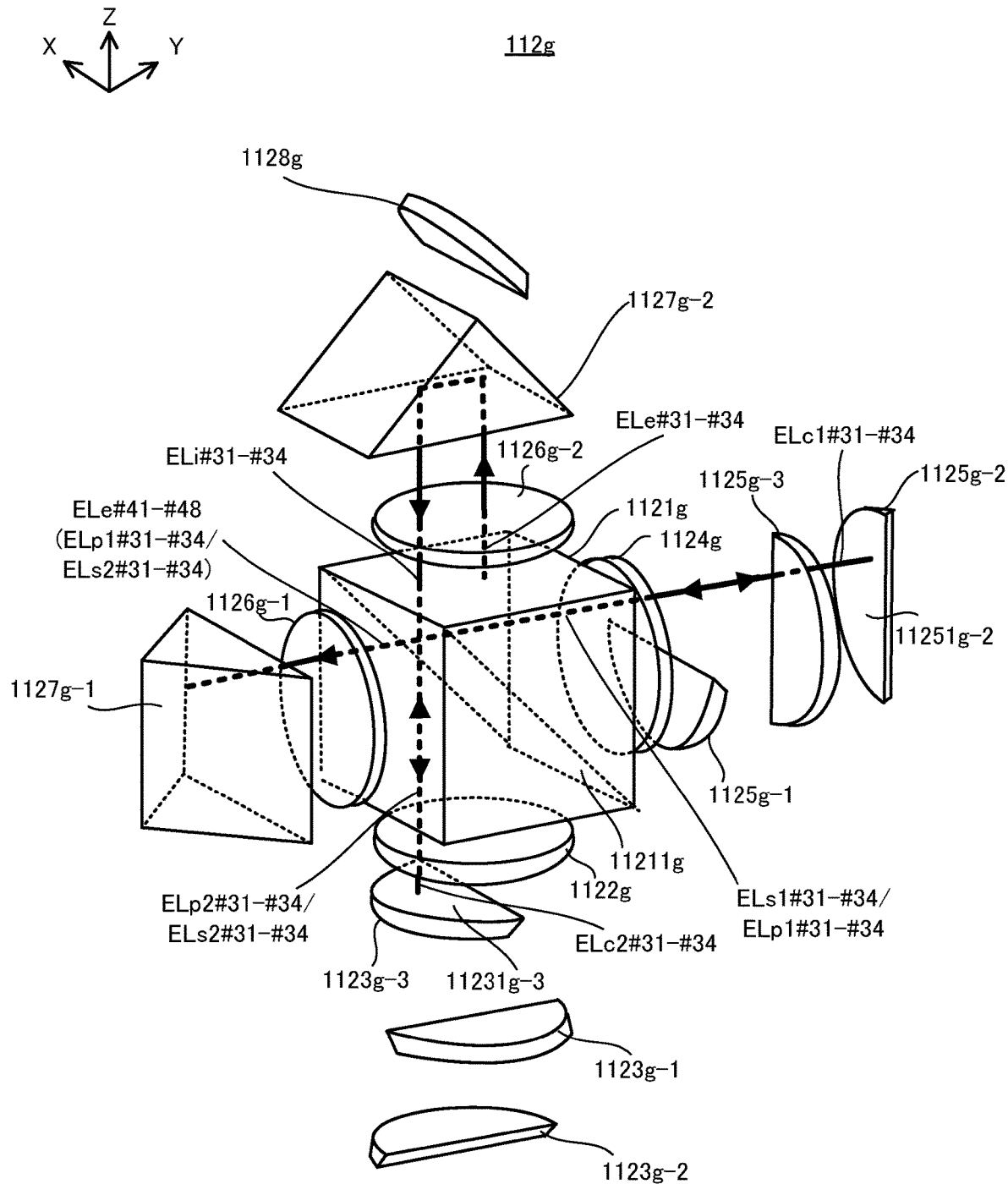

FIG. 38 is a perspective view that illustrates a process of dividing the source light into the plurality of processing lights by the multibeam optical system in the seventh embodiment.

Figure 39:
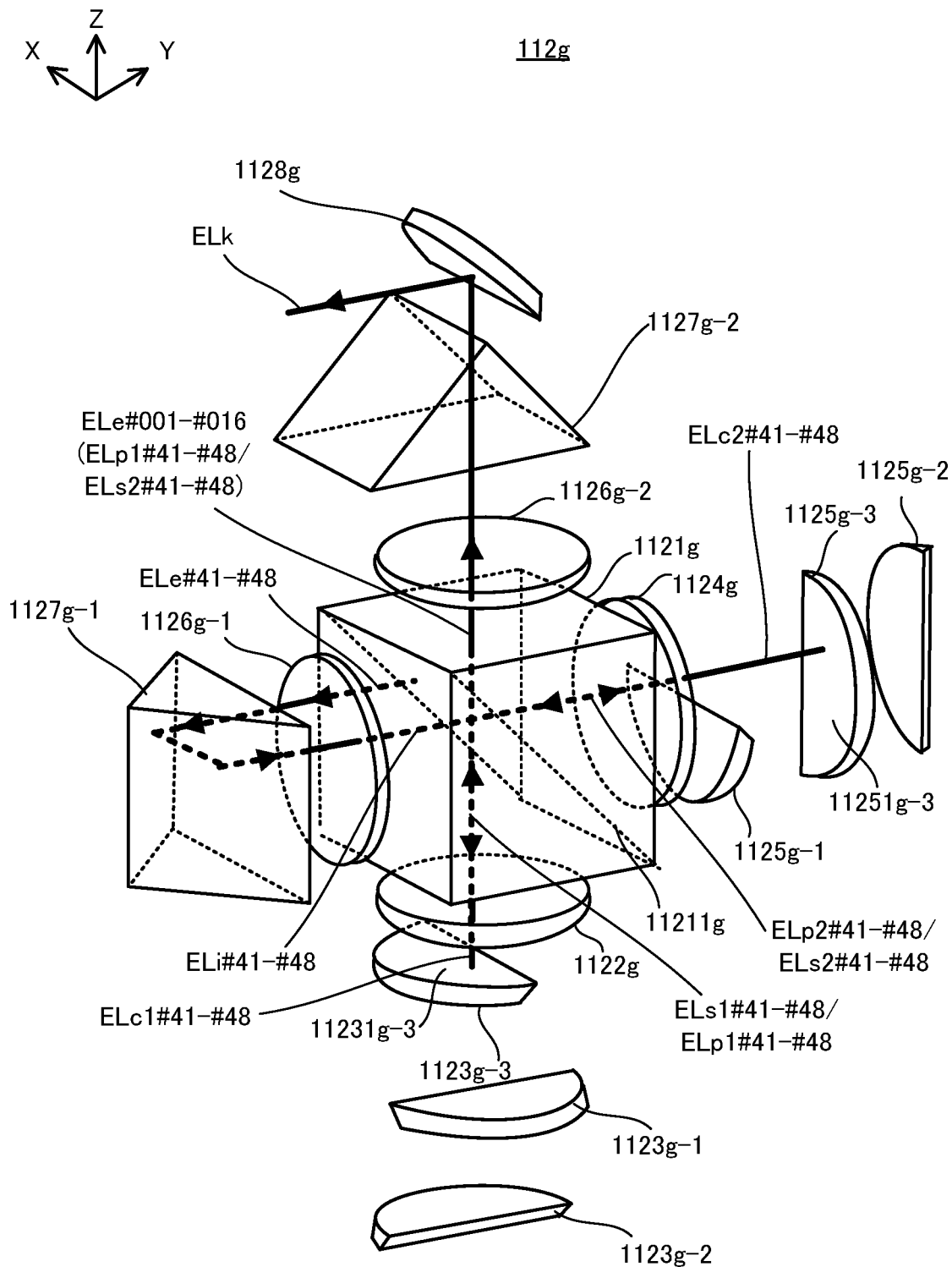

FIG. 39 is a perspective view that illustrates a process of dividing the source light into the plurality of processing lights by the multibeam optical system in the seventh embodiment.

Figure 40:
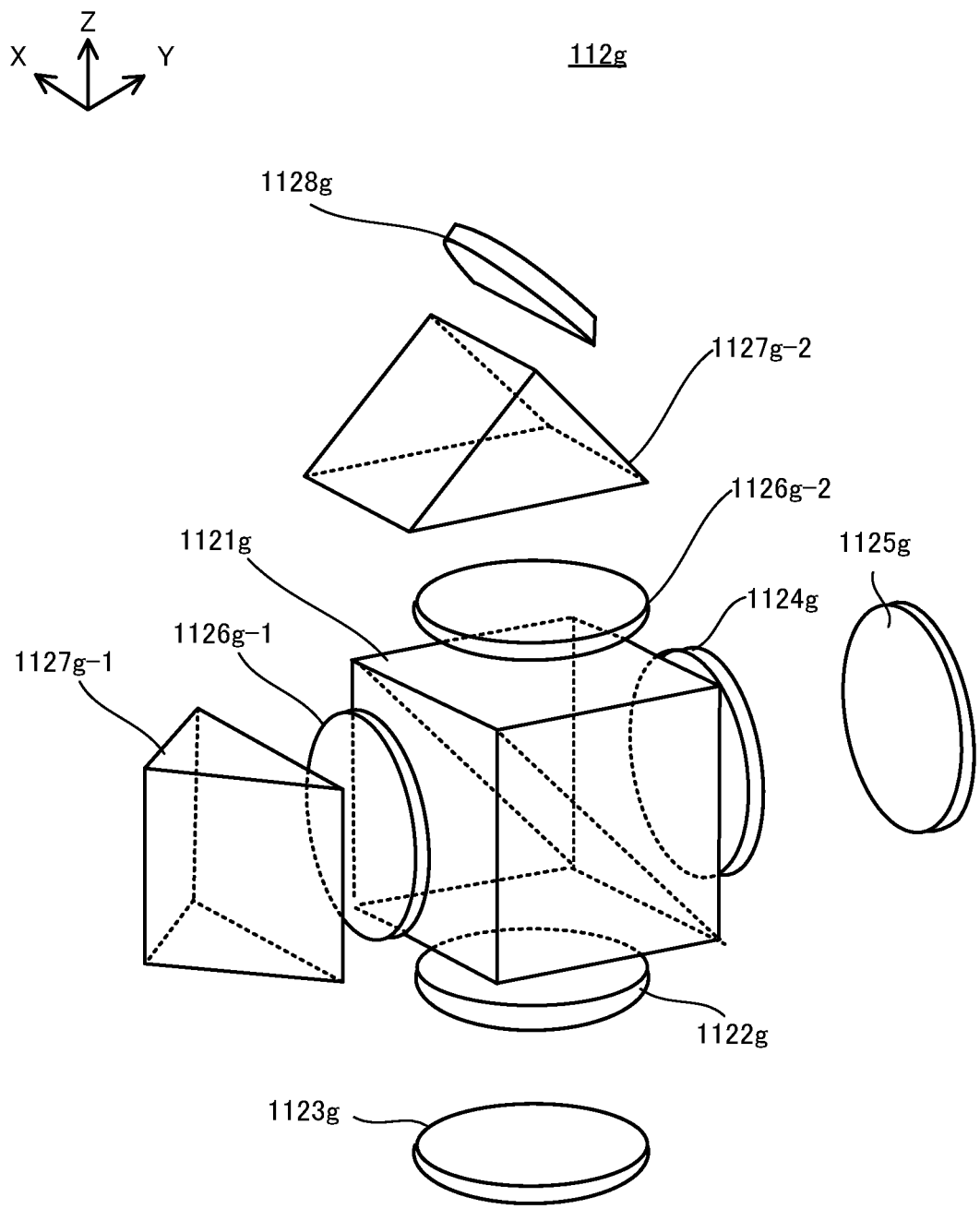

FIG. 40 is a perspective view that illustrates another example of the multibeam optical system in the seventh embodiment.

Figure 41:
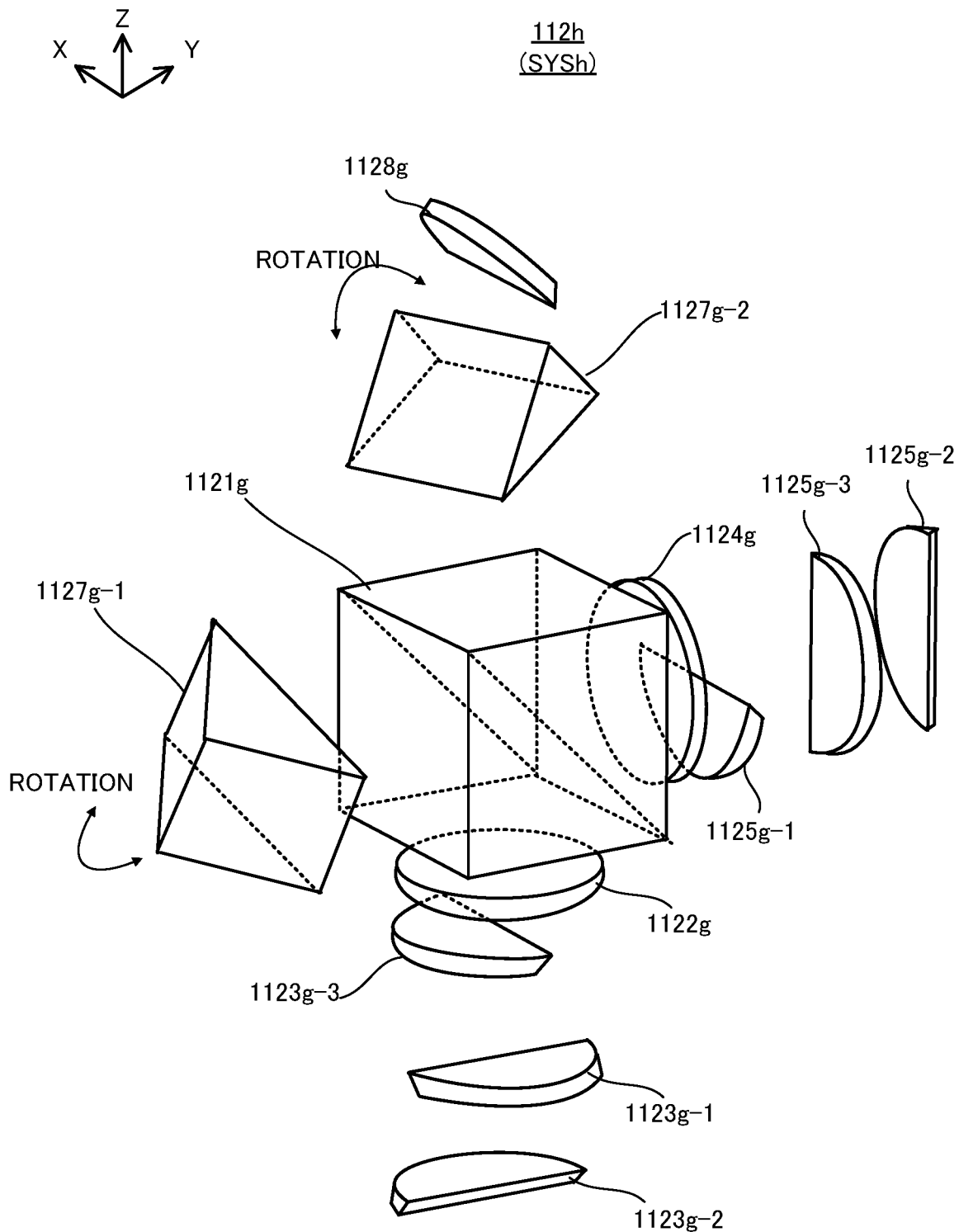

FIG. 41 is a perspective view that illustrates a multibeam optical system in an eighth embodiment.

Figure 42A:
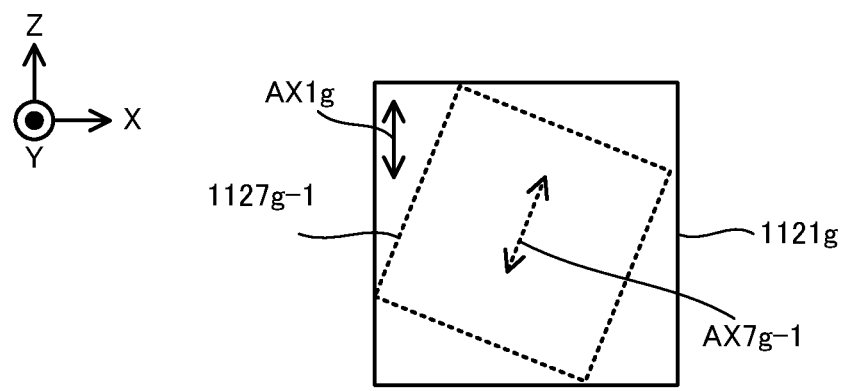
Figure 42B:
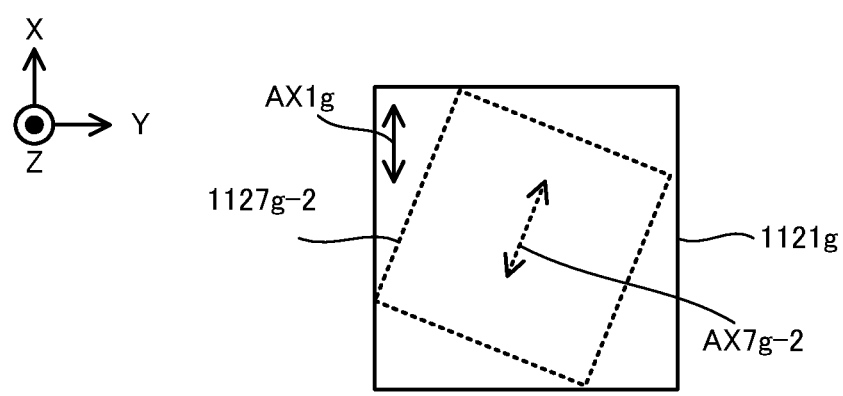

Each of FIG. 42A and FIG. 42B is a plan view that illustrates a positional relationship between a polarized beam splitter and a reflective prism of the multibeam optical system in the eighth embodiment.

Figure 43A:
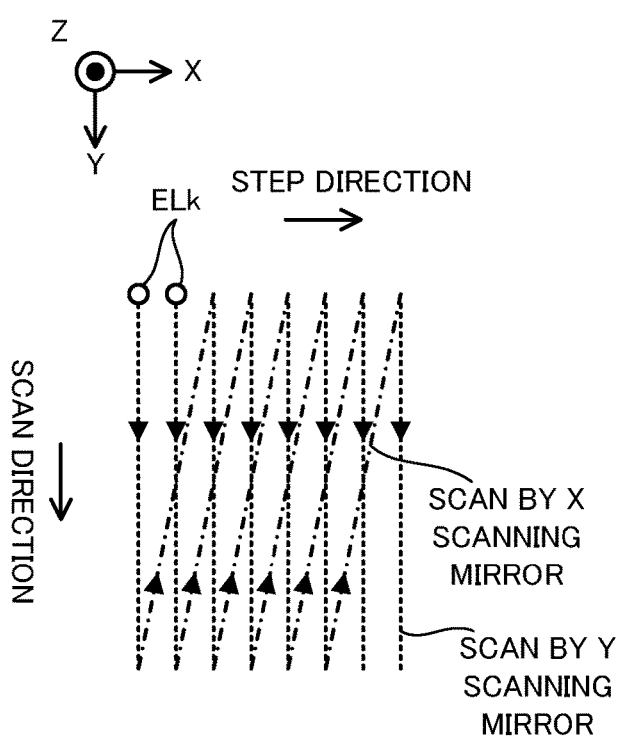
Figure 43B:
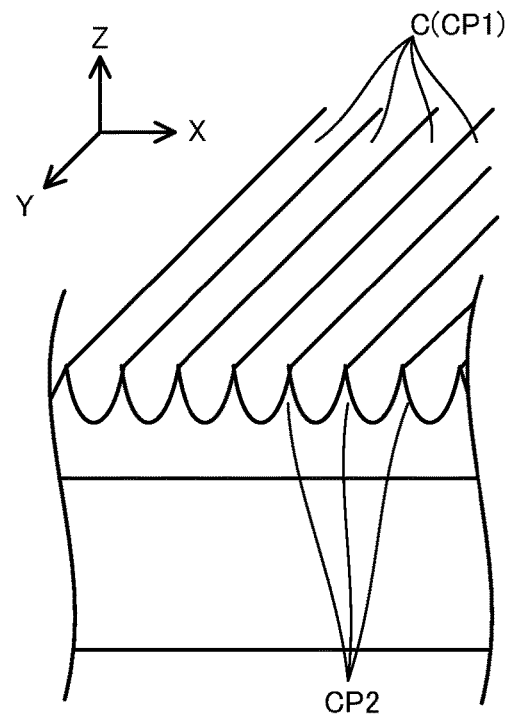
Figure 43C:
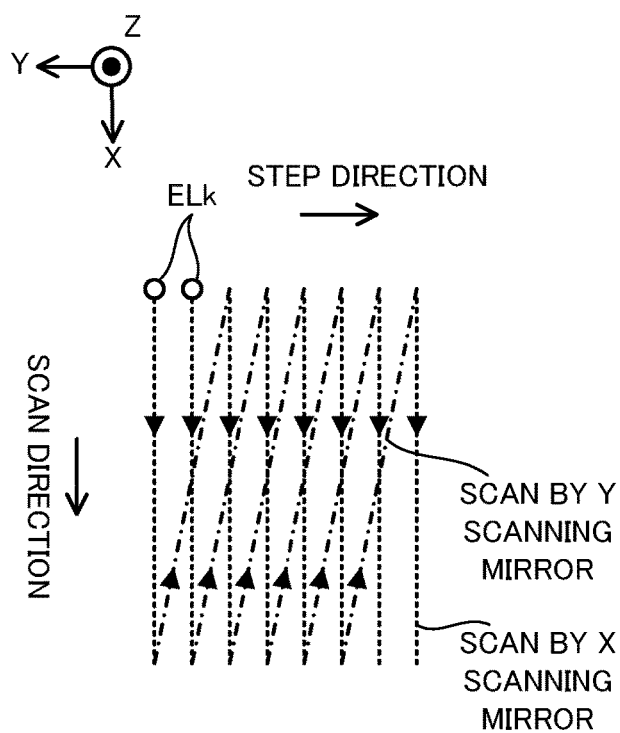
Figure 43D:
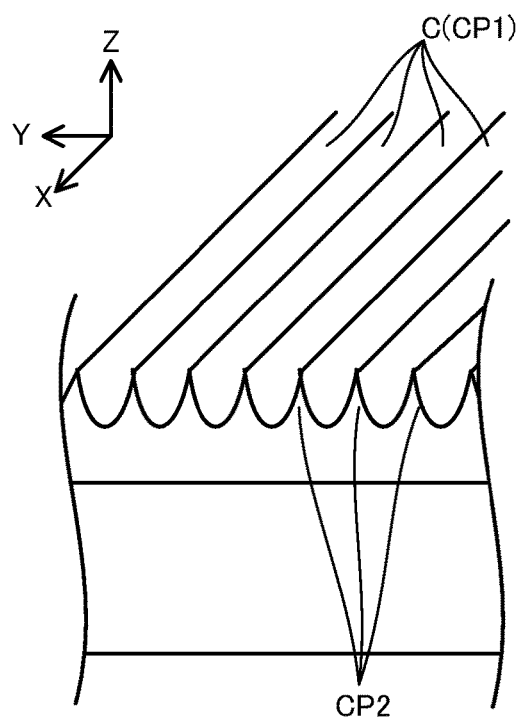

FIG. 43A is a plan view that illustrates a moving path of the target irradiation area on the coat of paint when a Y axis direction is set to be a scan direction, FIG. 43B is a perspective view that illustrates the riblet structure formed by the processing system in a situation illustrated in FIG. 43A, FIG. 43C is a plan view that illustrates the moving path of the target irradiation area on the coat of paint when a X axis direction is set to be a scan direction, and FIG. 43D is a perspective view that illustrates the riblet structure formed by the processing system in a situation illustrated in FIG. 43C.

Figure 44:
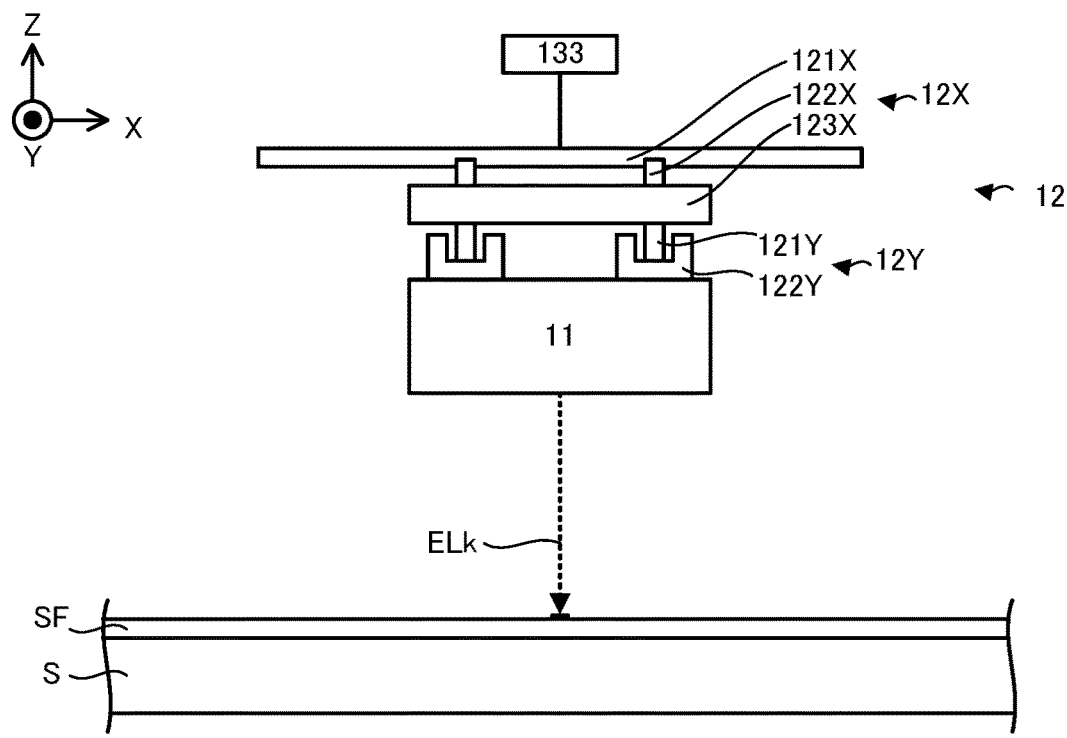

FIG. 44 is a cross-sectional view that illustrates one example of a driving system for moving the light irradiation apparatus.

Figure 45:
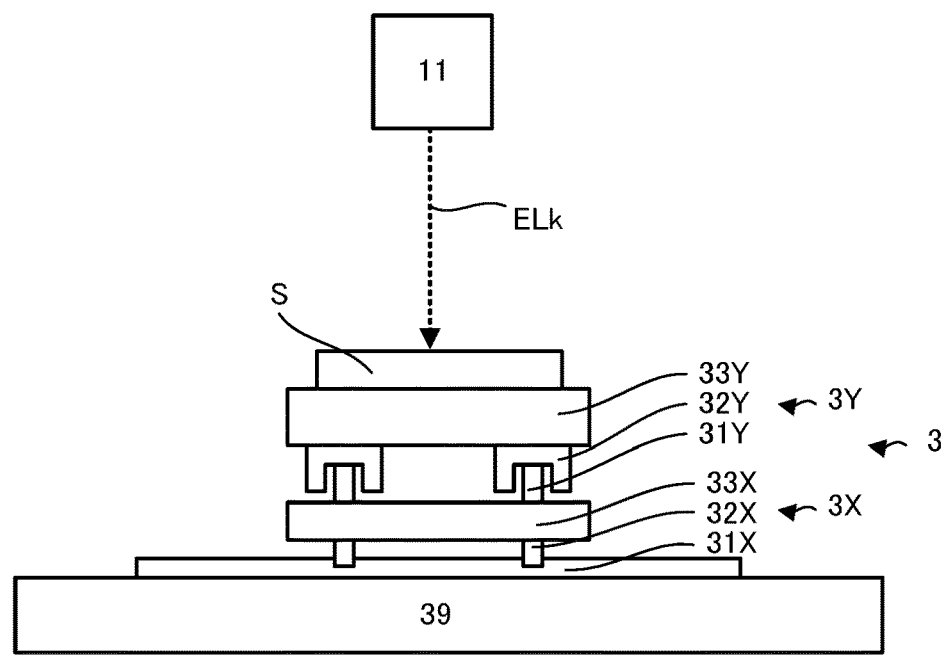

FIG. 45 is a cross-sectional view that illustrates one example of a stage apparatus for moving a processing target object.

Figure 46:
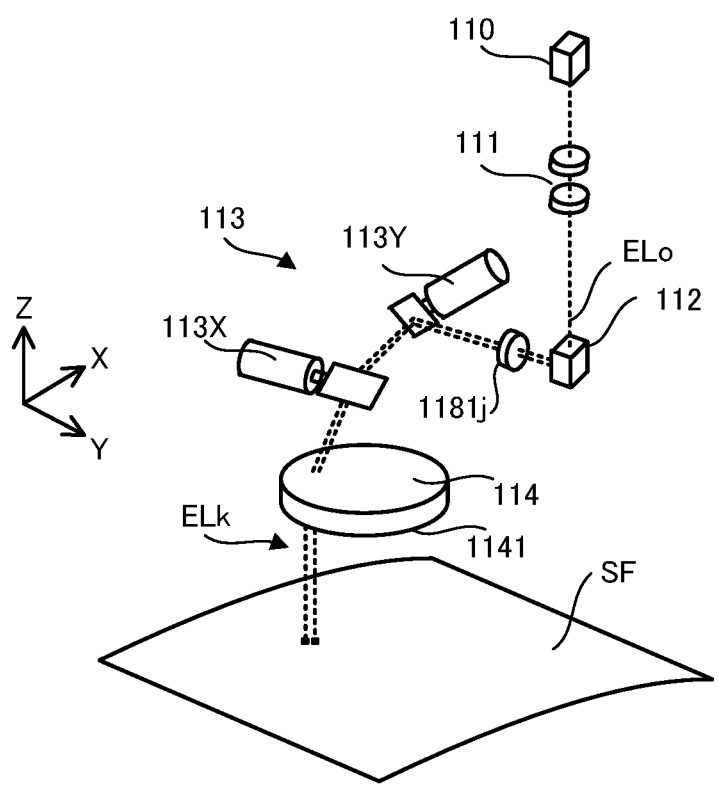

FIG. 46 is a cross-sectional view that illustrates one example of a structure of a light irradiation apparatus in a tenth embodiment.

Figure 47A:
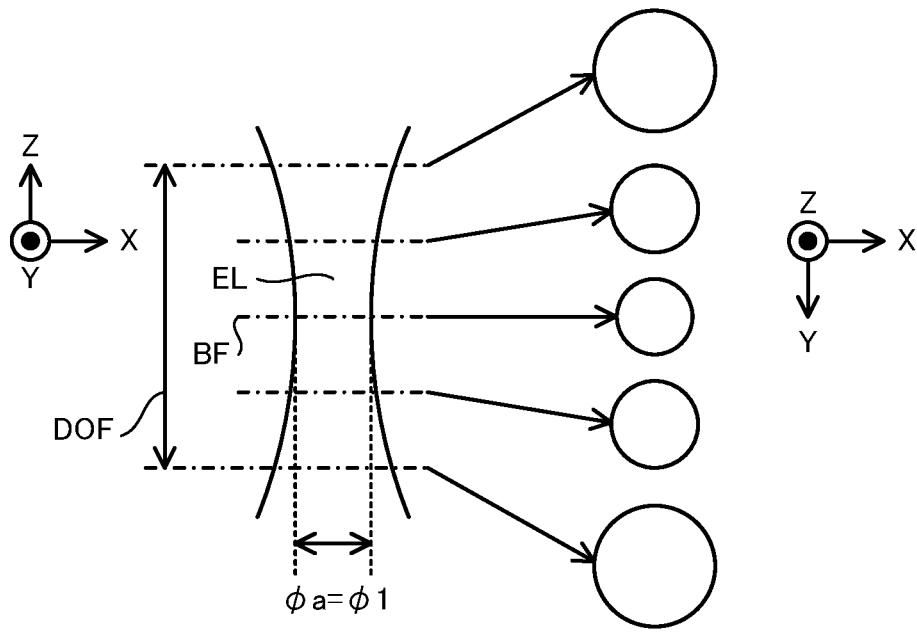
Figure 47B:
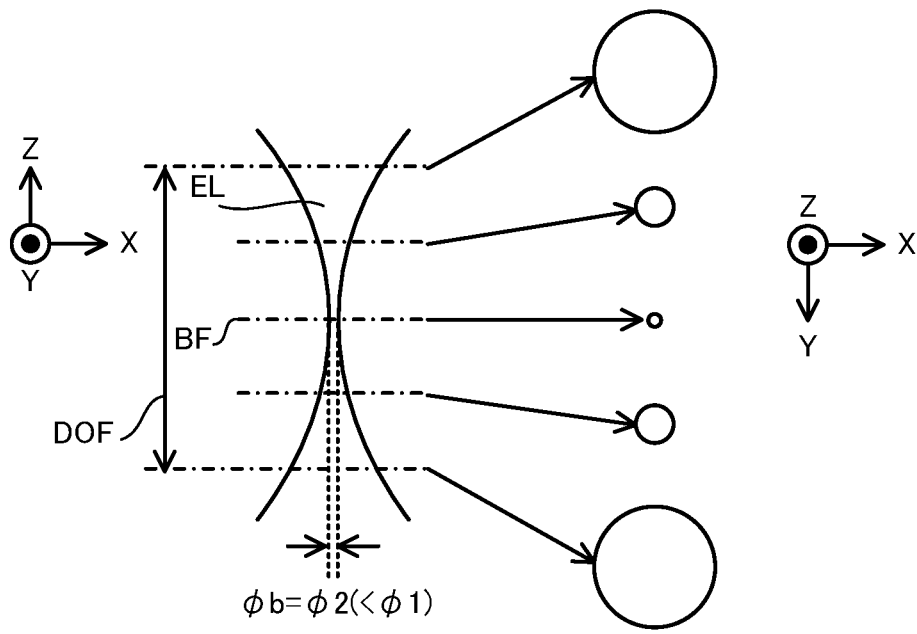

FIG. 47A is a cross-sectional view that illustrates a cross-section along a XZ plane of the processing light with which the coat of paint is irradiated through an enlargement optical system with it being associated with a cross-section along a XY plane of the processing light and FIG. 47B is a cross-sectional view that illustrates the cross-section along the XZ plane of the processing light with which the coat of paint is irradiated without the enlargement optical system with it being associated with a cross-section along the XY plane of the processing light.

Figure 48A:
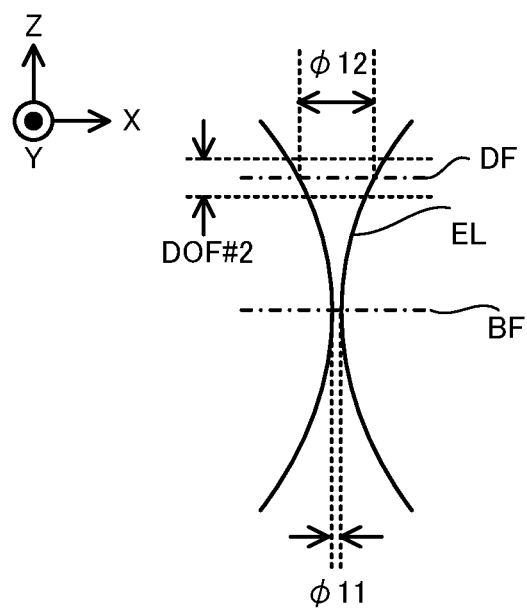
Figure 48B:
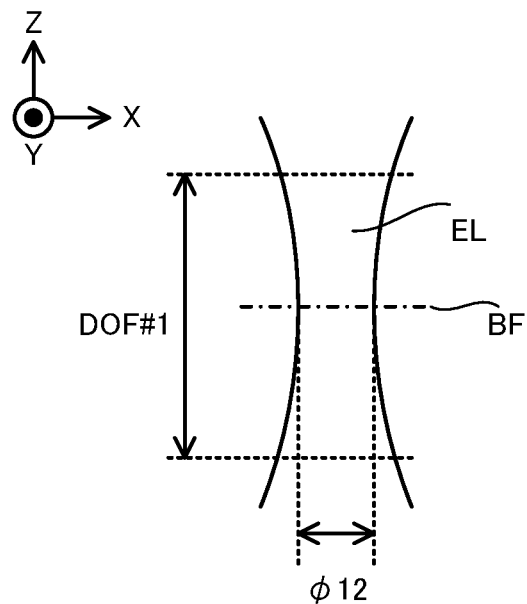

FIG. 48A is a cross-sectional view that illustrates an aspect in which a processing system in a comparison example that is not provided with the enlargement optical system processes the coat of paint with a relatively rough degree of fineness by using the processing light having a wavelength that is allowed to process the coat of paint with a relatively fine degree of fineness and FIG. 48B is a cross-sectional view that illustrates an aspect in which the processing system in the tenth embodiment that is provided with the enlargement optical system processes the coat of paint with a relatively rough degree of fineness by using the processing light having the wavelength that is allowed to process the coat of paint with a relatively fine degree of fineness.

Figure 49:
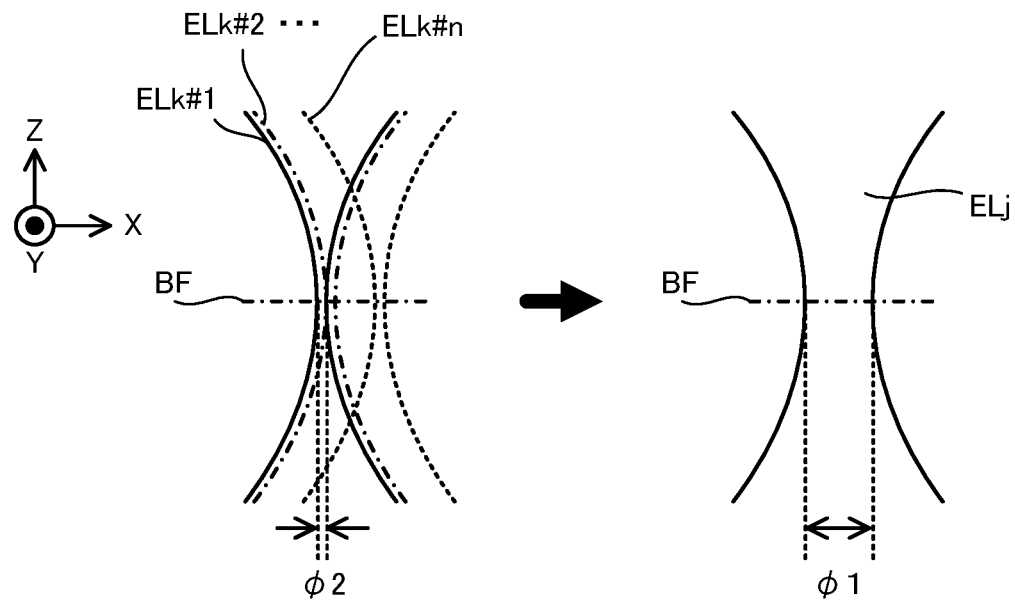

FIG. 49 is a cross-sectional view that illustrates an aspect of overlapping the plurality of processing lights.

Figure 50:
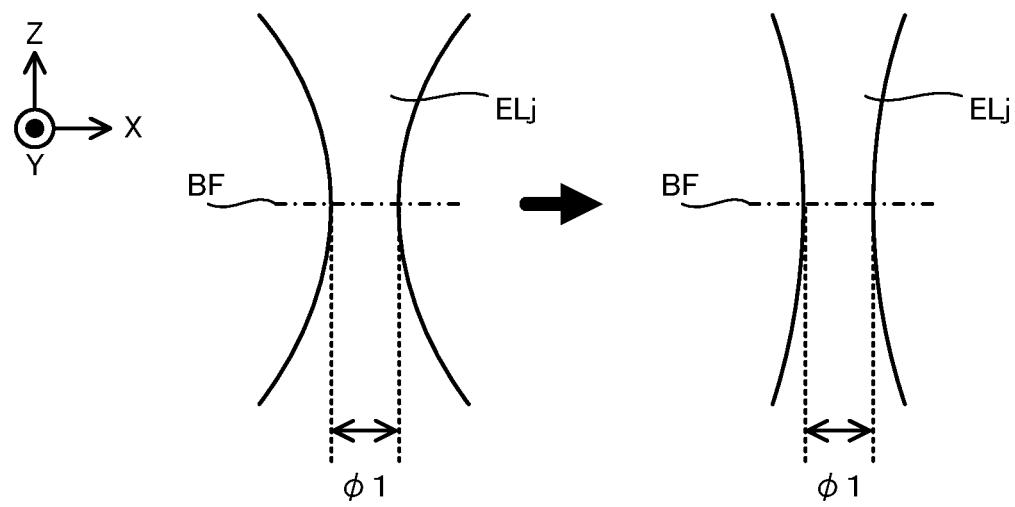

FIG. 50 is a cross-sectional view that illustrates the processing light that is emitted to the coat of paint from an optical system that includes a NA adjustment optical element and the processing light that is emitted to the coat of paint from an optical system that does not include the NA adjustment optical element.

Figure 51:
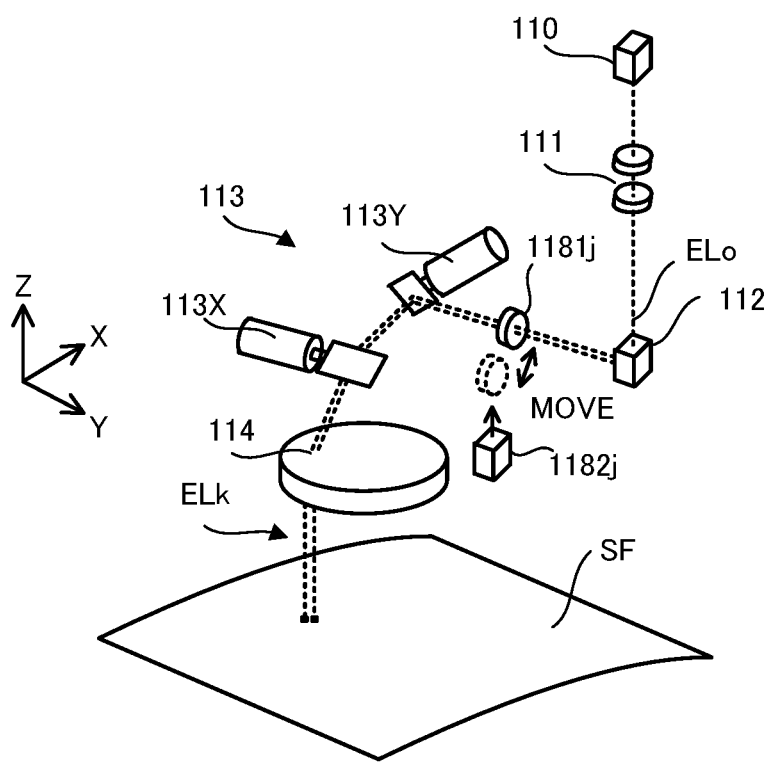

FIG. 51 is a cross-sectional view that illustrates another example of the structure of the light irradiation apparatus in the seventh embodiment.

Figure 52:
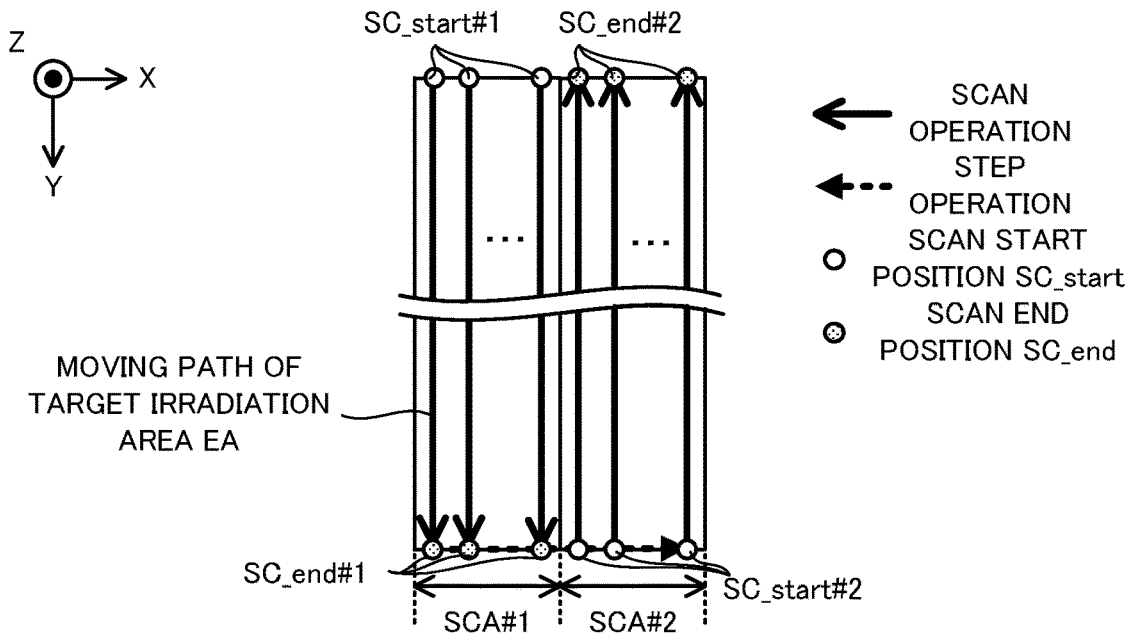

FIG. 52 is a plan view that illustrate one example of the moving path of the target irradiation area.

Figure 53:
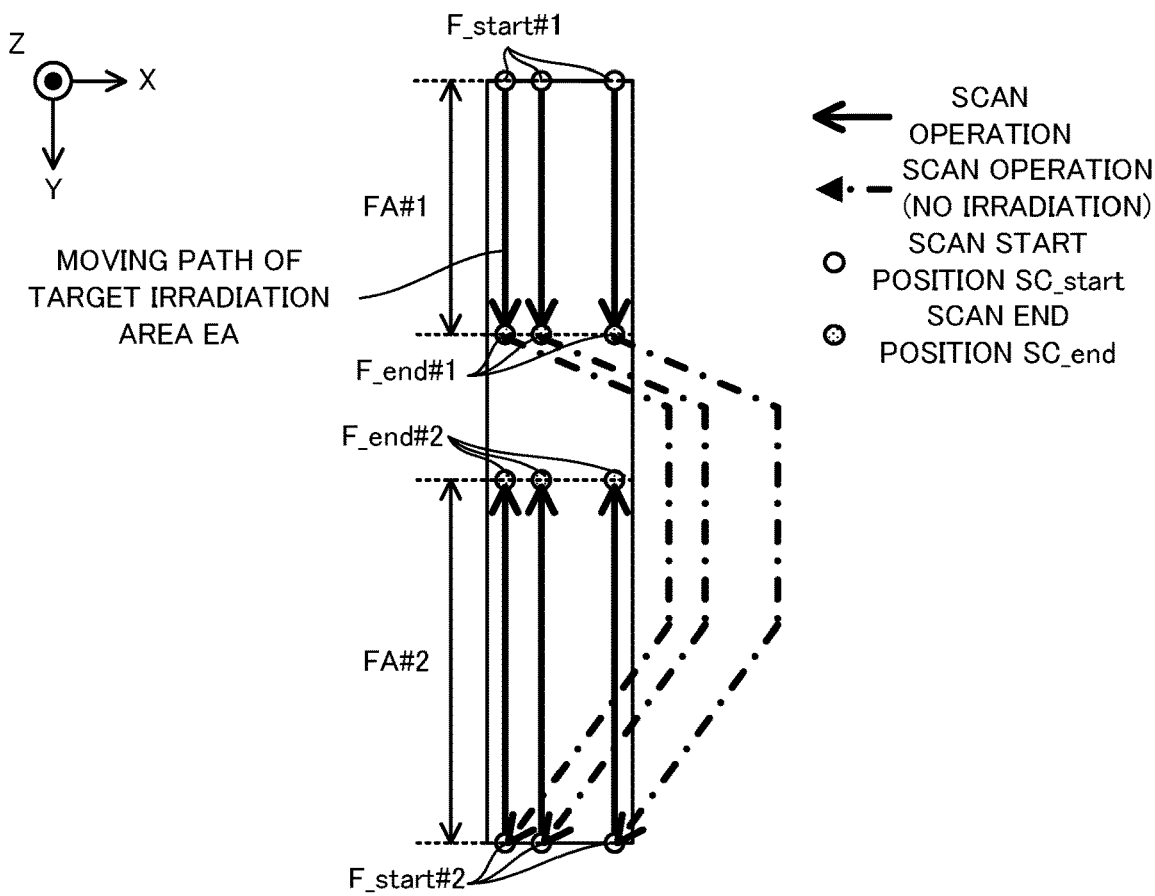

FIG. 53 is a plan view that illustrate one example of the moving path of the target irradiation area.

Figure 54:
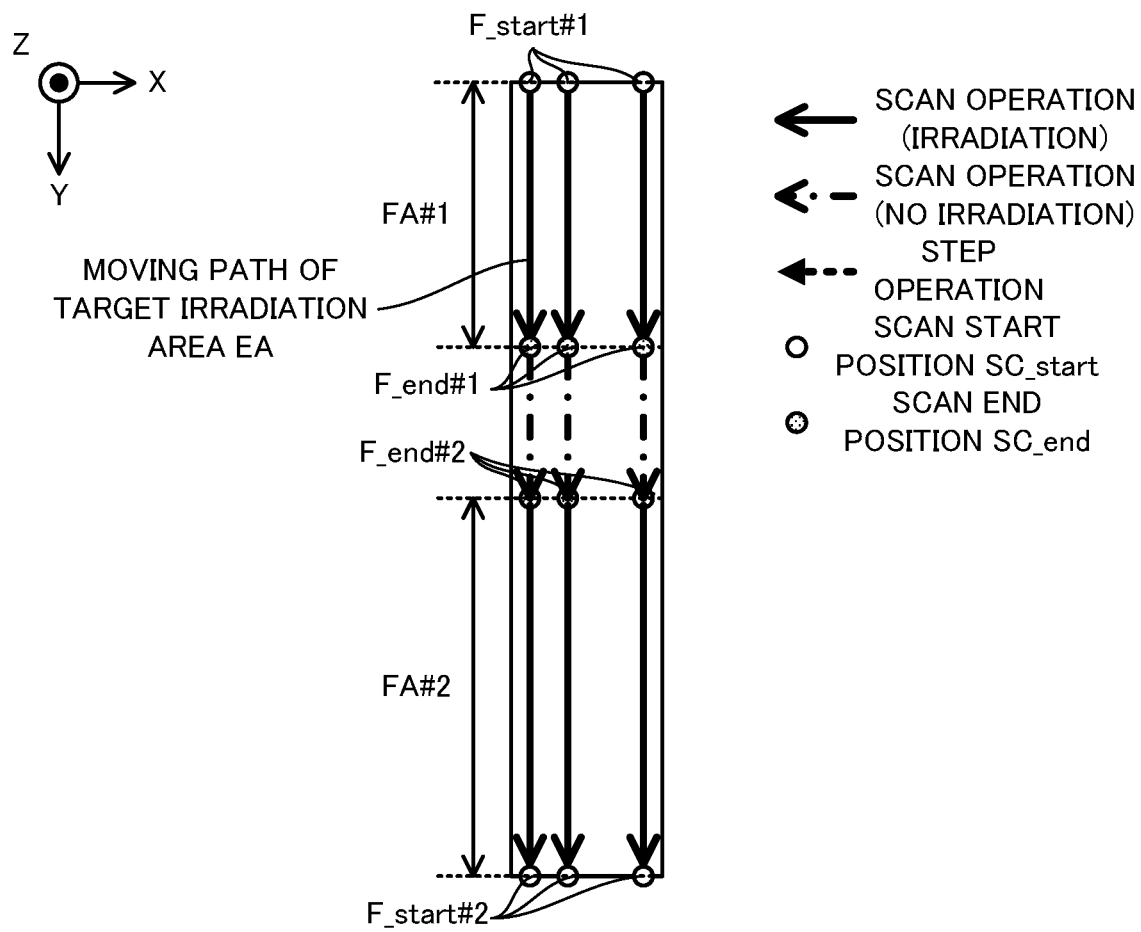

FIG. 54 is a plan view that illustrate one example of the moving path of the target irradiation area.

Figure 55:
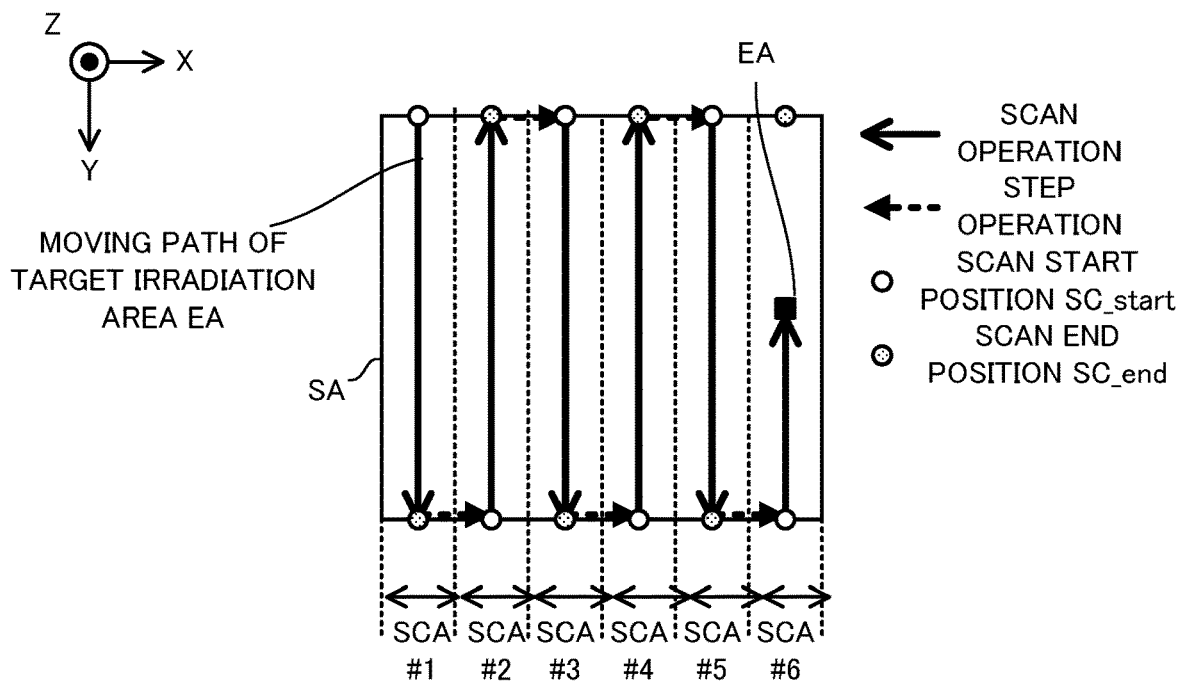

FIG. 55 is a plan view that illustrate one example of the moving path of the target irradiation area when a moving direction is set to satisfy a first standard.

Figure 56:
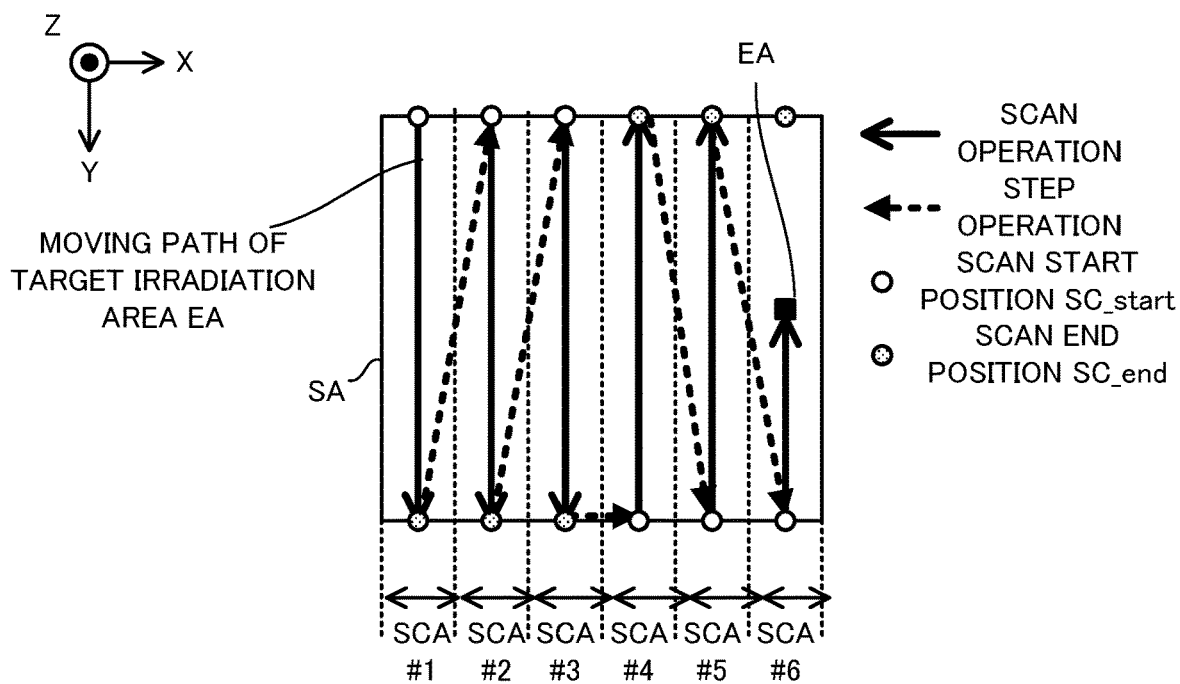

FIG. 56 is a plan view that illustrate one example of the moving path of the target irradiation area when the moving direction is set to satisfy a second standard.

Figure 57:
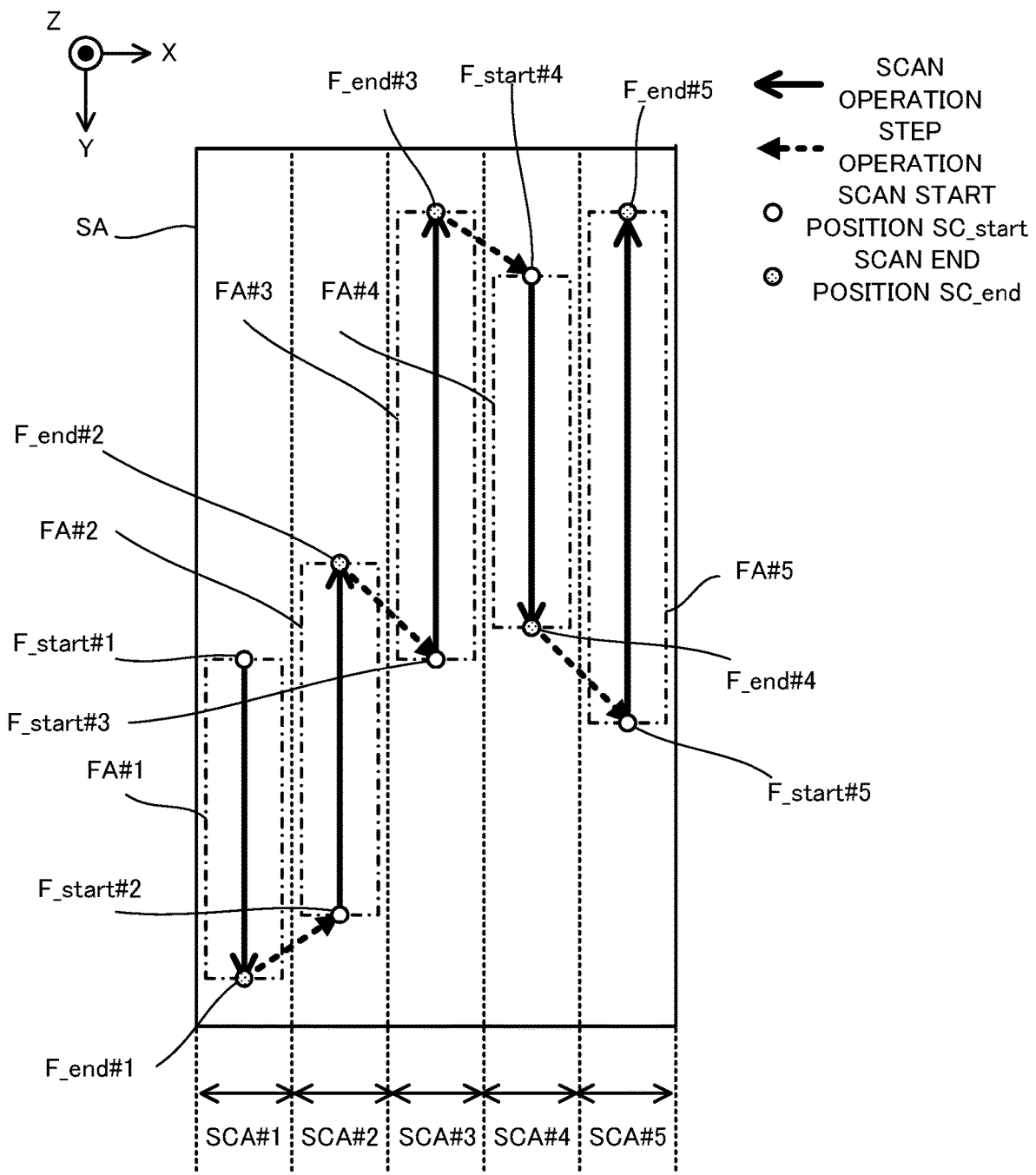

FIG. 57 is a plan view that illustrate one example of the moving path of the target irradiation area when the moving direction is set to satisfy a third standard.

Figure 58:
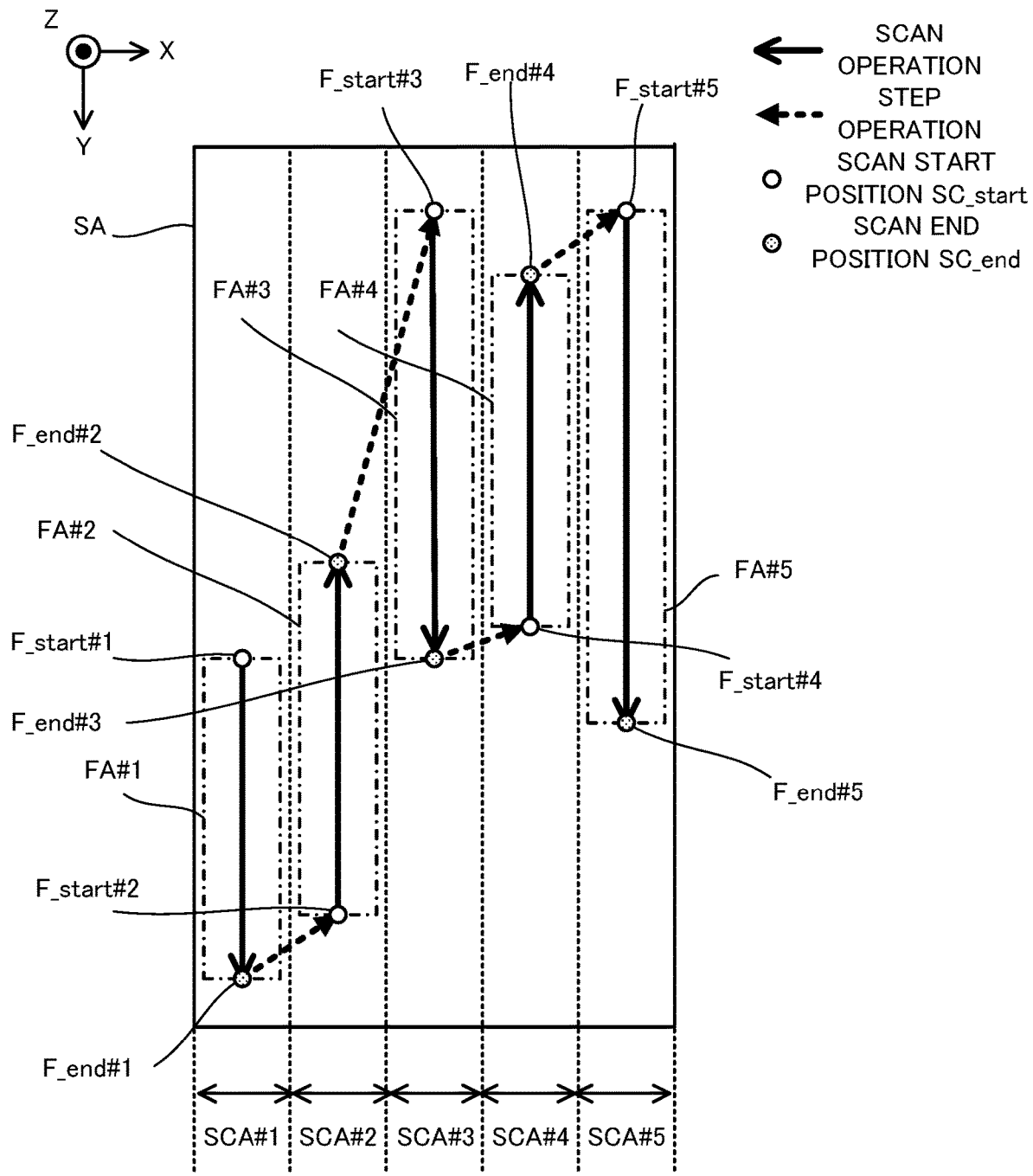

FIG. 58 is a plan view that illustrate one example of the moving path of the target irradiation area when the moving direction of the target irradiation area EA in a processing area illustrated in FIG. 57 is set to satisfy the first standard.

Figure 59:
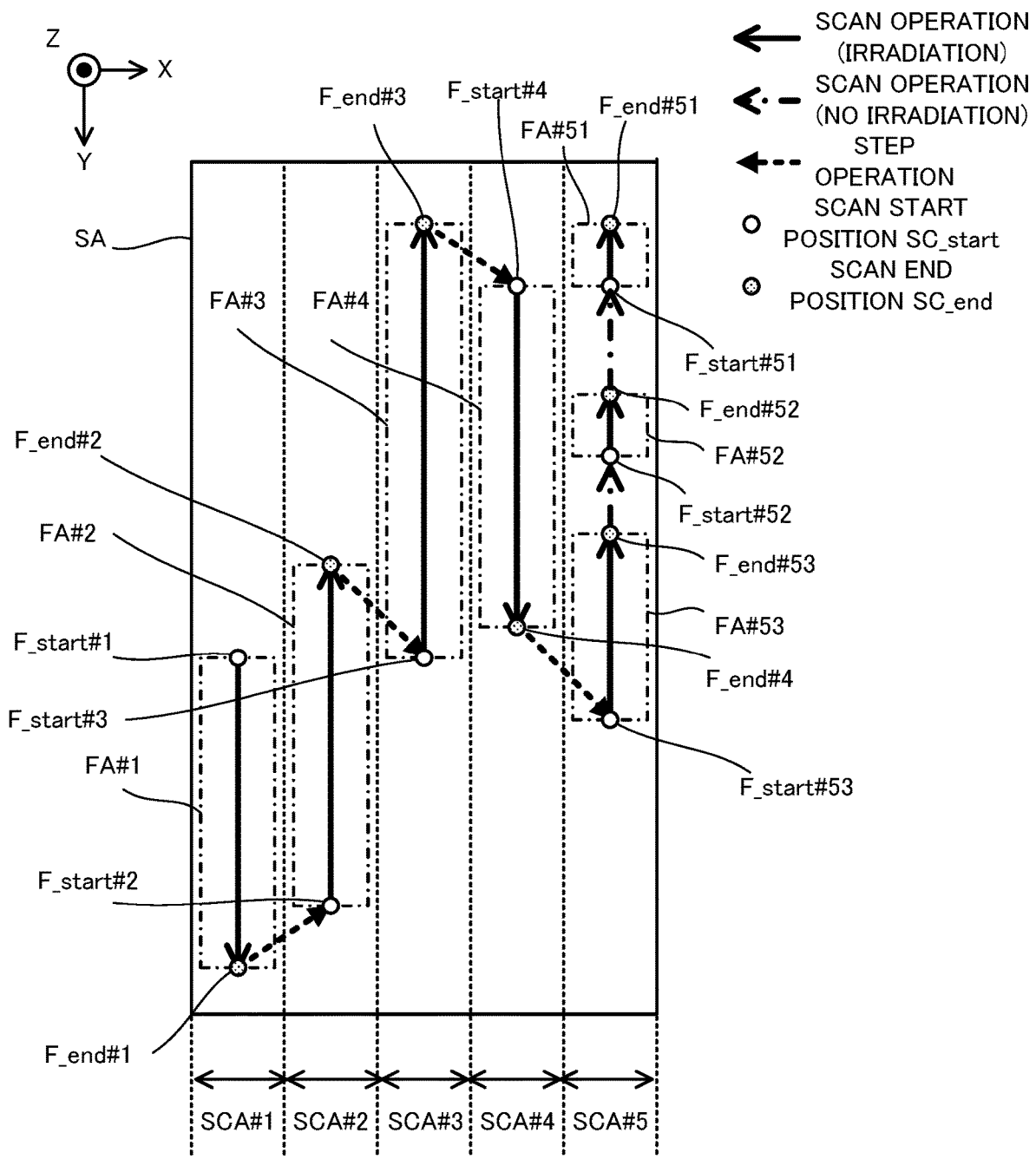

FIG. 59 is a plan view that illustrate one example of the moving path of the target irradiation area when the moving direction is set to satisfy a fourth standard.

Figure 60:
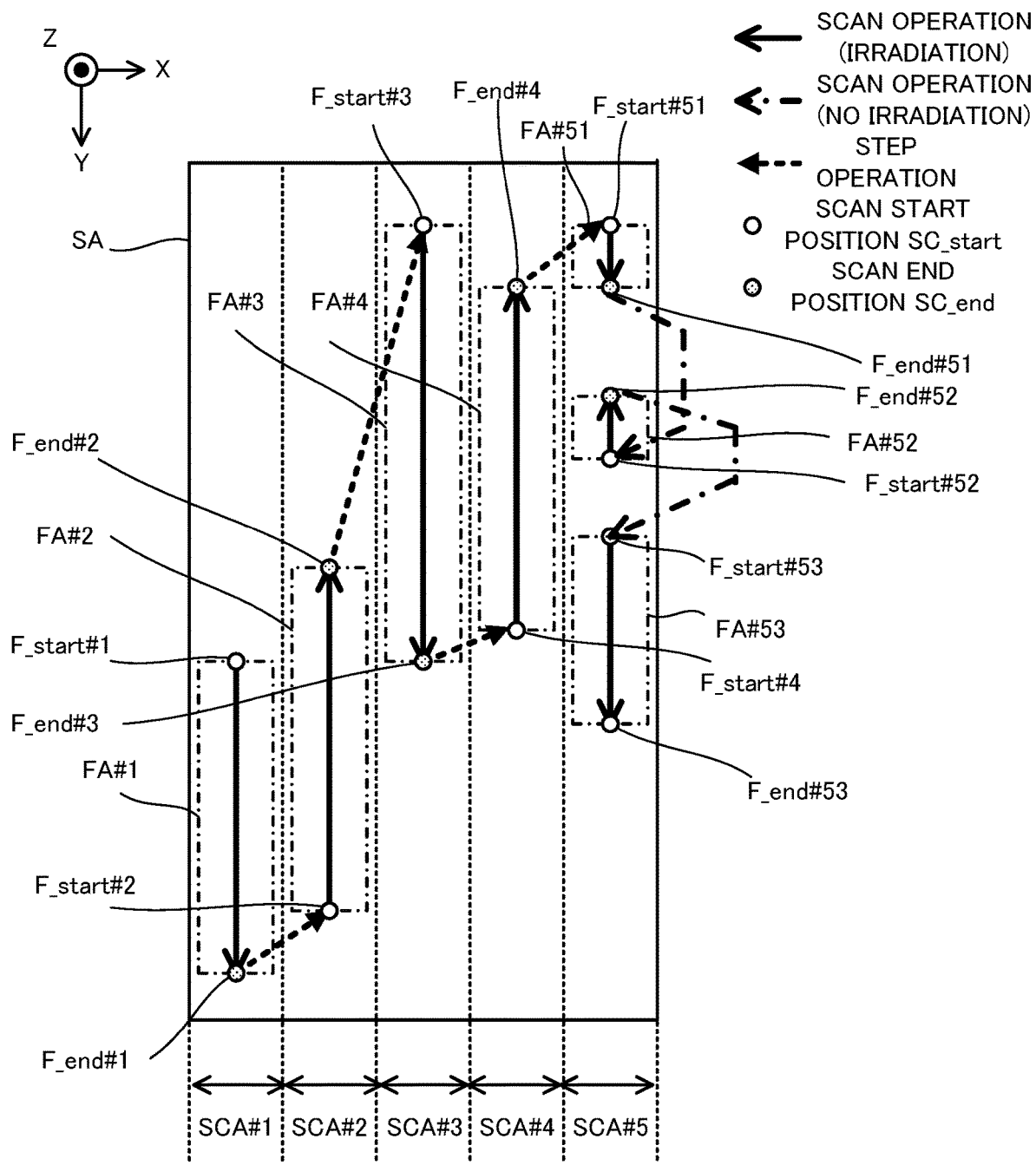

FIG. 60 is a plan view that illustrate one example of the moving path of the target irradiation area when the moving direction of the target irradiation area EA in a processing area illustrated in FIG. 59 is set to satisfy the first standard.

Figure 61:
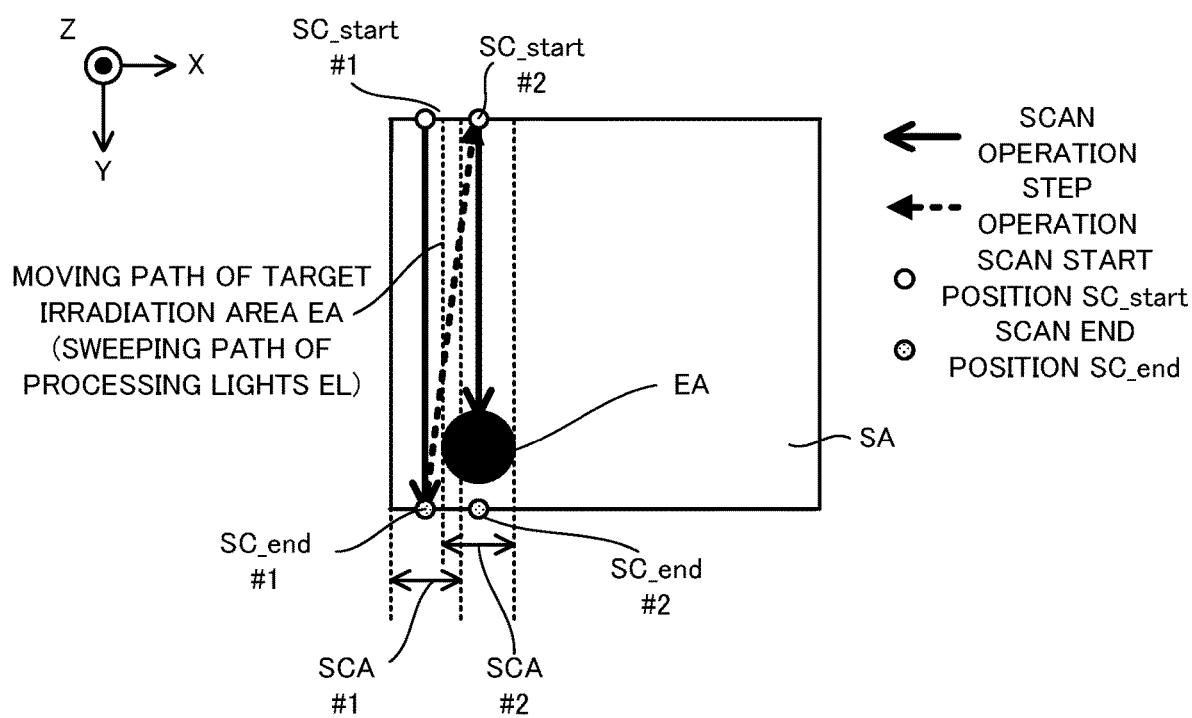

FIG. 61 is a plan view that illustrates the sweeping path of the processing light (namely, the moving path of the target irradiation area) during a period when the scan operation and the step operation are repeated.

FIG. 62 is a plan view that illustrates one example of changing a position of the target irradiation area for each time when the target irradiation area is scanned a plurality of times.

Figure 63A:
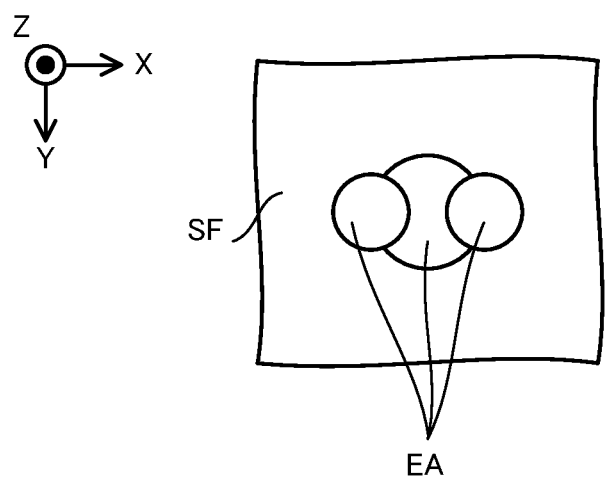
Figure 63B:
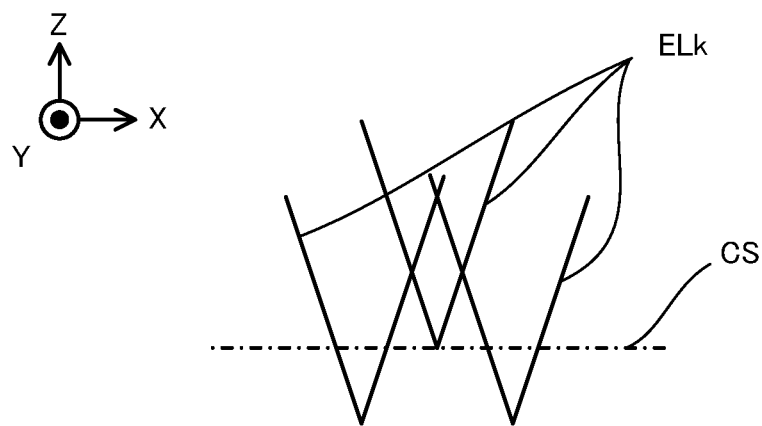

FIG. 63A is a plan view that illustrates one example of changing a size of the plurality of target irradiation areas and FIG. 63B is a cross-sectional view that illustrates one example of making a light concentration positions of the plurality of processing lights be different from each other.

Figure 64A:
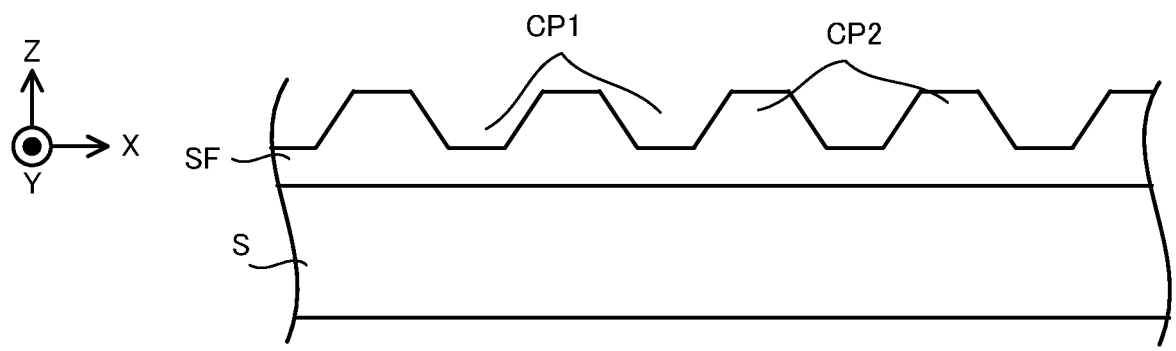
Figure 64B:
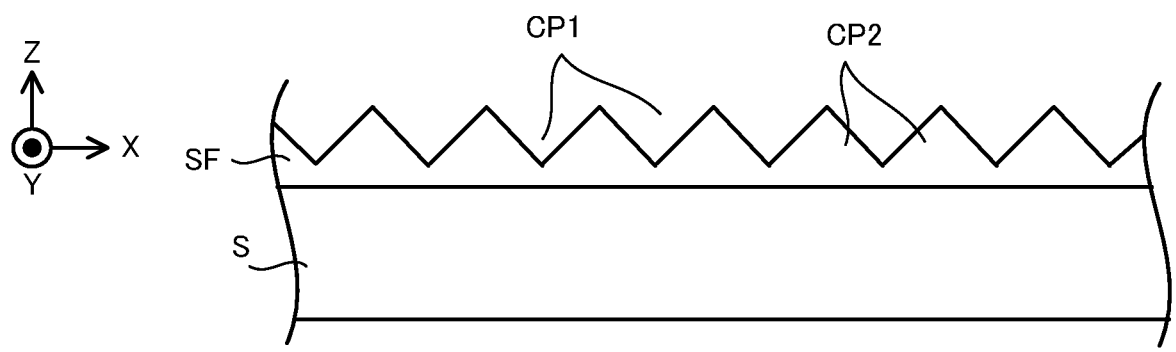
Figure 64C:
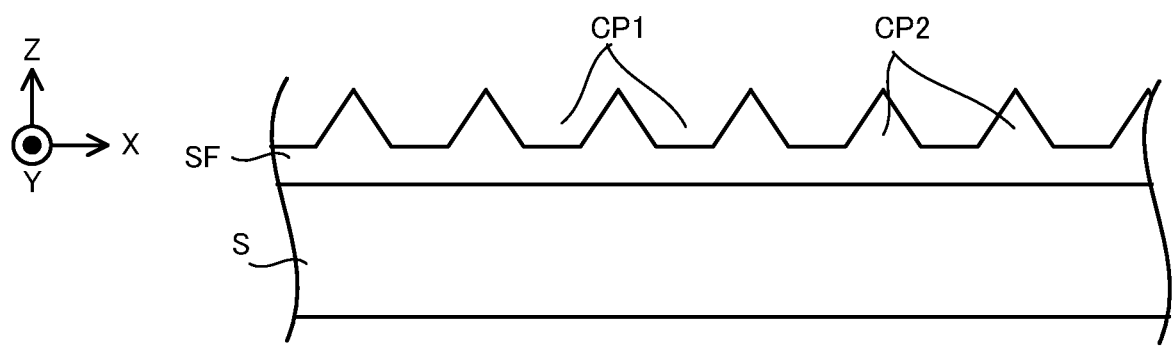

Each of FIG. 64A to FIG. 64C is a cross-sectional view that illustrates a cross-section of the riblet structure.

Each of FIG. 65A to FIG. 65H is a plan view that illustrates one example of changing the position of the target irradiation area for each time when the target irradiation area is scanned a plurality of times.

DESCRIPTION OF EMBODIMENTS

Next, with reference to drawings, embodiments of a processing apparatus, a processing method and a processing system will be described. In the below described description, the embodiments of the processing apparatus, the processing method and the processing system will be described by using a processing system SYS that performs a processing operation for processing a coat SF of paint formed on a surface of a processing target object S by using processing light ELk. However, the present invention is not limited to the below described embodiments.

Moreover, in the below described description, a positional relationship of various components that constitute the processing system SYS will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction) in the below described description, for convenience of the description. Moreover, rotational directions (in other words, inclination directions) around the X axis, the Y axis and the Z axis are referred to as a θX direction, a θY direction and a θZ direction, respectively. Here, the Z axis direction may be a gravity direction. Moreover, an XY plane may be a horizontal direction.

(1) Processing SYSa in First Embodiment

Firstly, a processing system SYS in a first embodiment (in the below described description, the processing system SYS in the first embodiment is referred to as a "processing system SYSa") will be described.

(1-1) Structure of Processing SYSa

Figure 1:
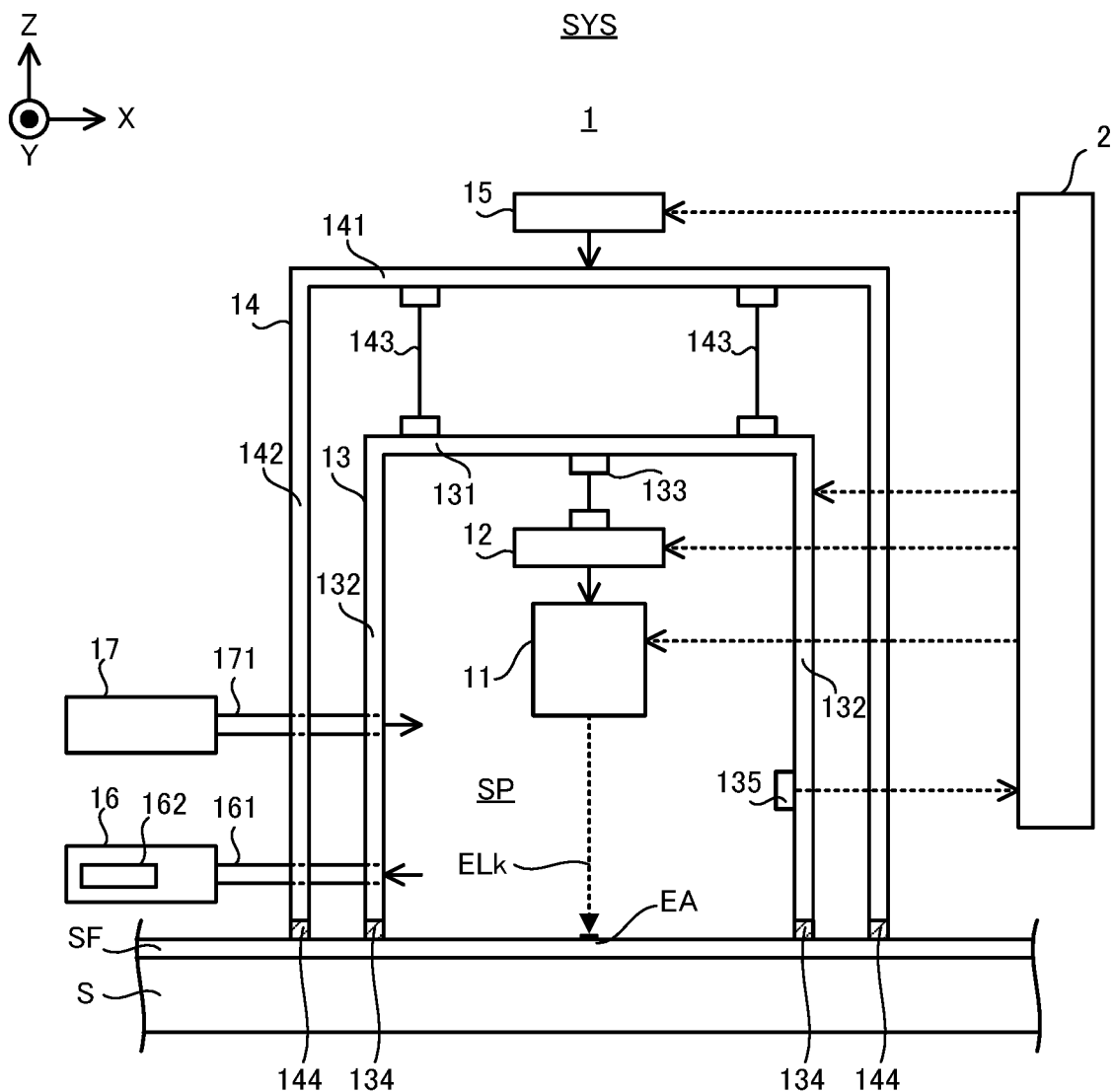
FIG. 1 is a cross-sectional view that schematically illustrates an entire structure of a processing system in a first embodiment.

Firstly, with reference to FIG. 1, a structure of the processing system SYSa in the first embodiment will be described. FIG. 1 is a cross-sectional view that schematically illustrates the structure of the processing system SYSa in the first embodiment.

As illustrated in FIG. 1, the processing system SYS processes the coat SF of paint that is formed (for example, coated) on the surface of the processing target object S. The processing target object S may be a metal, may be an alloy (for example, a duralumin and the like), may be a resin (for example, CFRP (Carbon Fiber Reinforced Plastic) and the like), may be a glass or may be an object that is made from any other material, for example. The coat SF of paint is a film of a painting material that covers the surface of the processing target object S. Thus, the coat SF of the paint may be referred to as a paint layer. The processing target object S is a base member for the coat SF of paint. A thickness of the coat SF of paint is several tens of microns to several hundreds of microns, for example, however, may be any other size. The painting material that constitutes the coat SF of paint may include a resin painting material or may include any other type of painting material, for example. The resin painting material may include at least one of an acrylic type of painting material (for example, a painting material including an acrylic polyol), a polyurethane type of painting material (for example, a painting material including a polyurethane polyol), a polyester type of painting material (for example, a painting material including a polyester polyol), a vinyl type of painting material, a fluorine type of painting material (for example, a painting material including a fluorine polyol), a silicon type of painting material and an epoxy type of painting material, for example.

FIG. 1 illustrates an example in which the processing system SYSa (especially, a below described processing apparatus 1 of the processing system SYSa) is disposed on the processing target object S having the surface that is along the horizontal plane (namely, the XY plane). However, the processing system SYSa is not always disposed on the processing target object S having the surface that is along the horizontal plane. For example, as described in later with reference to FIG. 5 and so on, the processing system SYSa may be disposed on the processing target object S having the surface that intersects with the horizontal plane. The processing system SYSa may be disposed to be suspended from the processing target object S. In this case, the X axis direction and the Y axis direction may be defined as directions along (typically, parallel to) the surface of the processing target object S and Z axis direction may be defined as a direction that intersects with (typically, a direction perpendicular to) the surface of the processing target object S.

The processing system SYSa irradiates the coat SF of paint with the processing light ELk in order to process the coat SF of paint. The processing light ELk may be any type of light, as long as the coat SF of paint is processed by irradiating the coat SF of paint with it. As one example, the processing light ELk may be a laser light. Moreover, the processing light ELk may be a light having any wavelength, as long as the coat SF of paint is processed by irradiating the coat SF of paint with it. The first embodiment will be described by using an example in which the processing light ELk is invisible light (for example, at least one of infrared light, ultraviolet light and the like). Namely, the first embodiment will be described by using an example in which the processing light ELk is at least one of light a wavelength of which is included in a wavelength band that is shorter than a wavelength of visible light and light a wavelength of which is included in a wavelength band that is longer than the wavelength of the visible light. However, the processing light ELk may be a visible light.

Here, with reference to FIG. 2A and FIG. 2B, an aspect of a processing of the coat SF of paint by using the processing light ELk will be described. Each of FIG. 2A and FIG. 2B is a cross-sectional view that schematically illustrates the aspect of the processing of the coat SF of paint formed on the surface of the processing target object S.

Figures 2A, 2B:
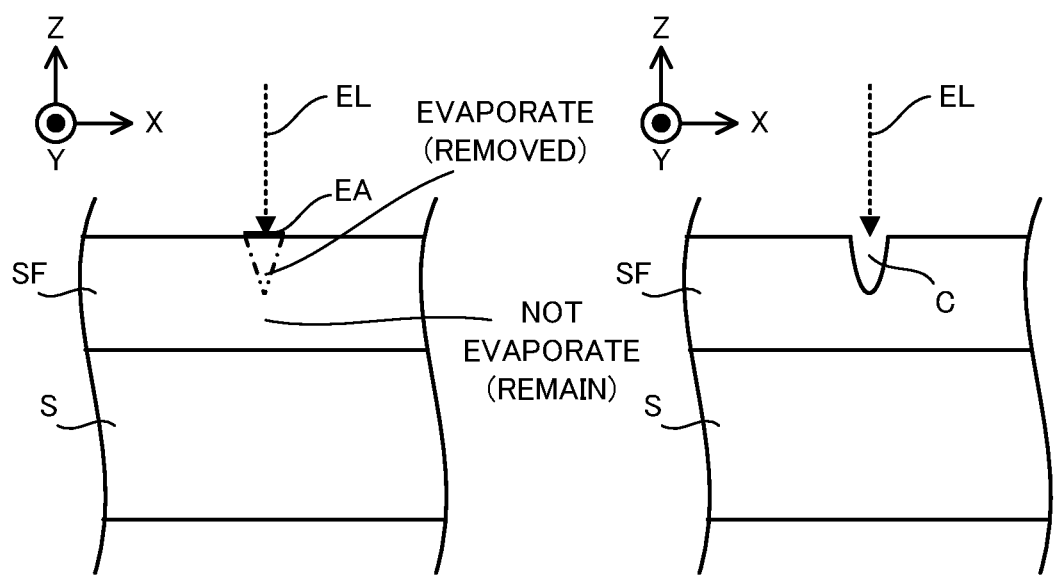
FIG. 2B is a cross-sectional view that schematically illustrates an aspect of a processing of a coat of paint formed on a surface of a processing target object.

As illustrated in FIG. 2A, the processing system SYSa irradiates a target irradiation area EA that is set on the surface of the coat SF of paint with the processing light ELk. Note that the target irradiation area EA is an area that is expected to be irradiated with the processing light ELk by the processing system SYSa. As illustrated in FIG. 2A, when the target irradiation area EA is irradiated with the processing light ELk, a part of the coat SF of paint that overlaps with the target irradiation area EA (namely, the coat of paint that is located at an −Z side of the target irradiation area EA) evaporates by the processing light ELk. Here, all of the coat SF of paint that overlaps with the target irradiation area EA does not evaporate along a thickness direction of the coat SF of paint. Namely, a part of the coat SF of paint that overlaps with the target irradiation area EA (specifically, a part of the coat SF of paint that is relatively close to the target irradiation area EA) evaporates and other part of the coat SF of paint that overlaps with the target irradiation area EA (specifically, a part of the coat SF of paint that is relatively far away from the target irradiation area EA) does not evaporate along the thickness direction of the coat SF of paint. In other words, the coat SF of paint evaporates so that the processing target object S is not exposed from the coat SF of paint. Thus, a characteristic of the processing light ELk may be set to be a desired characteristic that allows the coat SF of paint to evaporate so that the processing target object S is not exposed from the coat SF of paint. The characteristic of the processing light ELk may be set to be a desired characteristic that does not allow the irradiation of the processing light ELk to affect the processing target object S. The characteristic of the processing light ELk may be set to be a desired characteristic that allows the irradiation of the processing light ELk to affect only the coat SF of paint. Note that the characteristic of the processing light ELk may include at least one of the wavelength of the processing light ELk, an amount of energy that is transmitted from the processing light ELk to the surface of the coat SF of paint per unit time and/or per unit area, a distribution of an intensity of the processing light ELk on the surface of the coat SF of paint, an irradiation time of the processing light ELk on the surface of the coat SF of paint and a size (as one example, at least one of a spot diameter and an area size) of the processing light ELk on the surface of the coat SF of paint.

In this case, the energy of the processing light ELk with which the coat SF of paint is irradiated is set so that the irradiation of the processing light ELk does not affect the processing target object S. The energy of the processing light ELk is set so that the processing light ELk does not penetrate the coat SF of paint and does not reach the processing target object S. In other words, the energy of the processing light ELk is set so that the irradiation of the processing light ELk affects only the coat SF of paint.

As a result, the coat SF of paint is removed at a part at which the coat SF of paint evaporates. On the other hand, the coat SF of paint remains as it is at a part at which the coat SF of paint does not evaporate. Namely, as illustrated in FIG. 2B, the coat SF of paint is partially removed at a part that is irradiated with the processing light ELk. As a result, as illustrated in FIG. 2B, the thickness of the coat SF of paint is thinner at the part that is irradiated with the processing light ELk, compared to a part that is not irradiated with the processing light ELk. In other words, as illustrated in FIG. 2B, there are the coat SF of paint that is relatively thick because it is not irradiated with the processing light ELk and the coat SF of paint that is relatively thin because it is irradiated with the processing light ELk on the surface of the processing target object S. Namely, the thickness of the coat SF of paint is adjusted at least partially by the irradiation of the processing light ELk. A part of the coat SF of paint is removed in the thickness direction (the Z axis direction in the example illustrated in FIG. 2B) by the irradiation of the processing light ELk. As a result, a concave part (in other words, a groove part) C corresponding to the part at which the coat SF of paint is relatively thin is formed on the surface of the coat SF of paint. Therefore, "an operation for processing the coat SF of paint" in the present embodiment includes at least one of an operation for adjusting the thickness of the coat SF of paint, an operation for removing a part of the coat SF of paint and an operation for forming the concave part C at the coat SF of paint.

The coat SF of paint evaporates by absorbing the processing light ELk. Namely, the coat SF of paint is decomposed photochemically, for example, and removed by means of the energy of the processing light ELk being transmitted to the coat SF of paint. Incidentally, when the processing light ELk is the laser light, a phenomenon in which the coat SF of paint is decomposed photochemically and removed by means of the energy of the processing light ELk being transmitted to the coat SF of paint is sometimes referred to as a laser ablation. Thus, the coat SF of paint includes a material that is allowed to absorb the processing light ELk. Specifically, the coat SF of paint may include a material in which an absorptance relating to the processing light ELk (for example, an absorptance relating to a light in a wavelength band including a wavelength that is different from the wavelength of the visible light, when the processing light ELk is the invisible light) is equal to or higher than a first absorption threshold value, for example. Conversely speaking, a light component in a wavelength band that allows an absorptance relative to the coat SF of paint to be equal to or higher than the first absorption threshold value may be used as the processing light ELk.

The material of the coat SF of paint may include a coloring matter (specifically, at least one of pigment and dye). When the coat SF of paint includes the coloring matter, the coloring matter may be a coloring matter that takes on a predetermined color when it is irradiated with the visible light. As a result, the coat SF of paint including this coloring matter takes on the predetermined color. In this case, the coloring matter may have a characteristic that the absorptance of light component in a first wavelength band including a wavelength that is allowed to be recognized by a human as the predetermined colored light when it is reflected by the coat SF of paint among a wavelength band of the visible light is different from the absorptance of light component in a second wavelength band of the visible light that is different from the first wavelength band so that the coat SF of paint takes on the predetermined color. For example, the coloring matter may have a characteristic that the absorptance of the light component in the first wavelength band is lower than the absorptance of the light component in the second wavelength band. For example, the coloring matter may have a characteristic that the absorptance of the light component in the first wavelength band is equal to or lower than a predetermined second absorption threshold value (note that the second absorption threshold value is lower than the first absorption threshold value) and the absorptance of the light component in the second wavelength band is equal to or higher than a predetermined third absorption threshold value (note that the third absorption threshold value is higher than the second absorption threshold value). As one example of the coloring matter that is allowed to absorb the processing light ELk that is the invisible light to a certain degree and that takes on the predetermined color, there is a near infrared absorption coloring matter manufactured by Spectrum Info Ltd located in Kiev in Ukraine (as one example, a tetrafluoro boronated 4-((E)-2-{(3E)-2-chloro-3-[2-(2,6-diphenyl-4H-thiopyran-4-ylidene) ethylidene]cyclohexa-1-yen-1-yl}vinyl)-2,6-diphenylthiopyrylium), for example. Incidentally, when the coat SF of paint is transparent, the coat SF of paint does not include the coloring matter.

Alternatively, when the coat SF of paint includes the coloring matter, the coloring matter may be a coloring matter that is transparent to the visible light. As a result, the coat SF of paint including this coloring matter is a transparent film (what we call a clear coat). Incidentally, the "transparent film" here may mean a film through which light component in a wavelength band that is a part of the wavelength band of the visible light passes. In this case, the coloring matter may have a characteristic that it does not absorb the visible light much (namely, reflects to a certain degree) so that the coat SF of paint is transparent. For example, the coloring matter may have a characteristic that the absorptance of the visible light is lower than a predetermined fourth absorption threshold value. As one example of the coloring matter that is allowed to absorb the processing light ELk that is the invisible light to a certain degree and that is transparent to the visible light, there is a near infrared absorption coloring matter manufactured by Spectrum Info Ltd located in Kiev in Ukraine (as one example, a tetrafluoro boronated 6-chloro-2-[(E)-2-(3-{(E)-2-[6-chloro-1-ethylbenzo [cd]indole-2(1H)-ylidene]ethylidene}-2-phenyl-1-cyclopentene-1-yl) ethenyl]-1-ethylbenzo [cd]-indolium), for example.

Again in FIG. 1, in order to process the coat SF of paint, the processing system SYSa is provided with a processing apparatus 1 and a control apparatus 2. Furthermore, the processing apparatus 1 is provided with a light irradiation apparatus 11, a driving system 12, a housing apparatus 13, a support apparatus 14, a driving system 15, an exhaust apparatus 16 and a gas supply apparatus 17.

The light irradiation apparatus 11 is configured to irradiate the coat SF of paint with the processing light ELk under the control of the control apparatus 2. In order to irradiate the coat SF of paint with the processing light ELk, the light irradiation apparatus 11 is provided with a light source 110 that is configured to emit source light Els, a focusing lens 111, a multibeam optical system 112, a Galvano mirror 113 and a fθ lens 114, as illustrated in FIG. 3A that is a perspective view that illustrates a structure of the light irradiation apparatus 11.

The light source 110 emits source light Elo. For example, the source light Elo is light having a characteristic (for example, at least one of a type, a wavelength and an energy) that is same as that of the processing light Elk, however, may be light having characteristic that is different from that of the processing light Elk. The light source 110 emits a pulsed light as the source light Elo, for example. As a light emitting time width (hereinafter, it is referred to as a "pulse width") of the pulsed light is shorter, a processing accuracy (for example, a forming accuracy of a riblet structure described later) improves. Therefore, the light source 1111 may emit the pulsed light having a relatively short pulse width as the source light ELo. For example, the light source 1111 may emit the pulsed light having the pulse width that is equal to or shorter than 1000 nanoseconds as the source light ELo.

The focusing lens 111 is an optical element that is constructed from one or more lens and that is for adjusting light concentration position of the source light Elo (namely, a focus position of the light irradiation apparatus 11) by adjusting a position of at least one lens thereof along an optical axis direction.

Figure 4:
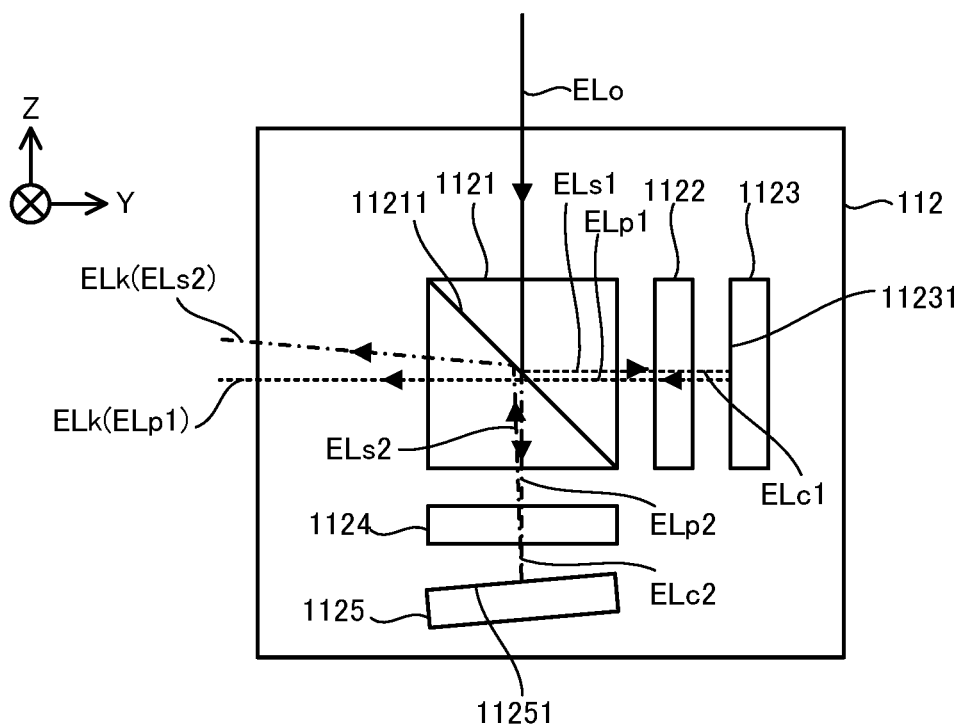
FIG. 4 is a cross-sectional view that illustrates a structure of a multibeam optical system.

The multibeam optical system 112 divides (in other words, separates or branches) the source light Elo from the light source 111 into a plurality of processing lights ELk. In order to divide the source light ELo into the plurality of processing lights ELk, the multibeam optical system 112 is provided with a polarized beam splitter 1121, a ¼ wavelength plate 1122, a reflective mirror 1123, a ¼ wavelength plate 1124 and a reflective mirror 1125, as illustrated in FIG. 4 that is a cross-sectional view that illustrates a structure of the multibeam optical system 112.

The source light ELo from the light source 111 enters a split surface 11211 of the polarized beam splitter 1121. S polarized light ELs1 of the source light ELo is reflected by the split surface 11211. On the other hand, P polarized light ELp2 of the source light ELo passes through the split surface 11211. Namely, the polarized beam splitter 1121 divides the source light ELo into the s polarized light ELs1 and the p polarized light ELp2.

The s polarized light ELs1 reflected by the polarized beam splitter 1121 passes through the ¼ wavelength plate 1122. As a result, the s polarized light ELs1 is converted into circular polarized light ELc1. The circular polarized light ELc1 passing through the ¼ wavelength plate 1122 is reflected by a reflective surface 11231 of the reflective mirror 1123. The circular polarized light ELc1 reflected by the reflective mirror 1123 passes through the ¼ wavelength plate 1122 again and is converted into p polarized light ELp1. The p polarized light ELp1 passing through the ¼ wavelength plate 1122 enters the split surface 11211 of the polarized beam splitter 1121.

On the other hand, the p polarized light ELp2 passing through the polarized beam splitter 1121 passes through the ¼ wavelength plate 1124. As a result, the p polarized light ELp2 is converted into circular polarized light ELc2. The circular polarized light ELc2 passing through the ¼ wavelength plate 1124 is reflected by a reflective surface 11251 of the reflective mirror 1125. The circular polarized light ELc2 reflected by the reflective mirror 1125 passes through the ¼ wavelength plate 1125 again and is converted into s polarized light ELs2. The s polarized light ELs2 passing through the ¼ wavelength plate 1125 enters the split surface 11211 of the polarized beam splitter 1121.

The p polarized light ELp1 entering the polarized beam splitter 1121 passes through the split surface 11211. The p polarized light ELp1 passing through the split surface 11211 is emitted as one of the plurality of processing lights ELk toward the Galvano mirror 113 from the multibeam optical system 112. On the other hand, the s polarized light ELs2 entering the polarized beam splitter 1121 is reflected by the split surface 11211. The s polarized light Els2 reflected by the split surface 11211 is emitted as one of the plurality of processing lights ELk toward the Galvano mirror 113 from the multibeam optical system 112. Namely, the polarized beam splitter 1121 not only serves as an optical system that divides the source light ELo into the s polarized light ELs1 and the p polarized light ELp2 but also serve as an optical system that merges the s polarized light ELs1 and the p polarized light ELp2, which enter the polarized beam splitter 1121 from different directions, as the plurality of processing lights ELk that are directed toward the Galvano mirror 113.

Figures 5A, 5B:
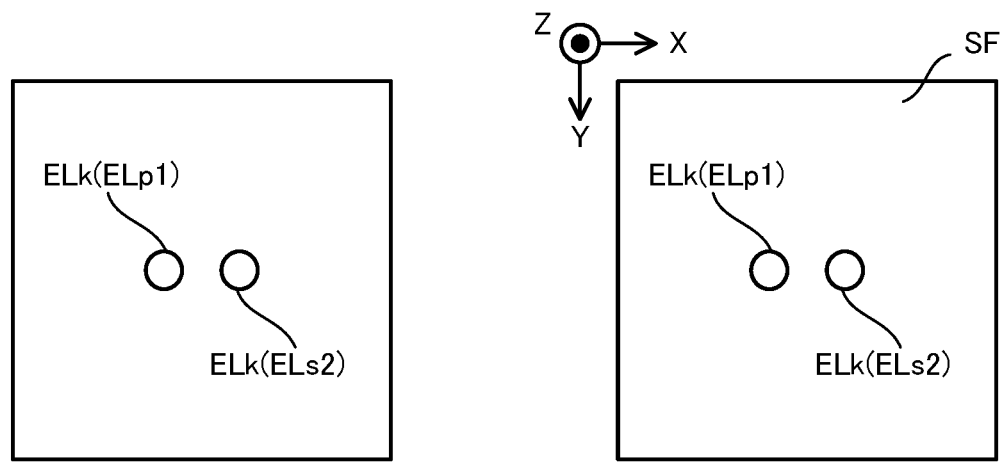
FIG. 5A is a plan view that illustrates beam spots that are formed on a predetermined optical plane by a plurality of processing lights emitted from the multibeam optical system and FIG. 5B is a plan view that illustrates beam spots that are formed on a coat of paint by the plurality of processing lights emitted from the multibeam optical system.

Here, as illustrated in FIG. 4, the reflective mirrors 1123 and 1125 are aligned so that an incident angle of the circular polarized light ELc1 relative to the reflective surface 11231 of the reflective mirror 1123 is different from an incident angle of the circular polarized light ELc2 relative to the reflective surface 11251 of the reflective mirror 1125. Namely, the reflective mirrors 1123 and 1125 are aligned so that an angle between the reflective surface 11231 of the reflective mirror 1123 and an axis along a traveling direction of the circular polarized light ELc1 is different from an angle between the reflective surface 11251 of the reflective mirror 1153 and an axis along a traveling direction of the circular polarized light ELc2. FIG. 4 illustrates an example in which the reflective mirrors 1123 and 1125 are aligned so that the circular polarized light ELc1 vertically enters the reflective surface 11231 and the circular polarized light ELc2 obliquely enters the reflective surface 11251. As a result, an axis along a traveling direction of the p polarized light ELp_1 passing through the split surface 11211 intersects with an axis along a traveling direction of the s polarized light ELs2 reflected by the split surface 11211. Namely, a plurality of axes each of which is along respective one of the traveling directions of the plurality of processing lights ELk emitted from the multibeam optical system 112 intersect. In this case, the reflective mirrors 1123 and 1125 are configured to serve as an optical system that allows the traveling directions of the plurality of processing lights ELk to be different from each other. As a result, as illustrated in FIG. 5A, the plurality of processing lights ELk passes through different positions on an optical plane that intersects with the traveling directions of the plurality of processing lights ELk. Namely, the plurality of processing lights ELk forms a plurality of beam spots, respectively, on the optical plane that intersects with the traveling directions of the plurality of processing lights ELk. As a result, when the coat SF of paint is irradiated with the plurality of these processing lights ELk, the plurality of processing lights ELk forms a plurality of beam spots (namely, irradiation areas), respectively, on the coat SF of paint, as illustrated in FIG. 5B. Namely, the multibeam optical system 112 emits the plurality of processing lights ELk with which different positions on the coat SF of paint are irradiated, respectively. As a result, the coat SF of paint is irradiated with the plurality of processing lights ELk simultaneously. Namely, a plurality of target irradiation areas EA are set on the coat SF of paint simultaneously.

Figure 3:
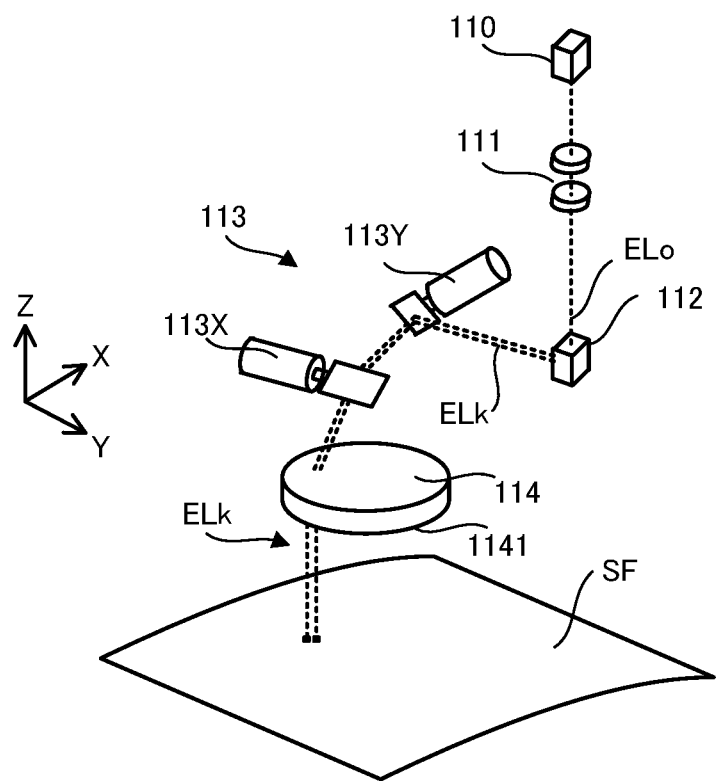
FIG. 3 is a perspective view that schematically illustrates a light irradiation apparatus of the processing system in the first embodiment.

Again in FIG. 3, the Galvano mirror 113 is disposed on an optical path of the plurality of processing lights ELk. The Galvano mirror 113 is disposed between the multibeam optical system 112 and the fθ lens 114. The Galvano mirror 113 deflects the plurality of processing lights ELk so that the surface of the coat SF of paint is scanned with the plurality of processing lights ELk emitted from the multibeam optical system 112 (namely, the plurality of target irradiation areas EA that are irradiated with the plurality of processing lights ELk, respectively, moves on the surface of the coat SF of paint). Note that the surface of the coat SF of paint may be swept with the plurality of processing lights ELk emitted from the optical system 112 by the Galvano mirror 113. The Galvano mirror 113 is provided with a X scanning mirror 113X and a Y scanning mirror 113Y. The Y scanning mirror 113Y reflects the plurality of processing lights ELk, which is emitted from the multibeam optical system 112, to the X scanning mirror 113X. The Y scanning mirror 113Y is configured to swing or rotate in the θX direction (namely, in a rotational direction around the X axis). Due to the swing or the rotation of the Y scanning mirror 113Y, the surface of the coat SF of paint is scanned with the plurality of processing lights ELk along the Y axis direction. Due to the swing or the rotation of the Y scanning mirror 113Y, the surface of the coat SF of paint is swept with the plurality of processing lights ELk along the Y axis direction. Due to the swing or the rotation of the Y scanning mirror 113Y, the traveling directions of the plurality of processing lights ELk are changed so that the surface of the coat SF of paint is scanned with the plurality of processing lights ELk along the Y axis direction. Due to the swing or the rotation of the Y scanning mirror 113Y, the plurality of target irradiation areas EA moves on the coat SF of paint along the Y axis direction. The Y scanning mirror 113Y changes a relative positional relationship between the plurality of target irradiation areas EA and the coat SF of paint along the Y axis direction. The X scanning mirror 113X reflects the plurality of processing lights ELk, which is reflected by the Y scanning mirror 113Y, to the fθ lens 114. The X scanning mirror 113Y is configured to swing or rotate in the θY direction (namely, in a rotational direction around the Y axis). Due to the swing or the rotation of the X scanning mirror 113X, the surface of the coat SF of paint is scanned with the plurality of processing lights ELk along the X axis direction. Due to the swing or the rotation of the X scanning mirror 113X, the surface of the coat SF of paint is swept with the plurality of processing lights ELk along the X axis direction. Due to the swing or the rotation of the X scanning mirror 113X, the traveling directions of the plurality of processing lights ELk are changed so that the surface of the coat SF of paint is scanned with the plurality of processing lights ELk along the X axis direction. Due to the swing or the rotation of the X scanning mirror 113X, the plurality of target irradiation areas EA moves on the coat SF of paint along the X axis direction. The X scanning mirror 113X changes a relative positional relationship between the plurality of target irradiation areas EA and the coat SF of paint along the X axis direction. Note that the Galvano mirror 113 may be referred to as a displacement member, because it is configured to move (namely, displace) the target irradiation areas EA on the surface of the coat SF of paint.

The fθ lens 114 is disposed on an optical path of the plurality of processing lights ELk from the Galvano mirror 113. The fθ lens 114 is an optical element for condensing the plurality of processing lights ELk from the Galvano mirror 113 on the coat SF of paint. The fθ lens 114 is a terminal optical element that is disposed at the most light emitting side of the light irradiation apparatus 11 (in other word, that is closest to the coat SF of paint or that is disposed at an end of optical paths of the plurality of processing lights ELk) among the optical element(s) of the light irradiation apparatus 11. The fθ lens 114 may be configured to be attachable to and detachable from the light irradiation apparatus 11. As a result, new fθ lens 114 is allowed to be attached to the light irradiation apparatus 11 after old fθ lens 114 is detached from the light irradiation apparatus 11. However, the light irradiation apparatus 11 may be provided with the optical element (for example, the cover lens and the like) that is disposed at more emitting side than the fθ lens 114. The optical element (for example, the cover lens and the like) that is disposed at more emitting side than the fθ lens 114 may be configured to be attachable to and detachable from the light irradiation apparatus 11.

Again in FIG. 1, the driving system 12 moves the light irradiation apparatus 11 relative to the coat SF of paint (namely, relative to the processing target object S on the surface of which the coat SF of paint is formed) under the control of the control apparatus 2. Namely, the driving system 12 moves the light irradiation apparatus 11 relative to the coat SF of paint so as to change a relative positional relationship between the light irradiation apparatus 11 and the coat SF of paint. When the relative positional relationship between the light irradiation apparatus 11 and the coat SF of paint is changed, a relative positional relationship between the plurality of target irradiation areas EA that are irradiated with the plurality of processing lights ELk, respectively, and the coat SF of paint is also changed. Thus, it can be said that the driving system 12 moves the light irradiation apparatus 11 relative to the coat SF of paint so as to change the relative positional relationship between the plurality of target irradiation areas EA and the coat SF of paint.

The driving system 12 may move the light irradiation apparatus 11 along the surface of the coat SF of paint. In an example illustrated in FIG. 1, the surface of the coat SF of paint is a plane that is parallel to at least one of the X axis and the Y axis, and thus, the driving system 12 may move the light irradiation apparatus 11 along at least one of the X axis and the Y axis. As a result, the target irradiation areas EA move on the coat SF of paint along at least one of the X axis and the Y axis. The driving system 12 may move the light irradiation apparatus 11 along the thickness direction of the coat SF of paint (namely, a direction that intersects with the surface of the coat SF of paint). In the example illustrated in FIG. 1, the thickness direction of the coat SF of paint is a direction along the Z axis, and thus, the driving system 12 may move the light irradiation apparatus 11 along the Z axis direction. The driving system 12 may move the light irradiation apparatus 11 along at least one of the θX direction, the θY direction and the θZ direction (namely, a rotational direction around the Z axis) in addition to at least one of the X axis, the Y axis and the Z axis.

The driving system 12 supports the light irradiation apparatus 11 and moves the supported light irradiation apparatus 11. In this case, the driving system 12 may be provided with a first support member that supports the light irradiation apparatus 11 and a first movement mechanism that moves the first support member, for example.

The housing apparatus 13 is provided with a top member 131 and a partition member 132. The top member 131 is disposed at +Z side than the light irradiation apparatus 11. The top member 131 is a plate-like member along the XY plane. The top member 131 supports the driving system 12 through a support member 133. The partition member 132 is disposed at (or near) an outer rim of a surface at the −Z side of the top member 131. The partition member 132 is a pipe-like (for example, a cylinder-like or rectangular pipe-like) member that extends from the top member 131 toward the −Z side. A space surrounded by the top member 131 and the partition member 132 is a containing space SP in which the light irradiation apparatus 11 and the driving system 12 are housed. Therefore, the above described driving system 12 moves the light irradiation apparatus 11 in the containing space SP. Moreover, the containing space SP includes a space between the light irradiation apparatus 11 and the coat SF of paint (especially, a space including the optical path of the processing lights ELk). More specifically, the containing space SP includes a space between the terminal optical element (for example, fθ lens 1123) of the light irradiation apparatus 11 and the coat SF of paint (especially, the space including the optical path of the processing lights ELk).

Each of the top member 131 and the partition member 132 is a member that is configured to shield the processing light ELk. Namely, each of the top member 131 and the partition member 132 is opaque to the wavelength of the processing light ELk. As a result, the processing light ELk propagating in the containing space SP does not leak outside the containing space SP (namely, outside the housing apparatus 13). Note that each of the top member 131 and the partition member 132 may be a member that is configured to fade the processing light ELk. Namely, each of the top member 131 and the partition member 132 is translucent to the wavelength of the processing light ELk. Moreover, each of the top member 131 and the partition member 132 is a member that does not allow unnecessary substance that is generated by the irradiation of the processing light ELk to pass therethrough (namely, that is configured to shield). At least one of vapor and fume of the coat SF of paint is one example of the unnecessary substance. As a result, the unnecessary substance that is generated in the containing space SP does not leak outside the containing space SP (namely, outside the housing apparatus 13).

An end part (specifically, an end part at the coat SF of paint side and an end part at the −Z side in the example illustrated in FIG. 1) 134 of the partition member 132 is allowed to contact with the surface of the coat SF of paint. When the end part 134 contacts with the coat SF of paint, the housing apparatus 13 (namely, the top member 131 and the partition member 132) maintains a sealability of the containing space SP with the coat SF of paint. The end part 134 is configured to change a shape thereof (especially, a shape of a contact surface (the surface at the −Z side in the example illustrated in FIG. 1) of the end part 134 that contacts with the coat SF of paint, the same applies to the below described description) in accordance with a shape of the surface of the coat SF of paint when it contacts with the coat SF of paint. For example, when the end part 134 contacts with the coat SF of paint the surface of which is a planar shape, the shape of the end part 134 becomes a planar shape as with the coat SF of paint. For example, when the end part 134 contacts with the coat SF of paint the surface of which is a curved shape, the shape of the end part 134 becomes a curved shape as with the coat SF of paint. As a result, the sealability of the containing space SP improves, compared to the case where the end part 134 is not configured to change the shape thereof in accordance with the shape of the surface of the coat SF of paint. The end part 134 that is made from a member having an elasticity such as a gum (in other words, a flexible member) is one example of the end part 134 that is configured to change the shape. Note that a bellows-like end part 134a that is a structure having an elasticity may be used as the end part 134 that is configured to change the shape, for example.

The end part 134 may be configured to adhere to the coat SF of paint in a state where it contacts with the coat SF of paint. For example, the end part 134 may be provided with a suction mechanism that is configured to suck the coat SF of paint. When the end part 134 adheres to the coat SF of paint, the sealability of the containing space SP improves more, compared to the case where the end part 134 does not adhere to the coat SF of paint. However, the end part 134 may not be configured to adhere to the coat SF of paint. Even in this case, the sealability of the containing space SP is maintained to a certain degree as long as the end part 134 contacts with the coat SF of paint.

The partition member 132 is a member that is configured to extend and contract along the Z axis by a non-illustrated driving system (for example, an actuator) that operates under the control of the control apparatus 2. For example, the partition member 132 may be a bellows-like member (what we call a bellows). In this case, the partition member 132 is configured to extend and contract due to the expansion and the contraction of the bellows-like part. Alternatively, the partition member 132 may be provided with a telescopic pipe in which a plurality of hollow cylindrical members having different diameters, respectively, are combined, for example. In this case, the partition member 132 is configured to extend and contract due to a relative movement of the plurality of cylindrical members. A state of the partition member 132 is allowed to be set to at least a first expansion state in which the partition member 132 extends along the Z axis and a size thereof in the Z axis direction is relatively long and a first contraction state in which the partition member 132 contracts along the Z axis and the size thereof in the Z axis direction is relatively short.

When the partition member 132 is in the first expansion state, the end part 134 is in a first contact state in which it is allowed to contact with the coat SF of paint. On the other hand, when the partition member 132 is in the first contraction state, the end part 134 is in a first non-contact state in which it does not contact with the coat SF of paint. Namely, when the partition member 132 is in the first contraction state, the end part 134 is in the first non-contact state in which it is away from the coat SF of paint toward the +Z side. Note that a configuration for switching the state of the end part 134 between the first contact state and the first non-contact state is not limited to a configuration that allows the partition member 132 to extend and contract. For example, the state of the end part 134 may be switched between the first contact state and the first non-contact state by means of the housing apparatus 13 itself being configured to move along the ±Z direction.

The housing apparatus 13 is further provided with a detection apparatus 135. The detection apparatus 135 detects the unnecessary substance (namely, the substance that is generated by the irradiation of the processing light ELk) in the containing space SP. A detected result by the detection apparatus 135 is used by the control apparatus 2 when the state of the partition member 132 is changed from the first expansion state to the first contraction state, as described later in detail.

The support apparatus 14 supports the housing apparatus 13. Since the housing apparatus 13 supports the driving system 12 and the light irradiation apparatus 11, the support apparatus 14 substantially supports the driving system 12 and the light irradiation apparatus 11 through the housing apparatus 13. In order to support the housing apparatus 13, the support apparatus 14 is provided with a beam member 141 and a plurality of leg members 142. The beam member 141 is disposed at the +Z side than the housing apparatus 13. The beam member 141 is a beam-like member that extends along the XY plane. The beam member 141 supports the housing member 13 through supporting members 143. The plurality of leg members 142 are disposed at the beam member 141. The leg member 142 is a bar-like member that extends from the beam member 141 toward the −Z side.

An end part (specifically, an end part at the coat SF of paint side and an end part at the −Z side in the example illustrated in FIG. 1) 144 of the leg member 142 is allowed to contact with the surface of the coat SF of paint. As a result, the support apparatus 14 is supported by the coat SF of paint (namely, by the processing target object S). Namely, the support apparatus 14 supports the housing apparatus 13 in a state where the end part 144 contacts with the coat SF of paint (in other words, in a state where the support apparatus 14 is supported by the coat S of paint). The end part 144 may be configured to change a shape thereof (especially, a shape of a contact surface (the surface at the −Z side in the example illustrated in FIG. 1) of the end part 144 that contacts with the coat SF of paint, the same applies to the below described description) in accordance with the shape of the surface of the coat SF of paint when it contacts with the coat SF of paint, as with the end part 134 of the housing apparatus 13. The end part 144 may be configured to adhere to the coat SF of paint in a state where it contacts with the coat SF of paint. For example, the end part 144 may be provided with a suction mechanism that is configured to suck the coat SF of paint. When the end part 144 adheres to the coat SF of paint, a stability of the support apparatus 14 improves more, compared to the case where the end part 144 does not adhere to the coat SF of paint. However, the end part 144 may not be configured to adhere to the coat SF of paint.

The beam member 141 is a member that is configured to extend and contract along at least one of the X axis and the Y axis (alternatively, along any direction along the XY plane) by the driving system 15 that operates under the control of the control apparatus 2. For example, the beam member 141 may be provided with a telescopic pipe in which a plurality of hollow cylindrical members having different diameters, respectively, are combined, for example. In this case, the beam member 141 is configured to extend and contract due to a relative movement of the plurality of cylindrical members.

The leg member 142 is a member that is configured to extend and contract along the Z axis by the driving system 15 that operates under the control of the control apparatus 2. For example, the leg member 142 may be provided with a telescopic pipe in which a plurality of hollow cylindrical members having different diameters, respectively, are combined, for example. In this case, the leg member 142 is configured to extend and contract due to a relative movement of the plurality of cylindrical members. A state of the leg member 142 is allowed to be set to at least a second expansion state in which the leg member 142 extends along the Z axis and a size thereof in the Z axis direction is relatively long and a second contraction state in which the leg member 142 contracts along the Z axis and the size thereof in the Z axis direction is relatively short. When the leg member 142 is in the second expansion state, the end part 144 is in a second contact state in which it is allowed to contact with the coat SF of paint. On the other hand, when the leg member 142 is in the second contraction state, the end part 144 is in a second non-contact state in which it does not contact with the coat SF of paint. Namely, when the leg member 142 is in the second contraction state, the end part 144 is in the second non-contact state in which it is away from the coat SF of paint toward the +Z side.

The driving system 15 moves the support apparatus 14 relative to the coat SF of paint (namely, relative to the processing target object S on the surface of which the coat SF of paint is formed) under the control of the control apparatus 2. Namely, the driving system 15 moves the support apparatus 14 relative to the coat SF of paint so as to change a relative positional relationship between the support apparatus 14 and the coat SF of paint. Since the support apparatus 14 supports the housing apparatus 13, the driving system 15 substantially moves the housing apparatus 13 relative to the coat SF of paint by moving the support apparatus 14. Namely, the driving system 15 moves the support apparatus 14 relative to the coat SF of paint so as to substantially change a relative positional relationship between the housing apparatus 13 and the coat SF of paint. Moreover, the housing apparatus 13 supports the light irradiation apparatus 11 through the driving system 12. Thus, the driving system 15 is configured to substantially move the light irradiation apparatus 11 relative to the coat SF of paint by moving the support apparatus 14. Namely, the driving system 15 is configured to move the support apparatus 14 relative to the coat SF of paint so as to substantially change the relative positional relationship between the light irradiation apparatus 11 and the coat SF of paint. In other words, the driving system 15 is configured to move the support apparatus 14 relative to the coat SF of paint so as to substantially change the relative positional relationship between the plurality of target irradiation areas EA and the coat SF of paint.

The driving system 15 extends and contracts the beam member 141 in order to move the support apparatus 14 under the control of the control apparatus 2. Moreover, the driving system 15 extends and contracts the plurality of leg members 142 in order to move the support apparatus 14 under the control of the control apparatus 2. Note that a moving aspect of the support apparatus 14 by the driving system 15 will be described later in detail with reference to FIG. 8 to FIG. 17.

The exhaust apparatus 16 is coupled to the containing space SP through an exhaust pipe 161. The exhaust apparatus 16 is configured to exhaust gas in the containing space SP. Especially, the exhaust apparatus 16 is configured to suck the unnecessary substance that is generated by the irradiation of the processing light ELk from the containing space SP to an outside of the containing space SP by exhausting the gas in the containing space SP. Especially, when the unnecessary substance is on the optical path of the processing lights ELk, there is a possibility that the irradiation of the processing lights ELk to the coat SF of paint is affected. Thus, the exhaust apparatus 16 especially sucks, from a space including the optical path of the processing lights ELk between the terminal optical element of the light irradiation apparatus 11 and the coat SF of paint, the unnecessary substance with the gas in this space. The unnecessary substance sucked by the exhaust apparatus 16 from the containing space SP is discharged to the outside of the processing system SYS_through a filter 162. The filter 162 sorbs the unnecessary substance. Note that the filter 162 may be attachable and detachable and may be replaceable.

The gas supply apparatus 17 is coupled to the containing space SP through an intake pipe 171. The gas supply apparatus 17 is configured to supply gas to the containing space SP. The gas that is supplied to the containing space SP includes at least one of an air, a CDA (Clean Dry Air) and an inert gas. A nitrogen gas is one example of the inert gas. In the first embodiment, the gas supply apparatus 17 supplies the CDA. Thus, the containing space SP is a space that is purged by the CDA. At least a part of the CDA supplied to the containing space SP is sucked by the exhaust apparatus 16. The CDA sucked by the exhaust apparatus 16 from the containing space SP is discharged to the outside of the processing system SYSa through the filter 162.

The gas supply apparatus 17 especially supplies the gas such as the CDA to an optical surface 1141 at the containing space SP side of the fθ lens 114 (namely, an optical surface at the containing space SP side of the terminal optical element of the light irradiation apparatus 11) illustrated in FIG. 3. There is a possibility that the optical surface 1141 is exposed to the unnecessary substance that is generated by the irradiation of the processing light ELk, because the optical surface 1141 faces the containing space SP. As a result, there is a possibility that the unnecessary substance adheres to the optical surface 1141. Moreover, there is a possibility that the unnecessary substance adhering to the optical surface 1141 is baked (namely, is firmly fixed) by the processing light ELk passing through the optical surface 1141, because the processing lights ELk pass through the optical surface 1141. The unnecessary substance adhering (moreover, firmly fixed) to the optical surface 1141 becomes a dust to be likely to affect a characteristic of the processing lights ELk. However, when the gas such as the CDA is supplied to the optical surface 1141, a contact between the optical surface 1141 and the unnecessary substance is prevented. Thus, an adherence of the dust to the optical surface 1141 is prevented. Therefore, the gas supply apparatus 17 also serves as an adherence prevention apparatus that prevents the adherence of the dust to the optical surface 1141. Moreover, even when the dust is adhering (moreover, firmly fixed) to the optical surface 1141, there is a possibility that the dust is removed (for example, is blown away) by the CDA supplied to the optical surface 1141. Therefore, the gas supply apparatus 17 also serves as an adherence prevention apparatus that removes the dust adhering to the optical surface 1141.

The control apparatus 2 controls an entire operation of the processing system SYSa. Especially, the control apparatus 2 controls the light irradiation apparatus 11, the driving system 12, the housing apparatus 13 and the driving system 15 so that the concave part C having a desired shape is formed at a desired position, as described later in detail.

The control apparatus 2 may include a CPU (Central Processing Unit) (alternatively, a GPU (Graphic Processing Unit) in addition to or instead of the CPU) and a memory, for example. The control apparatus 2 serves as an apparatus for controlling the operation of the processing system SYSa by means of the CPU executing a computer program. The computer program is a computer program that allows the control apparatus 2 (for example, the CPU) to execute (namely, to perform) a below described operation that should be executed by the control apparatus 2. Namely, the computer program is a computer program that allows the control apparatus 2 to function so as to make the processing system SYSa execute the below described operation. The computer program executed by the CPU may be recorded in the memory (namely, a recording medium) of the control apparatus 2, or may be recorded in any recording medium (for example, a hard disk or a semiconductor memory) that is built in the control apparatus 2 or that is attachable to the control apparatus 2. Alternatively, the CPU may download the computer program that should be executed from an apparatus disposed at the outside of the control apparatus 2 through a network interface.

The control apparatus 2 may not be disposed in the processing system SYSa, and may be disposed at the outside of the processing system SYSa as a server or the like. In this case, the control apparatus 2 may be connected to the processing system SYSa through a wired and/or wireless network (alternatively, a data bus and/or a communication line). A network using a serial-bus-type interface such as at least one of IEEE1394, RS-232x, RS-422, RS-423, RS-485 and USB may be used as the wired network. A network using a parallel-bus-type interface may be used as the wired network. A network using an interface that is compatible to Ethernet (a registered trademark) such as at least one of 10-BASE-T, 100BASE-TX or 1000BASE-T may be used as the wired network. A network using an electrical wave may be used as the wireless network. A network that is compatible to IEEE802.1x (for example, at least one of a wireless LAN and Bluetooth (registered trademark)) is one example of the network using the electrical wave. A network using an infrared ray may be used as the wireless network. A network using an optical communication may be used as the wireless network. In this case, the control apparatus 2 and the processing system SYSa may be configured to transmit and receive various information through the network. Moreover, the control apparatus 2 may be configured to transmit information such as a command and a control parameter to the processing system SYSa through the network. The processing system SYSa may be provided with a receiving apparatus that receives the information such as the command and the control parameter from the control apparatus 2 through the network. Alternatively, a first control apparatus that performs a part of the processing performed by the control apparatus 2 may be disposed in the processing system SYSa and a second control apparatus that performs another part of the processing performed by the control apparatus 2 may be disposed at the outside of the processing system SYSa.

Note that the recording medium recording therein the computer program that should be executed by the CPU may include an optical disc such as a CD-ROM, a CD-R, a CD-RW, a flexible disc, a MO, a DVD-ROM, a DVD-RAM, a DVD-R, a DVD+R, a DVD-RW, a DVD+RW and a Blu-ray (registered trademark), a magnetic disc such as a magnetic tape, an optical-magnetic disc, a semiconductor memory such as a USB memory, and another medium that is configured to store the program. The recording medium may include a device that is configured to record the computer program (for example, a device for a universal use or a device for an exclusive use in which the computer program is embedded to be executable in a form of at least one of a software, a firmware and the like). Moreover, various processes or functions included in the computer program may be realized by a logical process block that is realized in the control apparatus 2 by means of the control apparatus 2 (namely, a computer) executing the computer program, may be realized by a hardware such as a predetermined gate array (a FPGA, an ASIC) of the control apparatus 2, or may be realized in a form in which the logical process block and a partial hardware module that realizes an partial element of the hardware are combined.

(1-2) Specific Example of Processing Operation by Processing System SYSa (1-2-1) Specific Example of Structure formed by Processing Operation As described above by using FIG. 2, the processing system SYSa forms the concave part C at the coat SF of paint in the first embodiment. The concave part C is formed at a part of the coat SF of paint that is actually irradiated with the processing light ELk. Thus, the concave part C is formable at a desired position of the coat SF of paint by properly setting a position on the coat SF of paint that is actually irradiated with the processing light ELk (namely, a position at which the target irradiation area EA that is expected to be actually irradiated with the processing light ELk is set). Namely, a structure of the coat SF of paint is formable on the processing target object S.

Specifically, the processing system SYSa moves the target irradiation area EA on the surface of the coat SF of paint by using at least one of the Galvano mirror 113 and the driving system 12 as described above. The processing system SYSa emits the processing light ELk at a timing when the target irradiation area EA overlaps with the area of the surface of the coat SF of paint that should be actually irradiated with the processing light ELk (namely, that should be processed) in a period when the target irradiation area EA moves on the surface of the coat SF of paint. On the other hand, the processing system SYSa does not emit the processing light ELk at a timing when the target irradiation area EA does not overlap with the area of the surface of the coat SF of paint that should be actually irradiated with the processing light ELk in the period when the target irradiation area EA moves on the surface of the coat SF of paint. Namely, the processing system SYSa does not emit the processing light ELk at a timing when the target irradiation area EA overlaps with an area of the surface of the coat SF of paint that should not be actually irradiated with the processing light ELk (namely, that should not be processed) in the period when the target irradiation area EA moves on the surface of the coat SF of paint. As a result, the structure of the coat SF of paint in accordance with a pattern of the area that is actually irradiated with the processing light ELk is formed on the processing target object S.

In the first embodiment, the processing system SYSa forms a riblet structure that is one example of the structure of the coat SF of paint on the processing target object S under the control of the control apparatus 2. The riblet structure is a structure by which a resistance (especially, a frictional resistance, a turbulent frictional resistance) of the surface of the coat SF of paint to a fluid is reducible. A resistance of the surface of the processing target object S on which the riblet structure is formed to the fluid is shorter than a resistance of the surface of the processing target object S on which the riblet structure is not formed to the fluid. Thus, it can be said that the riblet structure is a structure by which the resistance of the surface of the processing target object S to the fluid is reducible. Note that the fluid here may be any medium (gas, liquid) that flows relative to the surface of the coat SF of paint. For example, each of the medium that flows relative to the static processing target object SF and the static medium distributing around the moving processing target object SF is one example of the fluid.

Figure 6A:
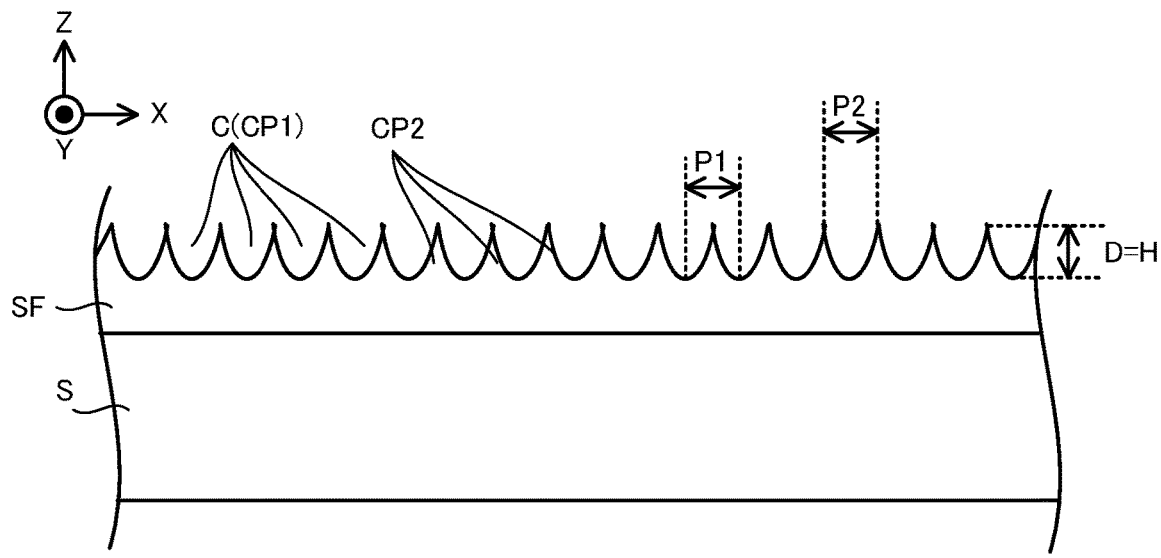
FIG. 6A is a cross-sectional view that illustrates a cross-sectional surface of a riblet structure formed by the processing system in the first embodiment and FIG. 6B is a perspective view that illustrates the riblet structure formed by the processing system in the present embodiment.
Figure 6B:
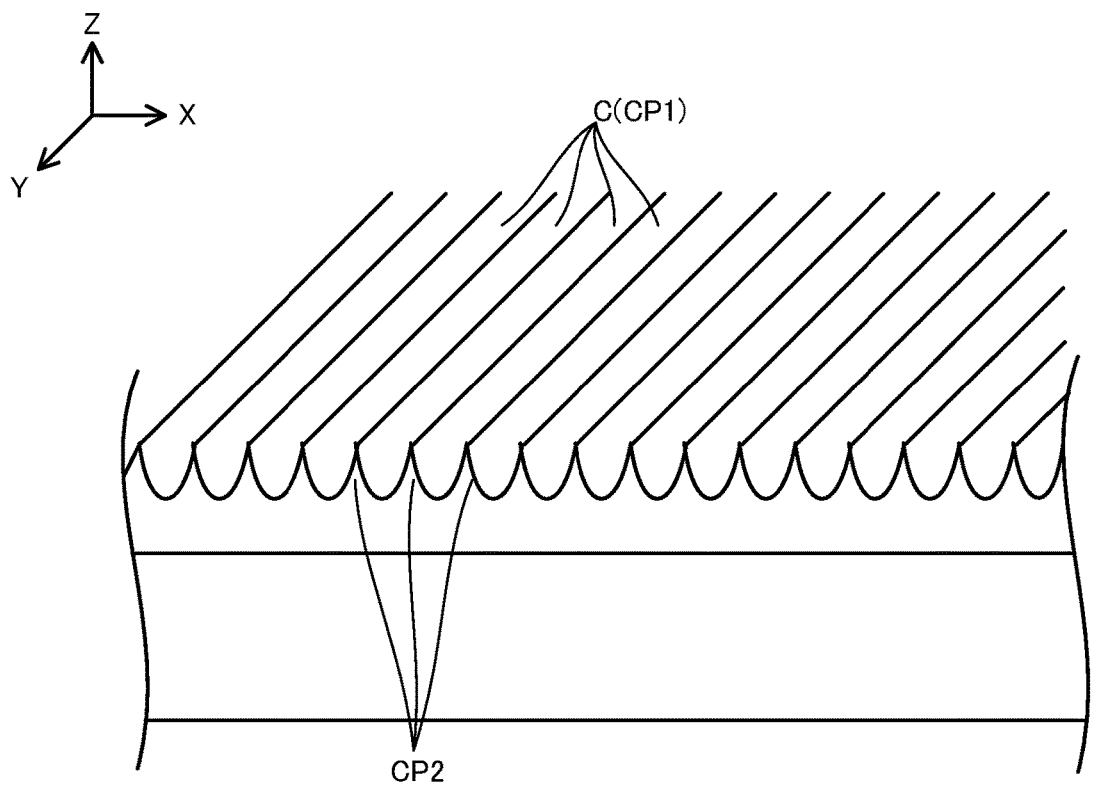
Figure 7A:
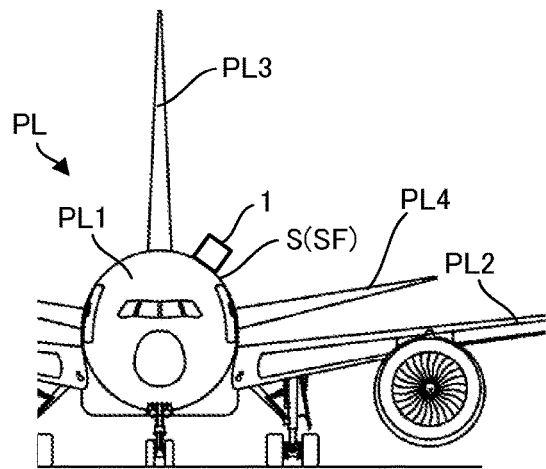
FIG. 7B is a front view that illustrates an airplane that is one example of the processing target object at which the riblet structure is formed and FIG. 7C is a side view that illustrates the airplane that is one example of the processing target object at which the riblet structure is formed.
Figure 7B:
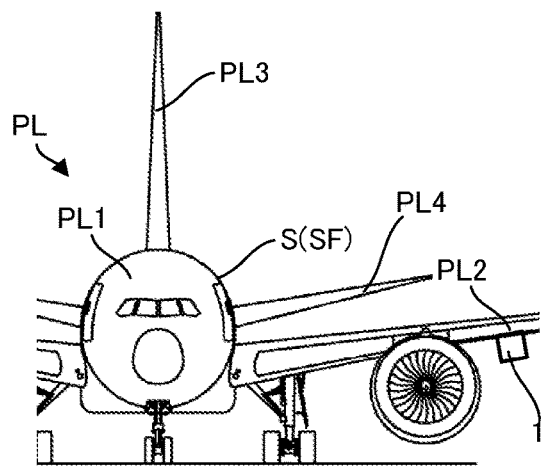

One example of the riblet structure is illustrated in FIG. 6A and FIG. 6B. As illustrated in FIG. 6A and FIG. 7B, the riblet structure is a structure in which a plurality of concave structures CP1 each of which is formed by sequentially forming the concave part C along a first direction (the Y axis direction in an example illustrated in FIG. 6A and FIG. 6B) (namely, a plurality of concave structures CP1 each of which is linearly formed to extend along the first direction) are arranged along a second direction (the X axis direction in the example illustrated in FIG. 6A and FIG. 6B) that intersects with the first direction, for example. Namely, the riblet structure is a structure in which the plurality of concave structures CP1 extending along the first direction have a periodical direction along the second direction that intersects with the first direction, for example. A convex structure CP2 that protrudes from a surrounding area substantially exists between two adjacent concave structures CP1. Therefore, it can be said that the riblet structure is a structure in which a plurality of convex structures CP2 each of which linearly extends along the first direction (for example, the Y axis direction) are arranged along the second direction (for example, the X axis direction) that intersects with the first direction, for example. Namely, it can be said the riblet structure is a structure in which the plurality of convex structures CP2 extending along the first direction have a periodical direction along the second direction that intersects with the first direction, for example. The riblet structure illustrated in FIG. 6A and FIG. 6B is a periodical structure.

An interval between the two adjacent concave structures CP1 (namely, an arrangement pitch P1 of the concave structure CP1) is several microns to several hundred microns, for example, however, may be different size. Moreover, a depth (namely, a depth in the Z axis direction) D of each concave structure CP1 is several microns to several hundred microns, for example, however, may be different size. The depth D of each concave structure CP1 may be equal to or shorter than the arrangement pitch P1 of the concave structure CP1. The depth D of each concave structure CP1 may be equal to or shorter than a half of the arrangement pitch P1 of the concave structure CP1. A shape of a cross-sectional surface including the Z axis (specifically, a cross-sectional surface along the XZ plane) of each concave structure CP1 is a bowl-shaped curved shape, however, may be a triangle shape, may be a quadrangular shape, may be a polygonal shape more than a pentagonal shape.

An interval between the two adjacent convex structures CP2 (namely, an arrangement pitch P2 of the convex structure CP2) is several microns to several hundred microns, for example, however, may be different size. Moreover, a height (namely, a height in the Z axis direction) H of each convex structure CP2 is several microns to several hundred microns, for example, however, may be different size. The height H of each convex structure CP2 may be equal to or shorter than the arrangement pitch P2 of the convex structure CP2. The height H of each convex structure CP2 may be equal to or shorter than a half of the arrangement pitch P2 of the convex structure CP2. A shape of a cross-sectional surface including the Z axis (specifically, a cross-sectional surface along the XZ plane) of each convex structure CP2 is a chevron shape having a curved slope, however, may be a triangle shape, may be a quadrangular shape, may be a polygonal shape more than a pentagonal shape.

Note that the riblet structure itself formed by the processing system SYSa may be an existing riblet structure disclosed in "Mechanical Engineers' Handbook, Basic Edition, α4 Fluids Engineering", Chapter 5, edited by The Japan Society of Mechanical Engineers, for example, and a detailed description of the riblet structure itself is omitted.

Figure 7C:
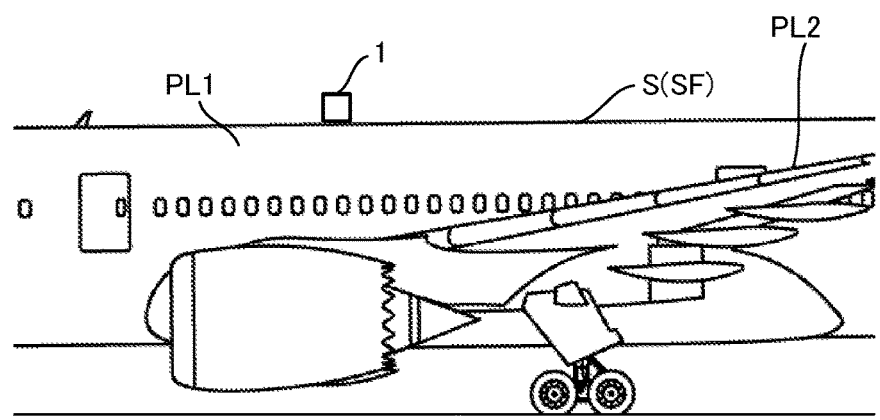

As described above, the resistance of the surface of the processing target object S on which the riblet structure is formed to the fluid is reducible by the riblet structure like this. Thus, the processing target object S may be an object (for example, a structural object) the resistance of which to the fluid is desired to be reduced. For example, the processing target object S may be an object (namely, a movable body) that is movable so that at least a part thereof travels in the fluid (for example, at least one of the gas and the liquid). Specifically, for example, the processing target object S may include an airframe (for example, at least one of a body PL1, a main wing PL2, a vertical tail PL3 and a horizontal tail PL4) of an airplane PL as illustrated in FIG. 7A to FIG. 7C. In this case, as illustrated in FIG. 7A to FIG. 7C, the processing apparatus 1 (alternatively, the processing system SYSa, same applies in this paragraph) may self-stands on the airframe of the airplane PL by the support apparatus 14. Alternatively, the processing apparatus 1 may adhere to the airframe of the airplane PL to suspend (namely, hang) from the airframe of the airplane PL by the support apparatus 14 as illustrated in FIG. 7B, because the end part 144 of the leg member 142 of the support apparatus 14 is configured to adhere to the coat SF of paint. Moreover, the processing apparatus 1 is capable of self-standing on the coat SF of paint even when the surface of the coat SF of paint is inclined with respect to the horizontal plane in a state where the surface of the coat SF of paint faces upwardly, because the end part 144 of the leg member 142 of the support apparatus 14 is configured to adhere to the coat SF of paint and the end part 134 of the partition member 132 of the housing apparatus 13 is configured to adhere to the coat SF of paint. Moreover, the processing apparatus 1 is capable of adhering to the coat SF of paint to suspend from the coat SF of paint even when the surface of the coat SF of paint is inclined with respect to the horizontal plane in a state where the surface of the coat SF of paint faces downwardly. Even in both cases, the light irradiation apparatus 11 is movable along the surface of the airplane PL by the driving system 12 and/or the movement of the support apparatus 14. Therefore, the processing system SYS is capable of forming the riblet structure of the coat SF of paint at the processing target object S such as the airframe of the airplane (namely, the processing target object S the surface of which is a curved surface, the surface of which is inclined with respect to the horizontal plane or the surface of which faces downwardly).

Beyond that, for example, the processing target object S may include at least one of a vehicle body and an aerodynamic part of a vehicle. For example, the processing target object S may include a ship hull of a ship. For example, the processing target object S may include a body of a rocket. For example, the processing target object S may include a turbine (for example, at least one of a hydraulic turbine, a wind turbine and the like, especially a turbine blade thereof). For example, the processing target object S may include a component that constitutes the object at least a part of which travels in the fluid. For example, the processing target object S may include an object at least a part of which is fixed in the flowing fluid. Specifically, for example, the processing target object S may include a bridge column built in a river or a sea. For example, the processing target object S may include a pipe in which the fluid flows. In this case, an inner wall of the pipe may be the surface of the above described processing target object S.

Note that one example of the processing target object S described here is a relatively large object (for example, an object having a size of an order of several meters to several hundred meters). In this case, as illustrated in FIG. 7A to FIG. 7C, a size of the light irradiation apparatus 11 is shorter than a size of the processing target object S. However, the processing target object S may be an object having any size. For example, the processing target object S may be an object having a size of an order of kilometer, centimeter, millimeter or micrometer.

A characteristic of the above described riblet structure may be set to be a proper characteristic by which an effect of a reduction of the resistance is properly achieved based on what object the processing target object S is. Namely, the characteristic of the above described riblet structure may be optimized so that the effect of a reduction of the resistance is properly achieved based on what object the processing target object S is. More specifically, the characteristic of the riblet structure may be set to be a proper characteristic by which the effect of the reduction of the resistance is properly achieved based on at least one of a type of the fluid that distributes around the used (namely, operated) processing target object S, a relative velocity of the processing target object S relative to the fluid, a shape of the processing target object S and the like. Moreover, the characteristic of the above described riblet structure may be set to be a proper characteristic by which the effect of the reduction of the resistance is properly achieved based on what object the processing target object S is and where the riblet structure is formed at the object. For example, when the processing target object S is the airframe of the airplane PL, the characteristic of the riblet structure formed at the body PL1 may be different from the characteristic of the riblet structure formed at the main wing PL2.

The characteristic of the riblet structure may include a size of the riblet structure. The size of the riblet structure may include at least one of the arrangement pitch P1 of the concave structure CP1, the depth D of each concave structure CP1, the arrangement pitch P2 of the convex structure CP2, the height H of each convex structure CP2 and the like. The characteristic of the riblet structure may include a shape (for example, the shape of the cross-sectional surface including the Z axis (specifically, the cross-sectional surface along the XZ plane)) of the riblet structure. The characteristic of the riblet structure may include an extending direction of the riblet structure (namely, an extending direction of the concave structure CP1). The characteristic of the riblet structure may include a formed position of the riblet structure.

The characteristic of the riblet structure may be determined on the basis of a simulation model for simulating the processing target object S. Especially, the characteristic of the riblet structure may be determined on the basis of a simulation model for simulating the processing target object S that moves in the fluid (in other words, for simulating a flow of the fluid around the moving target object S). Specifically, the control apparatus 2 (alternatively, another arithmetic apparatus that performs a calculation based on the simulation model) may determine the characteristic of the riblet structure on the basis of a fluid simulation model. Namely, the control apparatus 2 (alternatively, another arithmetic apparatus that performs a calculation based on the simulation model) may optimize the characteristic of the riblet structure on the basis of the fluid simulation model so that the effect of the reduction of the resistance is properly achieved. Then, the control apparatus 2 may control the processing apparatus 1 to form the riblet structure having the determined characteristic on the basis of riblet information relating to the determined (namely, optimized) characteristic of the riblet structure. The riblet information may include information that indicates what the size, the shape and the extending direction of the concave structure CP1 is and where it is formed at the object, for example. The riblet information may include information that indicates what the size, the shape and the extending direction of the concave structure CP1 is and where it is formed at the object and that is associated with the simulation model, for example.

Note that the characteristic of the riblet structure may be determined on the basis of the simulation model for simulating the processing target object S not only in the 3 processing system SYSa having the multibeam optical system 112 but also any processing system that processes the processing target object S to form the riblet structure. Namely, the characteristic of the riblet structure may be optimized on the basis of the fluid simulation model so that the effect of the reduction of the resistance is properly achieved and the riblet structure having the optimized characteristic on the basis of the riblet information relating to the optimized characteristic of the riblet structure.

(1-2-2) Flow of Processing Operation

Next, with reference to FIG. 8 to FIG. 19, a flow of a processing operation for forming the riblet structure will be described.

Firstly, as described above, the plurality of processing lights ELk are deflected by the Galvano mirror 113. In order to form the riblet structure, the Galvano mirror 113 deflects the plurality of processing lights ELk to alternately repeat: a scan operation for moving the plurality of target irradiation areas EA along the Y axis on the surface of the coat SF of paint and irradiating the plurality of target irradiation areas EA with the plurality of processing lights ELk, respectively, at a desired timing; and a step operation for moving the plurality of irradiation areas EA along at least the X axis on the surface of the coat SF of paint by a predetermined amount. In this case, the Y axis may be referred to as a scan axis and the X axis may be referred to as a step axis.

Figure 8:
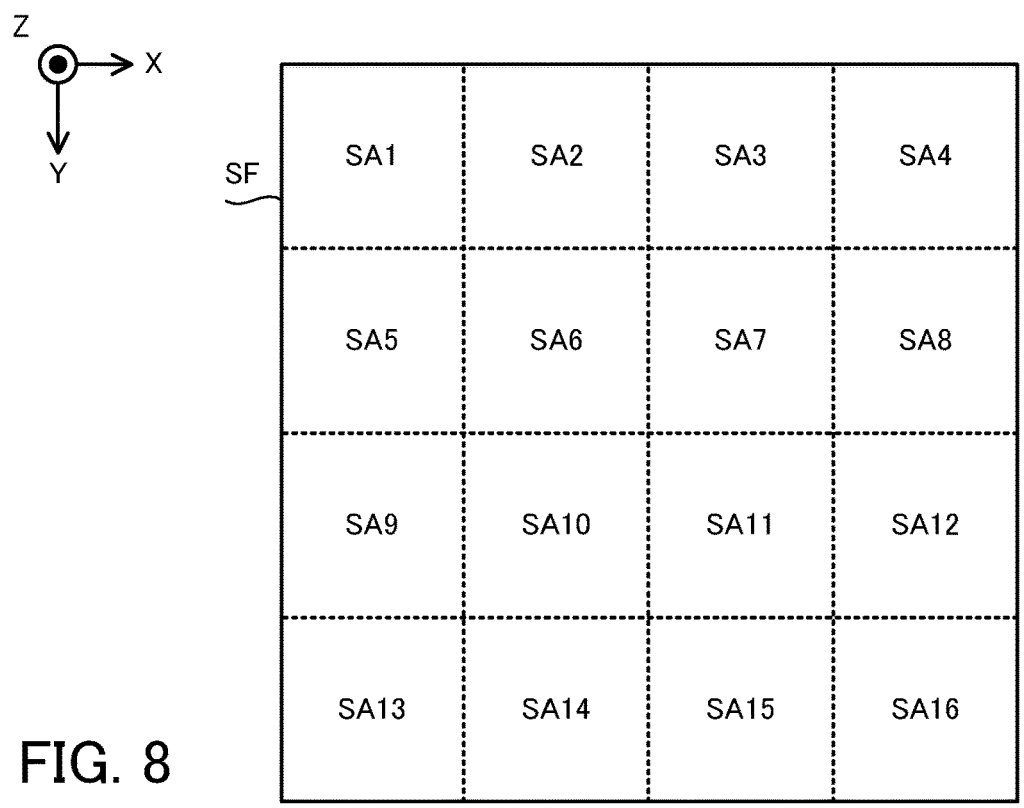
FIG. 8 is a plan view that illustrates a plurality of processing shot areas that are set on a surface of the coat of paint.

Here, a size of an area on the surface of the coat SF of paint that is swept with the plurality of processing lights ELk by controlling the Galvano mirror 113 without moving the light irradiation apparatus 11 relative to the coat SF of paint is limited. Therefore, in the first embodiment, as illustrated in FIG. 8, the control apparatus 2 may set a plurality of processing shot areas SA on the surface of the coat SF of paint (especially, an area of the coat SF of paint at which the riblet structure should be formed). Each processing shot area SA corresponds to an area that is sweepable with the plurality of processing lights ELk by controlling the Galvano mirror 113 without moving the light irradiation apparatus 11 relative to the coat SF of paint. A shape of each processing shot area SA is a quadrangular shape, however, may be any shape.

The control apparatus 2 controls the light irradiation apparatus 11 to irradiate at least a part of one processing shot area SA (for example, SA1) with the plurality of processing lights ELk deflected by the Galvano mirror 113 to form the riblet structure at one processing shot area SA (SA1). Then, the control apparatus 2 disposes the light irradiation apparatus 11 on a position from which another processing shot area SA (for example, SA2) is irradiated with the plurality of processing lights ELk by controlling at least one of the driving systems 12 and 15 to move the light irradiation apparatus 11 relative to the coat SF of paint. Then, the control apparatus 2 controls the light irradiation apparatus 11 to irradiate at least a part of another processing shot area SA (for example, SA2) with the plurality of processing lights ELk deflected by the Galvano mirror 113 to form the riblet structure at another processing shot area SA (SA2). The control apparatus 2 forms the riblet structure by repeating the following operation at all processing shot areas SA1 to SA16.

When the riblet structure is formed in each processing shot area SA, the control apparatus 2 obtain information corresponding to the characteristic of the riblet structure that should be formed in each processing shot area SA from the riblet information relating to the characteristic of the riblet structure that is optimized on the basis of the above described simulation model, and forms, in each processing shote area SA, the riblet structure having the determined characteristic for each processing shot area SA on the basis of the obtained information.

Next, an operation for forming the riblet structure at the processing shot areas SA1 to SA4 illustrated in FIG. 8 will be described as one example. In the below described description, an example in which two processing shot areas SA that are adjacent to each other along the X axis are located in the containing space SP will be described. However, the fact remains that same operation is performed even when any number of processing shot area SA is located in the containing space SP. Moreover, the operation for forming the riblet structure described below is merely one example, and the processing system SYS may form the riblet structure by performing an operation that is different from the below described operation. Namely, the processing system SYS may perform any operation as long as it forms the riblet structure on the processing target object S by irradiating the processing target object S with the plurality of processing lights ELk.

Figure 9:
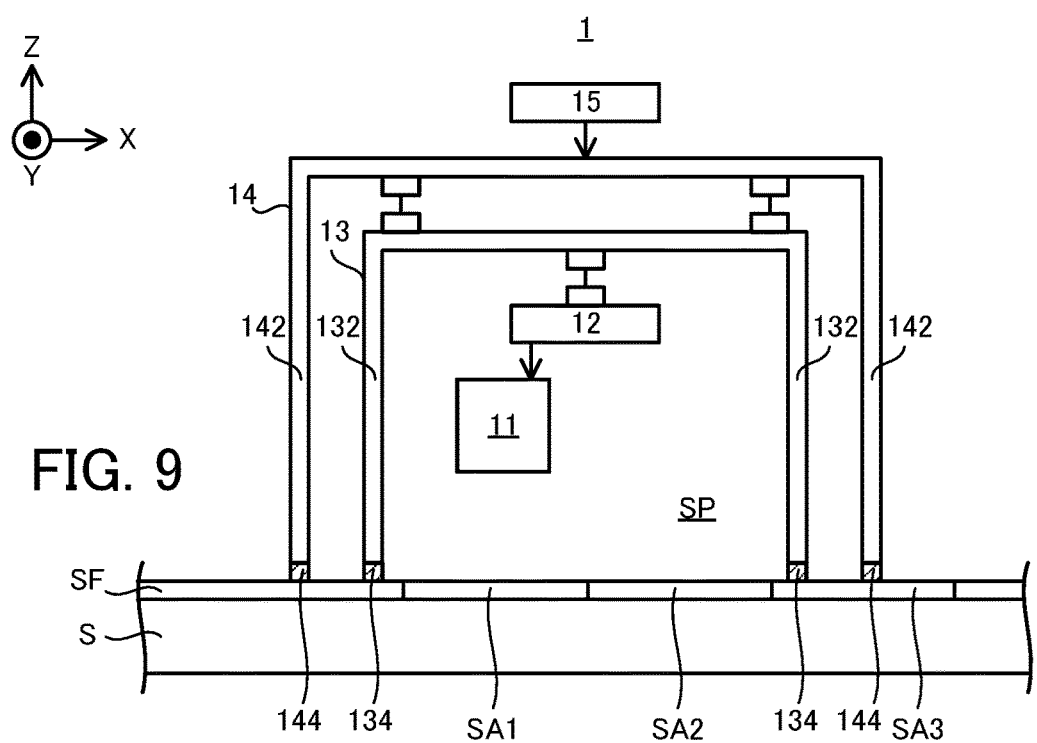
FIG. 9 is a cross-sectional view that illustrates the processing apparatus that performs one step of a processing operation for forming the riblet structure.

As illustrated in FIG. 9, firstly, the control apparatus 2 controls the driving system 15 to move the support apparatus 14 relative to the coat SF of paint so that the housing apparatus 13 is disposed at a first housing position at which the processing shot areas SA1 and SA2 are located in the containing space SP. Namely, the control apparatus 2 moves the housing apparatus 13 supported by the support apparatus 14 so that the processing shot areas SA1 and SA2 are covered by the housing apparatus 13. Moreover, the control apparatus 2 controls the driving system 12 to move the light irradiation apparatus 11 relative to the coat SF of paint so that the light irradiation apparatus 11 is disposed at a first irradiation position from which the processing shot area SA1 is irradiated with the plurality of processing lights ELk. After the housing apparatus 13 is disposed at the first housing position and the light irradiation apparatus 11 is disposed at the first irradiation position, the partition member 132 becomes to be the first expansion state. Therefore, the end part 134 of the partition member 132 contacts with and adheres to the coat SF of paint. Similarly, the plurality of leg members 142 becomes to be the second expansion state. Therefore, the end parts 144 of the plurality of leg members 142 contact with and adhere to the coat SF of paint.

Figure 10A:
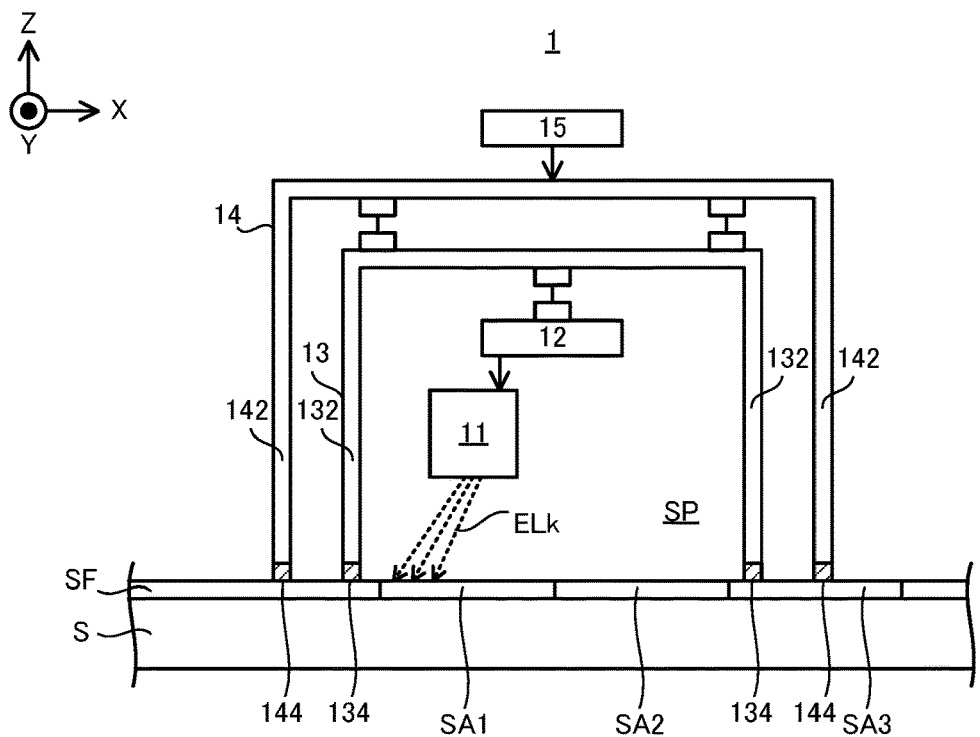
FIG. 10A is a cross-sectional view that illustrates the processing apparatus that performs one step of the processing operation for forming the riblet structure and FIG. 10B is a plan view that illustrates the surface of the coat of paint on which one step of the processing operation illustrated in FIG. 10A is performed.
Figure 10B:
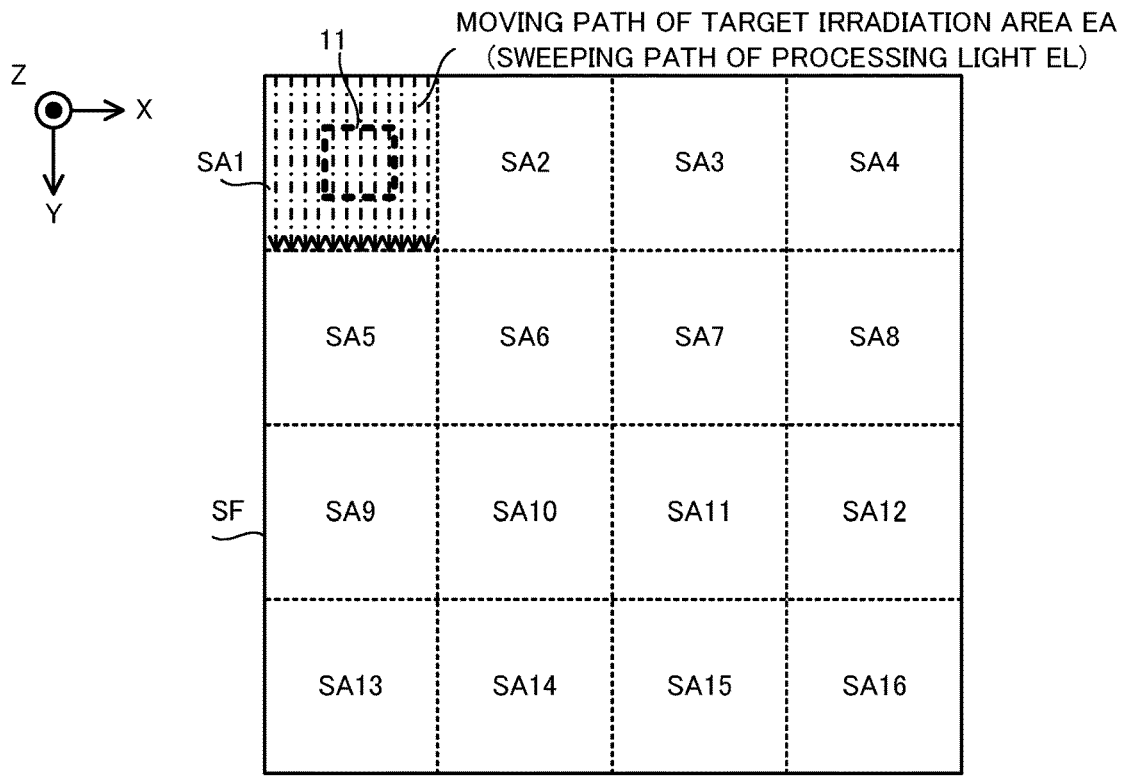

Then, as illustrated in FIG. 10A and FIG. 10B, the control apparatus 2 controls the light irradiation apparatus 11 (especially, the Galvano mirror 113) to sweep the processing shot area SA1 with the plurality of processing lights ELk. Specifically, the control apparatus 2 controls the Y scanning mirror 113Y of the Galvano mirror 113 to sweep a certain area in the processing shot area SA1 with the plurality of processing lights ELk along the Y axis direction, in order to perform the above described scan operation. During a period when the scan operation is performed, the light source 110 emits the source light ELo. As a result, the multibeam optical system 112 emits the plurality of processing lights ELk during the period when the scan operation is performed. Then, the control apparatus 2 rotates at least the X scanning mirror 113X of the Galvano mirror 113 by a unit step amount, in order to perform the above described step operation. During a period when the step operation is performed, the light source 110 does not emit the source light ELo. As a result, the multibeam optical system 112 does not emit the plurality of processing lights ELk. Then, the control apparatus 2 controls the Y scanning mirror 113Y of the Galvano mirror 113 to sweep a certain area in the processing shot area SA1 with the plurality of processing lights ELk along the Y axis direction, in order to perform the above described scan operation. In this manner, the control apparatus 2 controls the Galvano mirror 113 to sweep whole of the processing shot area SA1 (alternatively, a partial area at which the riblet structure should be formed in the processing shot area SA1) with the plurality of processing lights ELk by alternately repeating the scan operation and the step operation. Note that the source light ELo may be emitted from the light source 110 and the plurality of processing lights ELk may be emitted during the period when the step operation is performed.

Figure 11:
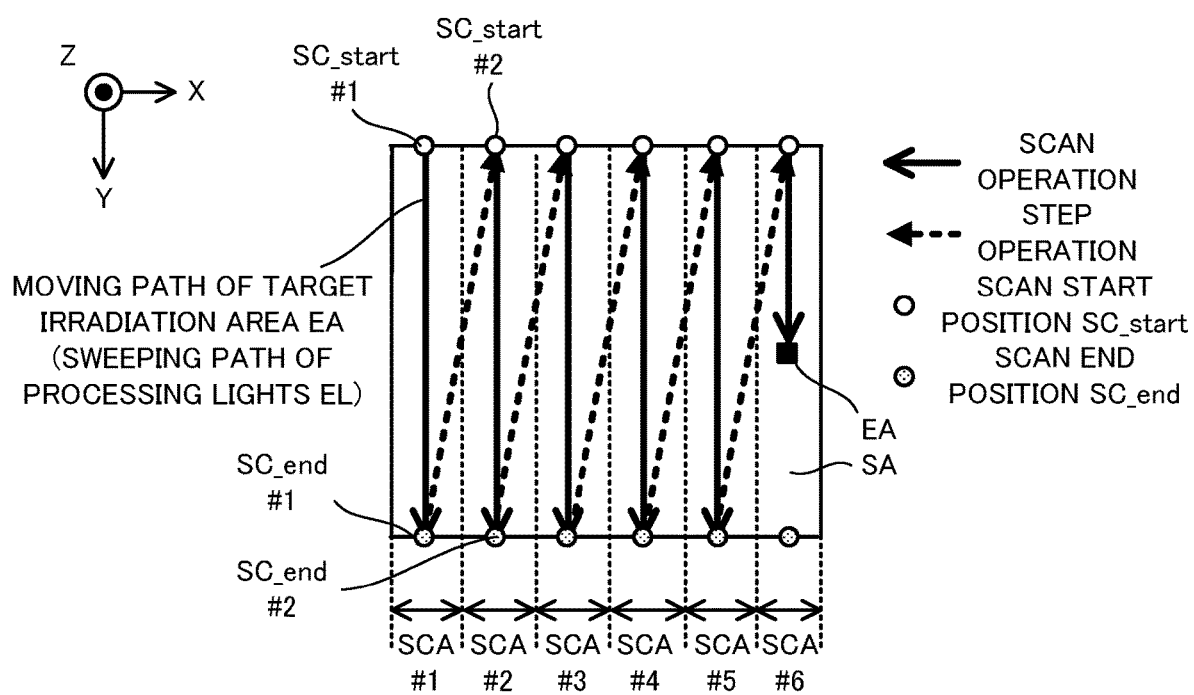
FIG. 11 is a plan view that illustrates a sweeping path of the processing light (namely, a moving path of a target irradiation area) during a period when a scan operation and a step operation are repeated.

In the first embodiment, as illustrated in FIG. 11 that is a plan view that illustrates a sweeping path of the processing lights ELk (namely, a moving path of the target irradiation areas EA) during a period when the scan operation and the step operation are repeated, the processing apparatus 1 performs the scan operation in a plurality of scan areas SCA set in the processing shot area EA in sequence. FIG. 11 illustrates an example in which six scan areas SCA#1 to SCA#6 are set in the processing shot area SA. Each scan area SCA is an area that is swept by the plurality of processing lights ELk that are emitted by one scan operation (namely, a series of scan operation without performing the step operation). Each scan area SCA is an area in which the plurality of target irradiation areas EA move by one scan operation. In this case, the plurality of target irradiation areas EA move from a scan start position SC_start to a scan end position SC_end in each scan area SCA by one scan operation. This scan area SCA is typically an area that extends along the Y axis direction (namely, a sweeping direction of the plurality of processing lights ELk). The plurality of scan areas SCA are arranged along the X axis direction (namely, a direction that intersects with the sweeping direction of the plurality of processing lights ELk).

In this case, the processing system SYSa starts the scan operation at one scan area SCA, which is located at the most +X side or the most −X side, of the plurality of scan areas SCA set in a certain processing shot area SA, for example. For example, FIG. 11 illustrates an example in which the processing system SYSa starts the scan operation at a scan area SCA#1 that is located at the most −X side. In this case, the control apparatus 2 controls the Galvano mirror 113 so that a scan start position SC_start#1 of the scan area SCA#1 (for example, an end part at the −Y side or a neighborhood thereof in the scan area SCA#1) is irradiated with the processing lights ELk. Namely, the control apparatus 2 controls the Galvano mirror 113 so that the target irradiation areas EA are set on the scan start position SC_start#1 of the scan area SCA#1. Then, the processing system SYSa performs the scan operation in the scan area SCA#1. Specifically, the control apparatus 2 controls the Galvano mirror 113 so that the plurality of target irradiation areas EA move from the scan start position SC_start#1 of the scan area SCA#1 to a scan end position SC_end#1 of the scan area SCA#1 (for example, an end part at the +Y side or a neighborhood thereof in the scan area SCA#1). Moreover, the control apparatus 2 controls the light irradiation apparatus 11 so that the plurality of target areas EA are irradiated with the plurality of processing lights ELk at a desired timing. As a result, the scan area SCA#1 is swept by the plurality of processing lights ELk. Note that FIG. 11 illustrates the moving path of one target irradiation area EA in each scan area SCA for the purpose of simple illustration, however, the plurality of target irradiation areas EA move in the scan area SCA actually. Namely, FIG. 11 illustrates the sweeping path of one processing light ELk in each scan area SCA for the purpose of simple illustration, however, the scan area SCA is swept by the plurality of processing lights ELk actually.

After the scan operation in the scan area SCA#1 is completed, the processing system SYSa performs the step operation in order to perform the scan operation in another scan area SCA that is different from the scan area SCA#1. Specifically, the control apparatus 2 controls the Galvano mirror 113 so that a scan start position SC_start#2 of a scan area SCA#2 (for example, an end part at the −Y side or a neighborhood thereof in the scan area SCA#2) that is adjacent to the scan area SCA#1 along the X axis direction is irradiated with the processing lights ELk. Namely, the control apparatus 2 controls the Galvano mirror 113 so that the target irradiation areas EA are set on the scan start position SC_start#2 of the scan area SCA#2. As a result, as illustrated in FIG. 11, the target irradiation positions EA move along each of the X axis direction and the Y axis direction. In this case, a moving distance of the target irradiation positions EA along the X axis direction may be equal to a size of the scan area SCA along the X axis direction. A moving distance of the target irradiation positions EA along the Y axis direction may be equal to a size of the scan area SCA along the Y axis direction.

Then, the processing system SYSa performs the scan operation in the scan area SCA#2. Specifically, the control apparatus 2 controls the Galvano mirror 113 so that the plurality of target irradiation areas EA move from the scan start position SC_start#2 of the scan area SCA#2 to a scan end position SC_end#2 of the scan area SCA#2 (for example, an end part at the +Y side or a neighborhood thereof in the scan area SCA#2). Moreover, the control apparatus 2 controls the light irradiation apparatus 11 so that the plurality of target areas EA are irradiated with the plurality of processing lights ELk at a desired timing. As a result, the scan area SCA#2 is swept by the plurality of processing lights ELk.

Then, same operation is repeated until the scan operations in the scan areas SCA#3 to SCA#6 are completed.

In the example illustrated in FIG. 11, the sweeping direction of the processing lights ELk by the scan operation is fixed to the +Y axis direction. The moving direction of the target irradiation areas EA by the scan operation is fixed to the +Y axis direction. Namely, in the example illustrated in FIG. 11, the sweeping directions of the processing light ELk (namely, the moving directions of the target irradiation area EA, the same applies the below described description) by the plurality of scan operations performed in the scan area SCA are same as each other. The sweeping directions of the plurality of processing lights ELk with which the plurality of scan areas SCA are swept, respectively, are same as each other. The moving directions of the target irradiation areas EA in the plurality of scan areas SCA are same as each other. Specifically, the sweeping direction of the processing lights ELk by the scan operation performed in the scan area SCA#1, the sweeping direction of the processing lights ELk by the scan operation performed in the scan area SCA#2, . . . , and the sweeping direction of the processing lights ELk by the scan operation performed in the scan area SCA#6 are same as one another. However, as described later in a modified example, the sweeping direction of the processing lights ELk by the scan operation performed in one scan area SCA may be different from the sweeping direction of the processing lights ELk by the scan operation performed in another scan area SCA. The sweeping direction of the processing lights ELk by the scan operation performed in one scan area SCA may be changed during the course of the scan operation.

The riblet structure is formed in the processing shot area SA1 by repeating the scan operation and the step operation in this manner. Note that a width of an area that is swept by the processing lights ELk (namely, a width of the processing shot area SA, especially, a width in the X axis direction) is wider than a width (especially, a width in the X axis direction) of the light irradiation apparatus 11, as illustrated in FIG. 10A and FIG. 10B.

The control apparatus 2 controls the driving system 15 so that the plurality of leg members 142 continue to be in the second expansion state during a period when the light irradiation apparatus 11 emits the processing lights ELk. As a result, the end parts 144 of the plurality of leg members 142 continue to adhere to the coat SF of paint. As a result, the stability of the support apparatus 14 improves, and thus, there is a low possibility that the irradiation areas EA of the processing lights ELk are displaced on the coat SF of paint accidentally due to an instability of the support apparatus 14. However, a part of the plurality of leg members 142 may be in the second contraction state as long as the support apparatus 14 is capable of self-standing on the coat SF of paint (alternatively, is capable of adhering to the coat SF of paint to suspend from the coat SF of paint) during at least a part of the period when the light irradiation apparatus 11 emits the processing lights ELk.

The control apparatus 2 controls the non-illustrated driving system that extends and contracts the partition member 132 so that the partition member 132 continues to be in the first expansion state during the period when the light irradiation apparatus 11 emits the processing lights ELk. As a result, the end part 134 of the partition member 132 continues to adhere to the coat SF of paint. As a result, the sealability of the containing space SP is maintained, and thus, the processing light ELk propagating in the containing space SP does not leak outside the containing space SP (namely, outside the housing apparatus 13). Moreover, the unnecessary substance that is generated in the containing space SP does not leak outside the containing space SP (namely, outside the housing apparatus 13).

Note that there is a possibility that at least a part of the end part 134 that should adhere to the coat SF of paint is away from the coat SF of paint due to any factor. When the light irradiation apparatus 11 continues to emit the processing lights ELk in this situation, there is a possibility that at least one of the processing light ELk and the unnecessary substance leaks outside the housing apparatus 13. Thus, the control apparatus 2 may control the light irradiation apparatus 11 to stop the irradiation of the processing lights ELk when it is detected that at least a part of the end part 134 is away from the coat SF of paint during the period when the light irradiation apparatus 11 emits the processing lights ELk.

Figure 12:
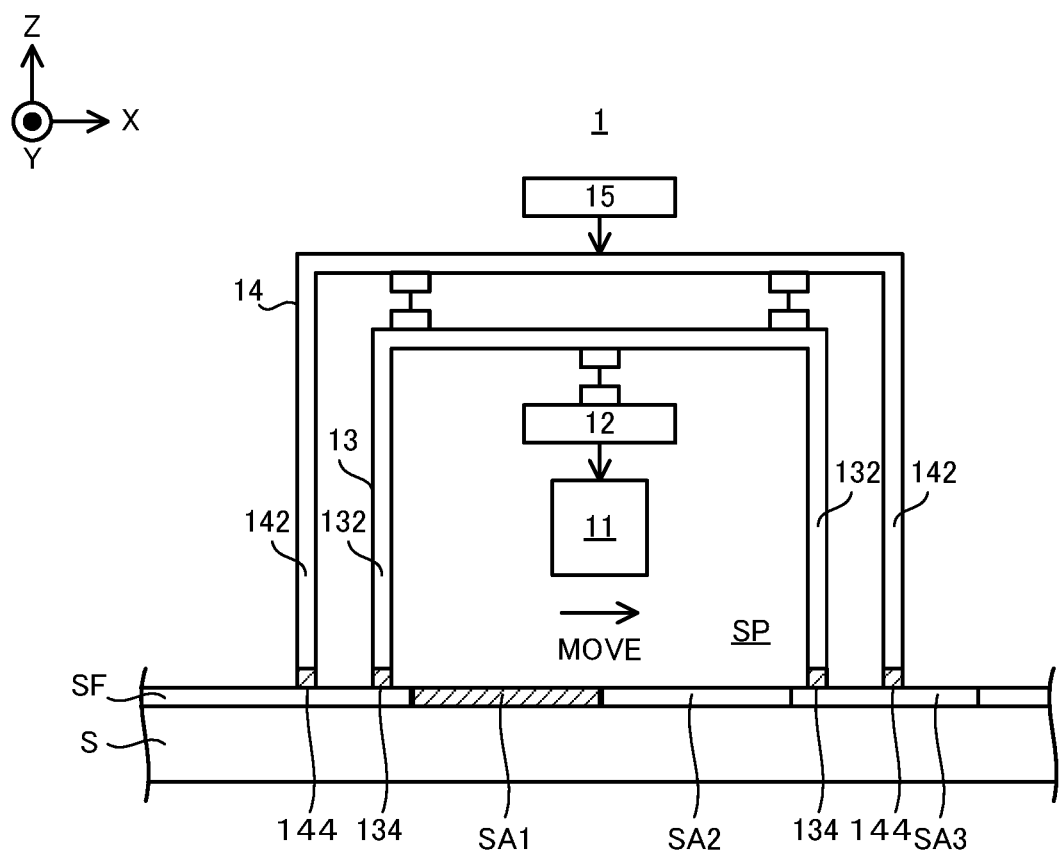
FIG. 12 is a cross-sectional view that illustrates the processing apparatus that performs one step of the processing operation for forming the riblet structure.

Then, as illustrated in FIG. 12, the control apparatus 2 controls the driving system 12 so that the light irradiation apparatus 11 moves from the first irradiation position to a second irradiation position at which the light irradiation apparatus 11 irradiates the processing shot area SA2 with the plurality of processing lights ELk. During a period when the light irradiation apparatus 11 moves, the control apparatus 2 controls the light irradiation apparatus 11 so that the light irradiation apparatus 11 does not emit the processing lights ELk.

Figure 13A:
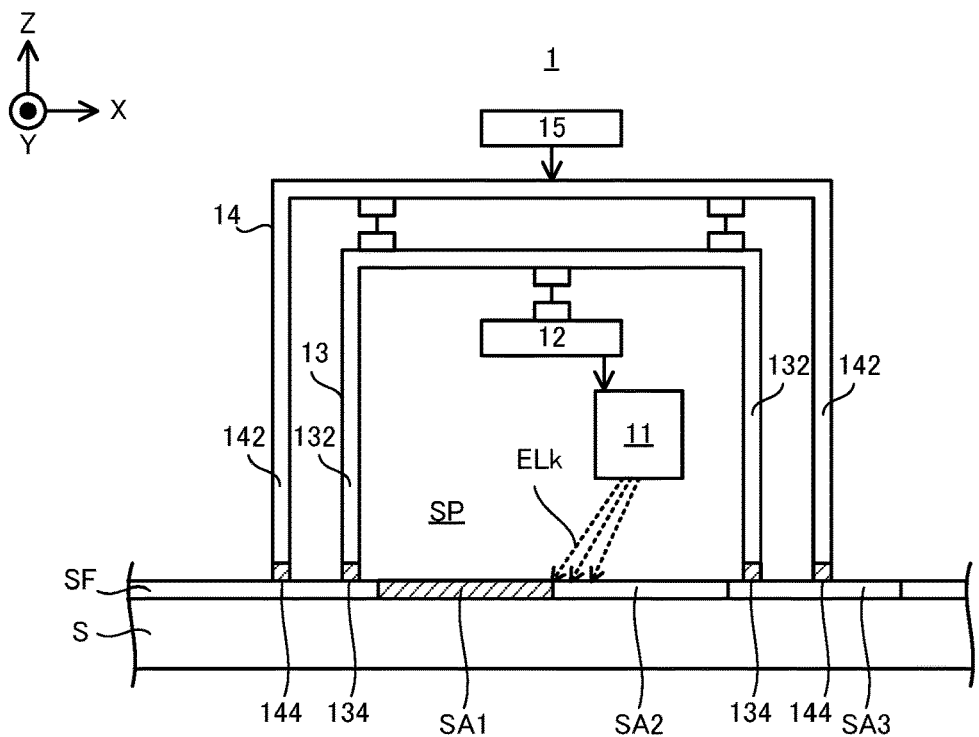
FIG. 13A is a cross-sectional view that illustrates the processing apparatus that performs one step of the processing operation for forming the riblet structure and FIG. 13B is a plan view that illustrates the surface of the coat of paint on which one step of the processing operation illustrated in FIG. 13A is performed.
Figure 13B:
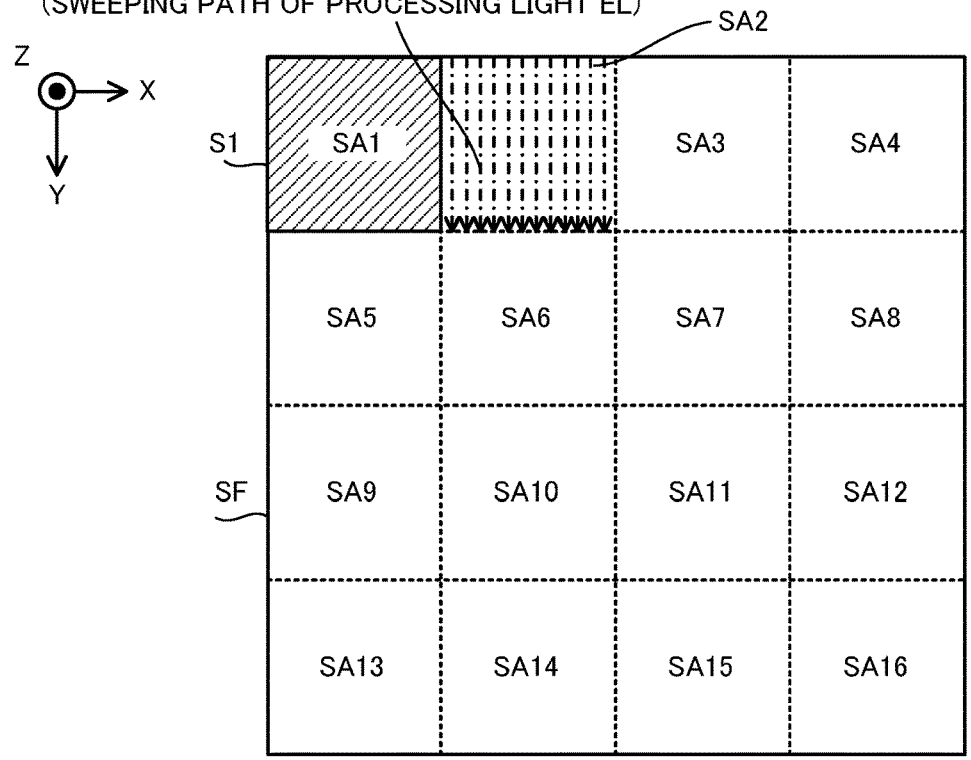

Then, as illustrated in FIG. 13A and FIG. 13B, the control apparatus 2 controls the light irradiation apparatus 11 (especially, the Galvano mirror 113) to sweep the processing shot area SA2 with the plurality of processing lights ELk. Specifically, the control apparatus 2 controls the light irradiation apparatus 11 (especially, the Galvano mirror 113) to sweep whole of the processing shot area SA2 (alternatively, a partial area at which the riblet structure should be formed in the processing shot area SA2) with the plurality of processing lights ELk by alternately repeating the above described scan operation and the above described step operation. As a result, the riblet structure is formed in the processing shot area SA2. Note that the plurality of concave parts CP1 constituting the riblet structure in the processing shot area SA1 and the plurality of concave parts CP1 constituting the riblet structure in the processing shot area SA2 (alternatively, other processing shot area SA) that is adjacent to the processing shot area SA1 may be formed to be sequentially connected to each other. Alternatively, the plurality of concave parts CP1 constituting the riblet structure in the processing shot area SA1 and the plurality of concave parts CP1 constituting the riblet structure in the processing shot area SA2 may be formed not to be sequentially connected to each other. For example, a sequential length of one concave part CP1 formed by sweeping the processing shot area SA with the processing light ELk depends on the size (especially, the size along the Y axis direction that is the sweeping direction of the processing light ELk) of the processing shot area SA. Therefore, when the size of the processing shot area SA is a size that realizes the sequential length allowing the riblet structure to have the above described function, the plurality of concave parts CP1 constituting the riblet structure in the processing shot area SA1 and the plurality of concave parts CP1 constituting the riblet structure in the processing shot area SA2 may be formed not to be sequentially connected to each other, respectively. As one example, when the processing target object S is the airplane, the sequential length allowing the riblet structure to have the above described function is about several millimeter in accordance with a calculation based on an air speed and a frequency of turbulence phenomenon when the airplane is used (typically, cruises). Thus, when the processing shot area SA the size of which is longer than about several millimeter in the Y axis direction is allowed to be set on the surface of the coat SF of paint, the plurality of concave parts CP1 constituting the riblet structure in the processing shot area SA1 and the plurality of concave parts CP1 constituting the riblet structure in the processing shot area SA2 may be formed not to be sequentially connected to each other, respectively.

After the riblet structure is formed in the processing shot area SA2, there is no processing shot area SA in which the riblet structure is not formed yet in the containing space SP. Thus, it is difficult for the light irradiation apparatus 11 to irradiate the processing shot area SA in which the riblet structure is not formed yet with the plurality of processing lights ELk to form the riblet structure therein only by moving the light irradiation apparatus 11 in the containing space SP by the driving system 12. Thus, when there is no processing shot area SA in which the riblet structure is not formed yet in the containing space SP, the control apparatus 2 controls the driving system 15 to move the support apparatus 14 (namely, to move the housing apparatus 13) so that the processing shot area SA in which the riblet structure is not formed yet is located in the containing space SP.

Figure 14:
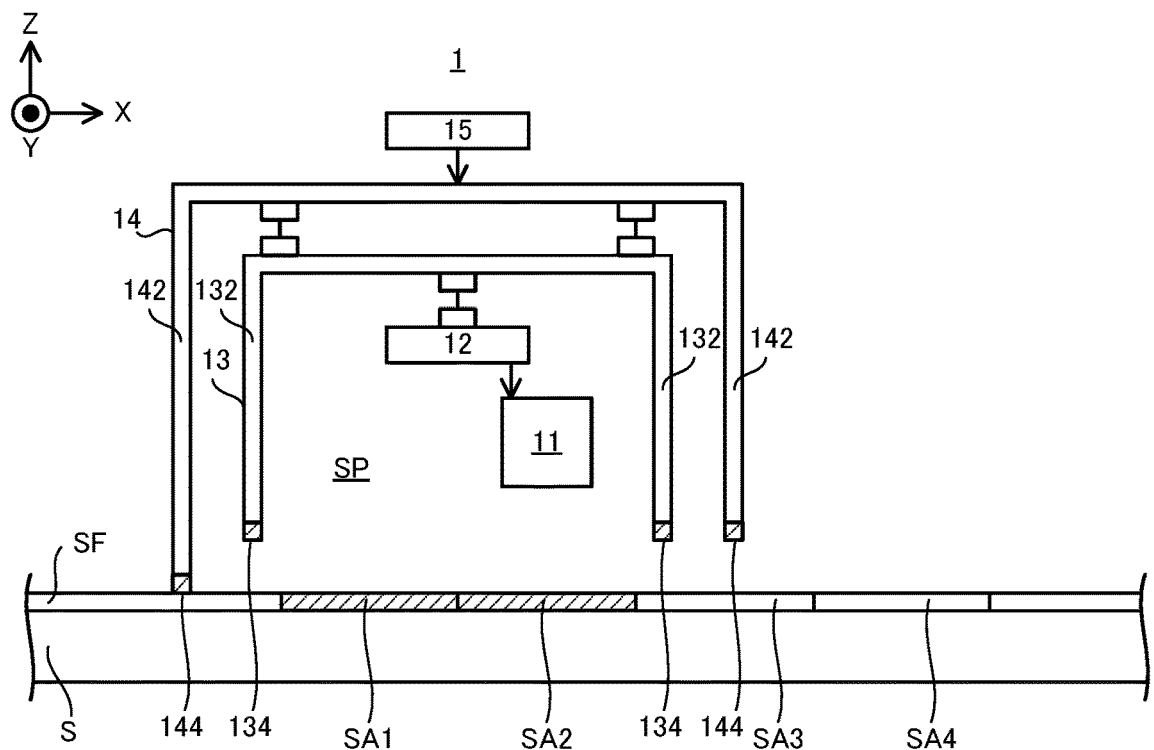
FIG. 14 is a cross-sectional view that illustrates the processing apparatus that performs one step of the processing operation for forming the riblet structure.

Specifically, firstly, as illustrated in FIG. 14, the control apparatus 2 controls the non-illustrated driving system that extends and contracts the partition member 132 so that the state of the partition member 132 is switched from the first expansion state to the first contraction state. As a result, the end part 134 of the partition member 132 is away from the coat SF of paint. Note that the control apparatus 2 controls the light irradiation apparatus 11 so that the light irradiation apparatus 11 does not emit the processing lights ELk during a period when the support apparatus 14 moves. Thus, even when the end part 134 is away from the coat SF of paint, at least one of the processing light ELk and the unnecessary substance does not leak outside the housing apparatus 13.

However, although the unnecessary substance existing in the containing space SP is sucked to the outside of the containing space SP by the above described exhaust apparatus 16, there is a possibility that all of the unnecessary substance existing in the containing space SP is not sucked by the exhaust apparatus 16 (namely, the unnecessary substance remains in the containing space SP) due to any factor. In this case, when the end part 134 is away from the coat SF of paint, there is a possibility that the unnecessary substance leaks outside the housing apparatus 13. Thus, the control apparatus 2 may determine on the basis of the detected result by the detection apparatus 135 that detects the unnecessary substance in the containing space SP whether or not the partition member 132 is switched from the first expansion state to the first contraction state. When the unnecessary substance remains in the containing space SP, the control apparatus 2 does not switch the partition member 132 from the first expansion state to the first contraction state. In this case, the exhaust apparatus 16 continues to suck the unnecessary substance remaining in the containing space SP. On the other hand, when the unnecessary substance does not remain in the containing space SP, the control apparatus 2 switches the partition member 132 from the first expansion state to the first contraction state.

Moreover, the control apparatus 2 controls the driving system 15 so that the state of at least one leg member 142 that moves relative to the coat SF of paint due to the movement of the support apparatus 14 (especially, the expansion of the contracted beam member 141 described later) among the plurality of leg members 142 is switched from the second expansion state to the second contraction state. The leg member 142 that moves relative to coat SF of paint due to the expansion of the contracted beam member 141 is typically the leg member 142 that is disposed at a front side along a moving direction of the support apparatus 14 (namely, a moving direction of the housing apparatus 13) among the plurality of leg members 142. In an example illustrated in FIG. 14, the support apparatus 14 moves toward the +X side and the leg member 142 that is disposed at the front side along the moving direction of the support apparatus 14 is the leg member 142 at the +X side. Hereinafter, the leg member 142 that is disposed at the front side along the moving direction of the support apparatus 14 is referred to as a "front leg member 142". As a result, the end part 144 of the front leg member 142 is away from the coat SF of paint.

Figure 15:
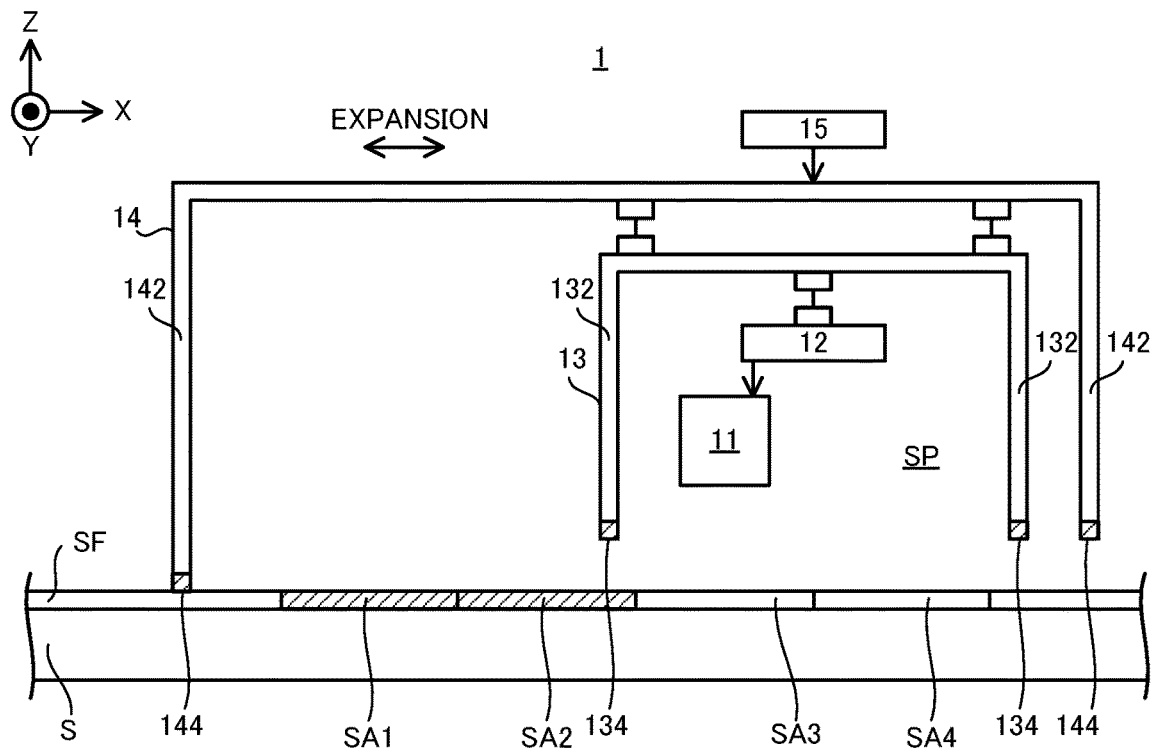
FIG. 15 is a cross-sectional view that illustrates the processing apparatus that performs one step of the processing operation for forming the riblet structure.

Then, as illustrated in FIG. 15, the control apparatus 2 controls the driving system 15 so that the housing apparatus 13 moves from the first housing position to a second housing position at which the processing shot areas SA3 and SA4 are located in the containing space SP. Specifically, the control apparatus 2 controls the driving system 15 so that the beam member 141 extends along the moving direction of the support apparatus 14. As a result, the beam member 141 extends while supporting the housing apparatus 13 (moreover, while supporting the light irradiation apparatus 11 supported by the housing apparatus 13). Moreover, in parallel with the movement of the support apparatus 14, the control apparatus 2 controls the driving system 12 so that the light irradiation apparatus 11 moves from the second irradiation position to a third irradiation position at which the light irradiation apparatus 11 irradiates the processing shot area SA3 with the plurality of processing lights ELk.

The control apparatus 2 controls the non-illustrated driving system that extends and contracts the partition member 132 so that the partition member 132 continues to be in the first contraction state during the period when the support apparatus 14 moves (namely, the contracted beam member 141 extends). As a result, the movement of the support apparatus 14 (namely, the movement of the housing apparatus 13) is not prevented by a contact between the end part 134 of the partition member 132 and the coat SF of paint. Moreover, the coat SF of paint is not scratched by the contact between the end part 134 and the coat SF of paint when the support apparatus 14 moves. However, when the contact between the end part 134 and the coat SF of paint does not prevent movement of the support apparatus 14, at least a part of the end part 134 may contact with the coat SF of paint during at least a part of the period when the support apparatus 14 moves. When the contact between the end part 134 and the coat SF of paint does not scratch the coat SF of paint during the period when the support apparatus 14 moves, at least a part of the end part 134 may contact with the coat SF of paint during at least a part of the period when the support apparatus 14 moves.

Moreover, the control apparatus 2 controls the driving system 15 so that the front leg member 142 continues to be in the second contraction state during the period when the support apparatus 14 moves. As a result, the movement of the support apparatus 14 (namely, the movement of the housing apparatus 13) is not prevented by a contact between the end part 144 of the front leg member 142 and the coat SF of paint. Moreover, the coat SF of paint is not scratched by the contact between the end part 144 and the coat SF of paint when the support apparatus 14 moves. However, when the contact between the end part 144 and the coat SF of paint does not prevent movement of the support apparatus 14, at least a part of the end part 144 may contact with the coat SF of paint during at least a part of the period when the support apparatus 14 moves. When the contact between the end part 144 and the coat SF of paint does not scratch the coat SF of paint during the period when the support apparatus 14 moves, at least a part of the end part 144 may contact with the coat SF of paint during at least a part of the period when the support apparatus 14 moves.

Moreover, the control apparatus 2 controls the driving system 15 so that the other leg member 142 of the plurality of leg members 142 other than the front leg member 142 continues to be in the first expansion state during the period when the support apparatus 14 moves. As a result, even when the end part 144 of the front leg member 142 is away from the coat SF of paint, the end part 144 of the leg member 142 other than the front leg member 142 contacts with the coat SF of paint. Thus, the fact remains that the processing apparatus 1 is capable of self-standing on the coat SF of paint (alternatively, is capable of adhering to the coat SF of paint to suspend from the coat SF of paint), as with the case where all end parts 144 of the plurality of leg members 142 contact with the coat SF of paint.

Moreover, during the period when the support apparatus 14 moves, the control apparatus 2 controls the light irradiation apparatus 11 so that the light irradiation apparatus 11 does not emit the processing lights ELk.

Figure 16:
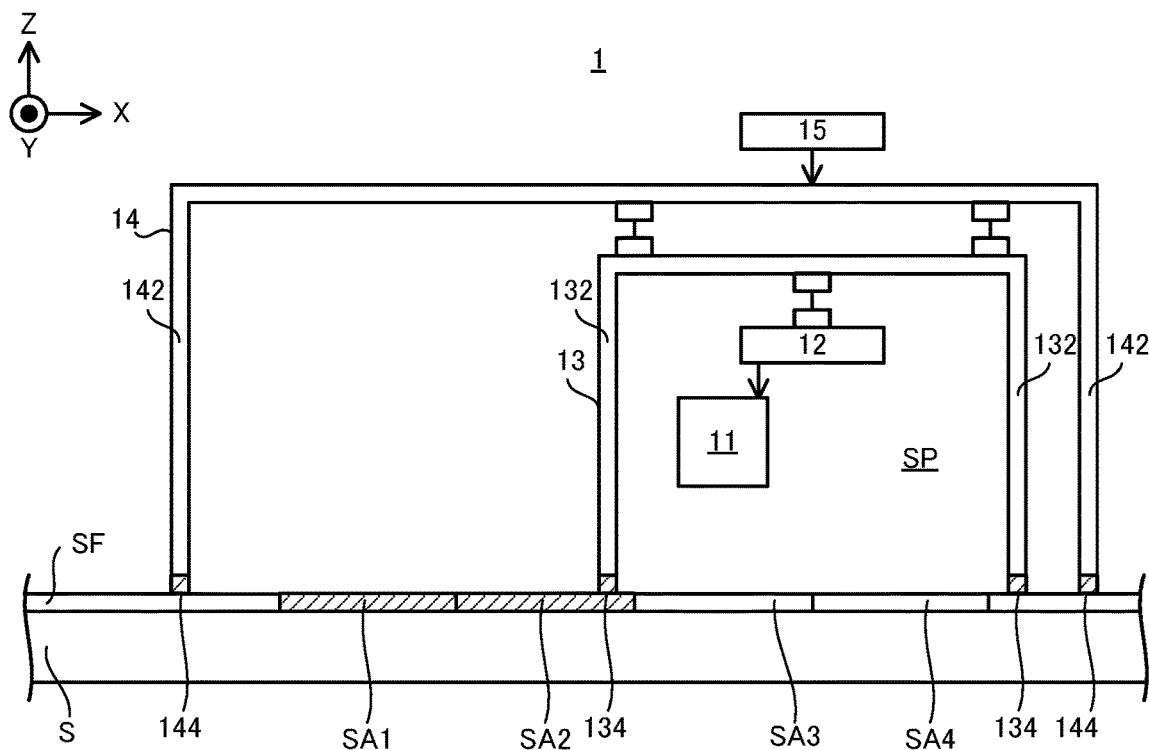
FIG. 16 is a cross-sectional view that illustrates the processing apparatus that performs one step of the processing operation for forming the riblet structure.

After the housing apparatus 13 is disposed at the second housing position, as illustrated in FIG. 16, the control apparatus 2 controls the non-illustrated driving system that extends and contracts the partition member 132 so that the partition member 132 is switched from the first contraction state to the first expansion state. As a result, the end part 134 of the partition member 132 contacts with and adheres to the coat SF of paint. Moreover, the control apparatus 2 controls the driving system 15 so that the front leg member 142 is switched from the second contraction state to the second expansion state. As a result, the end part 144 of the front leg member 142 contacts with and adheres to the coat SF of paint. Here, an operation for extending the partition member 132 and an operation for extending the front leg member 142 may be performed at the same time or may be performed at different times.

Figure 17:
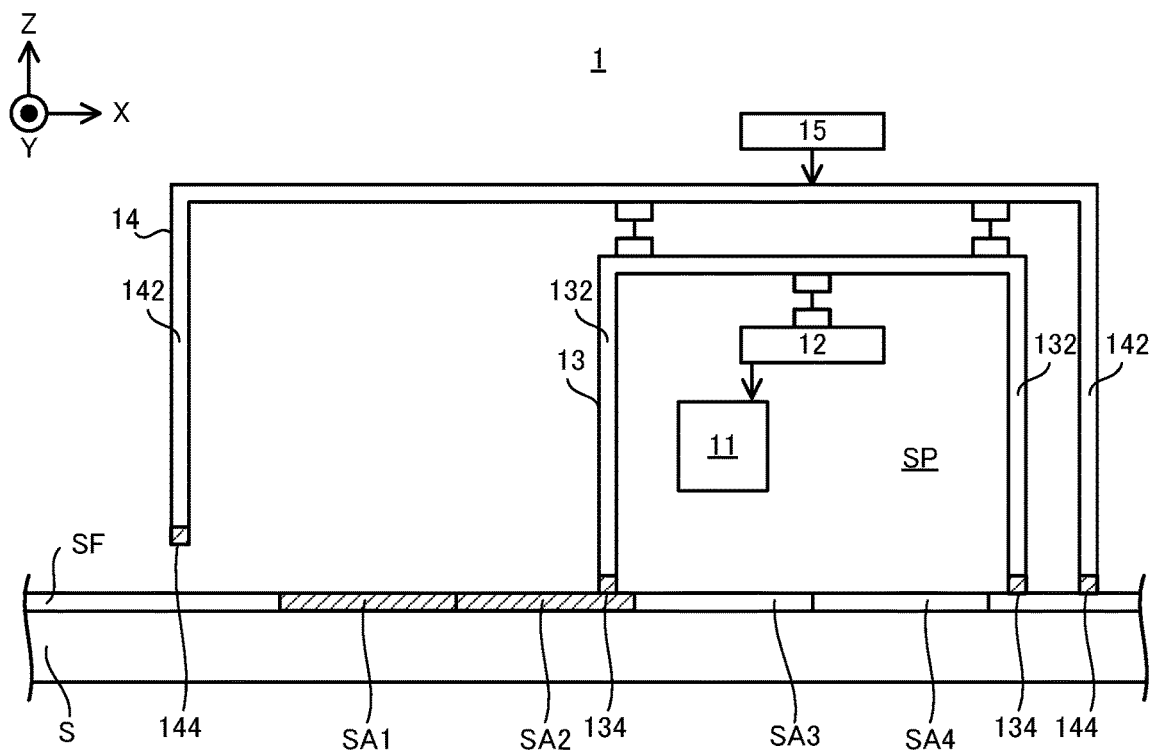
FIG. 17 is a cross-sectional view that illustrates the processing apparatus that performs one step of the processing operation for forming the riblet structure.

Then, as illustrated in FIG. 17, the control apparatus 2 controls the driving system 15 so that the state of at least one leg member 142 that moves relative to the coat SF of paint due to the movement of the support apparatus 14 (especially, the contraction of the extended beam member 141 described later) among the plurality of leg members 142 is switched from the second expansion state to the second contraction state. The leg member 142 that moves relative to coat SF of paint due to the contraction of the extended beam member 141 is typically the leg member 142 that is disposed at a rear side along the moving direction of the support apparatus 14 among the plurality of leg members 142. In an example illustrated in FIG. 17, the leg member 142 that is disposed at the rear side along the moving direction of the support apparatus 14 is the leg member 142 at the −X side. Hereinafter, the leg member 142 that is disposed at the rear side along the moving direction of the support apparatus 14 is referred to as a "rear leg member 142". As a result, the end part 144 of the rear leg member 142 is away from the coat SF of paint.

Figure 18:
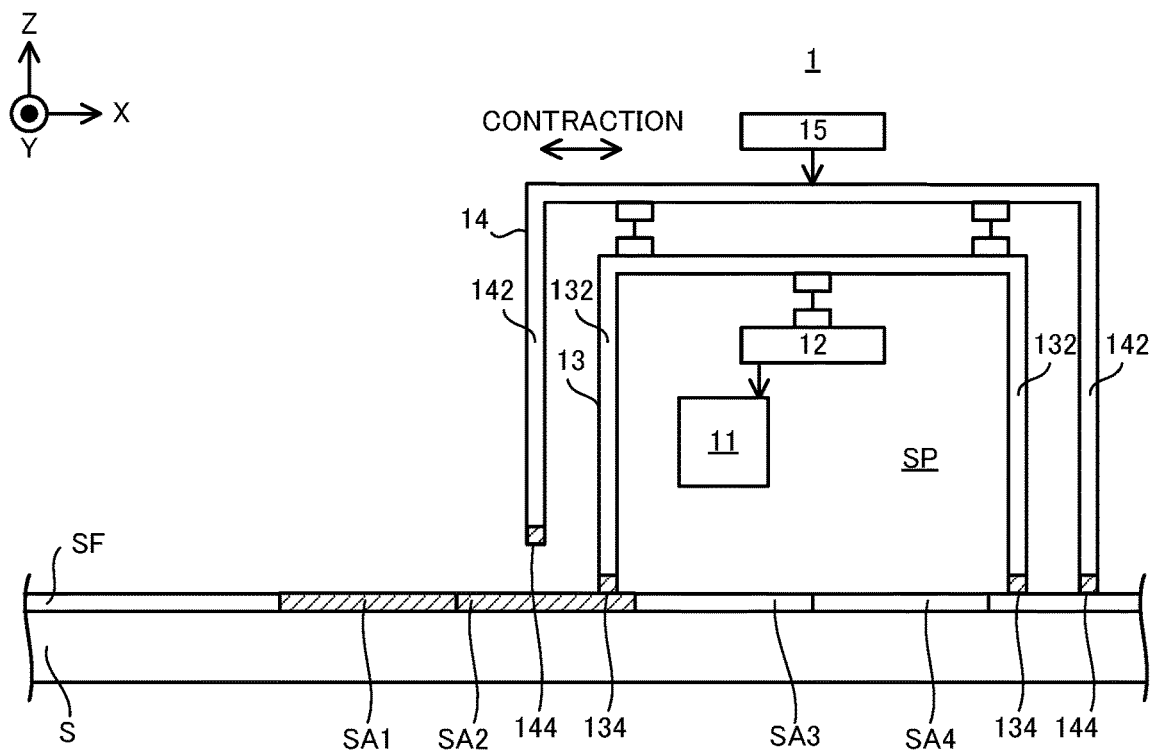
FIG. 18 is a cross-sectional view that illustrates the processing apparatus that performs one step of the processing operation for forming the riblet structure.

Then, as illustrated in FIG. 18, the control apparatus 2 controls the driving system 15 to contract the beam member 141 extending along the moving direction of the support apparatus 14.

Figure 19:
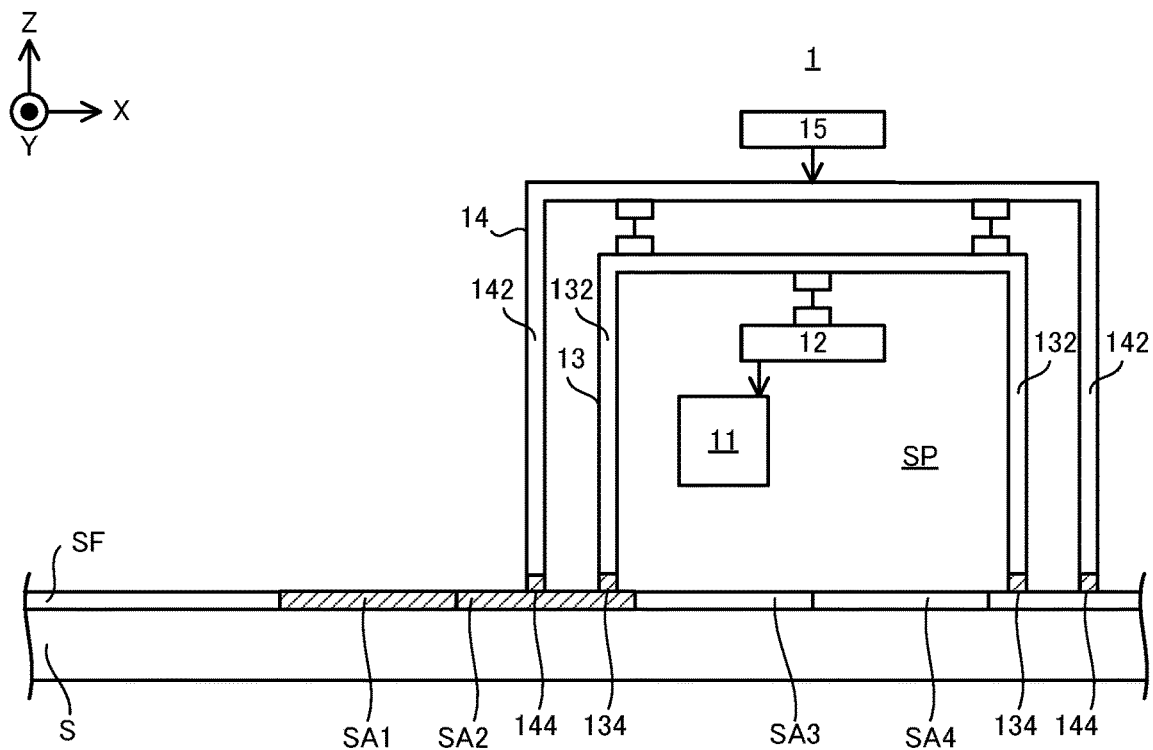
FIG. 19 is a cross-sectional view that illustrates the processing apparatus that performs one step of the processing operation for forming the riblet structure.

After the beam member 141 finishes contracting, as illustrated in FIG. 19, the control apparatus 2 controls the driving system 15 so that the second leg member 142 is switched from the second contraction state to the second expansion state. As a result, the end part 144 of the rear leg member 142 contacts with and adheres to the coat SF of paint.

Then, the control apparatus 2 controls the light irradiation apparatus 11 to sweep the processing shot areas SA3 and SA4 with the plurality of processing lights ELk, as with the case where the processing shot areas SA1 and SA2 are swept with the plurality of processing lights ELk. Then, same operation is repeated, and thus, the surface of the coat SF of paint (especially, the area of the coat SF of paint at which the riblet structure should be formed) is irradiated with the plurality of processing lights ELk. As a result, the riblet structure of the coat SF of paint is formed on the processing target object S.

(1-3) Technical Effect of Processing SYSa

As described above, the processing system SYSa in the first embodiment forms the riblet structure of the coat SF of paint on the surface of the processing target object S by irradiating the processing target object S (especially, the coat SF of paint formed on the surface thereof) with the processing lights ELk. Thus, the processing system SYSa forms the riblet structure relatively easily in a relatively short time, compared to a processing apparatus that forms the riblet structure by cutting the surface of the processing target object S by a cutting tool such as an end mill.

Moreover, the processing system SYSa forms the plurality of concave structures CP1 at the same time by emitting the plurality of processing lights ELk at the same time. Thus, the throughput relating to the formation of the riblet structure improves, compared to a processing apparatus that forms only single concave structure CP1 at a time by emitting the single processing light ELk.

Moreover, the processing system SYSa sweeps the coat SF of paint relatively fast by deflecting the plurality of processing lights ELk by the Galvano mirror 113. Thus, the throughput relating to the formation of the riblet structure improves.

Moreover, the processing system SYSa forms the riblet structure on the surface of the processing target object S by processing the coat SF of paint formed on the surface of the processing target object S instead of directly processing the processing target object S. Thus, an increase of a weight of the processing target object S due to the formation of the riblet structure is prevented, compared to a processing apparatus that forms the riblet structure by newly adding (for example, pasting), on the surface of the processing target object S (namely, the surface of the coat SF of paint), a special material for forming the riblet structure.

Moreover, the riblet structure is formable again relatively easily, because the processing system SYSa does not directly process the processing target object S. Specifically, when the riblet structure is formed again, firstly, the riblet structure of the coat SF of paint is removed and then new coat SF of paint is coated. Then, the processing system SYSa forms new riblet structure by processing the newly coated coat SF of paint. Therefore, a deterioration (for example, a breakage) of the riblet structure is handled relatively easily by forming the riblet structure again.

Moreover, the processing system SYSa is allowed to form the riblet structure on the surface of the processing target object S that is difficult to be directly processed or at which the riblet structure is not formed from the beginning, because the processing system SYS does not directly process the processing target object S. Namely, the riblet structure is formable relatively easily by processing the coat SF of paint by the processing system SYSa after coating the coat SF of paint on the surface of the processing target object S.

Incidentally, when the coat SF of paint is processed after the coat SF of paint is coated on the surface of the processing target object S, the processing operation for processing the processing target object S may include an operation for coating (namely, forming) the coat SF of paint on the processing target object S and an operation for processing the coat SF of paint (for example, partially removing the coat SF of paint). The operation for coating the coat SF of paint on the processing target object S may be performed by the processing system SYSa. In this case, the processing system SYSa may be provided with a coating apparatus that coats the coat SF of paint on the processing target object S. Alternatively, the operation for coating the coat SF of paint on the processing target object S may be performed at the outside of the processing system SYSa. For example, the operation for coating the coat SF of paint on the processing target object S may be performed by a coating apparatus outside the processing system SYSa.

Moreover, the processing system SYSa forms the riblet structure of the coat SF of paint. The coat SF of paint usually has relatively strong durability to an external environment (for example, at least one of heat, light, wind and the like). Thus, the processing system SYSa is capable of forming the riblet structure having the relatively strong durability relatively easily.

Moreover, in the first embodiment, the optical path of the processing lights ELk between the terminal optical element of the light irradiation apparatus 11 and the coat SF of paint is included in the containing space SP. Thus, it is possible to properly prevent the processing light ELk with which the coat SF of paint is irradiated (alternatively, the scattered light, the reflected light or the like of the processing light ELk from the coat SF of paint) from propagating (in other words, scattering) toward the surrounding environment of the processing system SYSa, compared to a processing apparatus in which the optical path of the processing lights ELk is not included in the containing space SP (namely, is exposed to an opened space). Moreover, it is possible to properly prevent the unnecessary substance generated by the irradiation of the processing light ELk from flying (in other words, scattering) toward the surrounding environment of the processing system SYSa.

Moreover, in the first embodiment, the light irradiation apparatus 11 is supported by the support apparatus 14 that is movable on the coat SF of paint. Thus, the processing system SYSa is capable of relatively easily processing the coat SF of paint that relatively widely spreads. Namely, the processing system SYSa is capable of forming the riblet structure of the coat SF of paint in a relatively wide area on the surface of the processing target object S. Moreover, the processing system SYS is capable of forming the riblet structure on the surface of the relatively large or heavy processing target object S relatively easily, because it does not necessarily move the processing target object S.

Moreover, the processing system SYSa sucks the unnecessary substance generated by the irradiation of the processing light ELk to the outside of the containing space SP by using the exhaust apparatus 16. Thus, the unnecessary substance rarely prevents the irradiation of the processing lights ELk to the coat SF of paint. Thus, an irradiation accuracy of the processing lights ELk improves, compared to a processing apparatus that is not provided with the exhaust apparatus 16 (namely, in which there is a possibility that the unnecessary substance prevents the irradiation of the processing lights ELk to the coat SF of paint). As a result, the forming accuracy of the riblet structure improves.

Moreover, the processing system SYSa prevents the adherence of the dust to the optical surface 1141 of the fθ lens 114 (namely, the optical surface at the containing space SP side of the terminal optical element of the light irradiation apparatus 11) by using the gas supply apparatus 17. Thus, there is a lower possibility that the irradiation of the processing lights ELk to the coat SF of paint is prevented by the dust that adheres to the optical surface 1141, compared to a processing apparatus that is not provided with the gas supply apparatus 17. Thus, the irradiation accuracy of the processing lights ELk improves. As a result, the forming accuracy of the riblet structure improves.

Moreover, in the first embodiment, the multibeam optical system 112 divides the source light ELo into the plurality of processing lights ELk by using the polarized beam splitter 1121. Thus, the multibeam optical system 112 is capable of reducing a loss of an energy (namely, an attenuation of the light) in the process of dividing the source light ELo into the plurality of processing lights ELk. As a result, the processing system SYSa processes the processing target object S by irradiating the coat SF of paint with the plurality of processing lights ELk having relatively high intensities, compared to a case where the loss of the energy in the process of dividing the source light ELo into the plurality of processing lights ELk is not reduced. Therefore, the throughput relating to the formation of the riblet structure improves, compared to a case where the processing target object S is processed by irradiating the coat SF of paint with the plurality of processing lights ELk having relatively low intensities.

Figure 20:
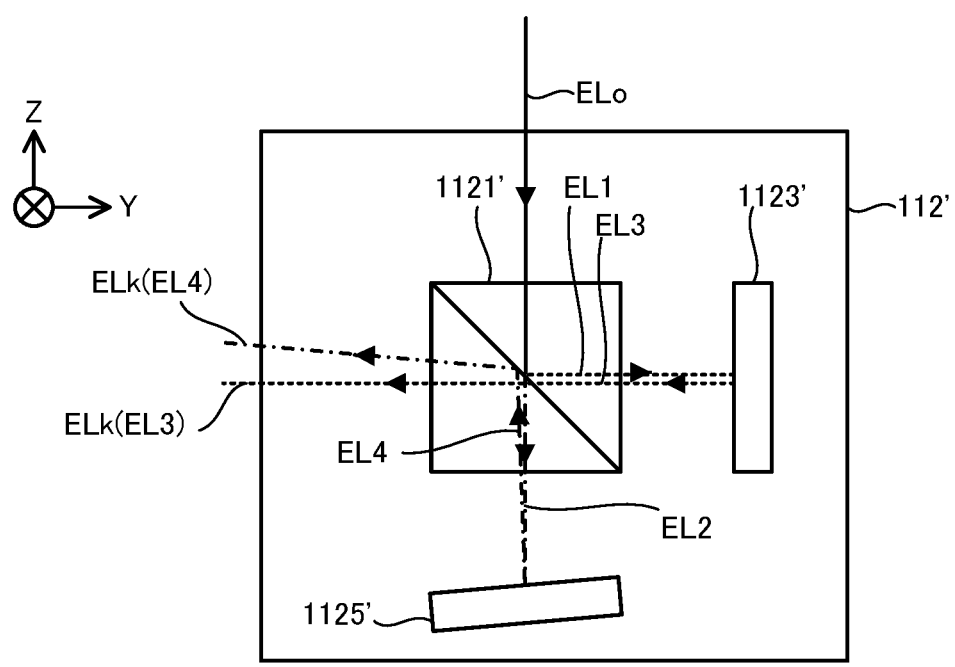
FIG. 20 is a cross-sectional view that schematically illustrates another example of the multibeam optical system.

However, the processing system SYSa may divides the source light ELo into the plurality of processing lights ELk by using a multibeam optical system that is not provided with the polarized beam splitter 1121, as long as it is configured to divide the source light ELo into the plurality of processing lights ELk. For example, as illustrated in FIG. 20 that is a cross-sectional view illustrating a structure of another example of the multibeam optical system, the processing system SYSa may divide the source light ELo into the plurality of processing lights ELk by using a multibeam optical system 112' that is provided with: an optical system 1121' including an optical element (for example, at least one of a beam splitter, a half mirror and a dichroic mirror) that divides the source light ELo into first light EL1 and second light EL2 (for example, first light EL1 and second light EL2 states of which are same or different); an optical system 1123' including an optical element (for example, at least one of a reflective optical element such as a reflective mirror and a refractive optical element such as a lens) that returns the first light EL1, which is from the optical system 1121', to the optical system 1121' as third light EL3; and an optical system 1125' including an optical element (for example, at least one of a reflective optical element such as a reflective mirror and a refractive optical element such as a lens) that returns the second light EL2, which is from the optical system 1121', to the optical system 1121' as fourth light EL4, wherein the optical system 1121' merges the third light EL3 from the optical system 1123' and the fourth light EL4 from the optical system 1125' to emit them as the plurality of processing lights EL toward the Galvano mirror 113. Even in this case, the optical system 1121', the optical system 1123' and the optical system 1125' may be aligned so that a plurality of axes that are along traveling directions of the plurality of processing lights ELk emitted from the multibeam optical system 112' intersect. Note that the polarized beam splitter 1121 of the above described multibeam optical system 112 corresponds to one example of the optical system 1121'. The ¼ wavelength plate 1122 and the reflective mirror 1123 of the above described multibeam optical system 112 correspond to one example of the optical system 1123'. The ¼ wavelength plate 1124 and the reflective mirror 1125 of the above described multibeam optical system 112 correspond to one example of the optical system 1125'.

Moreover, in the first embodiment, the polarized beam splitter 1121 not only serves as the optical system that divides the source light ELo into the s polarized light ELs1 and the p polarized light ELp2 but also serve as the optical system that merges the s polarized light ELs1 and the p polarized light ELp2, which enter the polarized beam splitter 1121 from different directions, as the plurality of processing lights ELk that are directed toward the Galvano mirror 113. Thus, a downsize of the multibeam optical system 112 is achievable, compared to a case where the optical system (for example, the polarized beam splitter) that divides the source light ELo into the s polarized light ELs1 and the p polarized light ELp2 and the optical system (for example, the polarized beam splitter) that merges the s polarized light ELs1 and the p polarized light ELp2 as the plurality of processing lights ELk are prepared separately.

(2) Processing System SYSb in Second Embodiment

Next, a processing system SYS in a second embodiment (in the below described description, the processing system SYS in the second embodiment is referred to as a "processing system SYSb") will be described. The processing system SYSb in the second embodiment is different from the above described processing system SYSa in the first embodiment that divides the source light ELo into two processing lights ELk in that it is configured to divide the source light ELo into three or more processing lights ELk. The processing system SYSb is different from the above described processing system SYSa in that it is provided with a light irradiation apparatus 11b instead of the light irradiation apparatus 11 in order to divide the source light ELo into three or more processing lights ELk. The light irradiation apparatus 11b is different from the light irradiation apparatus 11 in that it is provided with a plurality of multibeam optical system 112. Another feature of the processing system SYSa in a first modified example may be same as another feature of the above described processing system SYS.

Figure 21:
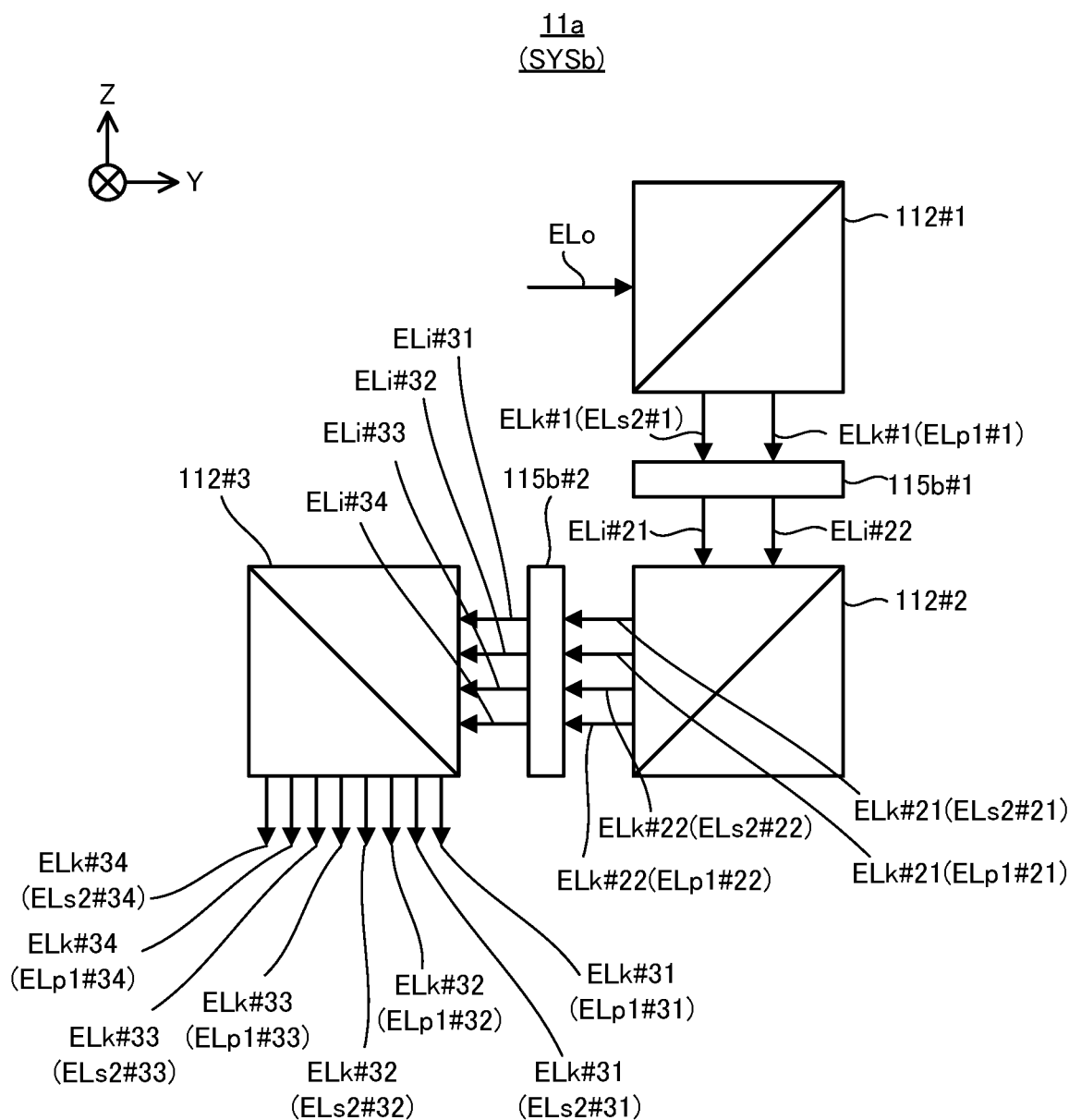
FIG. 21 is a cross-sectional view that illustrates a plurality of multibeam optical systems of a light irradiation apparatus in a second embodiment.

The plurality of multibeam optical systems 112 are connected in a multistage manner in series along the optical path, as illustrated in FIG. 21. Namely, the plurality of multibeam optical systems 112 are disposed so that the plurality of processing lights ELk emitted from one multibeam optical system 112 enter, as a plurality of source light ELo, another multibeam optical system 112 that is connected to the next stage of one multibeam optical system 112.

Moreover, as illustrated in FIG. 21, a wavelength plate 115b is disposed on the optical path between one multibeam optical system 112 and another multibeam optical system 112 that is connected to the next stage of one multibeam optical system 112. Therefore, the plurality of processing lights ELk emitted from one multibeam optical system 112 enter, as a plurality of source light ELo, another multibeam optical system 112 through the wavelength plate 115b.

The wavelength plate 115b is an optical element that is configured to change a polarized state of each processing light ELk that passes through the wavelength plate 115b. The wavelength plate 115b is a ¼ wavelength plate, however, may be another type of wavelength plate (for example, at least one of a ½ wavelength plate, a ⅛ wavelength plate and a 1 wavelength plate). For example, the wavelength plate 115b may be configured to convert each processing light ELk into circular polarized light (alternatively, polarized light other than liner polarized light or non-polarized light). When the wavelength plate 115b is the ¼ wavelength plate, the wavelength plate 115b is configured to convert each processing light ELk that is the linear polarized light into the circular polarized light. Alternatively, even when the wavelength plate 115b is not the ¼ wavelength plate, the wavelength plate 115b may be configured to convert each processing light ELk into the circular polarized light (alternatively, the polarized light other than the liner polarized light or the non-polarized light), when a characteristic of the wavelength plate 115b is set properly. For example, a thickness of the wavelength plate 115b may be set to be a desired thickness that allows the polarized state of each processing light ELk to be changed to a desired state. For example, a direction of an optical axis of the wavelength plate 115b may be set to be a desired direction that allows the polarized state of each processing light ELk to be changed to the desired state. As a result, each processing light ELk emitted from one multibeam optical system 112 enters another multibeam optical system 112 as incident light ELi after the polarized state thereof is changed. Another multibeam optical system 112 divides each of the entering incident lights ELi into the plurality of processing lights ELk in a same manner when the entering source light ELo is divided into the plurality of processing lights ELk. Thus, the number of the processing lights ELk emitted from another multibeam optical system 112 is larger than the number of the processing lights ELk emitted from one multibeam optical system 112. Specifically, the number of the processing lights ELk emitted from another multibeam optical system 112 is twice as much as the number of the processing lights ELk emitted from one multibeam optical system 112.

Figures 22A, 22B:
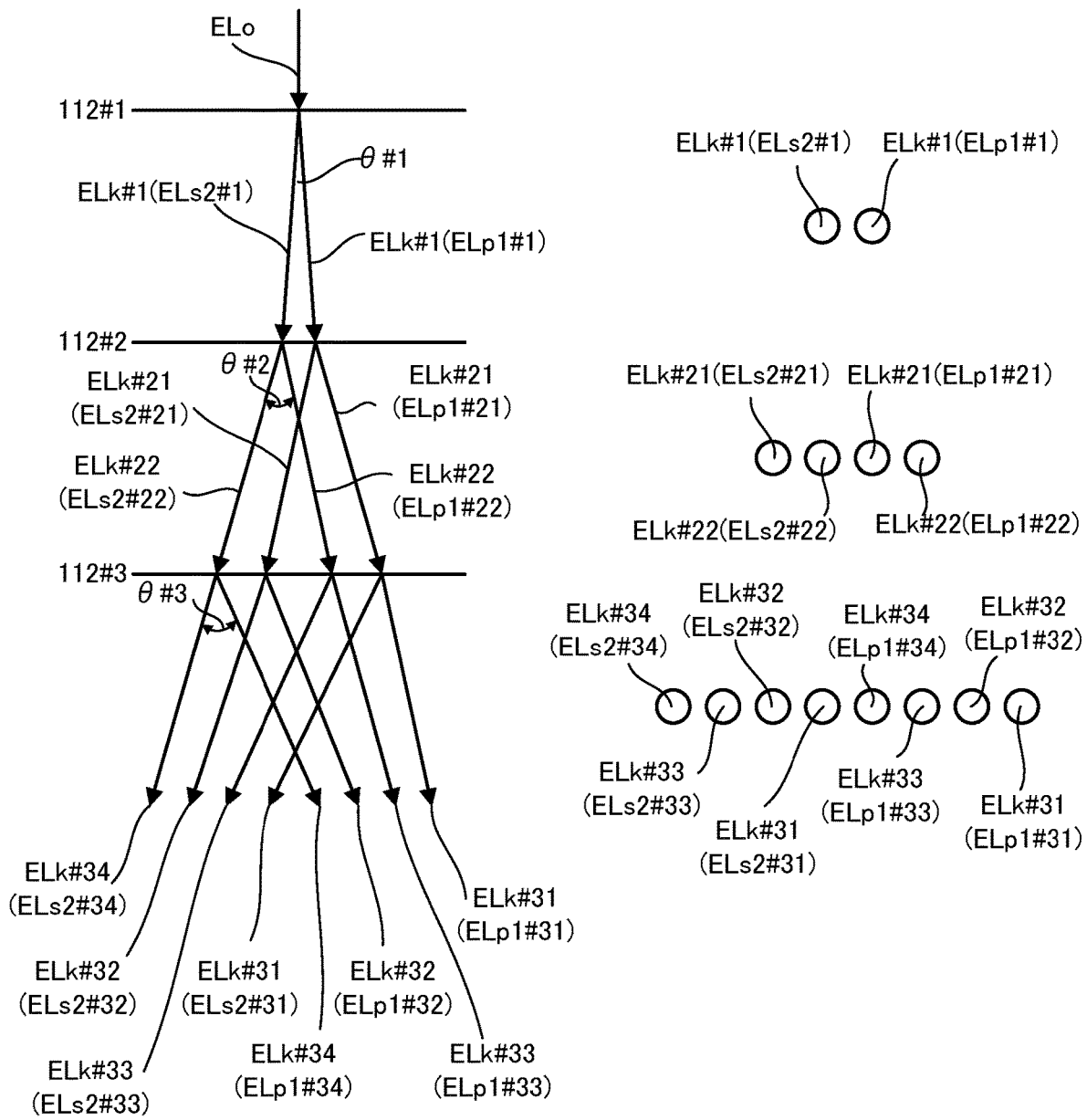
FIG. 22A is a cross-sectional view that schematically illustrates an aspect in which each of the plurality of multibeam optical systems divides a source light into a plurality of processing lights and FIG. 22B is a plan view that illustrates beam spots that are formed on a predetermined optical plane by the plurality of processing lights emitted from each of the plurality of multibeam optical systems.

FIG. 21 illustrates one example of the three multibeam optical systems 112 (specifically, multibeam optical systems 112#1 to 112#3) that are connected in a multistage manner in series along the optical path. In this case, source light ELo#1 from the light source 110 firstly enters the multibeam optical system 112#1. The multibeam optical system 112#1 divides the source light ELo#1 into two processing lights ELk#1 (namely, p polarized light ELp1#1 and s polarized light ELs2#1) as illustrated in FIG. 21 and FIG. 22A that is a cross-sectional view illustrating a state of the source light ELo. Note that FIG. 22B illustrates beam spots that are formed by the two processing lights ELk#1 on an optical plane that intersects with the two processing lights ELk#1. The two processing lights ELk#1 emitted from the multibeam optical system 112#1 passes through a wavelength plate 115b#1 that is disposed between the multibeam optical system 112#1 and the multibeam optical system 112#2 that is connected to the next stage of one multibeam optical system 112#1. As a result, the two processing lights ELk#1 are converted into two incident lights ELi#21 and ELi#22, respectively, that are different from the p polarized light and the s polarized light.

The two incident lights ELi#21 and ELi#22 passing through the wavelength plate 115*b*#1 enters the multibeam optical system 112#2. The multibeam optical system 112#2 divides the incident light ELi#21 into two processing lights ELk#21 (namely, p polarized light ELp1#21 and s polarized light ELs2#21) as illustrated in FIG. 21 and FIG. 22A. Moreover, the multibeam optical system 112#2 divides the incident light ELi#22 into two processing lights ELk#22 (namely, p polarized light ELp1#22 and s polarized light ELs2#22) as illustrated in FIG. 21 and FIG. 22A. Therefore, the multibeam optical system 112#2 emits the four processing lights ELk#21 and ELk#22. Note that FIG. 22B illustrates beam spots that are formed by the four processing lights ELk#21 and ELk#22 on an optical plane that intersects with the four processing lights ELk#21 and ELk#22. The four processing lights ELk#21 and ELk#22 emitted from the multibeam optical system 112#2 passes through a wavelength plate 115*b*#2 that is disposed between the multibeam optical system 112#2 and the multibeam optical system 112#3 that is connected to the next stage of one multibeam optical system 112#2. As a result, the polarized states of the two processing lights ELk#21 are changed and the polarized states of the two processing lights ELk#22 are changed.

Four incident lights ELi#31 and ELi#34 passing through the wavelength plate 115*b*#2 enters the multibeam optical system 112#3. The multibeam optical system 112#3 divides the incident light ELi#31 into two processing lights ELk#31 (namely, p polarized light ELp1#31 and s polarized light ELs2#31) as illustrated in FIG. 21 and FIG. 22A. Moreover, the multibeam optical system 112#3 divides the incident light ELi#32 into two processing lights ELk#32 (namely, p polarized light ELp1#32 and s polarized light ELs2#32) as illustrated in FIG. 21 and FIG. 22A. Moreover, the multibeam optical system 112#3 divides the incident light ELi#33 into two processing lights ELk#33 (namely, p polarized light ELp1#33 and s polarized light ELs2#33) as illustrated in FIG. 21 and FIG. 22A. Moreover, the multibeam optical system 112#3 divides the incident light ELi#34 into two processing lights ELk#34 (namely, p polarized light ELp1#34 and s polarized light ELs2#34) as illustrated in FIG. 21 and FIG. 22A. Therefore, the multibeam optical system 112#3 emits the eight processing lights ELk#31 and ELk#34.

As described above, the processing system SYSb in the second embodiment is configured to irradiate the coat SF of paint with the plurality of processing lights ELk simultaneously the number of which is larger than that of the above described processing system SYSa in the first embodiment. Specifically, when the processing system SYSb is provided with N (note that N is an integer that is equal to or larger than 2) multibeam optical systems 112 that are connected in a N-th stage manner, the processing system SYSb is configured to irradiate the coat SF of paint with the plurality of processing lights ELk simultaneously the number of which is $2^{(N-1)}$ times as much as that of the above described processing system SYSa. Namely, the processing system SYSb is configured to irradiate the coat SF of paint with $2^{(N-1)}$ processing lights ELk simultaneously. Thus, the throughput relating to the formation of the riblet structure improves.

Note that an angle between two axes (namely, an angle at which two axes intersect) along the traveling directions of the two processing lights ELk (especially, the p polarized light ELp1 and the s polarized light ELs2 that are divided from same source light ELo) emitted from one multibeam optical system 112 may be equal to an angle between two axes along the traveling directions of the two processing lights ELk (especially, the p polarized light ELp1 and the s polarized light ELs2 that are divided from same source light ELo) emitted from another multibeam optical system 112 that is connected to the next stage of one multibeam optical system 112. In an example illustrated in FIG. 22, an angle θ#1 between two axes along the traveling directions of the two processing lights ELk#1 emitted from the multibeam optical system 112#1 may be equal to an angle θ#2 between two axes along the traveling directions of the two processing lights ELk#21 emitted from the multibeam optical system 112#2 and an angle θ#2 between two axes along the traveling directions of the two processing lights ELk#22 emitted from the multibeam optical system 112#2. Similarly, the angle θ#2 between the two axes along the traveling directions of the two processing lights ELk#21 emitted from the multibeam optical system 112#2 and the angle θ#2 between the two axes along the traveling directions of the two processing lights ELk#22 emitted from the multibeam optical system 112#2 may be equal to an angle θ#3 between two axes along the traveling directions of the two processing lights ELk#31 emitted from the multibeam optical system 112#3, an angle θ#3 between two axes along the traveling directions of the two processing lights ELk#32 emitted from the multibeam optical system 112#3, an angle θ#3 between two axes along the traveling directions of the two processing lights ELk#33 emitted from the multibeam optical system 112#3 and an angle θ#3 between two axes along the traveling directions of the two processing lights ELk#34 emitted from the multibeam optical system 112#3.

Alternatively, the angle between the two axes along the traveling directions of the two processing lights ELk emitted from one multibeam optical system 112 may be different from the angle between the two axes along the traveling directions of the two processing lights ELk emitted from another multibeam optical system 112 that is connected to the next stage of one multibeam optical system 112. In the example illustrated in FIG. 22, the angle θ#1 between the two axes along the traveling directions of the two processing lights ELk#1 may be different from the angle θ#2 between the two axes along the traveling directions of the two processing lights ELk#2 1and the angle θ#2 between the two axes along the traveling directions of the two processing lights ELk#22. Similarly, the angle θ#2 between the two axes along the traveling directions of the two processing lights ELk#21 and the angle θ#2 between the two axes along the traveling directions of the two processing lights ELk#22 may be different from the angle θ#3 between the two axes along the traveling directions of the two processing lights ELk#31, the angle θ#3 between the two axes along the traveling directions of the two processing lights ELk#32, the angle θ#3 between the two axes along the traveling directions of the two processing lights ELk#33 and the angle θ#3 between the two axes along the traveling directions of the two processing lights ELk#34.

In this case, the angle between the two axes along the traveling directions of the two processing lights ELk emitted from one multibeam optical system 112 may be shorter than the angle between the two axes along the traveling directions of the two processing lights ELk emitted from another multibeam optical system 112 that is connected to the next stage of one multibeam optical system 112. Namely, the angle between the two axes along the traveling directions of the two processing lights ELk emitted from the multibeam optical system 112 that is disposed at a relatively upstream position may be shorter than the angle between the two axes along the traveling directions of the two processing lights ELk emitted from the multibeam optical system 112 that is disposed at a relatively downstream position. In the example illustrated in FIG. 22, the angle θ#1 between the two axes along the traveling directions of the two processing lights ELk#1 may be shorter than the angle θ#2 between the two axes along the traveling directions of the two processing lights ELk#21 and the angle θ#2 between the two axes along the traveling directions of the two processing lights ELk#22. Similarly, the angle θ#2 between the two axes along the traveling directions of the two processing lights ELk#21 and the angle θ#2 between the two axes along the traveling directions of the two processing lights ELk#22 may be shorter than the angle θ#3 between the two axes along the traveling directions of the two processing lights ELk#31, the angle θ#3 between the two axes along the traveling directions of the two processing lights ELk#32, the angle θ#3 between the two axes along the traveling directions of the two processing lights ELk#33 and the angle θ#3 between the two axes along the traveling directions of the two processing lights ELk#34. As a result, there is a lower possibility that a vignetting of the plurality of processing lights ELk by the fθ lens 114 occurs, compared to a case where the angle between the two axes along the traveling directions of the two processing lights ELk emitted from the multibeam optical system 112 that is disposed at a relatively upstream position is larger than the angle between the two axes along the traveling directions of the two processing lights ELk emitted from the multibeam optical system 112 that is disposed at a relatively downstream position. However, the angle between the two axes along the traveling directions of the two processing lights ELk emitted from the multibeam optical system 112 that is disposed at a relatively upstream position may be larger than the angle between the two axes along the traveling directions of the two processing lights ELk emitted from the multibeam optical system 112 that is disposed at a relatively downstream position.

(3) Processing System SYSc in Third Embodiment

Figure 23:
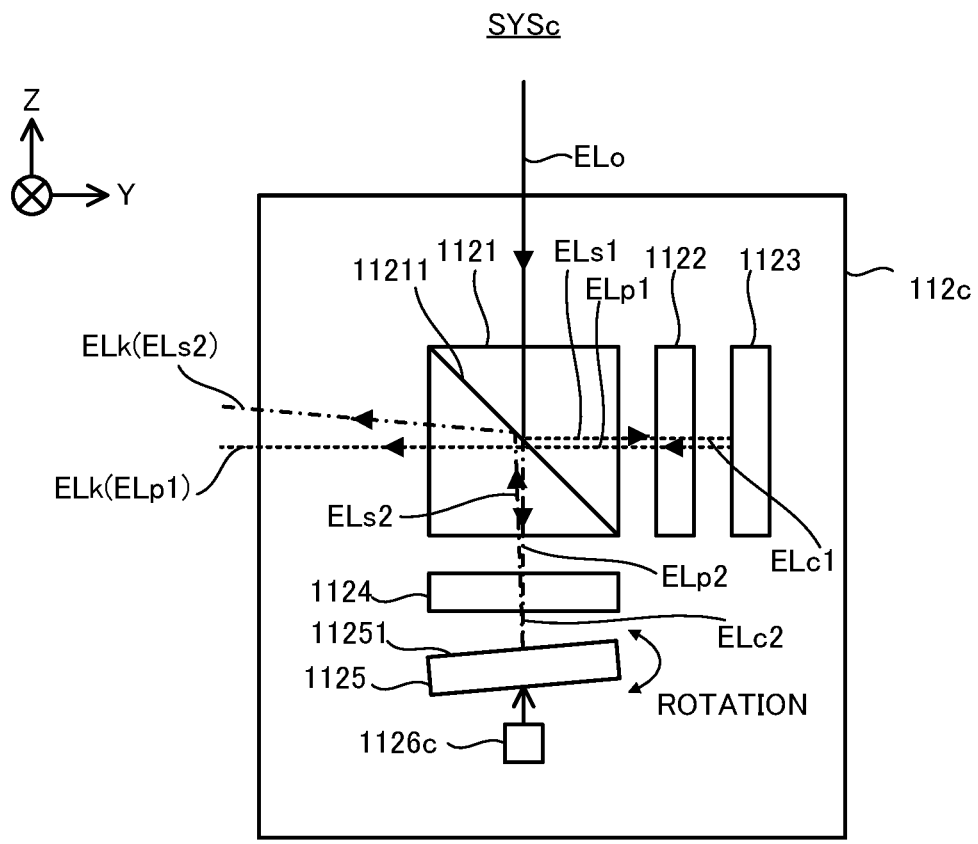
FIG. 23 is a cross-sectional view that illustrates a multibeam optical system in a third embodiment.

Next, a processing system SYS in a third embodiment (in the below described description, the processing system SYS in the third embodiment is referred to as a "processing system SYSc") will be described. The processing system SYSc in the third embodiment is different from the above described processing system SYSa in the first embodiment in that it is provided with a multibeam optical system 112c instead of the multibeam optical system 112. Another feature of the processing system SYSc may be same as another feature of the above described processing system SYSa. Therefore, in the below described description, with reference to FIG. 23, the multibeam optical system 112c in the third embodiment will be described. FIG. 23 is a cross-sectional view that illustrates a structure of the multibeam optical system 112c in the third embodiment.

As illustrated in FIG. 23, the multibeam optical system 112c is different from the above described multibeam optical system 112 in that it is provided with a driving system 1126c. Another feature of the multibeam optical system 112c may be same as another feature of the above described multibeam optical system 112.

The driving system 1126c is configured to move the reflective mirror 1125 under the control of the control apparatus 2. The driving system 1126c is configured to move the reflective mirror 1125 relative to the circular polarized light ELc2 entering the reflective mirror 1125. Specifically, the driving system 1126c is configured to move the reflective mirror 1125 so that the reflective mirror 1125 rotates around an axis that is along a plane intersecting with (typically, perpendicular to) the circular polarized light ELc2 entering the reflective mirror 1125. The driving system 1126c may be configured to move the reflective mirror 1125 so that the reflective mirror 1125 rotates around single axis that is along the plane intersecting with the circular polarized light ELc2 entering the reflective mirror 1125. Alternatively, the driving system 1126c may be configured to move the reflective mirror 1125 so that the reflective mirror 1125 rotates around two axes that are along the plane intersecting with the circular polarized light ELc2 entering the reflective mirror 1125 and that intersect with (typically, are perpendicular to) each other.

When the reflective mirror 1125 moves, an incident angle of the circular polarized light ELc2 relative to the reflective surface 11251 of the reflective mirror 1125 changes. When the incident angle of the circular polarized light ELc2 relative to the reflective surface 11251 of the reflective mirror 1125 changes, a traveling direction of the s polarized light ELs2 that is reflected by the split surface 11211 changes relative to a traveling direction of the p polarized light ELp1 that passes through the split surface 11211. When the traveling direction of the s polarized light ELs2 changes relative to the traveling direction of the p polarized light ELp1, an intersecting angle at which an axis along the traveling direction of the p polarized light ELp1 intersects with an axis along the traveling direction of the s polarized light ELs2 changes. Namely, an intersecting angle at which a plurality of axes along the traveling directions of the plurality of processing lights ELk emitted from the multibeam optical system 112c intersect changes. In this case, the reflective mirrors 1123 and 1125 may serve as an optical system that changes the intersecting angle at which the plurality of axes along the traveling directions of the plurality of processing lights ELk intersect (namely, an angle between the plurality of traveling directions of the plurality of processing lights ELk). When the intersecting angle at which the plurality of axes along the traveling directions of the plurality of processing lights ELk intersect changes, a positional relationship (especially, a relative positional relationship in a traveling direction along an optical plane) between the plurality of beam spots that are formed on the optical plane, which intersects the traveling directions of the plurality of processing lights ELk, by the plurality of processing lights ELk, respectively, changes. Namely, when the intersecting angle at which the plurality of axes along the traveling directions of the plurality of processing lights ELk intersect changes, a positional relationship (especially, a relative positional relationship in a traveling direction along the coat SF of paint) between the plurality of beam spots that are formed on the coat SF of paint by the plurality of processing lights ELk, respectively, changes. In other words, when the intersecting angle at which the plurality of axes along the traveling directions of the plurality of processing lights ELk intersect changes, a positional relationship (especially, a relative positional relationship in a traveling direction along the surface of the coat SF of paint) between the plurality of target irradiation areas EA that are set on the coat SF of paint by the plurality of processing lights ELk, respectively, changes. Therefore, the driving system 1126c is configured to move the reflective mirror 1125 to change the positional relationship between the plurality of target irradiation areas EA that are set on the coat SF of paint.

As one example, FIG. 24A illustrates the multibeam optical system 112c in which the driving system 1126c does not move the reflective mirror 1125 by a desired amount yet (namely, the reflective mirror 1125 is in an initial position). The plurality of processing lights ELk emitted from the multibeam optical system 112c that is in a state illustrated in FIG. 24A forms the plurality of beam spots illustrated in FIG. 24B, respectively, on the coat SF of paint. On the other hand, FIG. 24C illustrates the multibeam optical system 112c in which the driving system 1126c has already moved the reflective mirror 1125 by the desired amount. As illustrated in FIG. 24C, when the driving system 1126c moves the reflective mirror 1125, it turns out that the incident angle of the circular polarized light ELc2 relative to the reflective surface 11251 of the reflective mirror 1125 and the intersecting angle at which the axis along the traveling direction of the p polarized light ELp1 intersects with the axis along the traveling direction of the s polarized light ELs2 (namely, the intersecting angle at which the plurality of axes along the traveling directions of the plurality of processing lights ELk emitted from the multibeam optical system 112c intersect) changes, compared to a case where the driving system 1126c does not move the reflective mirror 1125 yet. The plurality of processing lights ELk emitted from the multibeam optical system 112c that is in a state illustrated in FIF. 24C forms the plurality of beam spots illustrated in FIG. 24D, respectively, on the coat SF of paint. As illustrated in FIG. 24D, when the driving system 1126c moves the reflective mirror 1125, it turns out that the positional relationship between the plurality of beam spots that are respectively formed on the coat SF of paint by the plurality of processing lights ELk (namely, the positional relationship between the plurality of target irradiation areas EA on the coat SF of paint changes, compared to the case where the driving system 1126c does not move the reflective mirror 1125 yet. Especially, since the reflective mirror 1125 moves, the beam sport formed by the s polarized light corresponding to the processing light ELk through the moving reflective mirror 1125 moves relative to the beam sport formed by the p polarized light corresponding to the processing light ELk through the not-moving reflective mirror 1123, and thus, the positional relationship between the plurality of target irradiation areas EA changes.

As described above, the driving system 1126c may be configured to move the reflective mirror 1125 so that the reflective mirror 1125 rotates around the single axis. In this case, the driving system 1126c is configured to change the positional relationship between the plurality of target irradiation areas EA in single direction along the coat SF of paint by moving the reflective mirror 1125. For example, the driving system 1126c is configured to change the positional relationship between the plurality of target irradiation areas EA in either one of the X axis direction and the Y axis direction by moving the reflective mirror 1125. Alternatively, as described above, the driving system 1126c may be configured to move the reflective mirror 1125 so that the reflective mirror 1125 rotates around the plurality of axes. In this case, the driving system 1126c is configured to change the positional relationship between the plurality of target irradiation areas EA in each of a plurality of directions along the coat SF of paint by moving the reflective mirror 1125. For example, the driving system 1126c is configured to change the positional relationship between the plurality of target irradiation areas EA in each of the X axis direction and the Y axis direction by moving the reflective mirror 1125.

The driving system 1126c may move the reflective mirror 1125 under the control of the control apparatus 2 so that the riblet structure having a desired characteristic is formed. Namely, the driving system 1126c may change the positional relationship between the plurality of target irradiation areas EA under the control of the control apparatus 2 so that the riblet structure 8 see FIG. 6A and FIG. 6B) having a desired characteristic is formed. Next, one example of an operation of the driving system 1126c when the riblet structure in which the plurality of concave structures CP1 each of which extends along the Y axis direction are arranged along the X axis direction is formed will be described.

The driving system 1126c may move the reflective mirror 1125 to change the positional relationship between the plurality of target irradiation areas EA in the X axis direction (namely, the direction that intersects with the Y axis direction along which each concave structure CP1 extends) along which the plurality of concave structures CP1 are arranged. In this case, the arrangement pitch P1 of the plurality of concave structures CP1 (furthermore, the arrangement pitch P2 of the plurality of convex structures CP2) is changeable due to the change of the positional relationship between the plurality of target irradiation areas EA, for example. Therefore, the driving system 1126c may move the reflective mirror 1125 so that the arrangement pitch P1 of the plurality of concave structures CP1 is a desired pitch. For example, FIG. 25A illustrates the positional relationship between the plurality of target irradiation areas EA before the driving system 1126c moves the reflective mirror 1125 by the desired amount (namely, when the reflective mirror 1125 is in the initial position). When the plurality of target irradiation areas EA are set as illustrated in FIG. 25A, the concave structures CP1 the arrangement pitch of which is a predetermined first pitch p1 are formed at the processing target object S as illustrated in FIG. 25B. On the other hand, FIG. 25C illustrates the positional relationship between the plurality of target irradiation areas EA after the driving system 1126c moves the reflective mirror 1125 by the desired amount. FIG. 25C illustrates an example in which the plurality of target irradiation areas EA moves away along the X axis direction. In this case, the concave structures CP1 the arrangement pitch of which is a predetermined second pitch p2 that is larger than the above described first pitch p1 are formed at the processing target object S as illustrated in FIG. 25D. Alternatively, when the plurality of target irradiation areas EA moves closer along the X axis direction, the concave structures CP1 the arrangement pitch of which is a predetermined third pitch p3 that is shorter than the above described first pitch p1 are formed at the processing target object S, although it is not illustrated in the drawing for the simple illustration.

The driving system 1126c may move the reflective mirror 1125 to change the positional relationship between the plurality of target irradiation areas EA in the Y axis direction along which each concave structure CP1 extends. The driving system 1126c may move the reflective mirror 1125 to change the positional relationship between the plurality of target irradiation areas EA in a direction that intersects with both of the X axis direction and the Y axis direction. Even in this case, the characteristic of the riblet structure is changeable due to the change of the positional relationship between the plurality of target irradiation areas EA.

The driving system 1126c may allow at least two of the plurality of target irradiation areas EA to overlap at least partially as illustrated in FIG. 26A, when the positional relationship between the plurality of target irradiation areas EA is changed by moving the reflective mirror 1125. When at least two of the plurality of target irradiation areas EA overlap at least partially, one concave part C is formed by the irradiation of two or more processing lights ELk, as illustrated in FIG. 26B. Therefore, the driving system 1126c may move the reflective mirror 1125 to form the same concave part C1 (namely, the concave structure CP1) by using at least two of the plurality of processing lights ELk.

Especially, when at least two of the plurality of target irradiation areas EA overlap at least partially, the distribution of the intensity of the plurality of processing lights ELk on the coat SF of paint changes, compared to a case where the plurality of target irradiation areas EA do not overlap. As a result, when at least two of the plurality of target irradiation areas EA overlap at least partially, the characteristic of the formed riblet structure changes, compared to a case where the plurality of target irradiation areas EA do not overlap. Thus, the driving system 1126c may allow at least two of the plurality of target irradiation areas EA to overlap at least partially by moving the reflective mirror 1125 so that the distribution of the intensity of the plurality of processing lights ELk on the coat SF of paint is a desired distribution of the intensity that allows the riblet structure having the desired characteristic to be formed. The driving system 1126c may change the state of the overlap between at least two of the plurality of target irradiation areas EA so that the distribution of the intensity of the plurality of processing lights ELk on the coat SF of paint is the desired distribution of the intensity that allows the riblet structure having the desired characteristic to be formed. Note that changing the state of the overlap here may include not only changing the state of the overlap between at least two target irradiation areas EA in a situation where at least two target irradiation areas EA overlap at least partially but also changing a state of at least two target irradiation areas EA between a state in which they overlap at least partially and a state in which they do not overlap and changing a relative position of at least two target irradiation areas EA in a situation where at least two target irradiation areas EA do not overlap. For example, when the distribution of the intensity of the plurality of processing lights ELk on the coat SF of paint changes, there is a possibility that the size of the riblet structure (especially, at least one of the depth D of the concave structure CP1 and the height H of the convex structure CP2) changes. Therefore, the driving system 1126c may move the reflective mirror 1125 so that the size of the riblet structure is a desired size. For example, when the distribution of the intensity of the plurality of processing lights ELk on the coat SF of paint changes, there is a possibility that the shape of the riblet structure changes. Therefore, the driving system 1126c may move the reflective mirror 1125 so that the shape of the riblet structure is a desired shape.

Incidentally, in the above described description, the multibeam optical system 112c is provided with the driving system 1126c that moves the reflective mirror 1125. However, the multibeam optical system 112c may be provided with a driving system that moves the reflective mirror 1123, in addition to or instead of the driving system 1126c. This driving system may be configured to move the reflective mirror 1123 in a moving aspect that is same as a moving aspect in which the driving system 1126c moves the reflective mirror 1125. Even in this case, an effect that is same as the above described effect is achievable.

In the above described description, the multibeam optical system 112c is provided with the driving system 1126c that moves the reflective mirror 1125 under the control of the control apparatus 2. However, the reflective mirror 1125 may be moved (rotated) manually by using a mechanical mechanism such as a push-pull screw.

Moreover, in the above described description, the processing system SYSc changes the positional relationship between the plurality of target irradiation areas EA on the coat SF of paint by moving the reflective mirror 1125. However, the processing system SYSc may change the positional relationship between the plurality of target irradiation areas EA on the coat SF of paint by using a method that is different from a method of moving the reflective mirror 1125. For example, when the multibeam optical system 112c is provided with a refractive optical element such as a lens, the processing system SYSc may change the positional relationship between the plurality of target irradiation areas EA on the coat SF of paint by using this refractive optical element. For example, the processing system SYSc may change the positional relationship between the plurality of target irradiation areas EA on the coat SF of paint by moving the refractive optical element (for example, rotating it around a certain axis) to change the traveling direction of at least one of the plurality of processing lights ELk. For example, the processing system SYSc may change the positional relationship between the plurality of target irradiation areas EA on the coat SF of paint by changing a refractive index of the refractive optical element to change the traveling direction of at least one of the plurality of processing lights ELk. A liquid crystal lens is one example of the refractive optical element that is configured to change the refractive index.

Moreover, the above described processing system SYSc irradiates the coat SF of paint with the plurality of processing lights ELk by using the multibeam optical system 112c (especially, the polarized beam splitter 1121). However, there is also a method that does not use the multibeam optical system 112c (especially, the polarized beam splitter 1121) as a method of irradiating the coat SF of paint with the plurality of processing lights ELk. For example, when the light irradiation apparatus 11 is provided with a plurality of light sources 110, the processing system SYSc may irradiate the coat SF of paint with a plurality of source lights ELo emitted from the plurality of light sources 110, respectively, as the plurality of processing lights ELk not through the multibeam optical system 112c (especially, the polarized beam splitter 1121). Even when the coat SF of paint is irradiated with the plurality of processing lights ELk not through the multibeam optical system 112c, the processing system SYSc may change the positional relationship between the plurality of target irradiation areas EA.

Moreover, in the above described description, the processing system SYSc is provided with single multibeam optical system 112c. Namely, in the above described description, the processing system SYSc that irradiates the coat SF of paint with two processing lights ELk simultaneously is described. However, the processing system SYSc may be provided with a plurality of multibeam optical systems 112c, as with the processing system SYSb in the second embodiment. Namely, the processing system SYSc may irradiate the coat SF of paint with three or more (typically, $2^N$) processing lights ELk simultaneously. In other words, the processing system SYSc may be provided with a feature that is unique to the processing system SYSb in the second embodiment (specifically, a feature relating to the irradiation of three or more processing lights ELk). In this case, at least one of the plurality of multibeam optical system 112 of the processing system SYSc may be the multibeam optical system 112c described in the third embodiment. Even in this case, the processing system SYSc may change the positional relationship between the plurality of beam spots that are respectively formed on the coat SF of paint by the plurality of processing lights ELk (namely, the positional relationship between the plurality of target irradiation areas EA on the coat SF of paint).

Figure 27A:
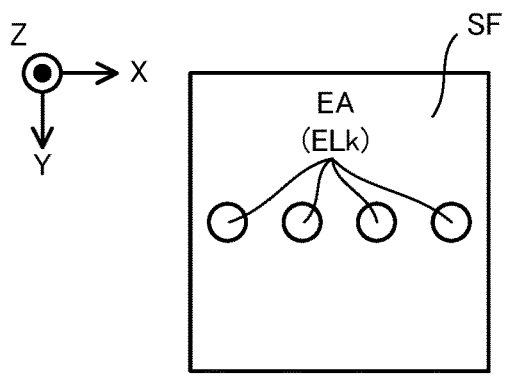
FIG. 27A is a plan view that illustrates a positional relationship between four irradiation areas that do not overlap partially.
Figure 27C:
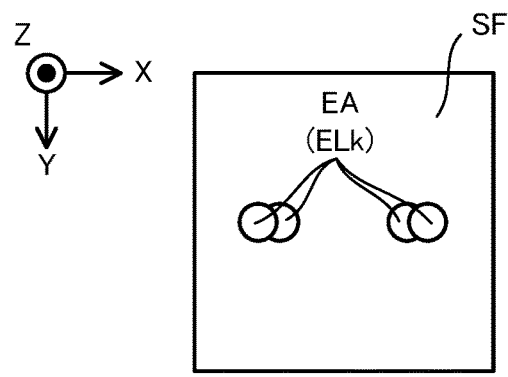
FIG. 27C is a plan view that illustrates a positional relationship between four irradiation areas that overlap partially.
Figure 27B:
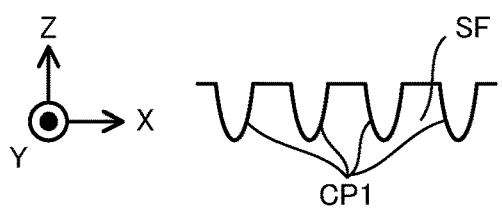
FIG. 27B is a cross-sectional view that illustrates the concave structure that is formed when the plurality of irradiation areas illustrated in FIG. 27A.
Figure 27D:
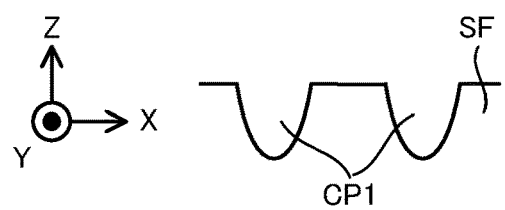
FIG. 27D is a cross-sectional view that illustrates the concave structure that is formed when the plurality of irradiation areas illustrated in FIG. 27C.
Figure 27E:
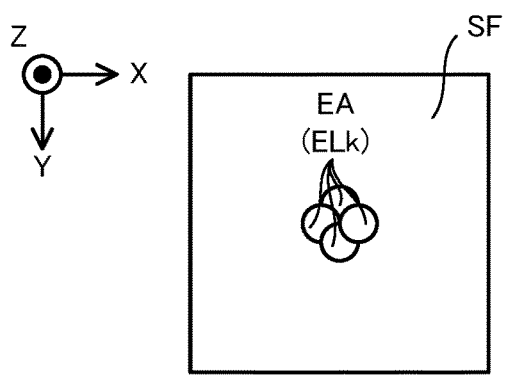
FIG. 27E is a plan view that illustrates a positional relationship between four irradiation areas that overlap partially.
Figure 27F:
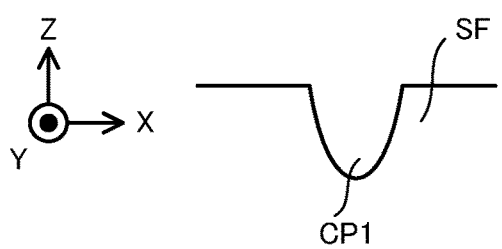
FIG. 27F is a cross-sectional view that illustrates the concave structure that is formed when the plurality of irradiation areas illustrated in FIG. 27E.

As one example, the processing system SYS that is provided with two multibeam optical system 112 at least one of which is the multibeam optical system 112c is configured to irradiate the coat SF of paint with the four processing lights ELk simultaneously. Namely, the processing system SYS is configured to irradiate the coat SF of paint with the four processing lights ELk emitted from the multibeam optical system 112#2 illustrated in FIG. 21 simultaneously. In this case, as illustrated in FIG. 27A, the processing system SYSc may move the reflection mirror 1125 so that the four target irradiation areas EA that are irradiated with the four processing lights ELk, respectively, do not overlap. As a result, as illustrated in FIG. 27B, the processing system SYSc may irradiate the coat SF of paint with the four processing lights ELk simultaneously to form four concave structures CP1 simultaneously. Alternatively, as illustrated in FIG. 27C, the processing system SYSc may move the reflection mirror 1125 so that respective two target irradiation areas EA overlap partially. As a result, as illustrated in FIG. 27D, the processing system SYSc may irradiate the coat SF of paint with the four processing lights ELk simultaneously to form two concave structures CP1 simultaneously. Alternatively, as illustrated in FIG. 27E, the processing system SYSc may move the reflection mirror 1125 so that the four target irradiation areas EA overlap partially. As a result, as illustrated in FIG. 27F, the processing system SYSc may irradiate the coat SF of paint with the four processing lights ELk simultaneously to form one concave structures CP1.

Incidentally, the third embodiment.

(4) Processing System SYSd in Fourth Embodiment

Figure 28:
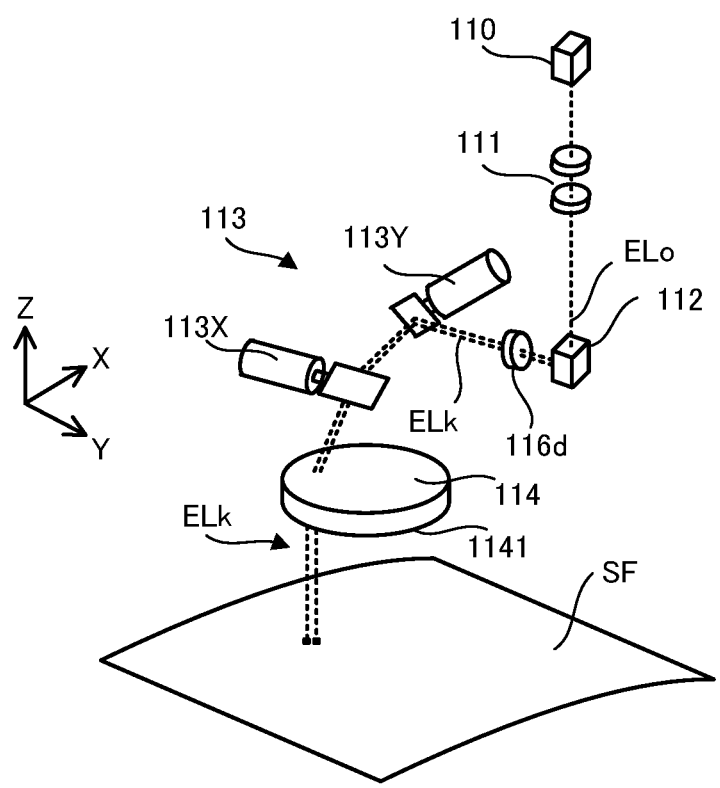
FIG. 28 is a perspective view that illustrates a light irradiation apparatus in a fourth embodiment.

Next, a processing system SYS in a fourth embodiment (in the below described description, the processing system SYS in the fourth embodiment is referred to as a "processing system SYSd") will be described. The processing system SYSc in the fourth embodiment is different from the above described processing system SYSa in the first embodiment in that it is provided with a light irradiation apparatus 11d instead of the light irradiation apparatus 11. Another feature of the processing system SYSd may be same as another feature of the above described processing system SYSa. Therefore, in the below described description, with reference to FIG. 28, the light irradiation apparatus 11d in the fourth embodiment will be described. FIG. 28 is a cross-sectional view that illustrates a structure of the light irradiation apparatus 11d in the fourth embodiment.

As illustrated in FIG. 29, the light irradiation apparatus 11d is different from the above described light irradiation apparatus 11 in that it is provided with a relay optical system 116d. Another feature of the light irradiation apparatus 11d may be same as another feature of the above described light irradiation apparatus 11.

The relay optical system 116d is disposed on the optical path of the plurality of processing lights ELk between the multibeam optical system 112 and the Galvano mirror 113. Therefore, the plurality of processing lights ELk emitted from the multibeam optical system 112 enter the Galvano mirror 113 through the relay optical system 116d. The relay optical system 116d is aligned relative to the fθ lens 114 so that a rear focal plane (in other words, an emitting side focal plane) of the relay optical system 116d is located at (including near) an incident surface of the fθ lens 114.

Figures 29A, 29B:
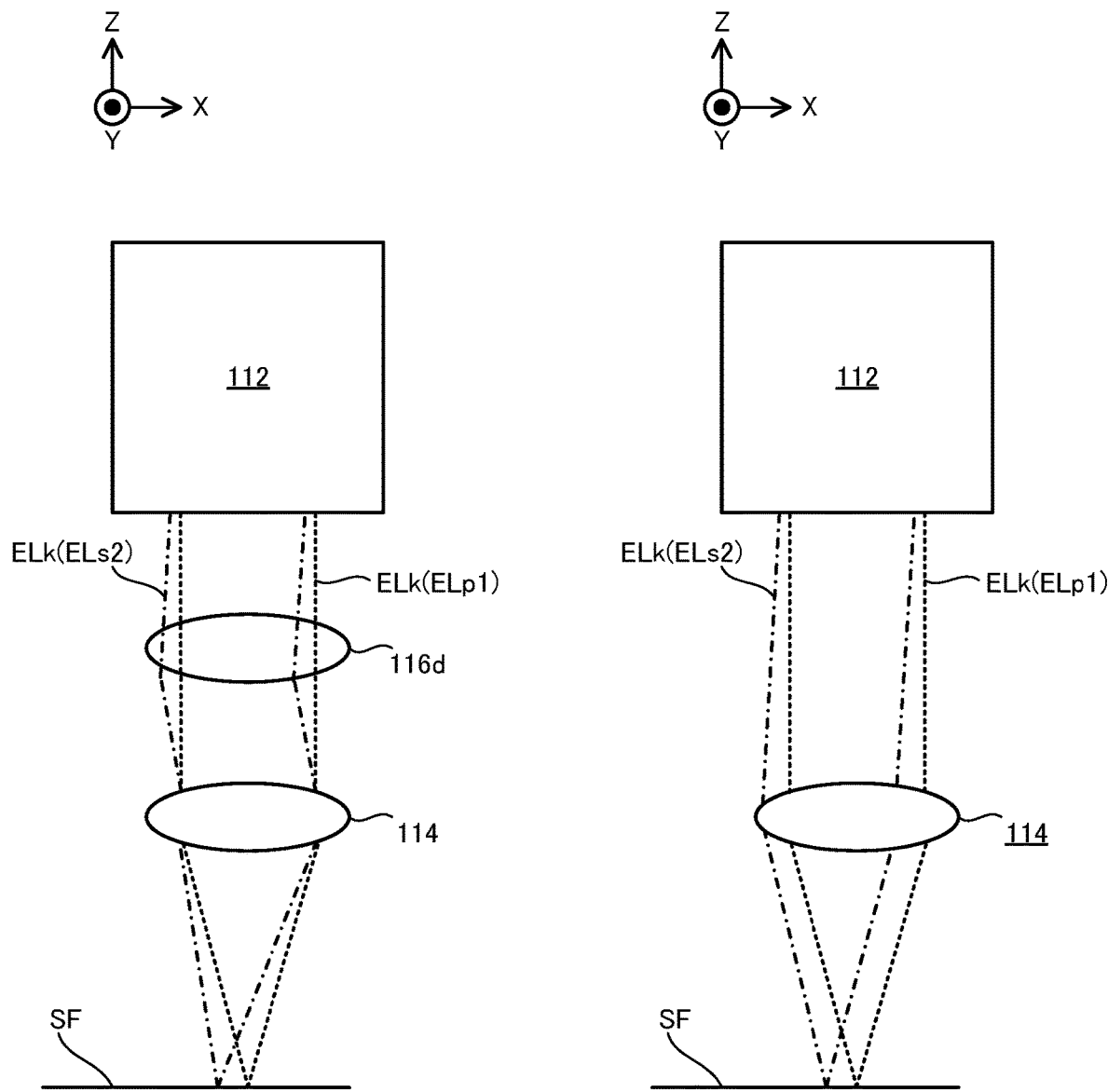
FIG. 29A is a cross-sectional view that illustrates the processing lights with which the coat of paint is irradiated through a relay optical system and FIG. 29B is a cross-sectional view that illustrates the processing lights with which the coat of paint is irradiated without the relay optical system.

The relay optical system 116d is an optical system that guides the plurality of processing lights ELk to the Galvano mirror 113. The relay optical system 116d has a desired optical characteristic that allows a difference between positions through which a plurality of light fluxes, which respectively constitute the plurality of processing lights ELk that pass through the relay optical system 116d, pass at a pupil plane of the fθ lens 114 to be shorter than a difference between positions through which a plurality of light fluxes, which respectively constitute the plurality of processing lights ELk that do not pass through the relay optical system 116d, pass at the pupil plane of the fθ lens 114. Note that FIG. 29A illustrates the positions through which the plurality of light fluxes, which respectively constitute the plurality of processing lights ELk that pass through both of the multibeam optical system 112 and the relay optical system 116d, pass at the pupil plane of the fθ lens 114. On the other hand, FIG. 29B illustrates the positions through which the plurality of light fluxes, which respectively constitute the plurality of processing lights ELk that pass through the multibeam optical system 112 but do not pass through the relay optical system 116d, pass at the pupil plane of the fθ lens 114.

There is a lower possibility that the vignetting of the plurality of processing lights ELk by the fθ lens 114 occurs, as the difference between the positions through which the plurality of light fluxes, which respectively constitute the plurality of processing lights ELk, pass at the pupil plane of the fθ lens 114 is shorter. Therefore, the processing system SYSd is configured to irradiate the coat SF of paint with the plurality of processing lights ELk properly.

Moreover, a difference between incident angles of the plurality of processing lights ELk relative to an image plane (for example, the surface of the coat SF of paint or a vicinity thereof) at which the plurality of processing lights ELk form an image is shorter, as the difference between the positions through which the plurality of light fluxes, which respectively constitute the plurality of processing lights ELk, pass at the pupil plane of the fθ lens 114 is shorter. This is because the difference between the positions through which the lights pass at the pupil plane is equivalent to the difference between the incident angles of the lights at the image plane. Thus, a state in which the processing system SYSd irradiates the coat SF of paint with the plurality of processing lights ELk is closer to a state in which the coat SF of paint is irradiated with the plurality of processing lights ELk through a telecentric optical system, as the difference between the positions through which the plurality of light fluxes, which respectively constitute the plurality of processing lights ELk, pass at the pupil plane of the fθ lens 114 is shorter. Therefore, the processing system SYSd is configured to irradiate the coat SF of paint with the plurality of processing lights ELk properly.

The relay optical system 116d may be an optical system that allows the reflective surfaces 11231 and 11251 of the reflective mirrors 1123 and 1125 of the multibeam optical system 112 of the light irradiation apparatus 11 to be optically conjugate with the pupil plane of the fθ lens 114. Moreover, when the plurality of multibeam optical systems 112 are used, the relay optical system 116d may allow the reflective surface of the reflective mirror of either one of the plurality of multibeam optical systems 112 to be optically conjugate with the pupil plane of the fθ lens 114. For example, the relay optical system 116d may allow the reflective surface 11231 or 11251 of the reflective mirror 1123 or 1125 of either one of the plurality of multibeam optical systems 112 of the light irradiation apparatus 11 to be optically conjugate with the pupil plane of the fθ lens 114. The relay optical system 116d may allow a position between the reflective surface of the reflective mirror of the multibeam optical system 112 that is closest to the light source 110 and the reflective surface of the reflective mirror of the multibeam optical system 112 that is closest to the fθ lens 114 along the optical path to be optically conjugate with the pupil plane of the fθ lens 114. For example, the relay optical system 116d may allow an optical plane between the reflective surface 11231 or 11251 of the reflective mirror 1123 or 1125 of the multibeam optical system 112 that is closest to the light source 110 and the reflective surface 11231 or 11251 of the reflective mirror 1123 or 1125 of the multibeam optical system 112 that is closest to the fθ lens 114 along the optical path to be optically conjugate with the pupil plane of the fθ lens 114.

Note that the processing system SYSd in the fourth embodiment may be provided with a feature that is unique to at least one of the processing system SYSb in the second embodiment to the processing system SYSc in the third embodiment described above. The feature that is unique to the processing system SYSc in the third embodiment includes a feature relating to the change of the positional relationship between the plurality of target irradiation areas EA (for example, the driving system 1126c).

(5) Processing System SYSe in Fifth Embodiment

Figure 30:
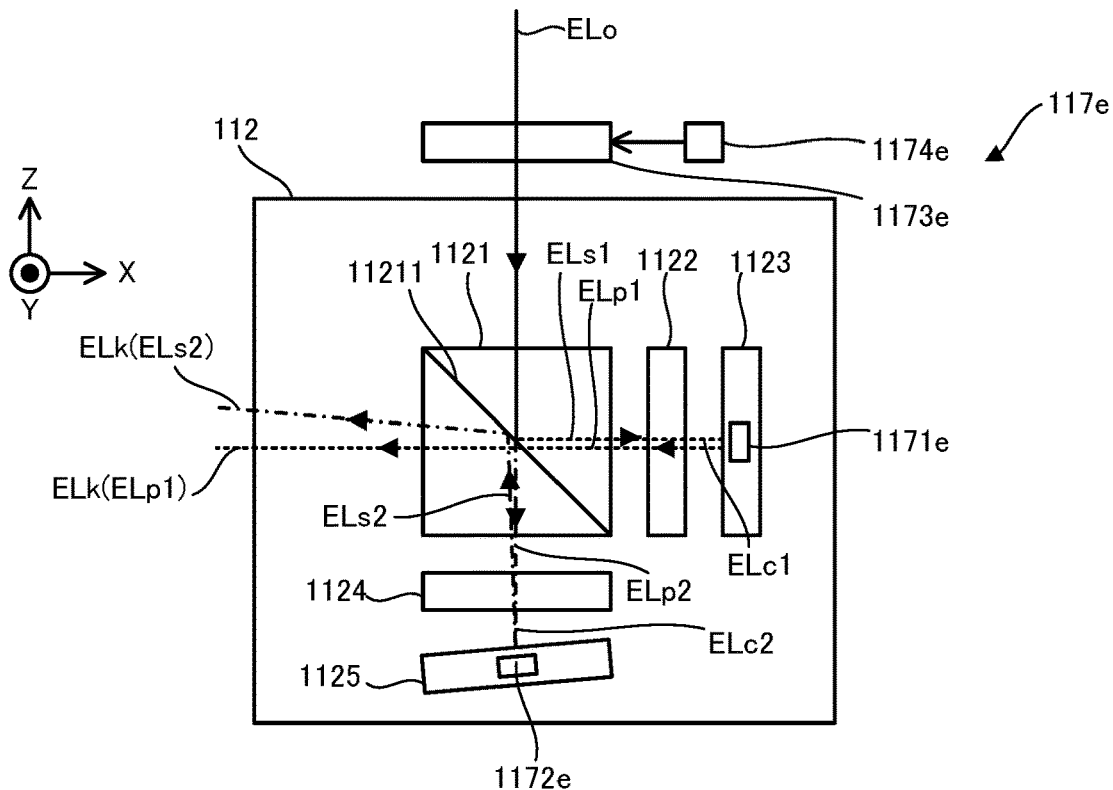
FIG. 30 is a cross-sectional view that illustrates an intensity adjust apparatus in a fifth embodiment.

Next, a processing system SYS in a fifth embodiment (in the below described description, the processing system SYS in the fifth embodiment is referred to as a "processing system SYSe") will be described. The processing system SYSe in the fifth embodiment is different from the above described processing system SYSa in the first embodiment in that it is provided with a light irradiation apparatus 11e instead of the light irradiation apparatus 11. The light irradiation apparatus 11e is different from the above described light irradiation apparatus 11 in that it is provided with an intensity adjustment apparatus 117e. Another feature of the processing system SYSe may be same as another feature of the above described processing system SYSa. Therefore, in the below described description, with reference to FIG. 30, the intensity adjustment apparatus 117e of the light irradiation apparatus 11e in the fifth embodiment will be described. FIG. 30 is a cross-sectional view that illustrates a structure of the intensity adjustment apparatus 117e in the fifth embodiment.

The intensity adjustment apparatus 117e adjusts the intensity of at least one of the plurality of processing lights ELk emitted from the multibeam optical system 112. For example, the intensity adjustment apparatus 117e may adjusts the intensity of at least one of the plurality of processing lights ELk so that the intensities of the plurality of processing lights ELk emitted from the multibeam optical system 112 are the same (namely, equal). Alternatively, for example, the intensity adjustment apparatus 117e may adjusts the intensity of at least one of the plurality of processing lights ELk so that the intensities of at least two of the plurality of processing lights ELk emitted from the multibeam optical system 112 are different. Note that the intensity adjustment apparatus 117e may adjust a ratio of the intensities of the plurality of processing lights ELk emitted from the multibeam optical system 112.

In order to adjust the intensity of at least one of the plurality of processing lights ELk, the intensity adjustment apparatus 117e may be provided with an intensity sensor 1171e, an intensity sensor 1172e, a wavelength plate 1173e and a driving system 1174e, for example, as illustrated in FIG. 30.

The intensity sensor 1171e is disposed at the reflective mirror 1123. The intensity sensor 1171e is a detect apparatus that is configured to detect an intensity of the circular polarized light ELc1 that enters the reflective mirror 1123. The intensity of the circular polarized light ELc1 is proportional to an intensity of the s polarized light ELs1 reflected by the split surface 11211. This is because the s polarized light ELs1 is converted into the circular polarized light ELc1 by passing through the ¼ wavelength plate 1122. Therefore, it can be said that the intensity sensor 1171e is a detect apparatus that is configured to indirectly detect the intensity of the s polarized light ELs1 by detecting the intensity of the circular polarized light ELc1. Moreover, the intensity of the circular polarized light ELc1 is proportional to an intensity of the p polarized light ELp1 that is emitted as the processing light ELk. This is because the circular polarized light ELc1 is converted into the p polarized light ELp1 by passing through the ¼ wavelength plate 1122. Therefore, it can be said that the intensity sensor 1171e is a detect apparatus that is configured to indirectly detect the intensity of the p polarized light ELp1 (namely, the intensity of one of the plurality of processing lights ELk) by detecting the intensity of the circular polarized light ELc1. Note that the intensity sensor 1171e may detect leakage light that passes through the reflective surface of the reflective mirror 1123. In this case, the intensity sensor 1171e may be disposed at the rear of the reflective mirror 1123.

The intensity sensor 1172e is disposed at the reflective mirror 1125. The intensity sensor 1172e is a detect apparatus that is configured to detect an intensity of the circular polarized light ELc2 that enters the reflective mirror 1125. The intensity of the circular polarized light ELc2 is proportional to an intensity of the polarized light ELp2 passing through the split surface 11211. This is because the p polarized light ELs2 is converted into the circular polarized light ELc2 by passing through the ¼ wavelength plate 1124. Therefore, it can be said that the intensity sensor 1172e is a detect apparatus that is configured to indirectly detect the intensity of the p polarized light ELp2 by detecting the intensity of the circular polarized light ELc2. Moreover, the intensity of the circular polarized light ELc2 is proportional to an intensity of the s polarized light ELs2 that is emitted as the processing light ELk. This is because the circular polarized light ELc2 is converted into the s polarized light ELs2 by passing through the ¼ wavelength plate 1124. Therefore, it can be said that the intensity sensor 1172e is a detect apparatus that is configured to indirectly detect the intensity of the s polarized light ELs2 (namely, the intensity of one of the plurality of processing lights ELk) by detecting the intensity of the circular polarized light ELc2. Note that the intensity sensor 1172e may detect leakage light that passes through the reflective surface of the reflective mirror 1125. In this case, the intensity sensor 1172e may be disposed at the rear of the reflective mirror 1125.

The wavelength plate 1173e is disposed on the optical path of the source light ELo between the light source 110 and the polarized beam splitter 1121. Thus, in the fourth embodiment, the source light ELo enters the polarized beam splitter 1121 through the wavelength plate 1173e. The wavelength plate 1173e changes a polarized state of the source light ELo that passes through the wavelength plate 1173e. The wavelength plate 1173e is a ½ wavelength plate, however, may be another type of wavelength plate (for example, at least one of a ¼ wavelength plate, a ⅛ wavelength plate and a 1 wavelength plate).

The driving system 1174e is configured to move the wavelength plate 1173e under the control of the control apparatus 2. Specifically, the driving system 1174e is configured to move the wavelength plate 1173e so that the wavelength plate 1173e rotates around an axis that is along the traveling direction of the source light ELo. A surface of the wavelength plate 1173e including an optical axis usually intersects with the traveling direction of the source light ELo. Thus, it can be said that the driving system 1174e is configured to move the wavelength plate 1173e so that the surface of the wavelength plate 1173e including the optical axis rotate around the axis that is along the traveling direction of the source light ELo.

Figure 31:
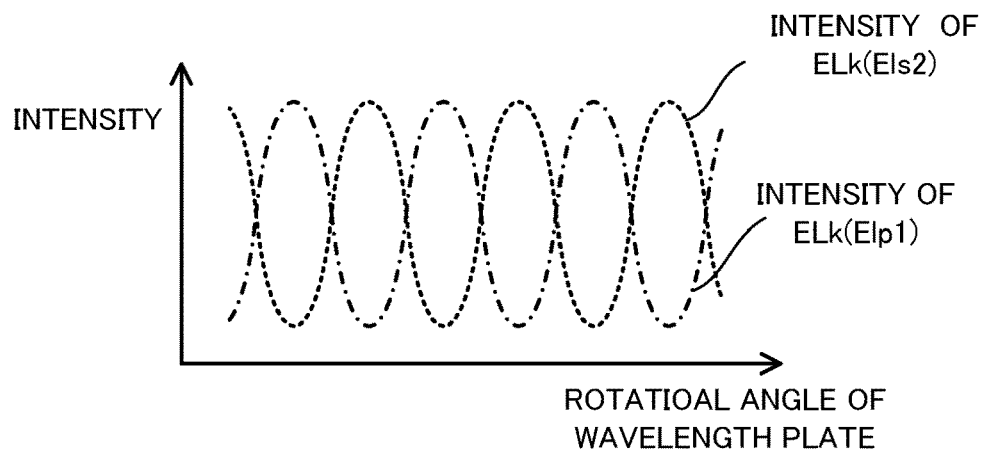
FIG. 31 is a graph that illustrates a relationship between intensities of the plurality of processing lights and a rotational angle of a wavelength plate.

When the wavelength plate 1173e rotates, the polarized state of the source light ELo passing through the wavelength plate 1173e changes. Especially, when the wavelength plate 1173e rotates, a ratio of intensities of p polarized light and s polarized light included in the source light ELo changes. When the ratio of the intensities of the p polarized light and the s polarized light included in the source light ELo changes, ratio of intensities of the s polarized light ELs1 reflected by the split surface 11211 of the polarized beam splitter 1121 and the p polarized light ELp2 passing through the split surface 11211 changes. When the ratio of the intensities of the s polarized light ELs1 and the p polarized light ELp2 changes, a ratio of the intensities of the processing light ELk (namely, the p polarized light ELp1) that is converted from the s polarized light ELs1 and the processing light ELk (namely, the s polarized light ELs2) that is converted from the p polarized light ELp2. Namely, as illustrated in FIG. 31, when the wavelength plate 1173e rotates, the ratio of the intensities of the plurality of processing lights ELk emitted from the multibeam optical system 112 changes. When the ratio of the intensities of the plurality of processing lights ELk changes, the intensity of each of the plurality of processing lights ELk also changes.

Thus, the driving system 1174e is configured to set the ratio of the intensities of the plurality of processing lights ELk emitted from the multibeam optical system 112 to a desired ratio by rotating the wavelength plate 1173e so that the ratio of the intensities of the p polarized light and the s polarized light included in the source light ELo passing through the wavelength plate 1173e is a desired ratio under the control of the control apparatus 2. Namely, the driving system 1174e is configured to set the intensity of each of the plurality of processing lights ELk emitted from the multibeam optical system 112 to a desired intensity by rotating the wavelength plate 1173e so that the ratio of the intensities of the p polarized light and the s polarized light included in the source light ELo passing through the wavelength plate 1173e is the desired ratio under the control of the control apparatus 2. Specifically, the control apparatus 2 may determine the intensities (furthermore, the ratio of the intensities) of the circular polarized lights ELc1 and ELc2 on the basis of detected results by the intensity sensors 1171e and 1172e. As described above, the intensities (furthermore, the ratio of the intensities) of the circular polarized lights ELc1 and ELc2 are equivalent to the intensities (furthermore, the ratio of the intensities) of the plurality of processing lights ELk. Thus, the control apparatus 2 may control the driving system 1174e to rotate the wavelength plate 1173e on the basis of detected results by the intensity sensors 1171e and 1172e so that the intensity of each of the plurality of processing lights ELk is the desired intensity and/or the ratio of the intensity of the plurality of processing lights ELk is the desired ratio.

For example, the driving system 1174e may rotate the wavelength plate 1173e under the control of the control apparatus 2 so that the intensities of the circular polarized lights ELc1 and ELc2 that is determinable from the detected results by the intensity sensors 1171e and 1172e are the same. In this case, the intensities of the plurality of processing lights ELk emitted from the multibeam optical system 112 are the same (namely, equal). As a result, the processing system SYSe may form the plurality of concave structures CP1 having the same characteristics simultaneously by emitting the plurality of processing lights ELk having the same intensities. Alternatively, for example, the driving system 1174e may rotate the wavelength plate 1173e under the control of the control apparatus 2 so that the intensities of the circular polarized lights ELc1 and ELc2 that is determinable from the detected results by the intensity sensors 1171e and 1172e are different. In this case, the intensities of the plurality of processing lights ELk emitted from the multibeam optical system 112 are different. As a result, the processing system SYSe may form the plurality of concave structures CP1 having the different characteristics simultaneously by emitting the plurality of processing lights ELk having the different intensities.

Incidentally, in the above described description, the intensity sensor 1171e detects the intensity of the circular polarized light ELc1. However, the intensity sensor 1171e may detect the intensity of the p polarized light ELp1 that is converted from the circular polarized light ELc1 and that is emitted as the processing light ELk. The intensity sensor 1171e may detect the intensity of the s polarized light ELs1 that is converted into the circular polarized light ELc1. Similarly, in the above described description, the intensity sensor 1172e detects the intensity of the circular polarized light ELc2. However, the intensity sensor 1172e may detect the intensity of the s polarized light ELs2 that is converted from the circular polarized light ELc2 and that is emitted as the processing light ELk. The intensity sensor 1172e may detect the intensity of the p polarized light ELp2 that is converted into the circular polarized light ELc2.

Incidentally, in the above described description, the driving system 1174e that moves (rotates) the wavelength plate 1173e under the control of the control apparatus 2 is used. However, the wavelength mirror 1173e may be moved (rotated) manually by using a mechanical mechanism.

Moreover, in the above described description, the intensity sensors 1171e and 1172e are disposed as the reflective mirrors 1123 and 1125. However, intensity sensors 1171e and 1172e may be disposed at the emitting side of the fθ lens 114. In this case, single intensity sensor may be disposed so that it is movable in a plane that intersects with the optical axis of the fθ lens 114. Note that the processing system SYSe may not be provided with the intensity sensors 1171e and 1172e.

Note that the processing system SYSe in the fifth embodiment may be provided with a feature that is unique to at least one of the processing system SYSb in the second embodiment to the processing system SYSd in the fourth embodiment described above. The feature that is unique to the processing system SYSd in the fourth embodiment includes a feature relating to the relay optical system 116d.

(6) Processing System SYSf in Sixth Embodiment

Figure 32:
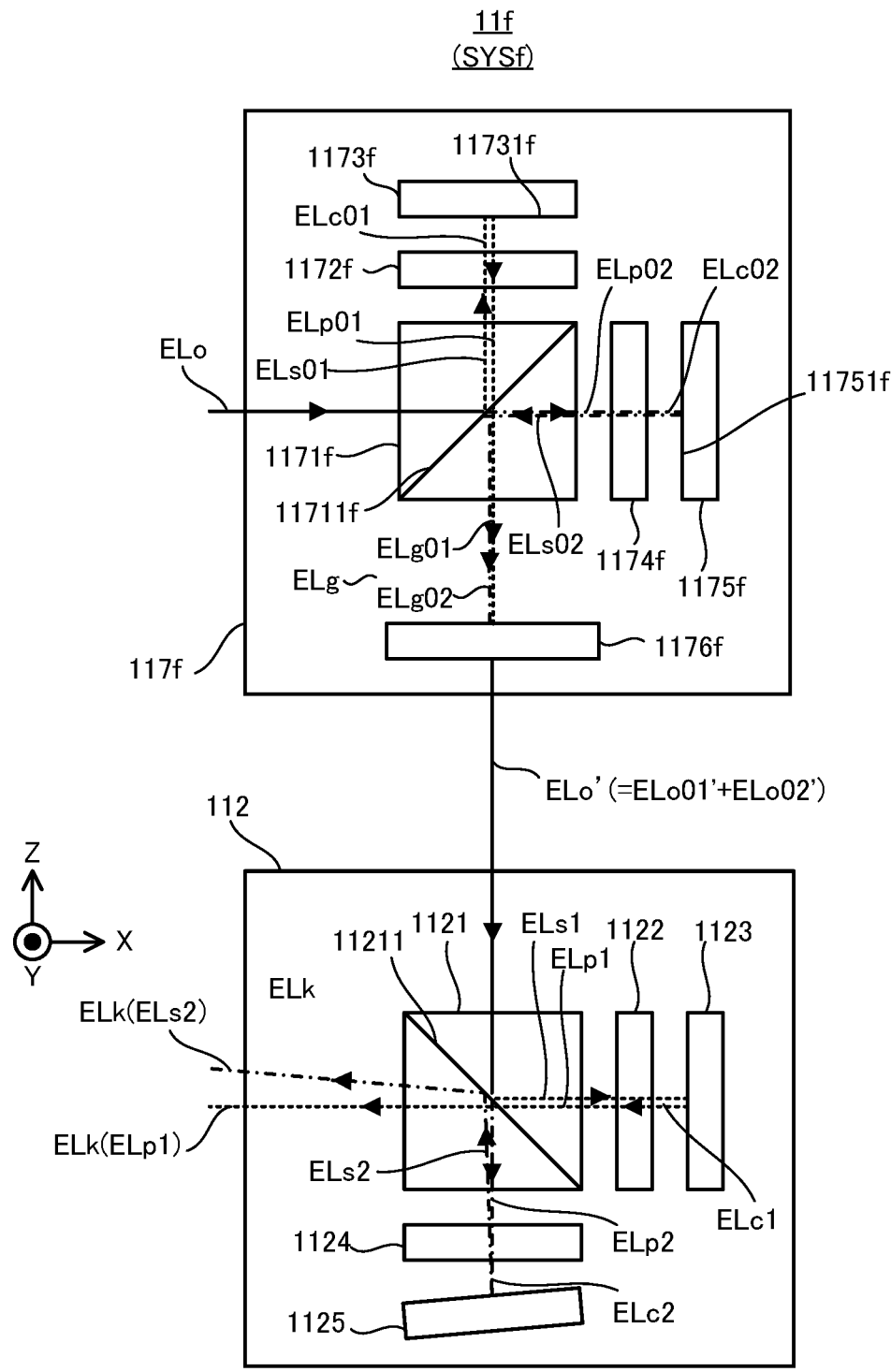
FIG. 32 is a cross-sectional view that illustrates an intensity adjust apparatus in a sixth embodiment.

Next, a processing system SYS in a sixth embodiment (in the below described description, the processing system SYS in the sixth embodiment is referred to as a "processing system SYSf") will be described. The processing system SYSf in the sixth embodiment is different from the above described processing system SYSa in that it is provided with a light irradiation apparatus 11f instead of the light irradiation apparatus 11. The light irradiation apparatus 11f is different from the above described light irradiation apparatus 11 in that it is provided with an intensity adjustment apparatus 117f. Another feature of the processing system SYSf in the sixth embodiment may be same as another feature of the above described processing system SYSa. Therefore, in the below described description, with reference to FIG. 32, the intensity adjustment apparatus 117f of the light irradiation apparatus 11f in the sixth embodiment will be described. FIG. 32 is a cross-sectional view that illustrates a structure of the intensity adjustment apparatus 117f.

The intensity adjustment apparatus 117f adjusts the intensity of at least one of the plurality of processing lights ELk emitted from the multibeam optical system 112, as with the intensity adjustment apparatus 11e in the fifth embodiment. The intensity adjustment apparatus 117f is disposed on the optical path between the light source 110 and the polarized beam splitter 1121. Thus, the source light ELo enters the polarized beam splitter 1121 through the intensity adjustment apparatus 117f.

In order to adjust the intensity of at least one of the plurality of processing lights ELk, the intensity adjustment apparatus 117f is provided with a polarized beam splitter 1171f, a ¼ wavelength plate 1172f, a reflective mirror 1173f, a ¼ wavelength plate 1174f, a reflective mirror 1175f and a wavelength plate 1176f, as illustrated in FIG. 32, for example.

The source light ELo from the light source 111 enters a split surface 11711f of the polarized beam splitter 1171f. S polarized light ELs01 of the source light ELo is reflected by the split surface 11711f. On the other hand, P polarized light ELp02 of the source light ELo passes through the split surface 11711f. Namely, the polarized beam splitter 1171f divides the source light ELo into the s polarized light ELs01 and the p polarized light ELp02.

The s polarized light ELs01 reflected by the polarized beam splitter 1171f passes through the ¼ wavelength plate 1172f. As a result, the s polarized light ELs01 is converted into circular polarized light ELc01. The circular polarized light ELc01 passing through the ¼ wavelength plate 1172f is reflected by a reflective surface 11731f of the reflective mirror 1173f. The circular polarized light ELc01 reflected by the reflective mirror 1173f passes through the ¼ wavelength plate 1172f again and is converted into p polarized light ELp01. The p polarized light ELp01 passing through the ¼ wavelength plate 1172f enters the split surface 11711f of the polarized beam splitter 1171f.

On the other hand, the p polarized light ELp02 passing through the polarized beam splitter 1171f passes through the ¼ wavelength plate 1174f. As a result, the p polarized light ELp02 is converted into circular polarized light ELc02. The circular polarized light ELc02 passing through the ¼ wavelength plate 1174f is reflected by a reflective surface 11751f of the reflective mirror 1175f. The circular polarized light ELc02 reflected by the reflective mirror 1175f passes through the ¼ wavelength plate 1175f again and is converted into s polarized light ELs02. The s polarized light ELs02 passing through the ¼ wavelength plate 1175f enters the split surface 11711f of the polarized beam splitter 1171f.

The p polarized light ELp01 entering the split surface 11711f passes through the split surface 11711f. On the other hand, the s polarized light ELs02 entering the split surface 11711f is reflected by the split surface 11711f. Here, as illustrated in FIG. 32, the reflective mirrors 1173f and 1175f are aligned so that an incident angle of the circular polarized light ELc01 relative to the reflective surface 11731f of the reflective mirror 1173f is equal to an incident angle of the circular polarized light ELc02 relative to the reflective surface 11751f of the reflective mirror 1175f. Namely, the reflective mirrors 1173f and 1175f are aligned so that an angle between the reflective surface 11731f of the reflective mirror 1173f and an axis along a traveling direction of the circular polarized light ELc01 is equal to an angle between the reflective surface 11751f of the reflective mirror 1173f and an axis along a traveling direction of the circular polarized light ELc02. FIG. 32 illustrates an example in which the reflective mirrors 1173f and 1175f are aligned so that the circular polarized light ELc01 vertically enters the reflective surface 11731f and the circular polarized light ELc02 vertically enters the reflective surface 11751f. As a result, an axis along a traveling direction of the p polarized light ELp01 passing through the split surface 11711f is parallel to an axis along a traveling direction of the s polarized light ELs02 reflected by the split surface 11711f. Namely, the traveling direction of the p polarized light ELp01 passing through the split surface 11711f is same as the traveling direction of the s polarized light ELs02 reflected by the split surface 11711f. In other words, an optical path of the p polarized light ELp01 passing through the split surface 11711f overlaps with an optical path of the s polarized light ELs02 reflected by the split surface 11711f. Therefore, the polarized beam splitter emits a merged light ELg in which an emitting light ELg01 corresponding to the p polarized light ELp01 overlaps with an emitting light ELg02 corresponding to the s polarized light ELs02. Namely, the polarized beam splitter 1171f that emits two lights of, the emitting lights ELg01 and ELg02 substantially emits the merged light ELg in which the emitting lights ELg01 and ELg02 are merged. Note that FIG. 32 illustrates that the optical path of the p polarized light ELp01 passing through the split surface 11711f (namely, an optical path of the emitting light ELg01) is slightly away from the optical path of the s polarized light ELs02 reflected by the split surface 11711f (namely, an optical path of the emitting light ELg02) for the illustration, however, these two optical paths actually overlap.

The merged light ELg emitted from the polarized beam splitter 1171f enters the wavelength plate 1176f. The wavelength plate 1176f is an optical element that is configured to change a polarized state of the merged light ELg (namely, a polarized state of each of two merged lights ELg01 and ELg02 that constitute the merged light ELg) that passes through the wavelength plate 1176f. The wavelength plate 1176f is a ¼ wavelength plate, however, may be another type of wavelength plate (for example, at least one of a ½ wavelength plate, a ⅛ wavelength plate and a 1 wavelength plate). For example, the wavelength plate 1176f may be configured to convert the merged light ELg into circular polarized light (alternatively, polarized light other than liner polarized light or non-polarized light). When the wavelength plate 1176f is the ¼ wavelength plate, the wavelength plate 1176f is configured to convert the merged light ELg that is the linear polarized light into the circular polarized light. Alternatively, even when the wavelength plate 1176f is not the ¼ wavelength plate, the wavelength plate 1176f may be configured to convert the merged light ELg into the circular polarized light (alternatively, the polarized light other than the liner polarized light or the non-polarized light), when a characteristic of the wavelength plate 1176f is set properly. For example, a thickness of the wavelength plate 1176f may be set to be a desired thickness that allows the polarized state of the merged light ELg to be changed to a desired state. For example, a direction of an optical axis of the wavelength plate 1176$f$ may be set to be a desired direction that allows the polarized state of the merged light ELk to be changed to the desired state.

The light passing through the wavelength plate 1176$f$ enters the multibeam optical system 112 as new source light ELo'. Thus, the new source light ELo' corresponds to light in which source light ELo01' that is obtained by changing the polarized state of the emitting light ELg01 by the wavelength plate 1176$f$ and source light ELo02' that is obtained by changing the polarized state of the emitting light ELg02 by the wavelength plate 1176$f$ overlap. Even when the driving light ELo' enters the multibeam optical system 112, the multibeam optical system 112 divides the source light ELo' into the plurality of processing lights ELk, as with the case where the driving light ELo enters the multibeam optical system 112 described above.

Note that the polarized beam splitter 1171$f$, the ¼ wavelength plate 1172$f$, the reflective mirror 1173$f$, the ¼ wavelength plate 1174$f$ and the reflective mirror 1175$f$ of the intensity adjustment apparatus 117$f$ have same functions as those of the polarized beam splitter 1121, the ¼ wavelength plate 1122, the reflective mirror 1123, the ¼ wavelength plate 1124 and the reflective mirror 1125 of the multibeam optical system 112, respectively, as can be seen from FIG. 32. However, the intensity adjustment apparatus 117$f$ is different from the multibeam optical system 112, in which the incident angle of the circular polarized light ELc1 relative to the reflective mirror 1123 is different from the incident angle of the circular polarized light ELc2 relative to the reflective mirror 1125, in that the incident angle of the circular polarized light ELc01 relative to the reflective mirror 1173$f$ is equal to the incident angle of the circular polarized light ELc02 relative to the reflective mirror 1175$f$. Moreover, the wavelength plate 1176$f$ of the intensity adjustment apparatus 117$f$ has a same function as that of the wavelength plate 115$b$ described in the second embodiment (namely, the wavelength plate 115$b$ that is disposed on the optical path between two multibeam optical systems 112). Therefore, it can be said that the intensity adjustment apparatus 117$f$ is equivalent to an optical system that is provided with: the multibeam optical system 112 at the most upstream side; and the wavelength plate 115$b$ through which the processing light ELk emitted from the multibeam optical system 112 at the most upstream side passes of the processing system SYSb in the second embodiment.

When the source light ELo enters the multibeam optical system 112 through the intensity adjustment apparatus 117$f$, the intensities of the plurality of processing lights ELk emitted from the multibeam optical system 112 are the same (namely, equal). Next, a technical reason will be described with reference to FIG. 33A to FIG. 33C. Each of FIG. 33A to FIG. 33C illustrates a process of dividing the source light ELo into the plurality of processing lights ELk through the intensity adjust apparatus 117$f$ and the multibeam optical system 112 together with the intensity of the lights generated in that process and the beam spots formed on the coat SF of paint (alternatively, a predetermined optical plane) by the lights. Note that FIG. 33A illustrates a process of dividing the source light ELo into the plurality of processing lights ELk in a case where the source light ELo emitted from the light source 110 includes the p polarized light ELp02 and the s polarized light ELs01 having the same intensities. FIG. 33B illustrates a process of dividing the source light ELo into the plurality of processing lights ELk in a case where the source light ELo emitted from the light source 110 includes the s polarized light ELs01 the intensity of which is lower than the that of the p polarized light ELp02. FIG. 33C illustrates a process of dividing the source light ELo into the plurality of processing lights ELk in a case where the source light ELo emitted from the light source 110 includes the s polarized light ELs01 the intensity of which is higher than the that of the p polarized light ELp02.

As illustrated in FIG. 33A to FIG. 33C, the intensity adjustment apparatus 117$f$ firstly divides the source light ELo into the p polarized light ELp02 and the s polarized light ELs01 by using the polarized beam splitter 1171$f$. In this case, in an example illustrated in FIG. 33A, the intensities of the divided p polarized light ELp02 and s polarized light ELs01 are the same. Note that the intensity here means an intensity on the coat SF of paint per unit area. Thus, in the example illustrated in FIG. 33A, if the coat SF of paint is irradiated with the divided p polarized light ELp02 and s polarized light ELs01, the beam spots formed by the divided p polarized light ELp02 and s polarized light ELs01 have about the same sizes. On the other hand, in an example illustrated in each of FIG. 33B and FIG. 33C, the intensities of the divided p polarized light ELp02 and s polarized light ELs01 are not the same. Thus, in the example illustrated in each of FIG. 33B and FIG. 33C, if the coat SF of paint is irradiated with the divided p polarized light ELp02 and s polarized light ELs01, the beam spots formed by the divided p polarized light ELp02 and s polarized light ELs01 have the different sizes.

Then, the intensity adjustment apparatus 117$f$ converts the divided p polarized light ELp02 and s polarized light ELs01 into the s polarized light ELs02 and the p polarized light ELp01 (namely, the emitting lights ELg01 and ELg02) by using the ¼ wavelength plates 1172$f$ and 1174$f$ and the reflective mirrors 1173$f$ and 1175$f$. In the example illustrated in FIG. 33A, since the intensities of the p polarized light ELp02 and the s polarized light ELs01 are the same, the intensities of the emitting lights ELg01 and ELg02 that are generated from the s polarized light ELs01 and the p polarized light ELp02, respectively, are the same too. On the other hand, in the example illustrated in each of FIG. 33B and FIG. 33C, since the intensities of the p polarized light ELp02 and the s polarized light ELs01 are not the same, the intensities of the emitting lights ELg01 and ELg02 that are generated from the s polarized light ELs01 and the p polarized light ELp02, respectively, are not the same either.

Then, the intensity adjustment apparatus 117$f$ merges the emitting lights ELg01 and ELGO2 to generate the merged light ELg by using the polarized beam splitter 1171$f$ and then converts the merged light ELg to the new source light ELo' by using the wavelength plate 1176$f$. The new source light ELo' is the light in which the source light ELo01' that is obtained by changing the polarized state of the emitting light ELg01 by the wavelength plate 1176$f$ and the source light ELo02' that is obtained by changing the polarized state of the emitting light ELg02 by the wavelength plate 1176$f$ overlap.

Then, the multibeam optical system 112 divides the new source light ELo' into the plurality of processing lights ELk. Specifically, since the source light ELo' is the light in which the source lights ELo01' and ELo02' overlap, the multibeam optical system 112 divides the source light ELo01' into the plurality of processing lights ELk01 and divides the source light ELo02' into the plurality of processing lights ELk02. However, since the source lights ELo01' and ELo02' overlap (namely, the optical path of the source light ELo01' and the optical path of the source light ELo02' overlap), the plurality of processing lights ELk01 and the plurality of processing lights ELk02 overlap too. As a result, as illustrated in FIG.

33A to FIG. 33C, each of the plurality of processing lights ELk emitted from the multibeam optical system 112 is light in which the processing light ELk01 and the processing light ELk02 are merged. Thus, no matter what a ratio of the intensities of the s polarized light ELs01 and the p polarized light ELp02 included in the source light ELo is, the intensities of the plurality of processing lights ELk are the same. Namely, the intensities of the plurality of processing lights ELk are the same in each of a case where the intensities of the s polarized light ELs01 and the p polarized light ELp02 are the same and a case where the intensities of the s polarized light ELs01 and the p polarized light ELp02 are not the same.

Note that each of FIG. 34A to FIG. 34C illustrates a process of dividing the source light ELo into the plurality of processing lights ELk through the multibeam optical system 112 not through the intensity adjust apparatus 117f together with the intensity of the lights generated in that process and the beam spots formed on the coat SF of paint (alternatively, a predetermined optical plane) by the lights, as a comparison example. Especially, FIG. 34A illustrates a process of dividing the source light ELo into the plurality of processing lights ELk in a case where the source light ELo emitted from the light source 110 includes the p polarized light ELp02 and the s polarized light ELs01 having the same intensities. FIG. 34B illustrates a process of dividing the source light ELo into the plurality of processing lights ELk in a case where the source light ELo emitted from the light source 110 includes the s polarized light ELs01 the intensity of which is lower than the that of the p polarized light ELp02. FIG. 33C illustrates a process of dividing the source light ELo into the plurality of processing lights ELk in a case where the source light ELo emitted from the light source 110 includes the s polarized light ELs01 the intensity of which is higher than the that of the p polarized light ELp02. As illustrated in FIG. 34A, when the source light ELo includes the p polarized light ELp02 and the s polarized light ELs01 having the same intensities, the intensities of the plurality of processing lights ELk emitted from the multibeam optical system 112 are the same even when the intensity adjustment apparatus 117f is not used. On the other hand, as illustrated in FIG. 34B and FIG. 34C, when the source light ELo includes the p polarized light ELp02 and the s polarized light ELs01 having the different intensities, the intensities of the plurality of processing lights ELk emitted from the multibeam optical system 112 are not the same unless the intensity adjustment apparatus 117f is used. Therefore, the intensity adjustment apparatus 117f described in the sixth embodiment is useful especially when the intensities of the plurality of processing lights ELk emitted from the multibeam optical system 112 are expected to be the same in the situation where the source light ELo includes the p polarized light ELp02 and the s polarized light ELs01 having the different intensities.

Note that the polarized state (for example, a polarized direction and an ovality) of the source light ELo changes sometimes when the intensity of the source light ELo emitted from the light source 110 is changed, depending on the characteristic of the source light ELo. Moreover, the polarized state of the source light ELo changes sometimes during a period when the light source 110 emits the source light ELo, depending on the characteristic of the source light ELo. Especially, there is a relatively high possibility that the polarized state of the source light ELo changes during a period before a predetermined time elapses after the light source 110 starts emitting the source light ELo. Even when the polarized state of the source light ELo changes in this manner, the intensity adjustment apparatus 117f in the sixth embodiment makes the intensities of the plurality of processing lights ELk emitted from the multibeam optical system 112 be the same without performing a special process based on a change of the polarized state of the source light ELo. Not that even the above described intensity adjustment apparatus 117e in the fifth embodiment may make the intensities of the plurality of processing lights ELk emitted from the multibeam optical system 112 be the same or the intensities of the plurality of processing lights ELk be set to be a desired intensity by rotating the wavelength plate 1173e on the basis of the change of the polarized state of the source light ELo.

Note that the processing system SYSf in the sixth embodiment may be provided with a feature that is unique to at least one of the processing system SYSb in the second embodiment to the processing system SYSe in the fifth embodiment described above. The feature that is unique to the processing system SYSe in the fifth embodiment includes a feature relating to the intensity adjustment apparatus 117e.

(7) Processing System SYSg in Seventh Embodiment

Next, a processing system SYS in a seventh embodiment (in the below described description, the processing system SYS in the seventh embodiment is referred to as a "processing system SYSg") will be described. The processing system SYSg in the seventh embodiment divides the source light ELo into three or more processing lights ELk, as with the above described processing system SYSb in the second embodiment. However, the processing system SYSg in the seventh embodiment is different from the above described processing system SYSb that divides the source light ELo into three or more processing lights ELk by connecting the plurality of multibeam optical systems 112 in a multistage manner in that it divides the source light ELo into three or more processing lights ELk by using single multibeam optical system 112g. Another feature of the processing system SYSg in the seventh embodiment may be same as another feature of the above described processing system SYSb. Therefore, in the below described description, with reference to FIG. 35 to FIG. 39, the multibeam optical system 112g in the seventh embodiment will be described. Note that FIG. 35 illustrates one example of a structure of the multibeam optical system 112g that divides the source light ELo into 16 processing lights ELk, however, the structure of the multibeam optical system 112g is not limited to the structure illustrated in FIG. 35 as long as it is configured to divide the source light ELo into three or more processing lights ELk.

As illustrated in FIG. 35, the multibeam optical system 112g is provided with: a polarized beam splitter 1121g, a ¼ wavelength plate 1122g, a reflective mirror 1123g-1, a reflective mirror 1123g-2, a reflective mirror 1123g-3, a ¼ wavelength plate 1124g, a reflective mirror 1125g-1, a reflective mirror 1125g-2, a reflective mirror 1125g-3, a wavelength plate 1126g-1, a reflective prism (alternatively, any other reflective optical element, for example, a retroreflective mirror) 1127g-1, a wavelength plate 1126g-2, a reflective prism (alternatively, any other reflective optical element, for example, a retroreflective mirror) 1127g-2, and a reflective mirror 1128g.

As illustrated in FIG. 36, the source light ELo#1 from the light source 111 enters a split surface 11211g of the polarized beam splitter 1121g. In this case, in an example illustrated in FIG. 36, the source light ELo#1 enters the polarized beam splitter 1121g through the ¼ wavelength plate 1126g-2, however, may enter the polarized beam splitter 1121g without passing through the ¼ wavelength plate 1126g-2. s polarized light ELs1#1 of the source light ELo#1 is reflected by the split surface 11211g. On the other hand, p polarized light ELp2#1 of the source light ELo#1 passes through the split surface 11211g.

The s polarized light ELs1#1 that is reflected by the polarized beam splitter 1121g passes through the ¼ wavelength plate 1124g. As a result, the s polarized light ELs1#1 is converted into circular polarized light ELc1#1. The circular polarized light ELc1#1 passing through the ¼ wavelength plate 1124g is reflected by a reflective surface 11251g-1 of the reflective mirror 1125g-1. The circular polarized light ELc1#1 reflected by the reflective mirror 1125g-1 passes through the ¼ wavelength plate 1124g again and is converted into p polarized light ELp1#1. The p polarized light ELp1#1 passing through the ¼ wavelength plate 1124g enters the split surface 11211g of the polarized beam splitter 1121g. On the other hand, the p polarized light ELp2#1 passing through the polarized beam splitter 1121g passes through the ¼ wavelength plate 1122g. As a result, the p polarized light ELp2#1 is converted into circular polarized light ELc2#1. The circular polarized light ELc2#1 passing through the ¼ wavelength plate 1122g is reflected by a reflective surface 11231g-1 of the reflective mirror 1123g-1. The circular polarized light ELc2#1 reflected by the reflective mirror 1123g-1 passes through the ¼ wavelength plate 1122g again and is converted into s polarized light ELs2#1. The s polarized light ELs2#1 passing through the ¼ wavelength plate 1122g enters the split surface 11211g of the polarized beam splitter 1121g.

The p polarized light ELp1#1 entering the split surface 11211g passes through the split surface 11211g. On the other hand, the s polarized light ELs2#1 entering the split surface 11211g is reflected by the split surface 11211g. Here, the reflective mirrors 1123g-1 and 1125g-1 are aligned so that an incident angle of the circular polarized light ELc1#1 relative to the reflective surface 11251g-1 of the reflective mirror 1125g-1 is different from an incident angle of the circular polarized light ELc2#1 relative to the reflective surface 11231g-1 of the reflective mirror 1123g-1. As a result, an axis along a traveling direction of the p polarized light ELp1#1 passing through the split surface 11211g intersects with an axis along a traveling direction of the s polarized light ELs2#1 reflected by the split surface 11211g. Thus, the p polarized light ELp1#1 passing through the split surface 11211g and the s polarized light ELs2#1 reflected by the split surface 11211g are emitted from the polarized beam splitter 1121g to the wavelength plate 1126g-1 as emitting lights ELe#21 and ELe#22, respectively. At this stage, the source light ELo is firstly divided into two emitting lights ELe#21 and ELe#22.

Then, as illustrated in FIG. 37, each of two emitting lights ELe#21 and ELe#22 emitted from the polarized beam splitter 1121g pass through the wavelength plate 1126g-1, then are reflected by the reflective prism 1127g-1 and then pass through the wavelength plate 1126g-1 again. Two emitting lights ELe#21 and ELe#22 that have passed the wavelength plate 1126g-1 twice enter the split surface 11211g of the polarized beam splitter 1121g as two incident lights ELi#21 and ELi#22, respectively. Namely, the wavelength plate 1126g-1 and the reflective prism 1127g-1 serve as an optical system that converts the emitting light ELe that is emitted from the polarized beam splitter 1121g into the incident light ELi that enters the polarized beam splitter 1121g (furthermore, returns the converted incident light ELi to the polarized beam splitter 1121g). The reflective prism 1127g-1 may be a right angle prism that has a plurality of reflective surfaces that intersects with each other.

The wavelength plate 1126g-1 changes a polarized state of each of the emitting lights ELe#21 and ELe#22 passing through the wavelength plate 1126g-1. The wavelength plate 1126g-1 is a ¼ wavelength plate, however, may be another type of wavelength plate (for example, at least one of a ½ wavelength plate, a ⅛ wavelength plate and a 1 wavelength plate). Especially in the seventh embodiment, a characteristic of the wavelength plate 1126g-1 is set so that each of the incident lights ELi#21 and ELi#22 (namely, each of the incident lights ELi#21 and ELi#22 that have passed the wavelength plate 1126g-1 twice) becomes the circular polarized light (alternatively, the polarized light other than the liner polarized light or the non-polarized light) by changing the polarized state of each of the emitting lights ELe#21 and ELe#22. At least one of a thickness of the wavelength plate 1126g-1, a direction of an optical axis of the wavelength plate 1126g-1 and a relative position of the wavelength plate 1126g-1 and the reflective prism 1127g-1 (especially, a relationship between the optical axis of the wavelength plate 1126g-1 and a transfer axis of the reflective prism 1127g-1) is one example of the characteristic of the wavelength plate 1126g-1. Here, when the reflective mirror 1127g-1 is the right angle prism that has two reflective surfaces that intersects with each other, the transfer axis of the reflective prism 1127g-1 may be an axis that extends in a direction that is perpendicular to a ridge line of two reflective surfaces, or may be an axis along a traveling direction of light that is directed from one reflective surface to the other reflective surface of two reflective surfaces. Moreover, the transfer axis of the reflective prism 1127g-1 may be an axis that connects an incident position (on an incident surface) of incident light to the reflective prism 1127g-1 and an emitting position (on an emitting surface) when the incident angle is emitted from the reflective prism 1127g-1.

s polarized light ELs1#21 of the incident light ELi#21 is reflected by the split surface 11211g. On the other hand, p polarized light ELp2#21 of the incident light ELi#21 passes through the split surface 11211g. Similarly, s polarized light ELs1#22 of the incident light ELi#22 is reflected by the split surface 11211g. On the other hand, p polarized light ELp2#22 of the incident light ELi#22 passes through the split surface 11211g.

The s polarized lights ELs1#21 and ELs1#22 that are reflected by the polarized beam splitter 1121g pass through the ¼ wavelength plate 1122g. As a result, the s polarized lights ELs1#21 and ELs#22 are converted into circular polarized lights ELc1#21 and ELc#22, respectively. Each of the circular polarized lights ELc1#21 and ELc1#22 passing through the ¼ wavelength plate 1122g is reflected by a reflective surface 11231g-2 of the reflective mirror 1123g-2. The circular polarized lights ELc1#21 and ELc#22 reflected by the reflective mirror 1123g-2 pass through the ¼ wavelength plate 1122g again and are converted into p polarized lights ELp1#21 and ELp1#22, respectively. The p polarized lights ELp1#21 and ELp1#22 passing through the ¼ wavelength plate 1122g enter the split surface 11211g of the polarized beam splitter 1121g. On the other hand, the p polarized lights ELp2#21 and ELp2#22 passing through the polarized beam splitter 1121g pass through the ¼ wavelength plate 1124g. As a result, the p polarized lights ELp2#21 and ELp2#22 are converted into circular polarized lights ELc2#21 and ELc#22, respectively. The circular polarized lights ELc2#21 and ELc#22 passing through the ¼ wavelength plate 1124g are reflected by the reflective surface 11251g-1 of the reflective mirror 1125g-1. The circular polarized lights ELc2#21 and ELc2#22 reflected by the reflective mirror 1125g-1 pass through the ¼ wavelength plate 1124g again and are converted into s polarized lights ELs2#21 and ELs2#22, respectively. The s polarized lights ELs2#21 and ELs2#22 passing through the ¼ wavelength plate 1124g enter the split surface 11211g of the polarized beam splitter 1121g.

The p polarized lights ELp1#21 and ELp1#22 entering the split surface 11211g pass through the split surface 11211g. On the other hand, the s polarized lights ELs2#21 and ELs2#22 entering the split surface 11211g are reflected by the split surface 11211g. Here, the reflective mirrors 1123g-2 and 1125g-1 are aligned so that incident angles of the circular polarized lights ELc1#21 and ELc1#22 relative to the reflective surface 11231g-2 of the reflective mirror 1123g-2 are different from incident angles of the circular polarized lights ELc2#21 and ELc2#22 relative to the reflective surface 11251g-1 of the reflective mirror 1125g-1. As a result, an axis along traveling directions of the p polarized lights ELp1#21 and ELp1#22 passing through the split surface 11211g intersects with an axis along traveling directions of the s polarized lights ELs2#21 and ELs2#22 reflected by the split surface 11211g. Thus, the p polarized lights ELp1#21 and ELp1#22 passing through the split surface 11211g and the s polarized lights ELs2#21 and ELs#22 reflected by the split surface 11211g are emitted from the polarized beam splitter 1121g to the wavelength plate 1126g-2 as emitting lights ELe#31 to ELe#34, respectively. In this manner, in the process illustrated in FIG. 37, two incident lights ELi#21 and ELi#22 are divided into four emitting lights ELe#31 to ELe#34. Namely, at this stage, the source light ELo is divided into four emitting lights ELe#31 to ELe#34.

As can be seen from FIG. 36 and FIG. 37, an optical path in the process illustrated in FIG. 36 (namely, an optical path in the process of diving the source light ELo into two emitting lights ELe#21 and ELe#22) does not overlap with an optical path in the process illustrated in FIG. 37 (namely, an optical path in the process of diving two emitting lights ELe#21 and ELe#22 into four emitting lights ELe#31 to ELe#34). In other words, the optical path in the process illustrated in FIG. 36 is optically separated from the optical path in the process illustrated in FIG. 37. Namely, in the process illustrated in FIG. 37, the light passes through the optical path (namely, a space) that is different from the optical path through which the light passes in the process illustrated in FIG. 36. However, the optical path in the process illustrated in FIG. 36 may overlap with the optical path in the process illustrated in FIG. 37 at least partially.

Then, as illustrated in FIG. 38, each of four emitting lights ELe#31 to ELe#34 emitted from the polarized beam splitter 1121g pass through the wavelength plate 1126g-2, then are reflected by the reflective prism 1127g-2 and then pass through the wavelength plate 1126g-2 again. Four emitting lights ELe#31 to ELe#34 that have passed the wavelength plate 1126g-2 twice enter the split surface 11211g of the polarized beam splitter 1121g as four incident lights ELi#31 to ELi#34, respectively. Namely, the wavelength plate 1126g-2 and the reflective prism 1127g-2 serve as an optical system that converts the emitting light ELe that is emitted from the polarized beam splitter 1121g into the incident light ELi that enters the polarized beam splitter 1121g (furthermore, returns the converted incident light ELi to the polarized beam splitter 1121f). The reflective prism 1127g-2 may be a right angle prism that has a plurality of reflective surfaces that intersects with each other.

The wavelength plate 1126g-2 changes a polarized state of each of the emitting lights ELe#31 to ELe#34 passing through the wavelength plate 1126g-2. The wavelength plate 1126g-2 is a ¼ wavelength plate, however, may be another type of wavelength plate (for example, at least one of a ½ wavelength plate, a ⅛ wavelength plate and a 1 wavelength plate). Especially in the seventh embodiment, a characteristic of the wavelength plate 1126g-2 is set so that each of the incident lights ELi#31 to ELi#34 (namely, each of the incident lights ELi#31 to ELi#34 that have passed the wavelength plate 1126g-2 twice) becomes the circular polarized light (alternatively, the polarized light other than the liner polarized light or the non-polarized light) by changing the polarized state of each of the emitting lights ELe#31 to ELe#34. At least one of a thickness of the wavelength plate 1126g-2, a direction of an optical axis of the wavelength plate 1126g-2 and a relative position of the wavelength plate 1126g-2 and the reflective prism 1127g-2 (especially, a relationship between the optical axis of the wavelength plate 1126g-2 and a transfer axis of the reflective prism 1127g-2) is one example of the characteristic of the wavelength plate 1126g-2. Here, when the reflective mirror 1127g-2 is the right angle prism that has two reflective surfaces that intersects with each other, the transfer axis of the reflective prism 1127g-2 may be an axis that extends in a direction that is perpendicular to a ridge line of two reflective surfaces, or may be an axis along a traveling direction of light that is directed from one reflective surface to the other reflective surface of two reflective surfaces. Moreover, the transfer axis of the reflective prism 1127g-2 may be an axis that connects an incident position (on an incident surface) of incident light to the reflective prism 1127g-2 and an emitting position (on an emitting surface) when the incident angle is emitted from the reflective prism 1127g-2.

s polarized lights ELs1#31 to ELs1#34 included in the incident lights ELi#31 to ELi#34, respectively, are reflected by the split surface 11211g. On the other hand, p polarized lights ELp2#31 to ELp2#34 included in the incident lights ELi#31 to ELi#34, respectively, pass through the split surface 11211g.

The s polarized lights ELs1#31 to ELs1#34 that are reflected by the polarized beam splitter 1121g pass through the ¼ wavelength plate 1124g. As a result, the s polarized lights ELs1#31 to ELs1#34 are converted into circular polarized lights ELc1#31 to ELc#34, respectively. Each of the circular polarized lights ELc1#31 to ELc1#34 passing through the ¼ wavelength plate 1124g is reflected by a reflective surface 11251g-2 of the reflective mirror 1125g-2. The circular polarized lights ELc1#31 to ELc#34 reflected by the reflective mirror 1125g-2 pass through the ¼ wavelength plate 1124g again and are converted into p polarized lights ELp1#31 to ELp1#34, respectively. The p polarized lights ELp1#31 to ELp1#34 passing through the ¼ wavelength plate 1124g enter the split surface 11211g of the polarized beam splitter 1121g. On the other hand, the p polarized lights ELp2#31 to ELp2#34 passing through the polarized beam splitter 1121g pass through the ¼ wavelength plate 1122g. As a result, the p polarized lights ELp2#31 to ELp2#34 are converted into circular polarized lights ELc2#31 to ELc2#34, respectively. The circular polarized lights ELc2#31 to ELc#34 passing through the ¼ wavelength plate 1122g are reflected by the reflective surface 11231g-3 of the reflective mirror 1123g-3. The circular polarized lights ELc2#31 to ELc#34 reflected by the reflective mirror 1123g-3 pass through the ¼ wavelength plate 1122g again and are converted into s polarized lights ELs2#31 to ELs2#34, respectively. The s polarized lights ELs2#31 to ELs2#34 passing through the ¼ wavelength plate 1122g enter the split surface 11211g of the polarized beam splitter 1121g.

The p polarized lights ELp1#31 to ELp1#34 entering the split surface 11211g pass through the split surface 11211g. On the other hand, the s polarized lights ELs2#31 to ELs2#34 entering the split surface 11211g are reflected by the split surface 11211g. Here, the reflective mirrors 1123g-3 and 1125g-2 are aligned so that incident angles of the circular polarized lights ELc1#31 to ELc1#34 relative to the reflective surface 11251g-2 of the reflective mirror 1125g-2 are different from incident angles of the circular polarized lights ELc2#31 to ELc2#34 relative to the reflective surface 11231g-3 of the reflective mirror 1123g-3. As a result, an axis along traveling directions of the p polarized lights ELp1#31 to ELp1#34 passing through the split surface 11211g intersects with an axis along traveling directions of the s polarized lights ELs2#31 to ELs2#34 reflected by the split surface 11211g. Thus, the p polarized lights ELp1#31 to ELp1#34 passing through the split surface 11211g and the s polarized lights ELs2#31 to ELs#34 reflected by the split surface 11211g are emitted from the polarized beam splitter 1121g to the wavelength plate 1126g-1 as emitting lights ELe#41 to ELe#48, respectively. In this manner, in the process illustrated in FIG. 38, four incident lights ELi#31 to ELi#34 are divided into eight emitting lights ELe#41 to ELe#48. Namely, at this stage, the source light ELo is divided into eight emitting lights ELe#41 to ELe#48.

As can be seen from FIG. 36 to FIG. 38, the optical path in the process illustrated in each of FIG. 36 and FIG. 37 does not overlap with an optical path in the process illustrated in FIG. 38 (namely, an optical path in the process of diving four emitting lights ELe#31 to ELe#34 into eight emitting lights ELe#41 to ELe#48). However, the optical path in the process illustrated in at least one of FIG. 36 and FIG. 37 may overlap with the optical path in the process illustrated in FIG. 38 at least partially.

Then, as illustrated in FIG. 39, each of eight emitting lights ELe#41 to ELe#48 emitted from the polarized beam splitter 1121g pass through the wavelength plate 1126g-1, then are reflected by the reflective prism 1127g-1 and then pass through the wavelength plate 1126g-1 again. Eight emitting lights ELe#41 to ELe#48 that have passed the wavelength plate 1126g-1 twice enter the split surface 11211g of the polarized beam splitter 1121g as eight incident lights ELi#41 to ELi#48, respectively. The characteristic of the wavelength plate 1126g-1 is set so that each of the incident lights ELi#41 to ELi#48 (namely, each of the incident lights ELi#41 to ELi#48 that have passed the wavelength plate 1126g-1 twice) becomes the circular polarized light (alternatively, the polarized light other than the liner polarized light or the non-polarized light) by changing the polarized state of each of the emitting lights ELe#41 to ELe#48.

s polarized lights ELs1#41 to ELs1#484 included in the incident lights ELi#41 to ELi#48, respectively, are reflected by the split surface 11211g. On the other hand, p polarized lights ELp2#41 to ELp2#48 included in the incident lights ELi#41 to ELi#48, respectively, pass through the split surface 11211g.

The s polarized lights ELs1#41 to ELs1#48 that are reflected by the polarized beam splitter 1121g pass through the ¼ wavelength plate 1122g. As a result, the s polarized lights ELs1#41 to ELs1#48 are converted into circular polarized lights ELc1#41 to ELc#48, respectively. Each of the circular polarized lights ELc1#41 to ELc1#48 passing through the ¼ wavelength plate 1122g is reflected by a reflective surface 11231g-3 of the reflective mirror 1123g-3. The circular polarized lights ELc1#41 to ELc#48 reflected by the reflective mirror 1123g-3 pass through the ¼ wavelength plate 1122g again and are converted into p polarized lights ELp1#41 to ELp1#48, respectively. The p polarized lights ELp1#41 to ELp1#48 passing through the ¼ wavelength plate 1122g enter the split surface 11211g of the polarized beam splitter 1121g. On the other hand, the p polarized lights ELp2#41 to ELp2#48 passing through the polarized beam splitter 1121g pass through the ¼ wavelength plate 1124g. As a result, the p polarized lights ELp2#41 to ELp2#44 are converted into circular polarized lights ELc2#41 to ELc2#48, respectively. The circular polarized lights ELc2#41 to ELc#48 passing through the ¼ wavelength plate 1124g are reflected by a reflective surface 11251g-3 of the reflective mirror 1125g-3. The circular polarized lights ELc2#41 to ELc2#48 reflected by the reflective mirror 1125g-3 pass through the ¼ wavelength plate 1124g again and are converted into s polarized lights ELs2#41 to ELs2#48, respectively. The s polarized lights ELs2#41 to ELs2#48 passing through the ¼ wavelength plate 1124g enter the split surface 11211g of the polarized beam splitter 1121g.

The p polarized lights ELp1#41 to ELp1#48 entering the split surface 11211g pass through the split surface 11211g. On the other hand, the s polarized lights ELs2#41 to ELs2#48 entering the split surface 11211g are reflected by the split surface 11211g. Here, the reflective mirrors 1123g-3 and 1125g-3 are aligned so that incident angles of the circular polarized lights ELc1#41 to ELc1#48 relative to the reflective surface 11231g-3 of the reflective mirror 1123g-3 are different from incident angles of the circular polarized lights ELc2#41 to ELc2#48 relative to the reflective surface 11251g-3 of the reflective mirror 1125g-3. As a result, an axis along traveling directions of the p polarized lights ELp1#41 to ELp1#48 passing through the split surface 11211g intersects with an axis along traveling directions of the s polarized lights ELs2#41 to ELs2#48 reflected by the split surface 11211g. Thus, the p polarized lights ELp1#41 to ELp1#44 passing through the split surface 11211g and the s polarized lights ELs2#41 to ELs#48 reflected by the split surface 11211g are emitted from the polarized beam splitter 1121g to the reflective mirror 1128g as emitting lights ELe#001 to ELe#016, respectively. In this manner, in the process illustrated in FIG. 39, eight incident lights ELi#41 to ELi#48 are divided into sixteen emitting lights ELe#001 to ELe#016. Namely, at this stage, the source light ELo is divided into sixteen emitting lights ELe#001 to ELe#016.

As can be seen from FIG. 36 to FIG. 39, the optical path in the process illustrated in each of FIG. 36 to FIG. 38 does not overlap with an optical path in the process illustrated in FIG. 39 (namely, an optical path in the process of diving eight emitting lights ELe#41 to ELe#48 into sixteen emitting lights ELe#001 to ELe#016). However, the optical path in the process illustrated in at least one of FIG. 36 to FIG. 38 may overlap with the optical path in the process illustrated in FIG. 39 at least partially.

The reflective mirror 1128g reflects sixteen emitting lights ELe#001 to ELe#016 to the Galvano mirror 113 as sixteen processing lights ELk. Therefore, the multibeam optical system 112g is configured to divide the source light ELo into sixteen processing lights ELk and emit the sixteen processing lights ELk toward the Galvano mirror 113.

As described above, the processing system SYSg in the seventh embodiment is configured to irradiate the coat SF of paint with $2^{(N-1)}$ processing lights ELk simultaneously, as with the processing system SYSb in the second embodiment. Thus, the throughput relating to the formation of the riblet structure improves. Furthermore, the processing system SYSg in the seventh embodiment is configured to divide the source light ELo into three or more processing lights ELk by using single multibeam optical system 112g. Thus, a downsize of the multibeam optical system 112 is achievable.

In addition, the processing system SYSg in the seventh embodiment is provided with the plurality of reflective mirrors 1123g-1 to 1123g-3 and 1125lg-1 to 1125g-3 separately as optical elements that returns, to the polarized beam splitter 1121g, the p polarized light or the s polarized light emitted from the polarized beam splitter 1121g. For example, the processing system SYSg is provided with: the reflective mirrors 1123g-1 and 1125g-1 that returns, to the polarized beam splitter 1121g, the p polarized light or the s polarized light emitted from the polarized beam splitter 1121g in the process of diving the source light ELo into two emitting lights ELe#21 and ELe#22 (see FIG. 36); the reflective mirrors 1123g-2 and 1125g-1 that returns, to the polarized beam splitter 1121g, the p polarized light or the s polarized light emitted from the polarized beam splitter 1121g in the process of diving two emitting lights ELe#21 and ELe#22 into four emitting lights ELe#31 to ELe#34 (see FIG. 37); the reflective mirrors 1123g-3 and 1125g-2 that returns, to the polarized beam splitter 1121g, the p polarized light or the s polarized light emitted from the polarized beam splitter 1121g in the process of diving four emitting lights ELe#31 to ELe#34 into eight emitting lights ELe#41 to ELe#48 (see FIG. 38); and the reflective mirrors 1123g-3 and 1125g-3 that returns, to the polarized beam splitter 1121g, the p polarized light or the s polarized light emitted from the polarized beam splitter 1121g in the process of diving eight emitting lights ELe#41 to ELe#48 into sixteen emitting lights ELe#001 to ELe#016 (see FIG. 39). In this case, at least one of the reflective mirrors 1123g-1 to 1123g-3 and 1125lg-1 to 1125g-3 is movable separately from residual of the reflective mirrors 1123g-1 to 1123g-3 and 1125lg-1 to 1125g-3 if the processing system SYSg is provided with the driving system 1126c described in the third embodiment. Thus, a degree of freedom regarding an adjustment of the positions of the beam spots of the plurality of processing lights ELk (namely, the positions of the plurality of target irradiation areas) improves.

Note that the processing system SYSg may adjust the positions of the beam spots of the plurality of processing lights ELk by moving at least one of the reflective mirrors 1123g-1 and 1125g-1 in the process of diving the source light ELo into two emitting lights ELe#21 and ELe#22 (see FIG. 36). The processing system SYSg may adjust the positions of the beam spots of the plurality of processing lights ELk by moving at least one of the reflective mirrors 1123g-2 and 1125g-1 in the process of diving two emitting lights ELe#21 and ELe#22 into four emitting lights ELe#31 to ELe#34 (see FIG. 37). The processing system SYSg may adjust the positions of the beam spots of the plurality of processing lights ELk by moving at least one of the reflective mirrors 1123g-3 and 1125g-2 in the process of diving four emitting lights ELe#31 to ELe#34 into eight emitting lights ELe#41 to ELe#48 (see FIG. 38). The processing system SYSg may adjust the positions of the beam spots of the plurality of processing lights ELk by moving at least one of the reflective mirrors 1123g-3 and 1125g-3 in the process of diving eight emitting lights ELe#41 to ELe#48 into sixteen emitting lights ELe#001 to ELe#016 (see FIG. 39). In this case, the positions of the beam spots of the plurality of processing lights ELk adjustable in all of the processes as long as the reflective mirrors 1123g-1, 1123g-2, 1125g-2 and 1125g-3 are movable, even when the reflective mirrors 1123g-3 and 1125g-1 are not movable.

However, as illustrated in FIG. 40, the processing system SYSg may be provided with single reflective mirror 1123g that serve as the reflective mirrors 1123g-1 to 1123g-3, instead of the reflective mirrors 1123g-1 to 1123g-3. Similarly, as illustrated in FIG. 40, the processing system SYSg may be provided with single reflective mirror 1125g that serve as the reflective mirrors 1125g-1 to 1125g-3, instead of the reflective mirrors 1125g-1 to 1125g-3.

Note that the processing system SYSg in the seventh embodiment may be provided with a feature that is unique to at least one of the processing system SYSb in the second embodiment to the processing system SYSf in the sixth embodiment described above. The feature that is unique to the processing system SYSf in the sixth embodiment includes a feature relating to the intensity adjustment apparatus 117f.

(8) Processing System SYSh in Eighth Embodiment

Next, a processing system SYS in an eighth embodiment (in the below described description, the processing system SYS in the eighth embodiment is referred to as a "processing system SYSh") will be described. The processing system SYSh in the eighth embodiment divides the source light ELo into three or more processing lights ELk by using single multibeam optical system 112h, as with the above described processing system SYSg in the seventh embodiment. However, as illustrated in FIG. 41 that is a perspective view that illustrates a structure of the multibeam optical system 112h in the eighth embodiment, the multibeam optical system 112h in the eighth embodiment is different from the above described multibeam optical system 112g in that it may not be provided with the wavelength plates 1126g-1 and 1126g-2. Another feature of the multibeam optical system 112h in the eighth embodiment may be same as another feature of the above described multibeam optical system 112g.

Namely, the above described processing system SYSg in the seventh embodiment is provided with, as the optical system that converts the emitting light ELe that is emitted from the polarized beam splitter 1121g into the incident light ELi that enters the polarized beam splitter 1121g (furthermore, returns the converted incident light ELi to the polarized beam splitter 1121f), each of an optical system that includes the wavelength plate 1126g-1 and the reflective prism 1127g-1 and an optical system that includes the wavelength plate 1126g-2 and the reflective prism 1127g-2. On the other hand, the processing system SYSh in the eighth embodiment is provided with, as the optical system that converts the emitting light ELe that is emitted from the polarized beam splitter 1121g into the incident light ELi that enters the polarized beam splitter 1121g, each of an optical system that includes the reflective prism 1127g-1 without including the wavelength plate 1126g-1 and an optical system that includes the reflective prism 1127g-2 without including the wavelength plate 1126g-2.

However, in the eighth embodiment, the reflective prism 1127g-1 is aligned relative to the polarized beam splitter 1121g so that an angle between the transfer axis of the reflective prism 1127g-1 and a polarization plane of the emitting light ELe that enters from the polarized beam splitter 1121g to the reflective prism 1127g-1 is 22.5 degree. A direction of the polarization plane of the emitting light ELe is determined depending on a transmission polarization direction (or a reflection polarization direction) AX1g of the polarized beam splitter 1121g. Therefore, as illustrated in FIG. 42A that illustrates a relationship between the transfer axis AX7g-1 of the reflective prism 1127g-1 and the transmission polarization direction (or the reflection polarization direction) AX1g of the polarized beam splitter 1121g, the reflective prism 1127g-1 is aligned relative to the polarized beam splitter 1121g so that an angle between the transfer axis AX7g-1 of the reflective prism 1127g-1 and the transmission polarization direction (or the reflection polarization direction) AX1g of the polarized beam splitter 1121g is 22.5 degree. As a result, even when the multibeam optical system 112h is not provided with the wavelength plate 1126g-1, the emitting light ELe that reflected by the reflective prism 1127g-1 is converted into the incident light Eli that is the circular polarized light (alternatively, the polarized light other than liner polarized light or the non-polarized light).

Similarly, the reflective prism 1127g-2 is aligned relative to the polarized beam splitter 1121g so that an angle between the transfer axis AX7g-2 of the reflective prism 1127g-2 and a polarization plane of the emitting light ELe that enters from the polarized beam splitter 1121g to the reflective prism 1127g-2 is 22.5 degree. A direction of the polarization plane of the emitting light ELe is determined depending on the transmission polarization direction (or a reflection polarization direction) gAX1g of the polarized beam splitter 1121g. Therefore, as illustrated in FIG. 42B that illustrates a relationship between the transfer axis AX7g-2 of the reflective prism 1127g-2 and the transmission polarization direction (or the reflection polarization direction) AX1g of the polarized beam splitter 1121g, the reflective prism 1127g-2 is aligned relative to the polarized beam splitter 1121g so that an angle between the transfer axis AX7g-2 of the reflective prism 1127g-2 and the transmission polarization direction (or the reflection polarization direction) AX1g of the polarized beam splitter 1121g is 22.5 degree. As a result, even when the multibeam optical system 112h is not provided with the wavelength plate 1126g-2, the emitting light ELe that reflected by the reflective prism 1127g-2 is converted into the incident light Eli that is the circular polarized light (alternatively, the polarized light other than liner polarized light or the non-polarized light).

The processing system SYSh in the eighth embodiment described above achieves an effect that is same as the effect that is achievable by the processing system SYSg in the seventh embodiment. Moreover, a downsize of the processing system SYSh is achievable because the wavelength plates 1126g-1 and 1126g-2 are not necessary.

(9) Processing System SYSi in Ninth Embodiment

Next, a processing system SYS in a ninth embodiment (in the below described description, the processing system SYS in the ninth embodiment is referred to as a "processing system SYSi") will be described. The processing system SYSi in the ninth embodiment may have a structure that is same as that of the above described processing system SYSa. Moreover, the processing system SYSi in the ninth embodiment forms the riblet structure by alternately repeating the scan operation for sweeping the coat SF of paint with the plurality of processing lights ELk along either one of the X axis and the Y axis and the step operation for moving the plurality of irradiation areas EA along the other one of the X axis and the Y axis on the surface of the coat SF of paint by the predetermined amount, as with the above described processing system SYSa. However, the processing system SYSi in the ninth embodiment is different from the above described processing system SYSa in the following point.

Specifically, the processing system SYSi (especially, the control apparatus 2) in the ninth embodiment allows the extending direction of the concave structure CP1 that constitutes the riblet structure to be same as a direction (in the below described description, it is referred to as a "scan direction") in which the coat SF of paint is swept with the plurality of processing lights ELk by the scan operation. Namely, the processing system SYSi allows the extending direction of the concave structure CP1 to be parallel to the scan direction. In other words, the processing system SYSi sets an angle between s the extending direction of the concave structure CP1 and the scan direction to zero degree.

The processing system SYSi (especially, the control apparatus 2) further determines the scan direction on the basis of a characteristic of the Galvano mirror 113 (namely, characteristics of the X scanning mirror 113X and the Y scanning mirror 113Y). Specifically, for example, the processing system SYSi determines, as the scan direction, one direction of the X axis direction and the Y axis direction that is selected on the basis of the characteristic of the Galvano mirror 113. In this case, during a period when the scan operation is performed, the processing system SYSi deflects the plurality of processing lights ELk by one mirror of the X scanning mirror 113X and the Y scanning mirror 113Y that is allowed to sweep the coat SF of paint with the plurality of processing lights ELk along the determined one direction. For example, when the X axis direction is determined as the scan direction, the processing system SYSi deflects the plurality of processing lights ELk by the X scanning mirror 113X to sweep the coat SF of paint with the plurality of processing lights ELk along the X axis during a period when the scan operation is performed. For example, when the Y axis direction is determined as the scan direction, the processing system SYSi deflects the plurality of processing lights ELk by the Y scanning mirror 113Y to sweep the coat SF of paint with the plurality of processing lights ELk along the Y axis during a period when the scan operation is performed.

The characteristic of the Galvano mirror 113 may include weights of the X scanning mirror 113X and the Y scanning mirror 113Y. For example, the X scanning mirror 113X and the Y scanning mirror 113Y rotate (alternatively, swing) relatively fast in order to deflect the processing lights ELk. Here, the mirror that deflects the processing lights ELk during the period when the scan operation is performed rotates faster than the mirror that deflects the processing lights ELk during a period when the step operation is performed. This is because the step operation is an operation for moving the irradiation areas EA, which are the irradiation positions of the processing lights ELk, in a step direction that intersects with (typically, is perpendicular to) the scan direction by the predetermined amount after the coat SF of paint is swept by the processing lights ELk in the scan direction by the scan operation. Generally, rotating the relatively light mirror fast is easier than rotating the relatively heavy mirror fast. Therefore, the processing system SYSi may determine, as the scan direction, a direction in which the mirror of the X scanning mirror 113X and the Y scanning mirror 113Y that is lighter scans the processing lights ELk. Namely, when the X scanning mirror 113X is lighter than the Y scanning mirror 113Y, the processing system SYSi may determine the X axis direction as the scan direction. On the other hand, when the Y scanning mirror 113Y is lighter than the X scanning mirror 113X, the processing system SYSi may determine the Y axis direction as the scan direction.

The characteristic of the Galvano mirror 113 may include sizes of the X scanning mirror 113X and the Y scanning mirror 113Y. Specifically, generally, rotating the relatively small mirror fast is easier than rotating the relatively large mirror fast. Therefore, the processing system SYSi may determine, as the scan direction, a direction in which the mirror of the X scanning mirror 113X and the Y scanning mirror 113Y that has a shorter size scans the processing lights ELk. Namely, when the X scanning mirror 113X is shorter than the Y scanning mirror 113Y, the processing system SYSi may determine the X axis direction as the scan direction. On the other hand, when the Y scanning mirror 113Y is shorter than the X scanning mirror 113X, the processing system SYSi may determine the Y axis direction as the scan direction. Note that the processing lights ELk from the multibeam optical system 112 are reflected by the Y scanning mirror 113Y and then are reflected by the X scanning mirror 113X. Namely, the Y scanning mirror 113Y reflects the processing lights ELk the optical path from the multibeam optical system 112 of which does not change (namely, the processing lights ELk that propagate in a relatively narrow range) and the X scanning mirror 113X reflects the processing lights ELk the optical path from the Y scanning mirror 113Y of which changes depending on the rotation of the Y scanning mirror 113Y (namely, the processing lights ELk that propagate in a relatively wide range). Thus, there is usually a higher possibility that the X scanning mirror 113X is larger than the Y scanning mirror 113Y

The characteristic of the Galvano mirror 113 may include magnitudes of moments (namely, forces) that are necessary for rotating the X scanning mirror 113X and the Y scanning mirror 113Y Specifically, generally, rotating the mirror which the moment necessary for rotating is relatively small fast is easier than rotating the mirror which the moment necessary for rotating is relatively large fast. Therefore, the processing system SYSi may determine, as the scan direction, a direction in which the mirror of the X scanning mirror 113X and the Y scanning mirror 113Y which the moment necessary for rotating is shorter scans the processing lights ELk. Namely, when the moment necessary for rotating the X scanning mirror 113X is shorter than the moment necessary for rotating the Y scanning mirror 113Y, the processing system SYSi may determine the X axis direction as the scan direction. On the other hand, when the moment necessary for rotating the Y scanning mirror 113Y is shorter than the moment necessary for rotating the X scanning mirror 113X, the processing system SYSi may determine the Y axis direction as the scan direction.

Note that there is a possibility that the weights of the X scanning mirror 113X and the Y scanning mirror 113Y are factors that affect the moments that are necessary for rotating the X scanning mirror 113X and the Y scanning mirror 113Y. Thus, it can be said that an operation for determining the scan direction on the basis of the weights of the X scanning mirror 113X and the Y scanning mirror 113Y is one specific example of an operation for determining the scan direction on the basis of the moments that are necessary for rotating the X scanning mirror 113X and the Y scanning mirror 113Y. Moreover, there is a possibility that the sizes of the X scanning mirror 113X and the Y scanning mirror 113Y are factors that affect the moments that are necessary for rotating the X scanning mirror 113X and the Y scanning mirror 113Y. Thus, it can be said that an operation for determining the scan direction on the basis of the sizes of the X scanning mirror 113X and the Y scanning mirror 113Y is one specific example of the operation for determining the scan direction on the basis of the moments that are necessary for rotating the X scanning mirror 113X and the Y scanning mirror 113Y

The scan direction intersects with (typically, is perpendicular to) the step direction, as described above. Thus, when the scan direction is determined, the step direction is also determined. Therefore, it can be said that the operation for determining the scan direction on the basis of the characteristics of the X scanning mirror 113X and the Y scanning mirror 113Y is equivalent to an operation for determining the step direction on the basis of the characteristics of the X scanning mirror 113X and the Y scanning mirror 113Y.

In the ninth embodiment, the processing system SYSi may determine (alternatively, set) the scan direction and align the processing apparatus 1 relative to the processing target object S so that the determined scan direction is same as the extending direction of the concave structure CP1 that is to be formed before processing the processing target object S (namely, forming the concave structure CP1). Specifically, the processing system SYSi firstly determines the scan direction. Incidentally, when the characteristic of the Galvano mirror 113 does not change easily over time, the scan direction may be determined in advance. Furthermore, the processing system SYSi determines the extending direction of the riblet structure (namely, the direction of the concave structure CP1) that is to be formed at the processing target object S (specifically, the above described processing shot area SA) from the riblet information relating to the characteristic of the riblet structure that is optimized on the basis of the above described simulation model. Then, the processing system SYSi aligns the processing apparatus 1 (especially, the light irradiation apparatus 11 that irradiates the processing target object S with the processing lights ELk) relative to the processing target object S so that the determined scan direction is same as (is parallel to) the determined extending direction of the concave structure CP1. In this case, for example, the processing apparatus 1 may be aligned relative to the processing target object S by means of the driving system 12 moving the light irradiation apparatus 11. For example, the processing apparatus 1 may be aligned relative to the processing target object S by means of the driving system 12 moving the support apparatus 14 that supports the light irradiation apparatus 11. Typically, the processing system SYSi may align the processing apparatus 1 relative to the processing target object S so that the determined scan direction is same as (is parallel to) the determined extending direction of the concave structure CP1 by rotating the light irradiation apparatus 11 around an axis (specifically, around the Z axis) that intersects with the coat SF of paint.

For example, FIG. 43A illustrates the moving path of the plurality of target irradiation areas EA (namely, the sweeping path of the plurality of processing lights ELk) on the coat SF of paint when the Y axis direction is determined (set) as the scan direction. In this case, the processing system SYSi forms the concave structure CP1 that extends in the desired direction on the processing target object S by forming the concave structure CP1 that extends along the Y axis direction, as illustrated in FIG. 43B. Therefore, before the concave structure CP is formed, the processing apparatus 1 is aligned relative to the processing target object S so that the concave structure CP1 that extends in the desired direction on the processing target object S is formed by forming the concave structure CP1 that extends along the Y axis direction. On the other hand, FIG. 43B illustrates the moving path of the plurality of target irradiation areas EA on the coat SF of paint when the X axis direction is determined (set) as the scan direction. In this case, the processing system SYSi forms the concave structure CP1 that extends in the desired direction on the processing target object S by forming the concave structure CP1 that extends along the X axis direction, as illustrated in FIG. 43D. Therefore, before the concave structure CP is formed, the processing apparatus 1 is aligned relative to the processing target object S so that the concave structure CP1 that extends in the desired direction on the processing target object S is formed by forming the concave structure CP1 that extends along the X axis direction.

When the processing apparatus 1 is aligned relative to the processing target object S in this manner, an angle between an axis along the scan direction and an axis along the extending direction of the concave structure CP1 becomes shorter than an angle between an axis along the step direction and the axis along the extending direction of the concave structure CP1. Finally, the processing apparatus 1 is aligned relative to the processing target object S so that the angle between the axis along the scan direction and the axis along the extending direction of the concave structure CP1 becomes zero degree. However, the processing apparatus 1 may not be aligned relative to the processing target object S so that the angle between the axis along the scan direction and the axis along the extending direction of the concave structure CP1 becomes zero degree. For example, the processing apparatus 1 may be aligned relative to the processing target object S so that the angle between the axis along the scan direction and the axis along the extending direction of the concave structure CP1 is regarded to be substantially zero degree (namely, the scan direction is regarded to be substantially parallel to the concave structure CP1). For example, the processing apparatus 1 may be aligned relative to the processing target object S so that the angle between the axis along the scan direction and the axis along the extending direction of the concave structure CP1 is shorter than the angle between the axis along the step direction and the axis along the extending direction of the concave structure CP1.

As described above, the processing system SYSi allows the scan direction to be parallel to the extending direction of the concave structure CP1. Thus, the processing system SYSi is capable of forming the concave structure that extends along the scan direction by keeping emitting the source light ELo from the light source 110 continuously during the period when the scan operation is performed. The processing system SYSi is capable of forming the concave structure that extends along the scan direction without performing a control for switching an on-off condition of the irradiation of the source light ELo from the light source 110. Therefore, the processing system SYSi is capable of forming the concave structure that extends along the desired direction relatively easily.

Moreover, the processing system SYSi in the ninth embodiment may determine the scan direction on the basis of the characteristic of the Galvano mirror 113. As a result, the processing system SYSi is capable of forming the riblet structure without increasing a load for rotating the Galvano mirror 113 excessively, compared to the case where the scan direction is not determined on the basis of the characteristic of the Galvano mirror 113.

Note that the processing system SYSi may scan the surface of the coat SF of paint with the plurality of processing lights ELk by moving (especially, moving relative to the coat SF of paint) the light irradiation apparatus 11 in addition to or instead of deflecting the processing lights ELk by the Galvano mirror 113. Note that not only the processing system SYSi but also each of the above described processing systems SYSa to SYSh may scan the surface of the coat SF of paint with the plurality of processing lights ELk by moving the light irradiation apparatus 11 in addition to or instead of deflecting the processing lights ELk by the Galvano mirror 113.

In this case, for example, the processing system SYSi may control the driving system 12 to move the light irradiation apparatus 11 relative to the coat SF of paint so that the surface of the coat SF of paint with the plurality of processing lights ELk. The driving system 12 that moves the light irradiation apparatus 11 in this manner may be provided with: a driving apparatus 12X that moves the light irradiation apparatus 11 along the X axis direction so that the processing target object S is swept with the processing lights ELk along the X axis; and a driving apparatus 12Y that moves the light irradiation apparatus 11 along the Y axis direction so that the processing target object S is swept with the processing lights ELk along the Y axis, for example, as illustrated in FIG. 44 that is a cross-sectional view illustrating the structure of the driving system 12. Note that the driving apparatus 12X may be provided with: a X guide member 121X that is supported by the support member 133 and that extends in the X axis direction; a X movable body 122X that is movable along the X guide member 121X; and a X stage 123X that is connected to the X movable body 122X, for example. The driving apparatus 12Y may be provided with: a Y guide member 121Y that is supported by the X stage 123X and that extends in the Y axis direction; and a Y movable body 122Y that is movable along the Y guide member 121Y and that is connected to the light irradiation apparatus 11, for example. According to these driving apparatuses 12X and 12Y, when the X movable body 122X moves along the X guide member 121X, the light irradiation apparatus 11 that is supported through the Y guide member 121Y and the Y movable body 122Y by the X stage 123X that is connected to the X movable body 122X moves along the X axis. Moreover, when the Y movable body 122Y moves along the Y guide member 121Y, the light irradiation apparatus 11 that is connected to the Y movable body 122Y moves along the Y axis. In this case, the processing system SYSi may determine the scan direction on the basis of characteristics of the driving apparatus 12X and the driving apparatus 12Y. For example, when the driving apparatus 12X is lighter than the driving apparatus 12Y, the driving apparatus 12X is shorter than the driving apparatus 12Y and/or the force necessary for moving the driving apparatus 12X (for example, moving the X movable body 122X and the X stage 123X) is shorter than the force necessary for moving the driving apparatus 12Y (for example, moving the Y movable body 122Y), the processing system SYSi may determine the X axis direction as the scan direction. For example, when the driving apparatus 12Y is lighter than the driving apparatus 12X, the driving apparatus 12Y is shorter than the driving apparatus 12X and/or the force necessary for moving the driving apparatus 12Y is shorter than the force necessary for moving the driving apparatus 12X, the processing system SYSi may determine the Y axis direction as the scan direction. Note that the driving apparatus 12X moves the light irradiation apparatus 11 along the X axis direction through the driving apparatus 12Y in an example illustrated in FIG. 44, and thus, the driving apparatus 12X needs to move the driving apparatus 12Y together in order to move the light irradiation apparatus 11. On the other hand, the driving apparatus 12Y moves the light irradiation apparatus 11 along the Y axis direction not through the driving apparatus 12X, and thus, the driving apparatus 12Y does not necessarily move the driving apparatus 12X in order to move the light irradiation apparatus 11. Therefore, in the example illustrated in FIG. 44, there is usually a high possibility that the force necessary for moving the driving apparatus 12Y is shorter than the force necessary for moving the driving apparatus 12X. Note that the support member 133 may be a part of a structural object of a hanger and may be one that is attached to the structural object.

Alternatively, for example, when the size of the processing target object S is not so large (for example, not as large as the above described airplane and the like), the processing system SYSi may scan the surface of the coat SF of paint with the plurality of processing lights ELk by moving (especially, moving relative to the light irradiation apparatus 11) the processing target object S in addition to or instead of deflecting the processing lights ELk by the Galvano mirror 113. Note that not only the processing system SYSi but also each of the above described processing systems SYSa to SYSh may scan the surface of the coat SF of paint with the plurality of processing lights ELk by moving the processing target object S in addition to or instead of deflecting the processing lights ELk by the Galvano mirror 113.

In this case, the processing system SYSi may be provided with a stage apparatus 3 that is movable while holding the processing target object S and the control apparatus 2 may control the stage apparatus 3 to relatively move the coat SF of paint relative to the light irradiation apparatus 11 so that the surface of the coat SF of paint is swept with the processing lights ELk. Note that this stage apparatus 3 may be provided with: a stage apparatus 3X that is movable to move the processing target object S along the X axis direction so that the processing target object S is swept with the processing lights ELk along the X axis; and a stage apparatus 3Y that is movable to move the processing target object S along the Y axis direction so that the processing target object S is swept with the processing lights ELk along the Y axis, for example, as illustrated in FIG. 45 that is a cross-sectional view illustrating the structure of the stage apparatus 3. Note that the stage apparatus 3X may be provided with: a X guide member 31X that is supported by a support member 39 such as a plate surface and that extends in the X axis direction; a X movable body 32X that is movable along the X guide member 31X; and a X stage 33X that is connected to the X movable body 32X, for example. The stage apparatus 3Y may be provided with: a Y guide member 31Y that is supported by the X stage 33X and that extends in the Y axis direction; a Y movable body 32Y that is movable along the Y guide member 31Y; and a Y stage 33Y that is connected to the Y movable body and that is configured to hold the processing target object S, for example. According to these stage apparatuses 3X and 3Y, when the X movable body 32X moves along the X guide member 31X, the processing target object S that is supported through the Y guide member 31Y, the Y movable body 32Y and the Y stage 33Y by the X stage 33X that is connected to the X movable body 32X moves along the X axis. Moreover, when the Y movable body 32Y moves along the Y guide member 31Y, the light irradiation apparatus 11 that is supported by the Y movable body 32X through the Y stage 33X moves along the Y axis. In this case, the processing system SYSi may determine the scan direction on the basis of characteristics of the stage apparatus 3X and the stage apparatus 3Y. For example, when the stage apparatus 3X is lighter than the stage apparatus 3Y, the stage apparatus 3X is shorter than the stage apparatus 3Y and/or a force necessary for moving the stage apparatus 3X (for example, moving the X movable body 32X and the X stage 33X) is shorter than a force necessary for moving the stage apparatus 3Y (for example, moving the Y movable body 32Y and the Y stage 33Y), the processing system SYSi may determine the X axis direction as the scan direction. For example, when the stage apparatus 3Y is lighter than the stage apparatus 3X, the stage apparatus 3Y is shorter than the stage apparatus 3X and/or the force necessary for moving the stage apparatus 3Y is shorter than the force necessary for moving the stage apparatus 3X, the processing system SYSi may determine the Y axis direction as the scan direction. Note that the stage apparatus 3X moves the processing target object S along the X axis direction through the stage apparatus 3Y in an example illustrated in FIG. 45, and thus, the stage apparatus 3X needs to move the stage apparatus 3Y together in order to move the processing target object S. On the other hand, the stage apparatus 3Y moves the processing target object S along the Y axis direction not through the stage apparatus 3X, and thus, the stage apparatus 3Y does not necessarily move the stage apparatus 3X in order to move the processing target object S. Therefore, in the example illustrated in FIG. 45, there is usually a high possibility that the force necessary for moving the stage apparatus 3Y is shorter than the force necessary for moving the stage apparatus 3X. Incidentally, even when the size of the processing target object S is large (for example, as large as the above described airplane and the like), the processing target object S may be moved in accordance with the example illustrated in FIG. 45.

It can be said that each of the Galvano mirror 113, the driving system 12 and the stage apparatus 3 is an apparatus for sweeping the processing target object S with the processing lights ELk. Namely, it can be said that each of the Galvano mirror 113, the driving system 12 and the stage apparatus 3 is an apparatus for moving the target irradiation areas EA on the surface of the coat SF of paint. Thus, it can be said that the processing system SYSi determines the determines the scan direction on the basis of a characteristic of a movable apparatus that moves (namely, physically moves) so that the processing target object S is swept with the processing lights ELk. In this case, for example, when a first movable apparatus that moves so that the processing target object S is swept with the processing lights ELk along either one of the X axis direction and the Y axis direction is lighter than a second movable apparatus that moves so that the processing target object S is swept with the processing lights ELk along the other one of the X axis direction and the Y axis direction, the processing system SYSi may determine either one of the X axis direction and the Y axis direction as the scan direction. For example, when the first movable apparatus that moves so that the processing target object S is swept with the processing lights ELk along either one of the X axis direction and the Y axis direction is shorter than the second movable apparatus that moves so that the processing target object S is swept with the processing lights ELk along the other one of the X axis direction and the Y axis direction, the processing system SYSi may determine either one of the X axis direction and the Y axis direction as the scan direction. For example, when a force necessary for moving the first movable apparatus that moves so that the processing target object S is swept with the processing lights ELk along either one of the X axis direction and the Y axis direction is shorter than a force necessary for moving the second movable apparatus that moves so that the processing target object S is swept with the processing lights ELk along the other one of the X axis direction and the Y axis direction, the processing system SYSi may determine either one of the X axis direction and the Y axis direction as the scan direction.

Moreover, not only the processing system SYSi and the like that is provided with the multibeam optical system 112 but also any processing system that processes the processing target object S to form the riblet structure may allow the scan direction to be parallel to the extending direction of the concave structure CP1. Similarly, any processing system that processes the processing target object S to form the riblet structure may determine the scan direction on the basis of the characteristic of the movable apparatus that moves so that the processing target object S is swept with the processing lights ELk. Namely, the processing system SYSi may not be provided with the multibeam optical system 112. In this case, as described in the third embodiment, the processing system SYSi may be provided with the plurality of light sources 110 in order to irradiate the coat SF of paint with the plurality of processing lights ELk.

The processing system SYSi in the ninth embodiment may be provided with a feature that is unique to at least one of the processing system SYSb in the second embodiment to the processing system SYSh in the eighth embodiment described above. The feature that is unique to the processing system SYSg in the seventh embodiment includes a feature relating to the multibeam optical system 112g. The feature that is unique to the processing system SYSh in the eighth embodiment includes a feature relating to the multibeam optical system 112h.

(10) Processing System SYSj in Tenth Embodiment

Next, a processing system SYS in a tenth embodiment (in the below described description, the processing system SYS in the tenth embodiment is referred to as a "processing system SYSj") will be described.
(10-1) Structure of Processing System SYSi Firstly, a structure of the processing system SYSj in the tenth embodiment will be described. The processing system SYSj in the tenth embodiment is different from the above described processing system SYSa in that it is provided with a light irradiation apparatus 11j instead of the light irradiation apparatus 11. Another feature of the processing system SYSj in the tenth embodiment may be same as another feature of the above described processing system SYSa. Therefore, in the below described description, with reference to FIG. 46, the light irradiation apparatus 11j in the tenth embodiment will be described. FIG. 46 is a cross-sectional view that illustrates a structure of the light irradiation apparatus 11j.

As described above, the light irradiation apparatus 11j is different from the above described light irradiation apparatus 11 in that it is further provided with an enlargement optical system 1181j. Another feature of the optical system 112b may be same as another feature of the optical system 112.

The enlargement optical system 1181j is disposed on the optical path of the plurality of processing lights EL. Thus, in the tenth embodiment, the processing system SYSj irradiates the coat SF of paint with the plurality of processing lights ELk through the enlargement optical system 1181j. FIG. 46 illustrates an example in which the enlargement optical system 1181j is disposed on the optical path of the plurality of processing lights EL between the multibeam optical system 112 and the Galvano mirror 113. However, the enlargement optical system 1181j may be disposed at a position that is different from the position illustrated in FIG. 46.

The enlargement optical system 1181j has a characteristic that makes the characteristic of the processing light ELk with which the coat SF of paint is irradiated through the enlargement optical system 1181j be different from the characteristic of the processing light ELk with which the coat SF of paint is irradiated not through the enlargement optical system 1181j. More specifically, the enlargement optical system 1181j has a characteristic that makes the characteristic of the processing light ELk with which the coat SF of paint is irradiated through the enlargement optical system 1181j and the fθ lens 114 be different from the characteristic of the processing light ELk with which the coat SF of paint is irradiated through the fθ lens 114 not through the enlargement optical system 1181j.

The characteristic of the processing light ELk that is changed by the enlargement optical system 1181j may include a size of a beam cross-section of the processing light ELk at a converged position (namely, a light concentration position) BF at which the processing light ELk is converged most (see FIG. 47A and FIG. 47B described below). Note that the beam cross-section of the processing light ELk means the beam cross-section of the processing light ELk on a plane that intersects with the traveling direction of the processing light ELk (namely, a plane that intersects with the optical axis of the optical system 112b). This beam cross-section is typically a circular shape (including an oval shape), and thus, "a beam diameter φ (see FIG. 47A and FIG. 47B described below)" is used as one example of a parameter that represents the size of the beam cross-section in the below described description. Note that the beam diameter φ here may mean a diameter of an area in which the intensity of the processing light ELk is equal to or higher than a predetermined threshold value in a plane that intersects with the traveling direction of the processing light ELk (namely, a plane that intersects with the optical axis of the optical system 112b). In this case, the enlargement optical system 1181j has a characteristic that makes the beam diameter φ at the converged position BF of the processing light ELk with which the coat SF of paint is irradiated through the enlargement optical system 1181j and the fθ lens 114 be different from the beam diameter φ at the converged position BF of the processing light ELk with which the coat SF of paint is irradiated through the fθ lens 114 not through the enlargement optical system 1181j. In the below described description, the beam diameter φ at the converged position BF of the processing light ELk with which the coat SF of paint is irradiated through the enlargement optical system 1181j and the fθ lens 114 is referred to as "a beam diameter φa". Moreover, the beam diameter φ at the converged position BF of the processing light ELk with which the coat SF of paint is irradiated through the fθ lens 114 not through the enlargement optical system 1181j is referred to as "a beam diameter φb".

Especially in the tenth embodiment, the enlargement optical system 1181j has a characteristic that makes the beam diameter φa be larger than the beam diameter φb. Namely, the enlargement optical system 1181j has a characteristic that makes the beam diameter φ at the converged position BF of the processing light ELk with which the coat SF of paint is irradiated through the enlargement optical system 1181j and the fθ lens 114 be larger than the beam diameter φ at the converged position BF of the processing light ELk with which the coat SF of paint is irradiated through the fθ lens 114 not through the enlargement optical system 1181j. Specifically, as illustrated in FIG. 47A that is a cross-sectional view illustrating the cross-section along the XZ plane of the processing light ELk with which the coat SF of paint is irradiated through the enlargement optical system 1181j with it being associated with a cross-section along the XY plane of the processing light ELk, the beam diameter φa is a first diameter φ1. On the other hand, as illustrated in FIG. 47B that is a cross-sectional view illustrating the cross-section along the XZ plane of the processing light ELk with which the coat SF of paint is irradiated not through the enlargement optical system 1181*j* with it being associated with a cross-section along the XY plane of the processing light ELk, the beam diameter φb is a second diameter φ2 that is shorter than the first diameter φ1. Namely, the enlargement optical system 1181*j* is configured to serve as an optical system that enlarges the beam diameter φ of the processing light ELk at the converged position BF.

The characteristic of the processing light ELk that is changed by the enlargement optical system 1181*j* may include a change rate (especially, a change rate in a direction that is along the traveling direction of the processing light ELk) of the beam diameter φ of the processing light ELk near the converged position BF. Namely, characteristic of the processing light ELk that is changed by the enlargement optical system 1181*j* may include a change rate of the beam diameter φ of the processing light ELk in the direction that is along the traveling direction of the processing light ELk in an area that corresponds to a vicinity of the converged position BF. The area that corresponds to the vicinity of the converged position BF here may mean an area that is included in a range of a depth of focus of the optical system of the light irradiation apparatus 11 (specifically, an optical system that includes the focusing lens 111, the multibeam optical system 112, the Galvano mirror 113, the fθ lens 114 and the enlargement optical system 1181*j*). Namely, the area that corresponds to the vicinity of the converged position BF may mean an area that is irradiated with the processing light ELk having the distribution of the intensity that is allowed to process the coat SF of paint when the coat SF of paint is disposed in that area.

Especially in the tenth embodiment, the enlargement optical system 1181*j* has a characteristic that makes the change rate of the beam diameter φa be shorter than the change rate of the beam diameter φb. Specifically, as illustrated in FIG. 47A and FIG. 47B, the beam diameter φ of the processing light ELk changes to be larger as it is away from the converged position BF along the traveling direction of the processing light ELk (the Z axis direction in an example illustrated in FIG. 47A and FIG. 47B) more. In this case, as illustrated in FIG. 47A, the change rate (in other words, a difference) of the beam diameter φa at a position that is away from the converged position BF by a predetermined distance relative to the beam diameter φa at the converged position BF is relatively small. On the other hand, as illustrated in FIG. 47B, the change rate (in other words, a difference) of the beam diameter φb at a position that is away from the converged position BF by the same predetermined distance relative to the beam diameter φb at the converged position BF is relatively large. Namely, the enlargement optical system 1181*j* is configured to serve as an optical system that reduces the change rate of the beam diameter φ of the processing light ELk near the converged position BF.

The processing system SYSj that has the enlargement optical system 1181*j* described above has a technical effect that it is configured to process the coat SF of paint with a relatively rough degree of fineness by using the processing light ELk having a wavelength that is allowed to process the coat SF of paint with a relatively fine degree of fineness. Next, with reference to FIG. 48A and FIG. 48B, the technical effect that is achievable by the processing system SYSj in the tenth embodiment will be described. FIG. 48A is a cross-sectional view that illustrates an aspect in which a processing system in a comparison example that is not provided with the enlargement optical system 1181*j* processes the coat SF of paint with the relatively rough degree of fineness by using the processing light ELk having the wavelength that is allowed to process the coat SF of paint with toe relatively fine degree of fineness. FIG. 48B is a cross-sectional view that illustrates an aspect in which the processing system SYSj in the tenth embodiment that is provided with the enlargement optical system 1181*j* processes the coat SF of paint with the relatively rough degree of fineness by using the processing light ELk having the wavelength that is allowed to process the coat SF of paint with toe relatively fine degree of fineness.

The processing system in the comparison example that is not provided with the enlargement optical system 1181*j* irradiates the coat SF of paint with the processing light ELk not through the enlargement optical system 1181*j*. Thus, as illustrated in FIG. 25A, the beam diameter φ (namely, the diameter φb) of the processing light ELk at the converged position BF is a relatively small first diameter φ11. The focusing lens 1121 usually adjust the converged position BF of the processing light ELk so that the converged position BF is located the surface of the coat SF of paint (alternatively, near it). In this case, the beam diameter φ of the processing light ELk at the surface of the coat SF of paint is about the first diameter φ11. The coat SF of paint is processable with a finer degree of fineness as the beam diameter φ of the processing light ELk at the surface of the coat SF of paint is shorter. Thus, in this case, it is difficult for the processing system in the comparison example to form the concave structure CP1 having a relative wide width by single irradiation of the processing light ELk (namely, single scan operation). Namely, it is difficult for the processing system in the comparison example to form the concave structure CP1 having the relative wide width by the irradiation of the single processing light ELk having a relatively small beam diameter φ at the surface of the coat SF of paint (namely, single scan operation). Thus, the processing system in the comparison example needs to form the plurality of concave structure CP1 each of which has a relatively narrow width with them being overlapped partially in order to form one concave structure CP1 having a relatively wide width (namely, the concave structure CP1 having a relatively large arrangement pitch P1). Namely, the processing system in the comparison example needs to use the plurality of processing lights ELk, which are expected to be emitted to simultaneously form the plurality of concave structures CP1 each of which has the relative narrow width, respectively, in order to form one concave structure CP1 having the relative wide width. As a result, there is a possibility a time required for processing the coat SF of paint with the relatively rough degree of fineness is relatively long (namely, the throughput deteriorates).

On the other hand, the beam diameter φ of the processing light ELk changes to be larger as it is away from the converged position BF along the traveling direction of the processing light ELk (the Z axis direction in an example illustrated in FIG. 48A and FIG. 48B) more. Thus, even in the processing system in the comparison example, when the driving system 12 moves the light irradiation apparatus 11 so that the coat SF of paint is located at a position DF that is away from the converged position BF along the Z axis direction as illustrated in FIG. 48A, the beam diameter φ of the processing light ELk on the coat SF of paint becomes a second diameter φ12 (note that the second diameter φ12 is larger than the first diameter φ11) that is suitable for forming the concave structure CP1 having the relatively wide width. As a result, it is possible for the processing system in the comparison example to form the concave structure CP1 having the relative wide width by single irradiation of the processing light ELk (namely, single scan operation). However, in this case, as illustrated in FIG. 48A, a range of the depth of focus in which the concave structure CP1 having the relative wide width is formable is relatively narrow. Specifically, as illustrated in FIG. 48A, the range of the depth of focus in which the concave structure CP1 having the relative wide width is formable is limited to a relatively narrow first range DOF#1. This is because the change rate (especially, the change rate along the traveling direction of the processing light ELk) of the beam diameter φ of the processing light ELk near each of the converged position BF and the position DF is relatively large in the processing system in the comparison example. Specifically, when the change rate of the beam diameter φ of the processing light ELk is relatively large, the amount of the energy that is transmitted from the processing light ELk to the coat SF of paint per unit time and/or per unit area decreases relatively largely, even if the coat SF of paint moves by a relatively small moving distance from the position DF along a direction that is away from the converged position BF. As a result, the coat SF of paint does not evaporate by the processing light ELk. Moreover, when the change rate of the beam diameter φ of the processing light ELk is relatively large, the beam diameter φ of the processing light ELk on the surface of the coat SF of paint decreases relatively rapidly, even if the coat SF of paint moves by a relatively small moving distance from the position DF along a direction that is close to the converged position BF. As a result, the beam diameter φ of the processing light ELk on the surface of the coat SF of paint is too small to form the concave structure CP1 having the relatively wide width.

On the other hand, in the tenth embodiment, the coat SF of paint is irradiated with the processing light ELk through the enlargement optical system 1181j. Thus, as illustrated in FIG. 48B, the beam diameter φ (namely, the diameter φa) of the processing light ELk at the converged position BF is larger than the beam diameter φ (namely, the first diameter φ11 illustrated in FIG. 48A) of the processing light ELk, which is emitted by the processing system in the comparison example, at the converged position BF. For example, in the tenth embodiment, the beam diameter φ of the processing light ELk at the converged position BF is enlarged to be a diameter φ12 that is suitable for forming the concave structure CP1 having the relatively wide width. Conversely, the characteristic of the enlargement optical system 1181j is set to be a desired characteristic that allows the beam diameter φ of the processing light ELk at the converged position BF to be enlarged to be the diameter φ12 that is suitable for forming the concave structure CP1 having the relatively wide width.

Furthermore, in the tenth embodiment, the since the coat SF of paint is irradiated with the processing light ELk through the enlargement optical system 1181j, the change rate of the beam diameter φ near the converged position BF is shorter than the change rate of the beam diameter φ of the processing light ELk, which is emitted by the processing system in the comparison example, near the converged position BF. Thus, in the tenth embodiment, the range of the depth of focus in which the concave structure CP1 having the relative wide width is formable is wider than that in the comparison example. Thus, when the coat SF of paint moves from the converged position BF along a direction that is away from the converged position BF, the amount of the energy that is transmitted from the processing light ELk to the coat SF of paint per unit time and/or per unit area decreases relatively mildly (does not decrease rapidly). As a result, there is a low possibility that the coat SF of paint does not evaporate by the processing light ELk. Thus, as illustrated in FIG. 48B, the range of the depth of focus in which the concave structure CP1 having the relative wide width is enlarged to be a second range DOF#2 that is wider than the first range DOF#1 in the comparison example.

As described above, the processing system SYSj in the tenth embodiment is capable of processing the coat SF of paint with the relatively rough degree of fineness by using the processing light ELk having the wavelength that is allowed to process the coat SF of paint with toe relatively fine degree of fineness. Moreover, the processing system SYSj does not excessively narrow the range of the depth of focus in which the concave structure CP1 having the relative wide width. Thus, a resistance to a change of a relative position of the coat SF of paint and the light irradiation apparatus 11 in the Z axis direction becomes stronger. Namely, even when the relative position of the coat SF of paint and the light irradiation apparatus 11 in the Z axis direction is changed, there is a higher possibility that the processing system SYSj processes the coat SF of paint properly. Moreover, the processing system SYSj achieves an effect that is same as the effect that is achievable by the above described processing system SYSa.

(10-2) Specific Example of Enlargement Optical System 1181j

Next, a specific example of the enlargement optical system 1181j will be described.

(10-2-1) First Specific Example of Enlargement Optical System 1181j

The enlargement optical system 1181j may include a soft focus lens (namely, a soft focus lens). The soft focus lens is an optical element that is configured to enlarge the beam diameter φ (namely, the diameter φa) at the converged position BF of the processing light ELk that is through the light irradiation apparatus 11j that is provided with the soft focus lens as the enlargement optical system 118j. compared to the beam diameter φ (namely, the diameter φb) at the converged position BF of the processing light ELk that is through the light irradiation apparatus 11 that is not provided with the soft focus lens as the enlargement optical system 118j. Moreover, the soft focus lens is an optical element that is configured to enlarge the dept of focus the optical system of the light irradiation apparatus 11j that is provided with the soft focus lens as the enlargement optical system 118j. compared to the depth of focus of the optical system of the light irradiation apparatus 11 that is not provided with the soft focus lens as the enlargement optical system 118j. The change rate of the beam diameter φ of the processing light ELk near the converged position BF becomes shorter as the depth of focus of the optical system of the light irradiation apparatus 11 becomes wider, and thus, it can be said that the soft focus lens is an optical element that is configured to make the change rate a of the beam diameter φ be shorter than the change rate of the beam diameter φb. Thus, the soft focus lens is configured to serve as the enlargement optical system 1181j.

The soft focus lens includes a plurality of lenses, for example. The soft focus lens adds, through the plurality of lenses, a longitudinal aberration (typically, a spherical aberration) to the processing light ELk that passes through the plurality of lenses The soft focus lens changes the characteristic 2 of the processing light in the above described manner by adding the longitudinal aberration (typically, the spherical aberration). Note that the soft focus lens is not limited to the one that adds the spherical aberration to the processing light ELk.

(10-2-2) Second Specific Example of Enlargement Optical System 1181j

Considering that the soft focus lens changes the characteristic of the processing light in the above described manner by adding the spherical aberration, the enlargement optical system 1181j may include an aberration addition optical element that adds the spherical aberration to the processing light ELk in addition to or instead of the soft focus lens. Alternatively, the aberration addition optical element may add, to the processing light ELk, an aberration that is rotationally asymmetric about an optical axis of the optical system 112b (especially, an optical element of the enlargement optical system 1181j) in addition to or instead of the spherical aberration. In this case, the aberration addition optical element changes the characteristic of the processing light in the above described manner by adding the spherical aberration, or the aberration that is rotationally asymmetric about the optical axis of the light irradiation apparatus 11j (especially, an optical element of the enlargement optical system 1181j). Thus, a characteristic (especially, a characteristic relating to an addition of the aberration to the processing light ELk) of the aberration addition optical element is set to be a desired characteristic that allows the characteristic of the processing light ELk with which the coat SF of paint is irradiated through the enlargement optical system 1181j that includes the aberration addition optical element to be different from the characteristic of the processing light ELk with which the coat SF of paint is irradiated not through the enlargement optical system 1181j that includes the aberration addition optical element.

(10-2-3) Third Specific Example of Enlargement Optical System 1181j

The enlargement optical system 1181j may include a rough surface optical element in addition to or instead of at least one of the soft focus lens and the aberration addition optical element. The rough surface optical element may be an optical element having a surface at least a part of which is a rough surface. The rough surface optical element may be an optical element having a surface at least a part of which is a scattering surface that is configured to scatter light. The rough surface optical element may be an optical element having a surface on at least a part of which a microscopic concavity and convexity is formed. At least one of a frosted glass, a matte glass, an opal glass and a lemon skin glass is one example of the rough surface optical element. Note that the lemon skin glass is the frosted glass on which an acid processing is performed to smooth the concavity and convexity.

The rough surface optical element substantially diffuses the processing light ELk that enters the rough surface optical element through the surface that is the rough surface, the scattering surface and/or on which the concavity and convexity is formed. The rough surface optical element changes the characteristic of the processing light in the above described manner by diffusing the processing light ELk. Thus, a characteristic (especially, a characteristic relating to a diffusion the processing light ELk) of the rough surface optical element is set to be a desired characteristic that allows the characteristic of the processing light ELk with which the coat SF of paint is irradiated through the enlargement optical system 1181j that includes the rough surface optical element to be different from the characteristic of the processing light ELk with which the coat SF of paint is irradiated not through the enlargement optical system 1181j that includes the rough surface optical element.

(10-2-4) Fourth Specific Example of Enlargement Optical System 1181j

Considering that the rough surface optical element changes the characteristic of the processing light in the above described manner by diffusing the processing light ELk, the enlargement optical system 1181j may include a diffusion optical element that is configured to diffuse the processing light ELk, in addition to or instead of at least one of the soft focus lens, the aberration addition optical element and the rough surface optical element. At least one of a diffusion plate, an opaque white resin and Japanese paper is one example of the diffusion optical element.

The diffusion optical element changes the characteristic of the processing light in the above described manner by diffusing the processing light ELk. Thus, a characteristic (especially, a characteristic relating to a diffusion the processing light ELk) of the diffusion optical element is set to be a desired characteristic that allows the characteristic of the processing light ELk with which the coat SF of paint is irradiated through the enlargement optical system 1181j that includes the diffusion optical element to be different from the characteristic of the processing light ELk with which the coat SF of paint is irradiated not through the enlargement optical system 1181j that includes the diffusion optical element.

(10-3) Substitution of Enlargement Optical System 1181j by Multibeam Optical System 112

As described above, the method of using the plurality of processing lights ELk, which are expected to be emitted to simultaneously form the plurality of concave structures CP1 each of which has the relative narrow width, respectively, in order to form one concave structure CP1 having the relative wide width results in the deterioration of the throughput of the processing system SYSj. However, according to this method, the fact remains that the coat SF of paint is processable with the relatively rough degree of fineness by using the processing light ELk having the wavelength that is allowed to process the coat SF of paint with toe relatively fine degree of fineness. Namely, the processing system SYSj may use the plurality of processing lights ELk, which are expected to be emitted to simultaneously form the plurality of concave structures CP1 each of which has the relative narrow width, respectively, in order to form one concave structure CP1 having the relative wide width.

In this case, the multibeam optical system 112 may make the plurality of processing lights ELk overlap. Specifically, as illustrated in a left part of FIG. 48 that is a cross-sectional view that illustrates an aspect of overlapping the plurality of processing lights ELk, the multibeam optical system 112 makes the plurality of processing lights ELk (the processing lights ELk#1 to ELk#n in an example illustrated in FIG. 49) overlap. As a result, as illustrated in a right part of FIG. 49, the processing light ELkj that is allowed to be regarded as one light by overlapping the plurality of processing lights ELk is emitted from the light irradiation apparatus 11j (especially, the multibeam optical system 112). As a result, the beam diameter φ at the converged position BF of the processing light ELkj emitted from the multibeam optical system 112 is larger than the beam diameter φ at the converged position BF of the processing light ELk emitted from the light source 110. In the example illustrated in FIG. 49, the beam diameter φ at the converged position BF of the processing light ELk emitted from the light source 110 is the above described first diameter φ1 and the beam diameter φ at the converged position BF of the processing light ELkj emitted from the multibeam optical system 112 is the above described second diameter φ2 that is larger than the first diameter φ1.

Incidentally, when the multibeam optical system 112 generates the processing light ELj by making the plurality of processing lights ELk overlap, the light irradiation apparatus 11j may not be provided with the enlargement optical system 1181j. Alternatively, the enlargement optical system 1181j may be provided with a combining optical element that is configured to make the plurality of processing lights ELk, which are emitted from the multibeam optical system 112, overlap. Alternatively, the enlargement optical system 1181j may be used together when the multibeam optical system 112 generates the processing light ELj by making the plurality of processing lights ELk overlap.

However, when the processing light ELj is generated by making the plurality of processing lights ELk overlap, there is a possibility that the change rate of the beam diameter φ of the processing light ELj near the converted position BF is not shorter than the change rate of the beam diameter φ of the processing light ELk near the converted position BF. Thus, when the processing light ELj is generated by making the plurality of processing lights ELk overlap, the light irradiation apparatus 11j may be provided with a change rate adjustment optical element that is configured to allow the change rate of the beam diameter φ of the processing light ELj near the converted position BF to be shorter than the change rate of the beam diameter φ of the processing light ELk near the converted position BF.

A NA (Numerical Aperture) adjustment optical element for adjusting a numerical aperture of the optical system (especially, the multibeam optical system 112 or the enlargement optical system 1181j) of the light irradiation apparatus 11j is one example of the change rate adjustment optical element. The NA adjustment optical element has a characteristic that allows the numerical aperture of the optical system that includes the NA adjustment optical element to be shorter than the numerical aperture of the optical system that does not include the NA adjustment optical element. As a result, as illustrated in FIG. 50 that is a cross-sectional view illustrating the processing light ELj that is emitted to the coat SF of paint from the optical system that includes the NA adjustment optical element and the processing light ELj that is emitted to the coat SF of paint from the optical system that does not include the NA adjustment optical element, the change rate of the beam diameter φ near the converged position BF of the processing light ELj that is emitted to the coat SF of paint from the optical system that includes the NA adjustment optical element is shorter than the change rate of the beam diameter φ near the converged position BF of the processing light ELj that is emitted to the coat SF of paint from the optical system that does not include the NA adjustment optical element.

(10-4) Control of State of Enlargement Optical System 1181j

A state of the enlargement optical system 1181j may be switched between a state in which the enlargement optical system 1181j is located on the optical path of the processing light ELk and a state in which the enlargement optical system 1181j is not located on the optical path of the processing light ELk (namely, a state in which the coat SF of paint is irradiated with the processing light ELk not through the enlargement optical system 1181j). The state in which the enlargement optical system 1181j is located on the optical path of the processing light ELk is equivalent to a state in which the coat SF of paint is irradiated with the processing light ELk through the enlargement optical system 1181j. The state in which the enlargement optical system 1181j is not located on the optical path of the processing light ELk is equivalent to the state in which the coat SF of paint is irradiated with the processing light ELk not through the enlargement optical system 1181j. Thus, it can be said that the state of the enlargement optical system 1181j may be switched between the state in which the coat SF of paint is irradiated with the processing light ELk through the enlargement optical system 1181j and the state in which the coat SF of paint is irradiated with the processing light ELk not through the enlargement optical system 1181j.

In order to switch the state of the enlargement optical system 1181j, the light irradiation apparatus 11j may be provided with a driving system 1182j, as illustrated in FIG. 51 that is a perspective view illustrating another example of the light irradiation apparatus 11j in the tenth embodiment. The driving system 1182j moves the enlargement optical system 1181j under the control of the control apparatus 2. For example, the driving system 1182j moves the enlargement optical system 1181j along a direction of the optical axis of the optical system (especially, the optical axis of the enlargement optical system 1181j) of the light irradiation apparatus 11j. For example, the driving system 1182j moves the enlargement optical system 1181j that is located on the optical path of the processing light ELk until the enlargement optical system 1181j is not located on the optical path of the processing light ELk. For example, the driving system 1182j moves the enlargement optical system 1181j that is not located on the optical path of the processing light ELk until the enlargement optical system 1181j is located on the optical path of the processing light ELk. Namely, the enlargement optical system 1181j may be insertable to and detachable from the optical path of the processing light ELk.

Due to the switching of the state of the enlargement optical system 1181j, a state of the processing system SYSj is switched between a first state in which the coat SF of paint is irradiated with the processing light ELk through the enlargement optical system 1181j and a second state in which the coat SF of paint is irradiated with the processing light ELk not through the enlargement optical system 1181j. The processing system SYSj in the first state is capable of processing the coat SF of paint by using the processing light ELk (see FIG. 48A) the beam diameter φ of which is relatively large near the converged position BF. Namely, the processing system SYSj in the first state is capable of processing the coat SF of paint with the relatively rough degree of fineness. On the other hand, the processing system SYSj in the second state is capable of processing the coat SF of paint by using the processing light ELk (see FIG. 48B) the beam diameter φ of which is relatively small near the converged position BF. Namely, the processing system SYSj in the second state is capable of processing the coat SF of paint with the relatively fine degree of fineness.

Thus, the control apparatus 2 may switch the state of the processing system SYSj (namely, the state of the enlargement optical system 1181j) on the basis of a processing condition of the processing target object S a condition relating to the degree of fineness required for processing the processing target object S. Namely, the control apparatus 2 may switch the state of the processing system SYSj (namely, the state of the enlargement optical system 1181j) on the basis of the processing condition of the coat SF of paint or a coat SF' of paint. For example, when the processing condition of the processing target object S is a first condition #1b, the control apparatus 2 may control the state of the enlargement optical system 1181j so that the state of the processing system SYSj is either one of the first and second states. For example, when the processing condition of the processing target object S is a second condition #2 that is different from the first condition #1b, the control apparatus 2 may control the state of the enlargement optical system 1181j so that the state of the processing system SYSj is the other one of the first and second states. For example, when the degree of fineness required for processing the processing target object S is a first degree of fineness #11b, the control apparatus 2 may control the state of the enlargement optical system 1181j so that the state of the processing system SYSj is either one of the first and second states. For example, when the degree of fineness required for processing the processing target object S is a second degree of fineness #12b that is different from the first degree of fineness #11b, the control apparatus 2 may control the state of the enlargement optical system 1181j so that the state of the processing system SYSj is the other one of the first and second states.

Specifically, for example, when the degree of fineness required for processing the processing target object S is a first degree of fineness #21b, the control apparatus 2 may control the state of the enlargement optical system 1181j so that the state of the processing system SYSj is the first state. For example, when the degree of fineness required for processing the processing target object S is a second degree of fineness #22b that is finer than the first degree of fineness #21b, the control apparatus 2 may control the state of the enlargement optical system 1181j so that the state of the processing system SYSj is the second state. Alternatively, for example, when the degree of fineness required for processing the processing target object S is a first degree of fineness #31b, the control apparatus 2 may control the state of the enlargement optical system 1181j so that the state of the processing system SYSj is the second state. For example, when the degree of fineness required for processing the processing target object S is a second degree of fineness #32b that is rougher than the first degree of fineness #31b, the control apparatus 2 may control the state of the enlargement optical system 1181j so that the state of the processing system SYSj is the first state.

For example, when the concave structure CP1 having a first arrangement pitch P1#11b and/or the convex structure CP2 having a first arrangement pitch P2#11b is formed, the control apparatus 2 may control the state of the enlargement optical system 1181j so that the state of the processing system SYSj is the first state. For example, when the concave structure CP1 having a second arrangement pitch P1#12b that is shorter than the first arrangement pitch P1#11b and/or the convex structure CP2 having a second arrangement pitch P2#12b that is shorter than the first arrangement pitch P2#11b is formed, the control apparatus 2 may control the state of the enlargement optical system 1181j so that the state of the processing system SYSj is the second state. Alternatively, for example, when the concave structure CP1 having a first arrangement pitch P1#21b and/or the convex structure CP2 having a first arrangement pitch P2#21b is formed, the control apparatus 2 may control the state of the enlargement optical system 1181j so that the state of the processing system SYSj is the second state. For example, when the concave structure CP1 having a second arrangement pitch P1#22b that is larger than the first arrangement pitch µl#21b and/or the convex structure CP2 having a second arrangement pitch P2#22b that is larger than the first arrangement pitch P2#21b is formed, the control apparatus 2 may control the state of the enlargement optical system 1181j so that the state of the processing system SYSj is the first state.

For example, when the concave structure CP1 having a first width #111b and/or the convex structure CP2 having a first width #211b is formed, the control apparatus 2 may control the state of the enlargement optical system 1181j so that the state of the processing system SYSj is the first state. For example, when the concave structure CP1 having a second width #112b that is narrower than the first width #111b and/or the convex structure CP2 having a second width #212b that is narrower than the first width #211b is formed, the control apparatus 2 may control the state of the enlargement optical system 1181j so that the state of the processing system SYSj is the second state. Alternatively, for example, when the concave structure CP1 having a first width #121b and/or the convex structure CP2 having a first width #221b is formed, the control apparatus 2 may control the state of the enlargement optical system 1181j so that the state of the processing system SYSj is the second state. For example, when the concave structure CP1 having a second width #122b that is wider than the first width #121b and/or the convex structure CP2 having a second width #222b that is wider than the first width #221b is formed, the control apparatus 2 may control the state of the enlargement optical system 1181j so that the state of the processing system SYSj is the first state.

The processing system SYSj that is configured to switch the state of the enlargement optical system 1181j in this manner is capable of processing the coat SF of paint more properly, compared to the processing system SYSj that is not configured to switch the state of the enlargement optical system 1181j. Specifically, the processing system SYSj is capable of processing the coat SF of paint properly regardless of a magnitude of the degree of fineness required for processing the processing target object S.

Note that the enlargement optical system 1181j may be an afocal optical system. A magnification (an angular magnification when it is the afocal optical system) of the enlargement optical system 1181j may be variable. The enlargement optical system 1181j may be a variable magnification optical system or a zoom optical system. Note that the magnification of the enlargement optical system 1181j is not limited to an enlargement magnification, and may be an equal magnification or a reduction magnification.

Note that not only the processing system SYSj and the like that is provided with the multibeam optical system 112 but also any processing system that processes the processing target object S to form the riblet structure may be provided with the enlargement optical system 1181j. Similarly, any processing system that processes the processing target object S to form the riblet structure may be provided with the driving system 1182j that moves the enlargement optical system 1181j. namely, the processing system SYSj may not be provided with the multibeam optical system 112.

The processing system SYSj in the tenth embodiment may be provided with a feature that is unique to at least one of the processing system SYSb in the second embodiment to the processing system SYSi in the ninth embodiment described above. The feature that is unique to the processing system SYSi in the ninth embodiment includes a feature relating to the determination of the scan direction.

(11) Processing System SYSk in Eleventh Embodiment

Next, a processing system SYS in an eleventh embodiment (in the below described description, the processing system SYS in the eleventh embodiment is referred to as a "processing system SYSk") will be described. The processing system SYSk in the eleventh embodiment may have a structure that is same as that of the above described processing system SYSa. Moreover, the processing system SYSk in the ninth embodiment forms the riblet structure by alternately repeating the scan operation for sweeping the coat SF of paint with the plurality of processing lights ELk along either one of the X axis and the Y axis and the step operation for moving the plurality of irradiation areas EA along the other one of the X axis and the Y axis on the surface of the coat SF of paint by the predetermined amount, as with the above described processing system SYSa. However, the processing system SYSk in the eleventh embodiment is different from the above described processing system SYSa in the following point.

Specifically, in the processing system SYSa, the sweeping directions of the processing light ELk (namely, the moving directions of the target irradiation area EA, the same applies the below described description) by the plurality of scan operations performed in the scan area SCA are same as each other as illustrated in FIG. 11. The sweeping directions of the plurality of processing lights ELk with which the plurality of scan areas SCA set in the processing shot area SA are swept, respectively, are same as each other. The moving directions of the target irradiation area EA in the plurality of scan areas SCA are same as each other. On the other hand, the processing system SYSk in the eleventh embodiment may change the sweeping direction of the processing light ELk by the scan operation. The processing system SYSk may change the moving direction of the target irradiation area EA by the scan operation. Namely, the control apparatus 2 may control the processing apparatus to change the sweeping direction of the processing light ELk by the scan operation during a period when the processing target object S is processed. The control apparatus 2 may control the processing apparatus to change the moving direction of the target irradiation area EA by the scan operation during a period when the processing target object S is processed. Incidentally, in the below described description, the description relating to the moving direction of the target irradiation area EA may be used as the description relating to the sweeping direction of the processing light ELk, because the moving direction of the target irradiation area EA is same as the sweeping direction of the processing light ELk.

When the moving direction of the target irradiation area EA is changed, the processing system SYSk performs, as the scan operation, a scan operation (it is referred to as a "scan operation (+Y)" in the below described description) for moving the target irradiation area EA toward one direction (for example, a direction from the −Y side toward the +Y side, it is referred to as a "+Y direction") on the surface of the coat SF of paint and irradiating the target irradiation area EA with the processing light ELk at a desired timing and a scan operation (it is referred to as a "scan operation (−Y)" in the below described description) for moving the target irradiation area EA toward another direction that is opposite to one direction (for example, a direction from the +Y side toward the −Y side, it is referred to as a "−Y direction") on the surface of the coat SF of paint and irradiating the target irradiation area EA with the processing light ELk at a desired timing. In this case, the processing apparatus 1 perform each of the scan operation (+Y) and the scan operation (−Y) at least one or more time during the period when the processing target object S is processed.

The processing system SYSk may change the moving direction of the target irradiation area EA so that the moving direction of the target irradiation area EA in one scan area SCA of the plurality of scan areas SCA is different from the moving direction of the target irradiation area EA in another scan area SCA of the plurality of scan areas SCA. Specifically, the processing system SYSk performs either one of the scan operation (+Y) and the scan operation (−Y) in one scan area SCA, then performs the step operation, and then performs the other one of the scan operation (+Y) and the scan operation (−Y) in another scan area SCA.

As one example, as illustrated in FIG. 52 that is a plan view that illustrate one example of the moving path of the target irradiation area EA, the processing system SYSk performs the scan operation (+Y) in the scan area SCA#1. As a result, the target irradiation area EA moves in the scan area SCA#1 along the Y axis direction from the −Y side toward the +Y side. In this case, the end part of the scan area SCA#1 at the −Y side is the scan start position SC_start#1 of the scan area SCA#1 and the end part of the scan area SCA#1 at the +Y side is the scan end position SC_end#1 of the scan area SCA#1. The processing system SYSk emits the processing light ELk at a desired timing during a period when the target irradiation area EA moves in the scan area SCA#1. Then, the processing system SYSk performs the step operation in order to perform the scan operation in the scan area SCA#2 that is adjacent to the scan area SCA#1 along the X axis direction. Namely, the processing system SYSk performs the step operation so that the target irradiation areas EA moves from the scan end position SC_end#1 of the scan area SCA#1 to the scan start position SC_start#2 of the scan area SCA#2. In this case, the end part of the scan area SCA#2 at the +Y side is the scan start position SC_start#2 of the scan area SCA#2, because the scan operation (−Y) is performed in the scan area SCA#2. Then, the processing system SYSk performs the scan operation (−Y) in the scan area SCA#2. As a result, the target irradiation area EA moves in the scan area SCA#2 along the Y axis direction from the +Y side toward the −Y side. In this case, the end part of the scan area SCA#2 at the −Y side is the scan end position SC_end#2 of the scan area SCA#2. The processing apparatus 1 emits the processing light ELk at a desired timing during a period when the target irradiation area EA moves in the scan area SCA#2.

In an example illustrated in FIG. 52, a distance from the end part of the scan area SCA#1 at the +Y side that is the scan end position SC_end#1 to the end part of the scan area SCA#2 at the +Y side that is the scan start position SC_start#2 is shorter than a distance from the end part of the scan area SCA#1 at the +Y side to the end part of the scan area SCA#2 at the +Y side (namely, a position that is the scan start position SC_start#2 when the moving direction of the target irradiation area EA is not changed, see FIG. 11). Thus, in the example illustrated in FIG. 52, a moving distance of the target irradiation area EA by the step operation when the moving direction of the target irradiation area EA is changed is shorter than a moving distance (see FIG. 11) of the target irradiation area EA by the step operation when the moving direction of the target irradiation area EA is not changed. As a result, a load of the Galvano mirror 113 that operates to move the target irradiation area EA is reduced For example, the processing system SYSk may change the moving direction of the target irradiation area EA so that the moving direction of the target irradiation area EA in a first part of one scan area SCA is different from the moving direction of the target irradiation area EA in a second part of the same one scan area SCA. In this case, the processing system SYSk performs bot of the scan operation (+Y) and the scan operation (−Y) in one scan area SCA.

As one example, as illustrated in FIG. 53 that is a plan view that illustrate one example of the moving path of the target irradiation area EA, when bot of the scan operation (+Y) and the scan operation (−Y) is performed in one scan area SCA, a plurality of processing areas FA each of which is expected to be actually irradiated with the processing light ELk by each scan operation are set in one scan area SCA. In an example illustrated in FIG. 53, a processing areas FA#1 and FA#2 are set in one scan area SCA. Therefore, in this example, the processing system SYSk performs either one of the scan operation (+Y) and the scan operation (−Y) in the processing area FA#1, then performs the step operation, and then performs the other one of the scan operation (+Y) and the scan operation (−Y) in the processing area FA#2. For example, when the scan operation (+Y) is performed in the processing area FA#1, an end part of the processing area FA#1 at the −Y side is a processing start position F_start#1 of the processing area FA#1 and an end part of the processing area FA#1 at the +Y side is a processing end position F_end#1 of the processing area FA#1. As a result, the target irradiation area EA moves in the processing area FA#1 along the Y axis direction from the −Y side toward the +Y side. The processing system SYSk emits the processing light ELk at a desired timing during a period when the target irradiation area EA moves in the processing area FA#1. Then, the processing system SYSk performs the scan operation (−Y) in the processing area FA#2 that is different from the processing area FA#1. In this case, an end part of the processing area FA#2 at the +Y side is a processing start position F_start#2 of the processing area FA#2 and an end part of the processing area FA#2 at the −Y side is a processing end position F_end#2 of the processing area FA#2. Thus, the processing system SYSk moves the target irradiation area EA along the Y axis direction from the −Y side toward the +Y side so as to move from the processing end position F_end#1 of the processing area FA#1 to the processing start position F_start#2 of the processing area FA#2 by using the Galvano mirror 113. Note that FIG. 53 illustrates the moving path of the target moving area EA as if the target irradiation area EA moves along not only the Y axis direction but also the X axis direction for the illustration, however, the target moving area EA may not move along the X axis direction actually. At this time, the processing system SYSk does not emit the processing light ELk. Note that an operation for moving the target irradiation area EA along the Y axis direction without emitting the processing light ELk is not the step operation, because it is not an operation for moving the target irradiation area EA along at least the X axis direction. In the eleventh embodiment, this operation is referred to as a "scan operation (no irradiation)" for the description. Therefore, in the example illustrated in FIG. 53, it can be said that the processing system SYSk performs the scan operation, then performs the scan operation (no irradiation) without performing the step operation, and then performs the scan operation. Namely, in the example illustrated in FIG. 53, it can be said that the processing system SYSk performs the scan operation again after performs the scan operation (no irradiation) without performing the step operation every time the scan operation is performed. Then, the processing system SYSk performs the scan operation (−Y) in the processing area FA#2. As a result, the target irradiation area EA moves in the processing area FA#2 along the Y axis direction from the +Y side toward the −Y side. The processing system SYSk emits the processing light ELk at a desired timing during a period when the target irradiation area EA moves in the processing area FA#2. When the processing area FA is further included in the scan area SCA, the processing system SYSk repeats the same operation. In this case, the processing apparatus 1 perform each of the scan operation (+Y) and the scan operation (−Y) at least one or more time in the same scan area SCA. After the scan operation for the scan area SCA is completed (namely, a plurality of scan operations that are performed in the plurality of processing areas FA included in the scan area SCA, respectively, are completed), the scan operation is performed in another scan area SCA after the step operation is performed.

Incidentally, even when either one of the scan operation (+Y) and the scan operation (−Y) is performed (namely, the other one of the scan operation (+Y) and the scan operation (−Y) is not performed) in one scan area SCA, the plurality of processing areas FA each of which is expected to be actually irradiated with the processing light ELk by each scan operation may be set in one scan area SCA. For example, as described above, the processing system SYSk emits the processing light ELk at a desired timing during the period when the target irradiation area EA moves in the scan area SCA. Namely, the processing system SYSk emits the processing light ELk at a timing when the target irradiation area EA overlaps with an area of the scan area SCA that should be actually irradiated with the processing light ELk and does not emit the processing light ELk at a timing when the target irradiation area EA does not overlap with the area of the scan area SCA that should be actually irradiated with the processing light ELk. In this case, the area of the scan area SCA that should be actually irradiated with the processing light ELk actually corresponds to the processing area FA. Thus, as illustrated in FIG. 54 that is a plan view illustrating one example of the moving path of the target irradiation area EA, even when either one of the scan operation (+Y) and the scan operation (−Y) is performed in one scan area SCA, the plurality of processing areas FA may be set in one scan area SCA. However, in this case, the moving direction of the target moving area EA in each processing area FA is the same. A flow of the scan operation illustrated in FIG. 54 may be same as a flow of the scan operation illustrated in FIG. 53, except the moving direction of the target moving area EA in each processing area FA is the same.

The control apparatus 2 may set the moving direction of the target irradiation area EA in each scan area SCA to satisfy a predetermined standard. Specifically, the control apparatus 2 may set the moving direction of the target irradiation area EA in each scan area SCA to either one or both of the +Y direction and the −Y direction that satisfies the predetermined standard. In this case, the processing system SYSk performs, in each scan area SCA, either one or both of the +Y direction and the −Y direction that satisfies the predetermined standard.

For example, the control apparatus 2 may set the moving direction of the target irradiation area EA in each scan area SCA to satisfy a step moving distance standard that the moving distance of the target irradiation area EA by the step operation that is performed to perform the scan operation in each scan area SCA is shorter than that in the case where the moving directions of the target irradiation areas EA in the plurality of scan areas SCA are same (see FIG. 11 described above). For example, the control apparatus 2 may set the moving direction of the target irradiation area EA in each scan area SCA to satisfy a step moving distance standard that the moving distance of the target irradiation area EA by the step operation that is performed to perform the scan operation in each scan area SCA is shorter than that in the case where the moving direction of the target irradiation areas EA is not set to satisfy the step moving distance standard. For example, the control apparatus 2 may set the moving direction of the target irradiation area EA in each scan area SCA to satisfy a step moving distance standard that the moving distance of the target irradiation area EA by the step operation that is performed to perform the scan operation in each scan area SCA is minimum.

A time required for the step operation decreases as the moving distance of the target irradiation area EA by the step operation is shorter. Thus, for example, the control apparatus 2 may set the moving direction of the target irradiation area EA in each scan area SCA to satisfy a step moving time standard that the time required for the step operation that is performed to perform the scan operation in each scan area SCA is shorter than that in the case where the moving directions of the target irradiation areas EA in the plurality of scan areas SCA are same. For example, the control apparatus 2 may set the moving direction of the target irradiation area EA in each scan area SCA to satisfy a step moving distance standard that the time required for the step operation that is performed to perform the scan operation in each scan area SCA is shorter than that in the case where the moving direction of the target irradiation areas EA is not set to satisfy the step moving time standard. For example, the control apparatus 2 may set the moving direction of the target irradiation area EA in each scan area SCA to satisfy a step moving time standard that the time required for the step operation that is performed to perform the scan operation in each scan area SCA is minimum.

For example, the control apparatus 2 may set the moving direction of the target irradiation area EA in each scan area SCA to satisfy a scan moving distance standard that the moving distance of the target irradiation area EA by the scan operation that is performed in in each scan area SCA is shorter than that in the case where the moving directions of the target irradiation areas EA in the plurality of scan areas SCA are same. For example, the control apparatus 2 may set the moving direction of the target irradiation area EA in each scan area SCA to satisfy a scan moving distance standard that the moving distance of the target irradiation area EA by the scan operation that is performed in each scan area SCA is shorter than that in the case where the moving direction of the target irradiation areas EA is not set to satisfy the scan moving distance standard. For example, the control apparatus 2 may set the moving direction of the target irradiation area EA in each scan area SCA to satisfy a scan moving distance standard that the moving distance of the target irradiation area EA by the scan operation that is performed in each scan area SCA is minimum.

A time required for the scan operation decreases as the moving distance of the target irradiation area EA by the scan operation is shorter. Thus, for example, the control apparatus 2 may set the moving direction of the target irradiation area EA in each scan area SCA to satisfy a scan moving time standard that the time required for the scan operation that is performed in each scan area SCA is shorter than that in the case where the moving directions of the target irradiation areas EA in the plurality of scan areas SCA are same. For example, the control apparatus 2 may set the moving direction of the target irradiation area EA in each scan area SCA to satisfy a scan moving time standard that the time required for the scan operation that is performed in each scan area SCA is shorter than that in the case where the moving direction of the target irradiation areas EA is not set to satisfy the scan moving time standard. For example, the control apparatus 2 may set the moving direction of the target irradiation area EA in each scan area SCA to satisfy a scan moving time standard that the time required for the scan operation that is performed in each scan area SCA is minimum.

For example, the control apparatus 2 may set the moving direction of the target irradiation area EA in each scan area SCA to satisfy a scan moving distance standard (no irradiation) that the moving distance of the target irradiation area EA by the scan operation (no irradiation) that is performed in in each scan area SCA is shorter than that in the case where the moving directions of the target irradiation areas EA in the plurality of scan areas SCA are same. For example, the control apparatus 2 may set the moving direction of the target irradiation area EA in each scan area SCA to satisfy a scan moving distance standard (no irradiation) that the moving distance of the target irradiation area EA by the scan operation (no irradiation) that is performed in each scan area SCA is shorter than that in the case where the moving direction of the target irradiation areas EA is not set to satisfy the scan moving distance standard (no irradiation). For example, the control apparatus 2 may set the moving direction of the target irradiation area EA in each scan area SCA to satisfy a scan moving distance standard (no irradiation) that the moving distance of the target irradiation area EA by the scan operation (no irradiation) that is performed in each scan area SCA is minimum.

A time required for the scan operation (no irradiation) decreases as the moving distance of the target irradiation area EA by the scan operation (no irradiation) is shorter. Thus, for example, the control apparatus 2 may set the moving direction of the target irradiation area EA in each scan area SCA to satisfy a scan moving time standard (no irradiation) that the time required for the scan operation (no irradiation) that is performed in each scan area SCA is shorter than that in the case where the moving directions of the target irradiation areas EA in the plurality of scan areas SCA are same. For example, the control apparatus 2 may set the moving direction of the target irradiation area EA in each scan area SCA to satisfy a scan moving time standard (no irradiation) that the time required for the scan operation (no irradiation) that is performed in each scan area SCA is shorter than that in the case where the moving direction of the target irradiation areas EA is not set to satisfy the scan moving time standard (no irradiation). For example, the control apparatus 2 may set the moving direction of the target irradiation area EA in each scan area SCA to satisfy a scan moving time standard (no irradiation) that the time required for the scan operation (no irradiation) that is performed in each scan area SCA is minimum.

A time required for processing the processing shot area decreases as the moving distance of the target irradiation area EA is shorter. Thus, the time required for processing the coat SF of paint also decreases. Namely, the throughput relating to the processing of the processing target object S improves.

The control apparatus 2 may set the moving direction of the target irradiation area EA in each scan area SCA at a desired timing. For example, the control apparatus 2 may set the moving direction of the target irradiation area EA in each scan area SCA before starting to process the processing target object S. For example, the control apparatus 2 may set the moving direction of the target irradiation area EA in each scan area SCA after starting to process the processing target object S. For example, the control apparatus 2 may set the moving direction of the target irradiation area EA in each scan area SCA in one processing shot area SA before starting to process the one processing shot area SA. For example, the control apparatus 2 may set the moving direction of the target irradiation area EA in each scan area SCA in one processing shot area SA after starting to process the one processing shot area SA. For example, the control apparatus 2 may set the moving direction of the target irradiation area EA in each scan area SCA before starting to process each scan area SCA.

Next, a specific example of the standard for setting the moving direction of the target irradiation area EA will be described.

(6-1) First Standard

The control apparatus 2 may set the moving direction of the target irradiation area EA to satisfy a first standard that a first standard operation for performing either one of the scan operation (+Y) and the scan operation (−Y), then performing the step operation, then performing the other one of the scan operation (+Y) and the scan operation (−Y) and then performing the step operation is repeated. Namely, the control apparatus 2 may set the moving direction of the target irradiation area EA to satisfy the first standard that an operation for performing either one of the scan operation (+Y) and the scan operation (−Y) in one scan area SCA, then performing the step operation, and then performing the other one of the scan operation (+Y) and the scan operation (−Y) in another scan area SCA is repeated.

FIG. 55 illustrates one example of the moving path of the target irradiation area EA when the moving direction of the target irradiation area EA is set to satisfy the first standard. In an example illustrated in FIG. 55, the processing system SYSk firstly performs the scan operation (+Y) in the scan area SCA#1. Then, the processing system SYSk performs the scan operation (−Y) in the unprocessed scan area SCA#2 that is adjacent to the scan area SCA#1 along the X axis direction after performing the step operation. Then, the processing system SYSk performs the scan operation (+Y) in the unprocessed scan area SCA#3 that is adjacent to the scan area SCA#2 along the X axis direction after performing the step operation. Then, the processing system SYSk performs the scan operation (−Y) in the unprocessed scan area SCA#4 that is adjacent to the scan area SCA#3 along the X axis direction after performing the step operation. Then, the processing system SYSk performs the scan operation (+Y) in the unprocessed scan area SCA#5 that is adjacent to the scan area SCA#4 along the X axis direction after performing the step operation. Then, the processing system SYSk performs the scan operation (−Y) in the unprocessed scan area SCA#6 that is adjacent to the scan area SCA#5 along the X axis direction after performing the step operation.

When the moving direction is set to satisfy the first standard in this manner, the moving distance of the target irradiation area EA by the step operation is shorter than that in the case where the moving directions of the target irradiation areas EA in the plurality of scan areas SCA are same. The reason is that the distance between the scan end position SC_end of one scan area SCA and the scan start position SC_start of one scan area SCA in the case where the moving direction is set to satisfy the first standard is shorter than that in the case where the moving directions of the target irradiation areas EA in the plurality of scan areas SCA are same (see FIG. 9). Therefore, it can be said that the first standard is one example of each of the step moving distance standard and the step moving time standard.

Moreover, it can be said that the first standard is one example of a standard that minimizes the moving distance of the target irradiation area EA by the step operation that is performed to perform the scan operation in each scan area SCA. Namely, it can be said that the first standard is one example of a standard that sets the moving direction of the target irradiation area EA in each scan area SCA to either one direction of the +Y direction and the −Y direction that shortens the moving distance of the target irradiation area EA by the step operation that is performed to perform the scan operation in each scan area SCA. For example, the moving distance of the target irradiation area EA by the step operation that is performed to perform the scan operation in each scan area SCA#2 in the case where the moving direction of the target irradiation area EA in the scan area SCA#2 is the −Y direction (see FIG. 55) is shorter than that in the case where the moving direction of the target irradiation area EA in the scan area SCA#2 is the +Y direction (see FIG. 11). Thus, the control apparatus 2 sets the moving direction of the target irradiation area EA in the scan area SCA#2 to not the +Y direction but the −Y direction.

(6-2) Second Standard

The control apparatus 2 may set the moving direction of the target irradiation area EA to satisfy a second standard that each of the scan operation (+Y) and the scan operation (−Y) is performed at least one or more time during the period when each processing shot area SA is processed. FIG. 56 illustrates one example of the moving path of the target irradiation area EA when the moving direction of the target irradiation area EA is set to satisfy the second standard. In an example illustrated in FIG. 56, the processing system SYSk firstly performs the scan operation (+Y) in the scan area SCA#1. Then, the processing system SYSk performs the scan operation (+Y) in the unprocessed scan area SCA#1 that is adjacent to the scan area SCA#1 along the X axis direction after performing the step operation. Then, the processing system SYSk performs the scan operation (+Y) in the unprocessed scan area SCA#3 that is adjacent to the scan area SCA#2 along the X axis direction after performing the step operation. Then, the processing system SYSk performs the scan operation (−Y) in the unprocessed scan area SCA#4 that is adjacent to the scan area SCA#3 along the X axis direction after performing the step operation. Then, the processing system SYSk performs the scan operation (−Y) in the unprocessed scan area SCA#5 that is adjacent to the scan area SCA#4 along the X axis direction after performing the step operation. Then, the processing system SYSk performs the scan operation (−Y) in the unprocessed scan area SCA#6 that is adjacent to the scan area SCA#5 along the X axis direction after performing the step operation.

The moving distance of the target irradiation area EA the moving direction of which is set to satisfy the second standard in this manner by the step operation is also shorter than that in the case where the moving directions of the target irradiation areas EA in the plurality of scan areas SCA are same. This is because the moving distance of the target irradiation area EA by at least one time step operation (specifically, the step operation that is performed at a timing when the moving direction of the target irradiation area EA is changed, and the step operation that is performed after completing the scan operation in the scan area SCA#3 and before starting the scan operation in the scan area SCA#4) is shorter than the moving distance of the target irradiation area EA (see FIG. 11) by one time step operation that is performed when the moving directions of the target irradiation areas EA in the plurality of scan areas SCA are same. Therefore, it can be said that the second standard is one example of each of the step moving distance standard and the step moving time standard.

(6-3) Third Standard

When single processing area FA is set in each scan area SCA, the control apparatus 2 may set the moving direction of the target irradiation area EA in one processing area FA in one scan area SCA to satisfy a third standard that is determined on the basis of a positional relationship between one processing area FA and the irradiation position of the processing light ELk at a timing when the scan operation in another processing area FA in another scan area SCA, in which the scan operation is performed before one scan area SCA, is completed (namely, the processing end position F_end). Namely, the control apparatus 2 may set the moving direction of the target irradiation area EA in one processing area FA in one scan area SCA to satisfy the third standard that is determined on the basis of a positional relationship between one processing area FA and the irradiation position of the processing light ELk at a timing when the scan operation in another processing area FA in another scan area SCA, which is adjacent to one scan area SCA, is completed (namely, the processing end position F_end).

For example, the control apparatus 2 may set the moving direction of the target irradiation area EA in one processing area FA to satisfy the third standard that is determined on the basis of a positional relationship between the processing end position F_end of another processing area FA and the end part at the +Y side and the end part at the −Y side of one processing area FA. In this case, the third standard may be a standard that the scan operation is started from an end part of the end part at the +Y side and the end part at the −Y side of one processing area FA that is closer to the processing end position F_end of another processing area FA. The third standard may be a standard that one end part of the end part at the +Y side and the end part at the −Y side of one processing area FA that is closer to the processing end position F_end of another processing area FA is set to be the processing start position F_start of one processing area FA and an end part of the end part at the +Y side and the end part at the −Y side of one processing area FA that is farther from the processing end position F_end of another processing area FA is set to be the processing end position F_end of one processing area FA.

Next, with reference to FIG. 57, the moving direction of the target irradiation area EA that is set to satisfy this third standard will be described. FIG. 57 is a plan view that illustrate one example of the moving path of the target irradiation area EA when the moving direction is set to satisfy the third standard.

FIG. 57 illustrates an example in which five scan area SCA#1 to scan area SCA#5 are set in the processing shot area SA and a processing area FA#1 to a processing area FA#5 are set in the scan area SCA#1 to the scan area SCA#5, respectively. In this case, the processing system SYSk firstly performs the scan operation in the scan area SCA#1. In an example illustrated in FIG. 57, the processing system SYSk performs the scan operation (+Y) in the scan area SCA#1. Namely, in the example illustrated in FIG. 57, an end part of the processing area FA#1 at the −Y side is set to be a processing start position F_start#1 of the processing area FA#1 and an end part of the processing area FA#1 at the +Y side is set to be a processing end position F_end#1 of the processing area FA#1.

Then, the processing system SYSk performs the scan operation in the processing area FA#2 in the scan area SCA#2 that is adjacent to the scan area SCA#1 along the X axis direction. In this case, the moving direction of the target irradiation area EA in the scan area SCA#2 (the processing area FA#2) is set in advance to satisfy the third standard that is determined on the basis of a positional relationship between the processing area FA#2 and the irradiation position of the processing light ELk at a timing when the scan operation in the scan area SCA#1 (the processing area FA#1) is completed (namely, the processing end position F_end#1). Specifically, an end part of the processing area FA#2 at the +Y side is closer to the processing end part F_end#1 of the processing area FA#1 than an end part of the processing area FA#2 at the −Y side is. Thus, the end part of the processing area FA#2 at the +Y side is set to be a processing start position F_start#2 of the processing area FA#2 and the end part of the processing area FA#2 at the −Y side is set to be a processing end position F_end#2 of the processing area FA#2. Thus, the moving direction of the target irradiation area EA in the scan area SCA#2 (the processing area FA#2) is set to be the −Y direction. Namely, the moving direction of the target irradiation area EA in the scan area SCA#2 (the processing area FA#2) is set so that the scan operation is started from the end part of the processing area FA#2 at the +Y side.

Thus, the processing system SYSk firstly performs the step operation so that the target irradiation areas EA moves from the processing end position F_end#1 of the processing area FA#1 to the processing start position F_start#2 of the processing area FA#2. Then, the processing system SYSk performs the scan operation (−Y) in the processing area FA#2.

Then, the processing system SYSk performs the scan operation in the processing area FA#3 in the scan area SCA#3 that is adjacent to the scan area SCA#2 along the X axis direction. In this case, an end part of the processing area FA#3 at the +Y side is closer to the processing end part F_end#2 of the processing area FA#2 than an end part of the processing area FA#3 at the −Y side is. Thus, the end part of the processing area FA#3 at the +Y side is set to be a processing start position F_start#3 of the processing area FA#3 and the end part of the processing area FA#3 at the −Y side is set to be a processing end position F_end#3 of the processing area FA#3. The moving direction of the target irradiation area EA in the scan area SCA#3 (the processing area FA#3) is set to be the −Y direction. Thus, the processing system SYSk firstly performs the step operation so that the target irradiation areas EA moves from the processing end position F_end#2 of the processing area FA#2 to the processing start position F_start#3 of the processing area FA#3. Then, the processing system SYSk performs the scan operation (−Y) in the processing area FA#3.

Then, the processing system SYSk performs the scan operation in the processing area FA#4 in the scan area SCA#4 that is adjacent to the scan area SCA#3 along the X axis direction. In this case, an end part of the processing area FA#4 at the −Y side is closer to the processing end part F_end#3 of the processing area FA#3 than an end part of the processing area FA#4 at the +Y side is. Thus, the end part of the processing area FA#4 at the −Y side is set to be a processing start position F_start#4 of the processing area FA#4 and the end part of the processing area FA#4 at the +Y side is set to be a processing end position F_end#4 of the processing area FA#4. The moving direction of the target irradiation area EA in the scan area SCA#4 (the processing area FA#4) is set to be the +Y direction. Thus, the processing system SYSk firstly performs the step operation so that the target irradiation areas EA moves from the processing end position F_end#3 of the processing area FA#3 to the processing start position F_start#4 of the processing area FA#4. Then, the processing system SYSk performs the scan operation (+Y) in the processing area FA#4.

Then, the processing system SYSk performs the scan operation in the processing area FA#5 in the scan area SCA#5 that is adjacent to the scan area SCA#4 along the X axis direction. In this case, an end part of the processing area FA#5 at the +Y side is closer to the processing end part F_end#4 of the processing area FA#4 than an end part of the processing area FA#5 at the −Y side is. Thus, the end part of the processing area FA#5 at the +Y side is set to be a processing start position F_start#5 of the processing area FA#5 and the end part of the processing area FA#5 at the −Y side is set to be a processing end position F_end#5 of the processing area FA#5. The moving direction of the target irradiation area EA in the scan area SCA#5 (the processing area FA#5) is set to be the −Y direction. Thus, the processing system SYSk firstly performs the step operation so that the target irradiation areas EA moves from the processing end position F_end#4 of the processing area FA#4 to the processing start position F_start#5 of the processing area FA#5. Then, the processing system SYSk performs the scan operation (−Y) in the processing area FA#5.

The moving distance of the target irradiation area EA the moving direction of which is set to satisfy the third standard in this manner by the step operation is also shorter than that in the case where the moving directions of the target irradiation areas EA in the plurality of scan areas SCA are same. Therefore, it can be said that the third standard is one example of each of the step moving distance standard and the step moving time standard.

Note that FIG. 58 illustrates the moving path of the target irradiation area EA when the moving direction of the target irradiation area EA in the processing areas FA#1 to FA#5 illustrated in FIG. 57 is set to satisfy the first standard. As can be seen from FIG. 57 and FIG. 58, there is a possibility that the moving distance and the moving time of the target irradiation area EA by the step operation in the case where the moving direction of the target irradiation area EA is set to satisfy the third standard is shorter than the moving distance and the moving time of the target irradiation area EA by the step operation in the case where the moving direction of the target irradiation area EA is set to satisfy the first standard.

However, when each scan area SCA is same as the processing area FA in each scan area SCA (namely, whole of the scan area SCA is the processing are FA), the moving direction of the target irradiation area EA is set to satisfy the third standard may be same as the moving direction of the target irradiation area EA is set to satisfy the first standard.

(6-4) Fourth Standard

When a plurality of processing areas FA are set in one scan area SCA, the control apparatus 2 may set the moving direction of each of each processing area FA to satisfy a third standard that the scan operation is performed in sequence from the processing area FA having an end part that is closest to the irradiation position of the processing light ELk at a timing when a last scan operation is completed and the target irradiation area EA moves, in each processing area FA, from an end part that is closer to the irradiation position of the processing light ELk at the timing when the last scan operation is completed to an end part that is farther from the irradiation position of the processing light ELk at the timing when the last scan operation is completed.

Next, with reference to FIG. 59, the moving direction of the target irradiation area EA that is set to satisfy this fourth standard will be described. FIG. 59 is a plan view that illustrate one example of the moving path of the target irradiation area EA when the moving direction is set to satisfy the fourth standard.

FIG. 59 illustrates an example in which five scan area SCA#1 to scan area SCA#5 are set in the processing shot area SA, a processing area FA#1 to a processing area FA#4 are set in the scan area SCA#1 to the scan area SCA4, respectively, and three processing areas FA#51 to FA#53 are set in the scan area SCA#5. In this case, the processing system SYSk firstly performs the scan operation in the scan area SCA#1. It is assumed that the scan area SCA#1 to scan area SCA4 the processing area FA#1 to the processing area FA#4 are same as the processing area FA#1 to the processing area FA#4 illustrated in FIG. 57. Thus, the description of the scan operation in the scan areas SCA#1 to SCA#4 (the processing areas FA#1 to FA#4) is omitted because it is same as the scan operation illustrated in FIG. 57.

After completing the scan operation in the scan area SCA#4 (the processing area FA#4), the processing system SYSk performs the scan operation in the processing areas FA#51 to FA#53 in the scan area SCA#5 in sequence. Here, an end part at the +Y side of the processing area FA#53 is closer to the processing end position F_end#4 of the processing area FA#4 that is the irradiation position of the processing light ELk at the timing when the last scan operation is completed than an end part at the +Y side and an end part at the −Y side of the processing area F#51, an end part at the +Y side and an end part at the −Y side of the processing area F#52 and an end part at the −Y side of the processing area F#53 are. Thus, in the scan area SCA#5, the scan operation is firstly performed in the processing area FA#53. As described above, the moving direction of the target irradiation area EA in the processing area FA#53 is set in advance to be a direction that is directed from the end part that is closer to the processing end position F_end#4 to an end part that is farther from the processing end position F_end#4. Namely, the end part of the processing area FA#53 at the +Y side is set to be a processing start position F_start#53 of the processing area FA#53 and the end part of the processing area FA#53 at the −Y side is set to be a processing end position F_end#53 of the processing area FA#53. Namely, the moving direction of the target irradiation area EA in the processing area FA#53 is set to be the −Y direction.

Thus, the processing system SYSk firstly performs the step operation so that the target irradiation areas EA moves from the processing end position F_end#4 of the processing area FA#4 to the processing start position F_start#53 of the processing area FA#53. Then, the processing system SYSk performs the scan operation (−Y) in the processing area FA#53.

Then, the processing system SYSk performs the scan operation in the unprocessed processing areas FA#51 to FA#52 in the scan area SCA#5. Here, the end part at the +Y side of the processing area FA#52 is closer to the processing end position F_end#53 of the processing area FA#53 that is the irradiation position of the processing light ELk at the timing when the last scan operation is completed than the end part at the +Y side and an end part at the −Y side of the processing area F#51 and the end part at the −Y side of the processing area F#52. Thus, in the scan area SCA#5, the scan operation is performed in the processing area FA#52 next to the processing area FA#52. As described above, the moving direction of the target irradiation area EA in the processing area FA#52 is set in advance to be a direction that is directed from the end part that is closer to the processing end position F_end#53 to an end part that is farther from the processing end position F_end#53. Namely, the end part of the processing area FA#52 at the +Y side is set to be a processing start position F_start#52 of the processing area FA#52 and the end part of the processing area FA#52 at the −Y side is set to be a processing end position F_end#52 of the processing area FA#52. Namely, the moving direction of the target irradiation area EA in the processing area FA#52 is set to be the −Y direction.

Thus, the processing system SYSk firstly performs the step operation so that the target irradiation areas EA moves from the processing end position F_end#53 of the processing area FA#53 to the processing start position F_start#52 of the processing area FA#52. Then, the processing system SYSk performs the scan operation (−Y) in the processing area FA#52.

Then, the processing system SYSk performs the scan operation in the unprocessed processing areas FA#51 in the scan area SCA#5. The moving direction of the target irradiation area EA in the processing area FA#51 is set in advance to be a direction that is directed from the end part that is closer to the processing end position F_end#52, which is the irradiation position of the processing light ELk at the timing when the last scan operation is completed, to an end part that is farther from the processing end position F_end#52. Namely, the end part of the processing area FA#51 at the +Y side is set to be a processing start position F_start#51 of the processing area FA#51 and the end part of the processing area FA#51 at the −Y side is set to be a processing end position F_end#51 of the processing area FA#51. Namely, the moving direction of the target irradiation area EA in the processing area FA#51 is set to be the −Y direction.

Thus, the processing system SYSk firstly performs the step operation so that the target irradiation areas EA moves from the processing end position F_end#52 of the processing area FA#52 to the processing start position F_start#51 of the processing area FA#51. Then, the processing system SYSk performs the scan operation (−Y) in the processing area FA#51.

The moving distance of the target irradiation area EA the moving direction of which is set to satisfy the fourth standard in this manner by the step operation is also shorter than that in the case where the moving directions of the target irradiation areas EA in the plurality of scan areas SCA are same. Therefore, it can be said that the fourth standard is one example of each of the step moving distance standard and the step moving time standard.

Moreover, when the moving direction of the target irradiation area EA is set to satisfy the fourth standard, there is a possibility that the moving distance of the target irradiation area EA by the scan operation (no irradiation) decreases in some cases. For example, FIG. 60 illustrates the moving path of the target irradiation area EA when the moving direction of the target irradiation area EA in the processing areas FA#1 to FA#4 and FA#51 to FA#53 illustrated in FIG. 59 is set to satisfy the first standard. As can be seen from FIG. 59 and FIG. 60, when the moving direction of the target irradiation area EA is set to satisfy the fourth standard, there is a possibility that the moving distance and the moving time of the target irradiation area EA by the scan operation (no irradiation) that is performed especially in the scan area SCA#5 is shorter than those in the case where the moving direction of the target irradiation area EA is set to satisfy the first standard. Therefore, it can be said that the fourth standard is one example of each of the scan moving distance standard (no irradiation) and the scan moving time standard (no irradiation).

Note that not only the processing system SYSk that is provided with the multibeam optical system 112 but also any processing system that processes the processing target object S to form the riblet structure may align the concave structure CP1 with the scan direction. Similarly, any processing system that processes the processing target object S to form the riblet structure may change the moving direction of the target irradiation area EA. Namely, the processing system SYSk may not be provided with the multibeam optical system 112.

The processing system SYSk in the eleventh embodiment may be provided with a feature that is unique to at least one of the processing system SYSb in the second embodiment to the processing system SYSj in the tenth embodiment described above. The feature that is unique to the processing system SYSj in the tenth embodiment includes a feature relating to the enlargement optical system 1181*j*.

(12) Other Modified Example

In the above described description, the processing system SYS deflects the processing lights ELk by the Galvano mirror 113 in order to sweep the surface of the coat SF of paint with the plurality of processing lights ELk. However, the processing apparatus 1 may sweep the surface of the coat SF of paint with the plurality of processing lights ELk by relatively moving the light irradiation apparatus 11 relative to the coat SF of paint in addition to or instead of deflecting the processing lights ELk by the Galvano mirror 113. Namely, the control apparatus 2 may control the driving system 12 to relatively move the light irradiation apparatus 11 relative to the coat SF of paint so that the surface of the coat SF of paint is swept with the processing lights ELk.

One of a purpose of relatively moving the light irradiation apparatus 11 relative to the coat SF of paint by the driving system 12 is to sweep the surface of the coat SF of paint with the processing lights ELk as described above. Thus, when the sweep of the coat SF of paint with the processing lights ELk is realized without moving the light irradiation apparatus 11, the light irradiation apparatus 11 may not move. Namely, the processing apparatus 1 may not be provided with the driving system 12.

One of the purpose of relatively moving the light irradiation apparatus 11 relative to the coat SF of paint by the driving system 12 is to sweep the plurality of processing shot areas SA with the processing lights ELk in sequence without moving the housing apparatus 13 and the support apparatus 14 when the plurality of processing shot areas SA are housed in the containing space SP of the housing apparatus 13. Thus, when the single processing shot area SA is housed in the containing space SP, the light irradiation apparatus 11 may not move. Namely, the processing system SYS may not be provided with the driving system 12.

In the above described description, the processing apparatus 1 is provided with the housing apparatus 13, the support apparatus14, the driving system 15, the exhaust apparatus 16 and the gas supply apparatus 17. However, the processing apparatus 1 may not be provided with at least one of the housing apparatus 13, the support apparatus14, the driving system 15, the exhaust apparatus 16 and the gas supply apparatus 17, as long as it is configured to process the processing target object S. The processing apparatus 1 may not be provided with at least a part of the housing apparatus 13, the support apparatus14, the driving system 15, the exhaust apparatus 16 and the gas supply apparatus 17, as long as it is configured to process the processing target object S. Moreover, the above described structure of each of the housing apparatus 13, the support apparatus14, the driving system 15, the exhaust apparatus 16 and the gas supply apparatus 17 is merely one example, and the processing apparatus 1 may be provided with at least one of the housing apparatus 13, the support apparatus14, the driving system 15, the exhaust apparatus 16 and the gas supply apparatus 17 having a structure that is different from the above described structure.

In the above described description, the processing system SYS forms the riblet structure of the coat SF of paint on the surface of the processing target object S. However, the processing system SYS may form any structure of the coat SF of paint having any shape on the surface of the processing target object S. Even in this case, any structure having any shape is formable by means of the control apparatus 2 controlling the light irradiation apparatus 11 and so on so that the surface of the coat SF of paint is swept with the processing lights ELk along the sweeping path based on the structure that should be formed. A fine texture structure (typically, a concave and convex structure) that is formed regularly or irregularly in a micro/nano-meter order is one example of any structure. This fine texture structure may include at least one of a shark skin structure or a dimple structure that has a function of reducing a resistance from a fluid (a liquid and/or a gas). The fine texture structure may include a lotus leaf surface structure that has at least one of a liquid repellent function and a self-cleaning function (for example, has a lotus effect). The fine texture structure may include at least one of a fine protrusion structure that has a liquid transporting function (US2017/0044002A1), a concave and convex structure that has a lyophile effect, a concave and convex structure that has an antifouling effect, a moth eye structure that has at least one of a reflectance reduction function and a liquid repellent function, a concave and convex structure that intensifies only light of a specific wavelength by interference to have a structural color, a pillar array structure that has an adhesion function using van der Waals force, a concave and convex structure that has an aerodynamic noise reduction function, a honeycomb structure that has a droplet collection function and so on.

In the above described description, the processing system SYS removes the coat SF of paint by evaporating the coat SF of paint by the irradiation of the processing lights ELk. However, the processing system SYS may remove the coat SF of paint by changing the characteristic of the coat SF of paint by the irradiation of the processing lights ELk, in addition to or instead of evaporating the coat SF of paint by the irradiation of the processing lights ELk. For example, the processing system SYS may remove the coat SF of paint by melting the coat SF of paint by the irradiation of the processing lights ELk and removing the melted coat SF of paint. For example, the processing system SYS may remove the coat SF of paint by making the coat SF of paint brittle by the irradiation of the processing lights ELk and peeling the brittle coat SF of paint. In the above described description, the processing system SYS processes the coat SF of paint formed on the surface of the processing target object S by the ablation. However, the processing system SYS may remove a part of the coat SF of paint formed on the surface of the processing target object S by a heat processing.

In the above described description, the processing system SYS forms the concave part C (alternatively, the concave structure CP1 or any structure by the concave structure CP1 such as the riblet structure) by removing the coat SF of paint. Namely, the processing system SYS processes the coat SF of paint to partially reduce the thickness of the coat SF of paint. However, the processing system SYS may process the coat SF of paint to partially increase the thickness of the coat SF of paint in addition to or instead of partially reducing the thickness of the coat SF of paint. Namely, the processing system SYS may form a convex part (alternatively, the convex structure CP2 or any structure by the convex structure CP2) by adding the coat SF of paint in addition to or instead of forming the concave part C by removing the coat SF of paint. For example, the processing system SYS may irradiate a first part of the coat SF of paint with the processing light ELk to remove the coat SF of paint at the first part and then may fix the removed coat SF of paint at a second part of the coat SF of paint to increase the thickness of the coat SF of paint at the second part (namely, to form the convex part at the second part).

In the above described description, the processing system SYS processes the coat SF of paint formed on the surface of the processing target object S. However, the processing system SYS may process any coat that is other than the coat SF of paint and that is formed on the surface of the processing target object S. Alternatively, the processing system SYS may process a structural object in which a plurality of layers are laminated. Specifically, the processing system SYS may process at least one layer (typically, at least one layer including a layer that is closest to the surface) of the plurality of layers that constitute the structural object. The processing system SYS may process at least one layer of the plurality of layers that constitute the structural object to form a structure of this layer. In this case, at least one layer that is processed corresponds to the above described coat SF of paint and the other layer other than the at least one layer corresponds to the processing target object S. Alternatively, the processing system SYS may process the processing target object S itself. Namely, the processing system SYS may process the processing target object S on the surface of which the coat SF of paint or any coat is not formed.

In the above described description, the processing system SYS forms the riblet structure for reducing the resistance of the surface of the processing target object S to the fluid. However, the processing system SYS may form, on the processing target object S, another structure that is different from the riblet structure for reducing the resistance of the surface to the fluid. For example, the processing system SYS may form, on the processing target object S, a riblet structure for reducing noise generated when the fluid and the surface of the processing target object S relatively move. For example, the processing system SYS may form, on the processing target object S, a structure that generates swirl relative to a flow of the fluid on the surface of the processing target object S. For example, the processing system SYS may form, on the processing target object S, a structure for adding hydrophobic property to the surface of the processing target object S.

In the above described description, the processing system SYS that processes the processing target object S is provided with the multibeam optical system 112 that divides the source light into the plurality of processing lights ELk. However, any apparatus that performs a desired operation by using light (especially, a plurality of lights) may be provided with the above described multibeam optical system (alternatively, the modified example thereof). In this case, any apparatus may perform the desired operation by using the plurality of lights (namely, the plurality of processing lights ELk) emitted from the multibeam optical system 112. Note that at least one of a measurement apparatus that measures a characteristic of a measurement target object by irradiating the measurement target object with the light and an exposure apparatus that exposes an exposure target object (for example, a substrate on which a resist is coated) by irradiating the exposure target object with the light is one example of the apparatus.

In the above described description, the plurality of scan areas SCA do not overlap with each other, however, the plurality of scan areas SCA may overlap with each other. FIG. 61 illustrates the scan areas SCA#1 and SCA#2 that are set in the processing shot area SA and that overlap with each other. Each scan area SCA is an area that is swept by the plurality of processing lights ELk that are emitted by one scan operation (namely, a series of scan operation without performing the step operation). Each scan area SCA is an area in which the plurality of target irradiation areas EA move by one scan operation. In this case, target irradiation areas EA move from the scan start position SC_start to the scan end position SC_end in each scan area SCA by one scan operation. This scan area SCA is typically an area that extends along the Y axis direction (namely, the sweeping direction of the plurality of processing lights ELk). The plurality of scan areas SCA are arranged along the X axis direction (namely, the direction that intersects with the sweeping direction of the plurality of processing lights ELk).

In this case, the processing system starts the scan operation at one scan area SCA, which is located at the most +X side or the most −X side, of the plurality of scan areas SCA set in a certain processing shot area SA, for example. For example, FIG. 61 illustrates an example in which the processing system SYS starts the scan operation at the scan area SCA#1 that is located at the most −X side.

After the scan operation in the scan area SCA#1 is completed, the processing system performs the step operation in order to perform the scan operation in the scan area SCA#2 that partially overlaps with the scan area SCA#1. Specifically, the control apparatus 2 controls the Galvano mirror 113 so that the scan start position SC_start#2 of the scan area SCA#2 (for example, the end part at the −Y side or the neighborhood thereof in the scan area SCA#2) that is adjacent to the scan area SCA#1 along the X axis direction is irradiated with the processing lights ELk. In this case, the control apparatus 2 sets the target irradiation areas EA at the scan start position SC_start#2 of the scan area SCA#2 so that the scan area SCA#2 partially overlaps with the scan area SCA#2 partially along a direction (typically, the X axis direction) that intersects with the scan direction (the Y axis direction).

As described above, a state where at least two of the plurality of target irradiation areas EA partially overlap includes a state where at least two of the plurality of target irradiation areas EA overlap simultaneously and a state where at least two of the plurality of target irradiation areas EA overlap with a time difference (namely, at least two of the plurality of target irradiation areas EA are located at the partially same positions with a time difference).

Note that the scan area SCA#1 may overlap with the scan area SCA#2 thoroughly along the direction (typically, the X axis direction) that intersects with the scan direction (the Y axis direction).

Moreover, when the light source 110 emits the pulsed light as the source light ELo, one pulsed light and another pulsed light of the plurality of pulsed lights may overlap on the coat SF of paint. In other words, the target irradiation area EA to which one pulsed light of the plurality of pulsed lights is directed may overlap with the target irradiation area EA to which another pulsed light is directed. Here, a state of the overlap between the plurality of target irradiation areas EA by the different pulsed lights may be changed.

Figure 62A:
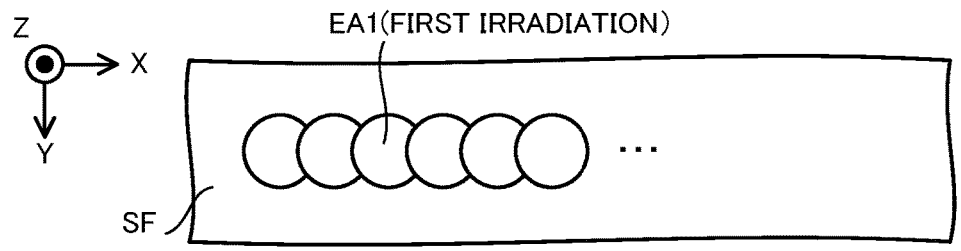
Figure 62B:
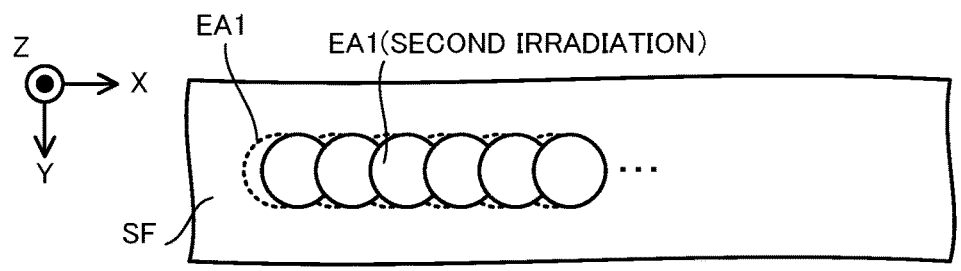
Figure 62C:
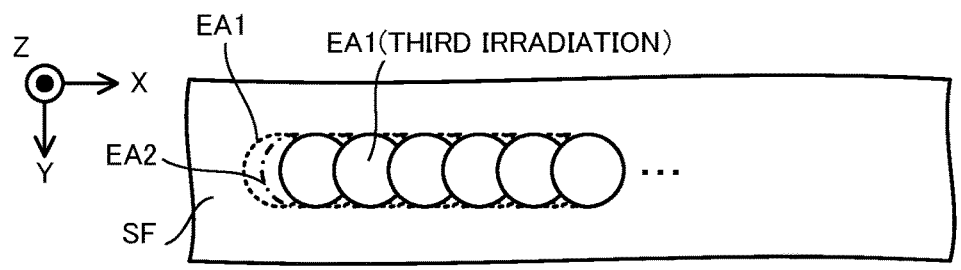
Figure 62D:
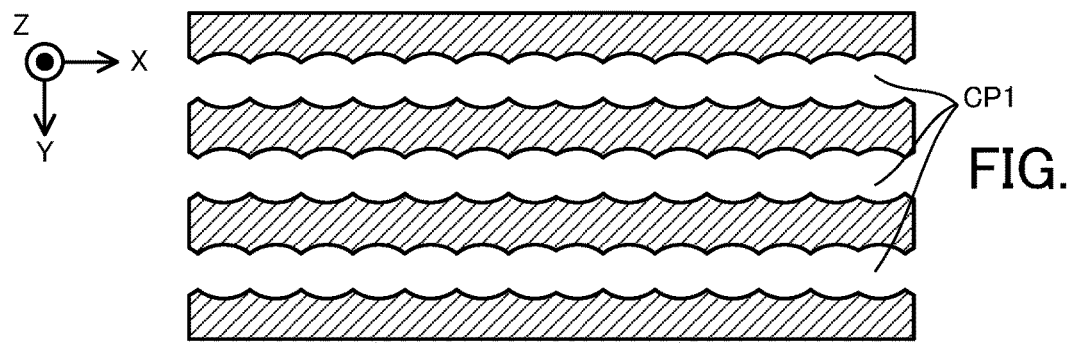
Figure 62E:
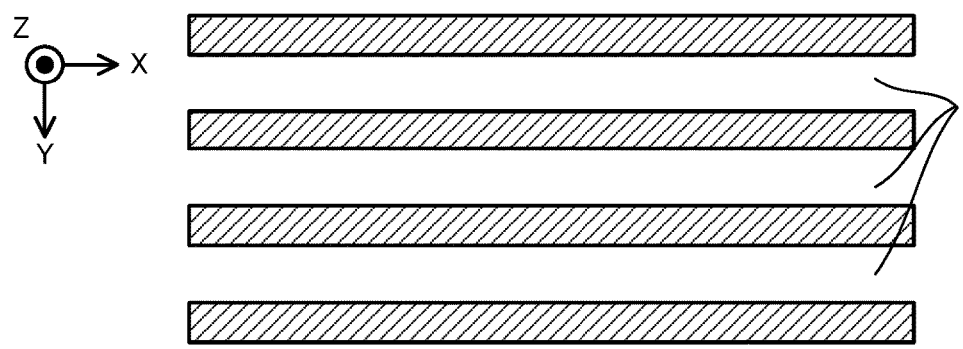

Moreover, one scan area may be scanned (swept) by the plurality of scan operations. In this case, when the light source 110 emits the pulsed light, as illustrated in FIG. 62A to FIG. 62C, a target irradiation area EA1 by the first processing light ELk, a target irradiation area EA2 by the second processing light ELk and a target irradiation area EA3 by the third processing light ELk may be set at respective one of positions that are different from each other. Particularly, the target irradiation area EA1 by the first processing light ELk, the target irradiation area EA2 by the second processing light ELk and the target irradiation area EA3 by the third processing light ELk may be different from each other in the scan direction. In other words, when the target irradiation area EA is scanned a plurality of times, a position of the target irradiation area EA for each time may be changed in the scan direction. Note that the position of the target irradiation area EA for each time may be same in the scan direction when the target irradiation area EA is scanned a plurality of times. By this, it is possible to smooth a roughness of a side surface of the concave part CP1 (see FIG. 62E) that is formed when all of the target irradiation areas EA1 to EA3 are set at the different positions.

In the above described description, sizes of the plurality of target irradiation areas EA on the coat SF of paint are the same. However, as illustrated in FIG. 63A, the sizes of the plurality of target irradiation areas EA may be different from each other. moreover, in the above described description, condensed positions of the plurality of processing lights ELk in the optical axis direction (the Z axis direction) are the same. However, as illustrated in FIG. 63B, a position of a plane CS on which one processing light ELk in the optical axis direction (the Z axis direction) is condensed may be different from a position at which another processing light ELk is condensed.

In the above described description, the shape of the cross-section of the riblet formed by the irradiation of the processing light ELk is a U-shape. However, the shape of the cross-section of the riblet may be any shape. For example, as illustrated in FIG. 64A, the shape of the cross-section of the riblet may be a shape that includes the concave part CP1 having an inverted-trapezoidal shape and the convex part CP2 having a trapezoidal shape. For example, as illustrated in FIG. 64B, the shape of the cross-section of the riblet may be a shape that includes the concave part CP1 having an inverted-triangular shape and the convex part CP2 having a triangular shape. For example, as illustrated in FIG. 64C, the shape of the cross-section of the riblet may be a shape that includes the concave part CP1 having an inverted-trapezoidal shape and the convex part CP2 having a triangular shape. This shape may be realized by changing the state of the overlap between the plurality of processing lights ELk.

Figure 65A:
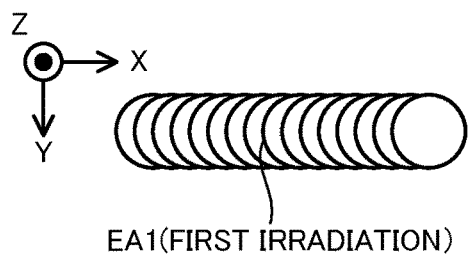
Figure 65B:
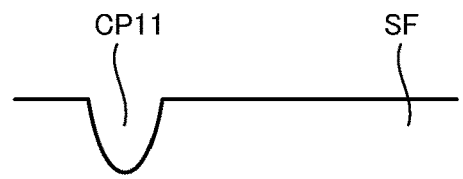
Figure 65C:
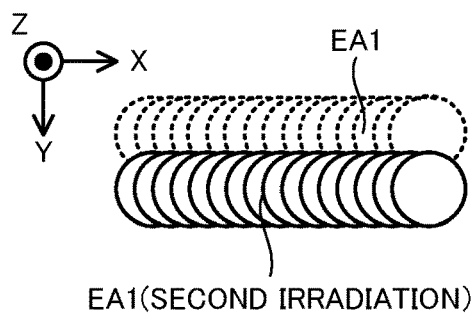
Figure 65D:
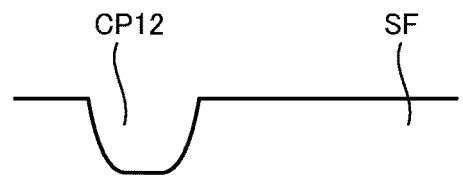

In the above described description, when the target irradiation area EA is scanned a plurality of times, the position of the target irradiation area EA for each time may be changed in the scan direction. However, when the target irradiation area EA is scanned a plurality of times, the position of the target irradiation area EA for each time may be changed in a direction that intersects with the scan direction on the coat SF of paint (the processing target object S). It will be described by using FIG. 65A to FIG. 65H. FIG. 65A is a diagram that illustrates a state where the target irradiation area EA1 is scanned (swept) in the scan direction (a lateral direction in drawing) by the first processing light ELk. The concave part CP11 illustrated in FIG. 65B is formed at the coat SF of paint by the scanning of the target irradiation area EA1. Then, as illustrated in FIG. 65C, when the target irradiation area EA2 is scanned (swept) relative to the sweeping path by of the first target irradiation area EA1 so that it partially overlaps with the target irradiation area EA1 in the direction on the coat SF of paint that intersects with the scan direction, a concave part FCP12 that is wider than the concave part CP11 is formed as illustrated in FIG. 65D.

Figure 65E:
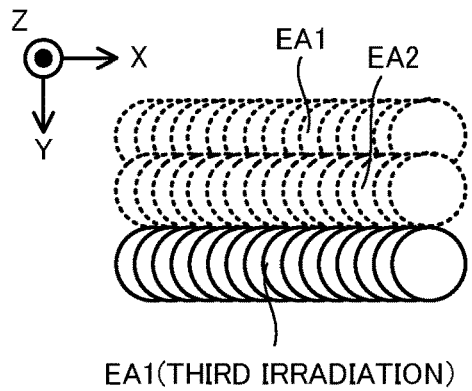
Figure 65F:
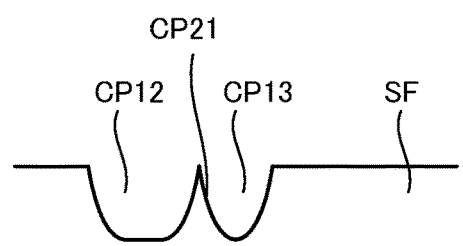
Figure 65G:
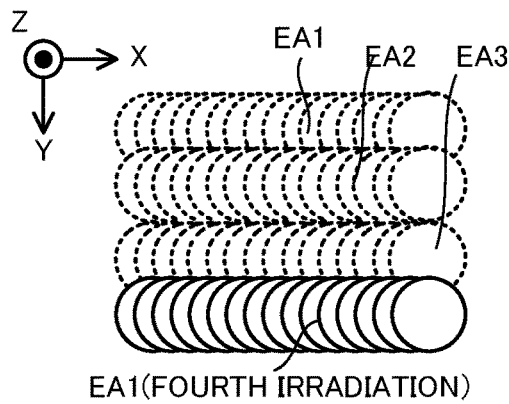
Figure 65H:
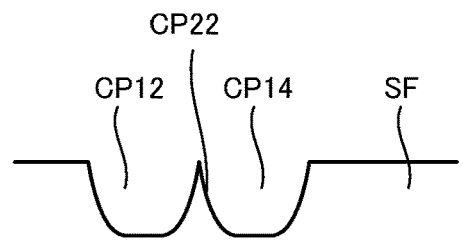

Then, as illustrated in FIG. 65E, when the target irradiation area EA3 is scanned (swept) relative to the sweeping path by of the second target irradiation area EA2 so that it is adjacent to (does not overlap with) the target irradiation area EA2 in the direction on the coat SF of paint that intersects with the scan direction, a concave part CP13 is formed next to the concave part CP12 and a convex part CP21 is formed between the concave part CP12 and the concave part CP13 as illustrated in FIG. 25F. Then, as illustrated in FIG. 65G, when the target irradiation area EA4 is scanned (swept) relative to the sweeping path by of the third target irradiation area EA3 so that it partially overlaps with the target irradiation area EA3 in the direction on the coat SF of paint that intersects with the scan direction, a concave part FCP22 that is wider than the concave part CP21 is formed as illustrated in FIG. 65H.

Note that the target irradiation areas EA1 to EA4 are scanned non-simultaneously in the example illustrated in FIG. 65A to FIG. 65H, however, the target irradiation areas EA1 to EA4 may be scanned simultaneously.

(13) Supplementary Note

Regarding the above described embodiment, below described supplementary notes are further disclosed.

Supplementary Note 1

A processing apparatus that irradiates an object with processing light to process an object,
the processing apparatus comprising:
a first optical system that divides incident light into first light and second light;
a second optical system that returns the first light, which is from the first optical system, to the first optical system as third light; and
a third optical system that returns the second light, which is from the first optical system, to the first optical system as fourth light,
the first optical system emitting the third light from the second optical system and the fourth light from the third optical system as a plurality of processing lights with which different positions on a surface of the object area irradiated, respectively.

Supplementary Note 2

The processing system according to the supplementary note 1, wherein
an axis that is along a traveling direction of the third light emitted from the first optical system intersects with an axis that is along a traveling direction of the fourth light emitted from the first optical system.

Supplementary Note 3

A processing apparatus that irradiates an object with processing light to process an object,
the processing apparatus comprising:
a first optical system that divides incident light into first light and second light;
a second optical system that returns the first light, which is from the first optical system, to the first optical system as third light; and
a third optical system that returns the second light, which is from the first optical system, to the first optical system as fourth light,
the first optical system emitting the third light from the second optical system and the fourth light from the third optical system as a plurality of processing lights,
an axis that is along a traveling direction of the third light emitted from the first optical system intersecting with an axis that is along a traveling direction of the fourth light emitted from the first optical system.

Supplementary Note 4

The processing system according to any one of the supplementary notes 1 to 3 further comprising an optical system that reflects and/or refracts at least one of the first light to the fourth light so that an axis that is along a traveling direction of the third light emitted from the first optical system intersects with an axis that is along a traveling direction of the fourth light emitted from the first optical system Supplementary Note 5

The processing system according to any one of the supplementary notes 1 to 4 further comprising an intersecting angle change apparatus that changes an intersecting angle at which an axis that is along a traveling direction of the third light emitted from the first optical system intersects with an axis that is along a traveling direction of the fourth light emitted from the first optical system.

Supplementary Note 6

The processing system according to the supplementary note 5 changing a relative positional relationship between irradiation positions of the plurality of processing lights on a surface of the object by changing the intersecting angle by using the intersecting angle change apparatus.

Supplementary Note 7

The processing system according to any one of the supplementary notes 1 to 6 further comprising an irradiation position change apparatus that changes a relative positional relationship between irradiation positions of the plurality of processing lights on a surface of the object so that a desired pattern structure is formed at the object.

Supplementary Note 8

The processing system according to the supplementary note 7, wherein the pattern structure includes a periodical structure in which a plurality of concave structures or convex structures extending in one direction are arranged along another direction that intersects with the one direction,
the irradiation position changes apparatus changes the relative positional relationship between the irradiation positions of the plurality of processing lights on the surface of the object on the basis of at least one of a height of at least one of the concave structure or the convex structure in a direction that intersects with the surface of the object, a width of at least one of the concave structure or the convex structure in a direction that is along the surface of the object, a shape of a cross-section of at least one of the concave structure or the convex structure including an axis that intersects with the surface of the object and an arrangement pitch of at least one of the concave structure or the convex structure.

Supplementary Note 9

The processing system according to the supplementary note 8, wherein
the irradiation position changes apparatus changes the relative positional relationship between the irradiation positions of the plurality of processing lights in the one direction.

Supplementary Note 10

The processing system according to the supplementary note 9 changing the relative positional relationship between the irradiation positions of the plurality of processing lights by using the irradiation position change apparatus to form the same concave structure or convex structure by at least two processing lights of the plurality of processing lights.

Supplementary Note 11

The processing system according to the supplementary note 10 making the irradiation positions of at least two processing lights of the plurality of processing lights overlap at least partially on the surface of the object by using the irradiation position change apparatus to form the same concave structure or convex structure by the at least two processing lights.

Supplementary Note 12

The processing system according to any one of the supplementary notes 7 to 11, wherein
the irradiation position change apparatus changes the relative positional relationship between the irradiation positions of the plurality of processing lights so that the irradiation positions of at least two processing lights of the plurality of processing lights overlap at least partially on the surface of the object.

Supplementary Note 13

The processing system according to any one of the supplementary notes 1 to 12, wherein
the first optical system has a first optical surface that reflects a light component of the incident light in a first state and that allows a light component of the incident light in a second state different from the first state to pass therethrough, and divides the incident light into the first light in the first state and the second light in the second state by using the first optical surface,
the second optical system converts the first light from the first optical system into light in the second state and returns the converted light to the first optical surface as the third light,
the third optical system converts the second light from the first optical system into light in the first state and returns the converted light to the first optical surface as the fourth light,
the first optical system emits the third light from the second optical system that passes through the first optical surface and the fourth light from the third optical system that is reflected by the first optical surface as the plurality of processing lights.

Supplementary Note 14

A processing apparatus that irradiates an object with processing light to process an object,
the processing apparatus comprising:
a first optical system that has a first optical surface that reflects first light of incident light in a first state and allows a second light of the incident light in a second state different from the first state to pass therethrough;
a second optical system that converts the first light from the first optical system into third light in the second state and returns the third light to the first optical surface; and
a third optical system converts the second light from the first optical system into fourth light in the first state and returns the fourth light to the first optical surface,
the first optical system emitting the third light from the second optical system that passes through the first optical surface and the fourth light from the third optical system that is reflected by the first optical surface as the plurality of processing lights with which different positions on a surface of the object area irradiated, respectively.

Supplementary Note 15

The processing system according to the supplementary note 13 or 14, wherein
the first state includes a state that is either one of s polarized light and p polarized light,
the second state includes a state that is the other one of s polarized light and p polarized light.

Supplementary Note 16

The processing system according to the supplementary note 15, wherein
the first optical system includes a polarized beam splitter,
the second optical system includes a first reflective optical element having a first reflective surface that reflects light and a first ¼ wavelength plate that is disposed on an optical path between the first optical surface and the first reflective surface,
the third optical system includes a second reflective optical element having a second reflective surface that reflects light and a second ¼ wavelength plate that is disposed on an optical path between the second optical surface and the second reflective surface.

Supplementary Note 17

The processing system according to the supplementary note 16, wherein
a first incident angle of light from the first optical system relative to the first reflective surface is different from a second incident angle of light from the first optical system relative to the second reflective surface.

Supplementary Note 18

The processing system according to the supplementary note 16 or 17 further comprising an incident angle change apparatus that changes at least one of a first incident angle of light from the first optical system relative to the first reflective surface and a second incident angle of light from the first optical system relative to the second reflective surface.

Supplementary Note 19

The processing system according to the supplementary note 18 changing at least one of the first and second incident angles by using the incident angle change apparatus to change an intersecting angle at which an axis that is along a traveling direction of the third light emitted from the first optical system intersects with an axis that is along a traveling direction of the fourth light emitted from the first optical system.

Supplementary Note 20

The processing system according to the supplementary note 18 or 19 changing at least one of the first and second incident angles by using the incident angle change apparatus to change a relative positional relationship between irradiation positions of the plurality of processing lights on a surface of the object.

Supplementary Note 21

The processing system according to any one of the supplementary notes 18 to 20, wherein
the incident angle change apparatus changes at least one of the first and second incident angles by moving at least one of the first and second reflective surfaces.

Supplementary Note 22

The processing system according to any one of the supplementary notes 1 to 21 further comprising:
a fourth optical system that condenses the plurality of processing lights emitted from the first optical system on a surface of the object; and
a fifth optical system that is disposed on an optical path of the plurality of processing lights between the first optical system and the fourth optical system, wherein
when the fifth optical system is disposed, a distance between a plurality of areas through which the plurality of processing lights pass, respectively, on a pupil plane of the fourth optical system, compared to a case where the fifth optical system is not disposed.

Supplementary Note 23

The processing system according to the supplementary note 22, wherein
a focal plane at an emission side of the fifth optical system is set at an incident plane of the fourth optical system.

Supplementary Note 24

The processing system according to the supplementary note 22 or 23, wherein
the fourth optical system includes a Galvano mirror and a fθ lens,
the focal plane at the emission side of the fifth optical system is set at an incident surface of the fθ lens Supplementary Note 25

The processing system according to any one of the supplementary notes 1 to 25 comprising a first optical unit and a second optical unit each of which has the first, second and third optical systems,
each of the plurality of processing lights emitted from the first optical unit enters the second optical unit as the incident light.

Supplementary Note 26

The processing system according to the supplementary note 25 further comprising, on an optical path between the first optical unit and the second optical unit, a conversion optical element that changes polarized states of the plurality of processing lights emitted from the first optical unit.

Supplementary Note 27

The processing system according to the supplementary note 26, wherein
the conversion optical element includes a wavelength plate.

Supplementary Note 28

The processing system according to any one of the supplementary notes 25 to 27, wherein
an intersecting angle at which an axis that is along a traveling direction of the third light emitted from the first optical unit intersects with an axis that is along a traveling direction of the fourth light emitted from the first optical unit is shorter than an intersecting angle at which an axis that is along a traveling direction of the third light emitted from the second optical unit intersects with an axis that is along a traveling direction of the fourth light emitted from the second optical unit.

Supplementary Note 29

The processing system according to any one of the supplementary notes 1 to 28 further comprising an adjustment apparatus that adjusts an intensity of at least one of the plurality of processing lights emitted from the first optical system.

Supplementary Note 30

The processing system according to the supplementary note 29, wherein
the adjustment apparatus adjusts the intensities of the plurality of processing lights so that the intensities of the plurality of processing lights emitted from the first optical system equalize.

Supplementary Note 31

The processing system according to the supplementary note 29, wherein
the adjustment apparatus adjusts the intensities of the plurality of processing lights so that the intensities of the plurality of processing lights emitted from the first optical system differ.

Supplementary Note 32

The processing system according to any one of the supplementary notes 29 to 31, wherein
the adjustment apparatus includes a passing optical system through which the incident angle passes before entering the first optical system.

Supplementary Note 33

The processing system according to the supplementary note 32, wherein
the passing optical system includes a wavelength plate.

Supplementary Note 34

The processing system according to the supplementary note 33, wherein
the adjustment apparatus includes a detection apparatus that detects intensities of the first and second lights from the first optical system and driving apparatus that rotationally drives the wavelength plate around an axis that is along a traveling direction of the incident light on the basis of a detected result.

Supplementary Note 35

The processing system according to the supplementary note 34, wherein
the driving apparatus rotationally drives the wavelength plate on the basis of the detected result so that a direction of an optical axis of the wavelength plate in a plane that intersects with a traveling direction of the incident light is a desired direction that allows an intensity of the third light emitted from the first optical system as the processing light to be a first desired intensity and that allows an intensity of the fourth light emitted from the first optical system as the processing light to be a second desired intensity.

Supplementary Note 36

The processing system according to any one of the supplementary notes 32 to 35, wherein
the passing optical system includes:
a sixth optical system that divides the incident light, which is not yet enters the first optical system, into a fifth light and a sixth light;
a seventh optical system that returns the fifth light, which is from the sixth optical system, to the sixth optical system as seventh light; and
an eighth optical system that returns the sixth light, which is from the sixth optical system, to the first optical system as eighth light,
wherein
the sixth optical system emits, as the incident light that enters the first optical system, light obtained by combining the seventh light from the seventh optical system and the eighth light from the eighth optical system,
an axis that is along a traveling direction of the seventh light from the seventh optical system is parallel to an axis that is along a traveling direction of the eighth light from the eighth optical system.

Supplementary Note 37

The processing system according to the supplementary note 36, wherein
the sixth optical system has a second optical surface that reflects a light component of the incident light, which is not yet enters the first optical system, in a first state and that allows a light component of the incident light in a second state different from the first state to pass therethrough, and divides the incident light, which is not yet enters the first optical system, into the fifth light in the first state and the sixth light in the second state by using the second optical surface,
the seventh optical system converts the fifth light from the sixth optical system into light in the second state and returns the converted light to the second optical surface as the seventh light,
the eighth optical system converts the sixth light from the sixth optical system into light in the first state and returns the converted light to the second optical surface as the eighth light,
the sixth optical system merges the seventh light from the seventh optical system and the eighth light from the eighth optical system through the second optical surface to emit it as the incident light that enters the first optical system.

Supplementary Note 38

The processing system according to the supplementary note 37, wherein
the first state includes a state that is either one of s polarized light and p polarized light,
the second state includes a state that is the other one of s polarized light and p polarized light.

Supplementary Note 39

The processing system according to the supplementary note 37 or 38, wherein
the sixth optical system includes a polarized beam splitter,
the seventh optical system includes a third reflective optical element having a third reflective surface that reflects light and a third ¼ wavelength plate that is disposed on an optical path between the second optical surface and the third reflective surface,
the eighth optical system includes a fourth reflective optical element having a fourth reflective surface that reflects light and a fourth ¼ wavelength plate that is disposed on an optical path between the second optical surface and the fourth reflective surface.

Supplementary Note 40

The processing system according to any one of the supplementary notes 1 to 39 further comprising a ninth optical system that returns the plurality of processing lights emitted, which is from the first optical system, to the first optical system as a plurality of incident lights, respectively.

Supplementary Note 41

The processing system according to the supplementary note 40, wherein
the ninth optical system changes a polarized state of each of the plurality of processing lights emitted from the first optical system and returns the light the polarized state of which is already changed to the first optical system as the incident light.

Supplementary Note 42

The processing system according to the supplementary note 40 or 41, wherein
the ninth optical system includes a fifth reflective optical element having a fifth reflective surface that reflects light and a wavelength plate that is disposed on an optical path between the first optical surface and the fifth reflective surface.

Supplementary Note 43

The processing system according to the supplementary note 42, wherein
the wavelength plate has a characteristic by which the polarized state of each of the plurality of processing lights emitted from the first optical system is changed and the light the polarized state of which is already changed is returned to the first optical system as the incident light.

Supplementary Note 44

The processing system according to the supplementary note 40 or 41, wherein
the ninth optical system includes a fifth reflective optical element that has a fifth reflective surface reflecting light and that has such a positional relationship that an optical axis of which intersects with a polarized plane of the plurality of processing lights emitted from the first optical system.

Supplementary Note 45

The processing system according to the supplementary note 44, wherein
the optical axis of the fifth reflective optical element has such a positional relationship that it intersects with the polarized plane of the plurality of processing lights emitted from the first optical system by an angle of 22.5 degree.

Supplementary Note 46

The processing system according to any one of the supplementary notes 40 to 45, wherein
the first optical system divides a first incident light into a plurality of first processing lights and emits them to the ninth optical system,
the ninth optical system returns the plurality of first processing lights to the first optical system as a plurality of second incident lights,
the first optical system divides each of the plurality of second incident lights into a plurality of second processing lights and emits them,
an optical path during a period when the first incident light is divided into the plurality of first processing lights is optically separated from an optical path during a period when the plurality of second incident lights are divided into the plurality of second processing lights in the first optical system.

Supplementary Note 47

The processing system according to any one of the supplementary notes 40 to 46, wherein
the second optical system has an optical element that is disposed on a first optical path during the period when the first incident light is divided into the plurality of first processing lights and that returns the first light to the first optical system as the third light on the first optical path and an optical element that is disposed on a second optical path during the period when the plurality of second incident lights are divided into the plurality of second processing lights and that returns the first light to the first optical system as the third light on the second optical path.

Supplementary Note 48

The processing system according to any one of the supplementary notes 40 to 46, wherein
the second optical system has an optical element that is disposed on a first optical path during the period when the first incident light is divided into the plurality of first processing lights and that returns the first light to the first optical system as the third light on the first optical path, and that is disposed on a second optical path during the period when the plurality of second incident lights are divided into the plurality of second processing lights and that returns the first light to the first optical system as the third light on the second optical path.

Supplementary Note 49

The processing system according to any one of the supplementary notes 40 to 48, wherein
the third optical system has an optical element that is disposed on a third optical path during the period when the first incident light is divided into the plurality of first processing lights and that returns the second light to the first optical system as the fourth light on the third optical path and an optical element that is disposed on a fourth optical path during the period when the plurality of second incident lights are divided into the plurality of second processing lights and that returns the second light to the first optical system as the fourth light on the fourth optical path.

Supplementary Note 50

The processing system according to any one of the supplementary notes 40 to 48, wherein
the third optical system has an optical element that is disposed on a third optical path during the period when the first incident light is divided into the plurality of first processing lights and that returns the second light to the first optical system as the fourth light on the third optical path, and that is disposed on a fourth optical path during the period when the plurality of second incident lights are divided into the plurality of second processing lights and that returns the second light to the first optical system as the fourth light on the fourth optical path.

Supplementary Note 51

The processing system according to any one of the supplementary notes 40 to 50, wherein
the first optical system to which the plurality of incident lights from the ninth optical system enter emits the processing lights the number of which is larger than the number of the incident lights that enters the first optical system from the ninth optical system.

Supplementary Note 52

The processing system according to any one of the supplementary notes 40 to 51, wherein
the first optical system to which the plurality of incident lights from the ninth optical system enter emits the processing lights the number of which is twice as many as the number of the incident lights that enters the first optical system from the ninth optical system.

Supplementary Note 53

A processing apparatus comprising:
a light irradiation apparatus that irradiates an object with a plurality of processing lights to process the object; and
an irradiation position change apparatus that changes a relative positional relationship between irradiation positions of the plurality of processing lights on a surface of the object so that a desired pattern structure is formed at the object.

Supplementary Note 54

The processing system according to the supplementary note 53, wherein
the pattern structure includes a periodical structure in which a plurality of concave structures or convex structures extending in one direction are arranged along another direction that intersects with the one direction,
the irradiation position changes apparatus changes the relative positional relationship between the irradiation positions of the plurality of processing lights on the surface of the object on the basis of at least one of a height of at least one of the concave structure or the convex structure in a direction that intersects with the surface of the object, a width of at least one of the concave structure or the convex structure in a direction that is along the surface of the object, a shape of a cross-section of at least one of the concave structure or the convex structure including an axis that intersects with the surface of the object and an arrangement pitch of at least one of the concave structure or the convex structure.

Supplementary Note 55

The processing system according to the supplementary note 54, wherein
the irradiation position changes apparatus changes the relative positional relationship between the irradiation positions of the plurality of processing lights in the one direction.

Supplementary Note 56

The processing system according to the supplementary note 54 or 55 changing the relative positional relationship between the irradiation positions of the plurality of processing lights by using the irradiation position change apparatus to form the same concave structure or convex structure by at least two processing lights of the plurality of processing lights.

Supplementary Note 57

The processing system according to the supplementary note 56 making the irradiation positions of at least two processing lights of the plurality of processing lights overlap at least partially on the surface of the object by using the irradiation position change apparatus to form the same concave structure or convex structure by the at least two processing lights.

Supplementary Note 58

The processing system according to any one of the supplementary notes 53 to 57, wherein
the irradiation position change apparatus changes the relative positional relationship between the irradiation positions of the plurality of processing lights so that the irradiation positions of at least two processing lights of the plurality of processing lights overlap at least partially on the surface of the object.

Supplementary Note 59

The processing system according to any one of the supplementary notes 1 to 58, wherein
the processing system
processes the object so that the pattern structure that extends in a desired direction is formed at the object, and
comprises:
a first movable apparatus that is movable to change a relative position of the irradiation position of the processing light and the surface of the object in a first direction that is along the surface of the object; and
a second movable apparatus that is heavier and/or larger than the first movable apparatus and that is movable to change the relative position of the irradiation position of the processing light and the surface of the object in a second direction that is along the surface of the object and that intersects with the first direction,
the first and second movable apparatuses are aligned relative to the surface so that a first angle between an axis extending in the desired direction and an axis extending in the first direction is shorter than a second angle between the axis extending in the desired direction and an axis extending in the second direction.

Supplementary Note 60

A processing system that irradiates an object with processing light to process the object so that a pattern structure that extends in a desired direction is formed at the object, the processing system comprising:
a first movable apparatus that is movable to change a relative position of an irradiation position of the processing light and a surface of the object in a first direction that is along the surface of the object; and
a second movable apparatus that is heavier and/or larger than the first movable apparatus and that is movable to change the relative position of the irradiation position of the processing light and the surface of the object in a second direction that is along the surface of the object and that intersects with the first direction,
the first and second movable apparatuses being aligned relative to the surface so that a first angle between an axis extending in the desired direction and an axis extending in the first direction is shorter than a second angle between the axis extending in the desired direction and an axis extending in the second direction.

Supplementary Note 61

The processing system according to the supplementary note 59 or 60 further comprising a relative position change apparatus that changes a relative position of the surface and the first and second movable apparatuses so that the first angle is shorter than the second angle.

Supplementary Note 62

The processing system according to the supplementary note 61, wherein
the relative position change apparatus changes the relative position of the surface and the first and second movable apparatuses in a direction around an axis intersecting with the surface.

Supplementary Note 63

The processing system according to the supplementary note 61 or 62, wherein
the first and second movable apparatuses are aligned relative to the surface by using the relative position change apparatus so that the first angle is shorter than the second angle.

Supplementary Note 64

The processing system according to any one of the supplementary notes 59 to 63, wherein
a state where the first angle is shorter than the second angle includes a state where the axis extending in the desired direction is parallel to the axis extending along the first direction.

Supplementary Note 65

The processing system according to any one of the supplementary notes 59 to 64, wherein
a state where the first angle is shorter than the second angle includes a state where the first angle is zero.

Supplementary Note 66

The processing system according to any one of the supplementary notes 1 to 65, wherein
the processing system
processes the object so that the pattern structure that extends in a desired direction is formed at the object, comprises:
a first movable apparatus that is movable to change a relative position of the irradiation position of the processing light and the surface of the object in a first direction that is along the surface of the object; and
a second movable apparatus that is movable to change the relative position of the irradiation position of the processing light and the surface of the object in a second direction that is along the surface of the object and that intersects with the first direction, and that needs a force for moving that is larger than that of the first movable apparatus, and
further comprises
a relative position change apparatus that changes a relative position of the surface and the first and second movable apparatuses on the basis of a relative position of the desired direction and at least one of the first and second directions.

Supplementary Note 67

A processing system that irradiates an object with processing light to process the object so that a pattern structure that extends in a desired direction is formed at the object,
the processing system comprising:
a first movable apparatus that is movable to change a relative position of an irradiation position of the processing light and a surface of the object in a first direction that is along the surface of the object;
a second movable apparatus that is movable to change the relative position of the irradiation position of the processing light and the surface of the object in a second direction that is along the surface of the object and that intersects with the first direction, and that needs a force for moving that is larger than that of the first movable apparatus; and
a relative position change apparatus that changes a relative position of the surface and the first and second movable apparatuses on the basis of a relative position of the desired direction and at least one of the first and second directions.

Supplementary Note 68

The processing system according to the supplementary note 66 or 67, wherein
the second movable apparatus is heavier and/or larger than the first movable apparatus.

Supplementary Note 69

The processing system according to any one of the supplementary notes 66 to 68, wherein
the relative position change apparatus changes the relative position of the surface and the first and second movable apparatuses on the basis of at least one of a first angle between an axis extending in the desired direction and an axis extending in the first direction and a second angle between the axis extending in the desired direction and an axis extending in the second direction.

Supplementary Note 70

The processing system according to the supplementary note 69, wherein
the relative position change apparatus changes the relative position of the surface and the first and second movable apparatuses so that the first angle is shorter than the second angle.

Supplementary Note 71

The processing system according to the supplementary note 70, wherein
a state where the first angle is shorter than the second angle includes a state where the axis extending in the desired direction is parallel to the axis extending along the first direction.

Supplementary Note 72

The processing system according to the supplementary note 70 or 71, wherein
a state where the first angle is shorter than the second angle includes a state
where the first angle is zero.

Supplementary Note 73

The processing system according to any one of the supplementary notes 66 to 72, wherein
the relative position change apparatus changes the relative position of the surface and the first and second movable apparatuses in a direction around an axis intersecting with the surface.

Supplementary Note 74

The processing system according to any one of the supplementary notes 59 to 73, wherein
the first movable apparatus includes a first deflection apparatus that changes a relative position of the irradiation position of the processing light and the surface of the object in the first direction by moving to deflect the processing light,
the second movable apparatus includes a second deflection apparatus that changes the relative position of the irradiation position of the processing light and the surface of the object in the second direction by moving to deflect the processing light.

Supplementary Note 75

The processing system according to the supplementary note 74 comprising a Galvano scanner that includes a first mirror as the first deflection apparatus and a second mirror as the second deflection apparatus.

Supplementary Note 76

The processing system according to any one of the supplementary notes 59 to 75, wherein
the first movable apparatus includes a first movement apparatus that changes a relative position of the irradiation position of the processing light and the surface of the object in the first direction by moving to move at least one of the object and a light irradiation apparatus that emits the processing light,
the second movable apparatus includes a second movement apparatus that changes the relative position of the irradiation position of the processing light and the surface of the object in the second direction by moving to move at least one of the light irradiation apparatus and the object,

Supplementary Note 77

The processing system according to any one of the supplementary notes 59 to 76 further comprising:
a processing apparatus that irradiates the object with the processing light to process the object so that the pattern structure that extends in the desired direction is formed at a surface of the object; and
a control apparatus that controls the processing apparatus to form the pattern structure on the basis of pattern information relating to the pattern structure that is generated from a simulation model for simulating the object at which the pattern structure is formed.

Supplementary Note 78

A processing system comprising:
a processing apparatus that irradiates an object with processing light to process the object so that a pattern structure that extends in a desired direction is formed at a surface of the object; and
a control apparatus that controls the processing apparatus to form the pattern structure on the basis of pattern information relating to the pattern structure that is generated from a simulation model for simulating the object at which the pattern structure is formed.

Supplementary Note 79

The processing system according to the supplementary note 77 or 78, wherein
the pattern structure includes a periodical structure in which a plurality of concave structures or convex structures extending in the desired direction are arranged along another direction that intersects with the desired direction.

Supplementary Note 80

The processing system according to any one of the supplementary notes 77 to 79, wherein
the pattern structure includes a riblet structure by which a resistance of the object to a fluid is reducible.

Supplementary Note 81

The processing system according to the supplementary note 80, wherein
the simulation model includes a fluid simulation model for simulating the object in the fluid.

Supplementary Note 82

The processing system according to any one of the supplementary notes 77 to 81, wherein
the pattern information includes information relating to the pattern structure that is optimized for the object on the basis of the simulation model

Supplementary Note 83

The processing system according to any one of the supplementary notes 77 to 82, wherein
the pattern information includes structure information relating to at least one of a height of the pattern structure in a direction that intersects with the surface of the object, a width of the pattern structure in a direction that is along the surface of the object, an arrangement pitch of the pattern structure, a shape of the pattern structure and the desired direction in which the patter structure extends.

Supplementary Note 84

The processing system according to any one of the supplementary notes 77 to 83, wherein
the pattern information includes position information that indicates where the pattern structure is formed on the surface of the object.

Supplementary Note 85

A processing method of irradiating an object with processing light to process an object,
the processing method including:
dividing incident light into first light and second light by using an optical system;
returning the first light to the optical system as third light;
returning the second light to the first optical system as fourth light; and
emitting the third light and the fourth light as a plurality of processing lights with which different positions on a surface of the object area irradiated, respectively, by using the optical system.

Supplementary Note 86

A processing method of irradiating an object with processing light to process an object,
the processing method including:
dividing incident light into first light and second light by using an optical system;
returning the first light to the optical system as third light;
returning the second light to the first optical system as fourth light; and
emitting the third light and the fourth light as a plurality of processing lights by using the optical system,
an axis that is along a traveling direction of the third light emitted from the optical system intersecting with an axis that is along a traveling direction of the fourth light emitted from the optical system.

Supplementary Note 87

A processing method of irradiating an object with processing light to process an object,
the processing method including:
dividing incident light into first light and second light by using an optical surface that reflects the first light of incident light in a first state and allows the second light of the incident light in a second state different from the first state to pass therethrough;
converting the first light from the optical surface into third light in the second state and returning the third light to the optical surface;
converting the second light from the optical surface into fourth light in the first state and returning the fourth light to the optical surface; and
emitting the third light and the fourth light as a plurality of processing lights with which different positions on a surface of the object area irradiated, respectively, by using the optical surface.

Supplementary Note 88

A processing method including:
irradiating an object with a plurality of processing lights to process the object; and
changing a relative positional relationship between irradiation positions of the plurality of processing lights on a surface of the object so that a desired pattern structure is formed at the object.

Supplementary Note 89

A processing method of irradiating an object with processing light to process the object so that a pattern structure that extends in a desired direction is formed at the object,
the processing method including:
changing a relative position of an irradiation position of the processing light and a surface of the object in a first direction by using a first movable apparatus that is movable to change the relative position of the irradiation position of the processing light and the surface of the object in the first direction that is along the surface of the object;
changing the relative position of the irradiation position of the processing light and the surface of the object in a second direction by using a second movable apparatus that is heavier and/or larger than the first movable apparatus and that is movable to change the relative position of the irradiation position of the processing light and the surface of the object in the second direction that is along the surface of the object and that intersects with the first direction; and
aligning the first and second movable apparatuses relative to the surface so that a first angle between an axis extending in the desired direction and an axis extending in the first direction is shorter than a second angle between the axis extending in the desired direction and an axis extending in the second direction.

Supplementary Note 90

A processing method of irradiating an object with processing light to process the object so that a pattern structure that extends in a desired direction is formed at the object,
the processing method including:
changing a relative position of an irradiation position of the processing light and a surface of the object in a first direction by using a first movable apparatus that is movable to change the relative position of the irradiation position of the processing light and the surface of the object in the first direction that is along the surface of the object;
changing the relative position of the irradiation position of the processing light and the surface of the object in a second direction by using a second movable apparatus that is heavier and/or larger than the first movable apparatus and that is movable to change the relative position of the irradiation position of the processing light and the surface of the object in the second direction that is along the surface of the object and that intersects with the first direction; and
changing a relative position of the surface and the first and second movable apparatuses on the basis of a first angle between an axis extending in the desired direction and an axis extending in the first direction and a second angle between the axis extending in the desired direction and an axis extending in the second direction.

Supplementary Note 91

A processing method of irradiating an object with processing light to process the object so that a pattern structure that extends in a desired direction is formed at surface of the object,
the processing method including:
obtaining pattern information relating to the pattern structure that is generated from a simulation model for simulating the object at which the pattern structure is formed; and
processing the object on the basis of the pattern object to form the pattern structure.

Supplementary Note 92

A processing method of processing the object by using the processing system according to any one of the supplementary notes 1 to 84.

Supplementary Note 93

A processing system comprising:
a light irradiation apparatus that irradiates a surface of an object with processing light; and
a position change apparatus that changes a relative position of a target irradiation area of the processing light on the surface of the object and the surface,
the processing system alternately repeating a first operation that scans the surface with the processing light along a first axis that is along the surface and a second operation that changes a relative position of the processing light and the surface along a second axis that intersects with the first axis and that is along the surface by using the light irradiation apparatus and the position change apparatus,
the first operation including a first scan operation that scans the surface with the processing light so that the target irradiation position relatively moves relative to the surface toward a first direction that is along the first axis and a second scan operation that scans the surface with the processing light so that the target irradiation position relatively moves relative to the surface toward a second direction that is along the first axis and that is a direction opposite to the first direction.

Supplementary Note 94

The processing system according to the supplementary note 93 performing each of the first and second scan operation at least one time or more during a period when the first operation and the second operation are repeated.

Supplementary Note 95

The processing system according to the supplementary note 93 or 94 performing the first scan operation, the second operation, the second scan operation and the second operation in this order.

Supplementary Note 96

The processing system according to any one of the supplementary notes 93 to 95 repeating an operation for performing the first scan operation, the second operation, the second scan operation and the second operation in this order.

Supplementary Note 97

The processing system according to any one of the supplementary notes 93 to 96,
performing the first scan operation in a first scan area of the surface that extends along the first axis,
performing the second operation after the first scan operation in the first scan area is completed so that the processing light is allowed to be emitted to a second scan area of the surface that extends along the first axis and a position of which is different from that of the first scan area along the second axis,
performing the second scan operation in the first scan area after performing the second operation so that the processing light is allowed to be emitted to the second scan area,
performing the second operation after the second scan operation in the second scan area is completed so that the processing light is allowed to be emitted to a third scan area of the surface that extends along the first axis and a position of which is different from those of the first and second scan areas along the second axis, and
performing the first scan operation in the third scan area after performing the second operation so that the processing light is allowed to be emitted to the third scan area,

Supplementary Note 98

The processing system according to any one of the supplementary notes 93 to 97 performing the first scan operation a plurality of times in a scan area of the surface that extends along the first axis.

Supplementary Note 99

The processing system according to the supplementary note 98,
performing the first scan operation one time and then performing the first scan operation again without performing the second operation, and
performing the second operation after the first scan operation that is performed a plurality of times is completed.

Supplementary Note 100

The processing system according to the supplementary note 98 or 99 changing the relative position of the target irradiation position and the surface along the first axis every time the first scan operation is performed one time and then performing the first scan operation again.

Supplementary Note 101

The processing system according to any one of the supplementary notes 98 to 100,
performing the first scan operation in a part of a first scan area of the surface that extends along the first axis,
changing the relative position of the target irradiation position and the surface along the first axis every time the first scan operation is performed one time and then performing the first scan operation in another part of the first scan area again, and
performing the second operation after the first scan operation that is performed a plurality of times in the first scan area is completed so that the processing light is allowed to be emitted to a second scan area of the surface that extends along the first axis and a position of which is different from that of the first scan area along the second axis.

Supplementary Note 103

The processing system according to any one of the supplementary notes 93 to 101 performing both of the first and second scan operations in a scan area of the surface that extends along the first axis.

Supplementary Note 103

The processing system according to any one of the supplementary notes 93 to 101 performing both of the first and second scan operations in a scan area of the surface that extends along the first axis.

Supplementary Note 104

The processing system according to any one of the supplementary notes 93 to 103 starting the first operation by performing, in a scan area of the surface that extends along the first axis, one operation of the first and second scan operations that allows a changed amount of the relative position of the target irradiation position and the surface by the second operation that is performed before the first operation in the scan area to be shorter.

Supplementary Note 105

The processing system according to any one of the supplementary notes 93 to 104 starting the first operation by performing, in a scan area of the surface that extends along the first axis, one operation of the first and second scan operations that allows a time required for the second operation that is performed before the first operation in the scan area to be shorter.

Supplementary Note 106

The processing system according to any one of the supplementary notes 93 to 105, wherein
it is determined whether an irradiation expected area is irradiated with the processing light by the first scan operation of the irradiation expected area is irradiated with the processing light by the second scan operation on the basis of a positional relationship between an irradiation completion point that is irradiated with the processing light at a timing when the scan operation is completed in a first scan area of the surface that extends along the first axis and the irradiation expected area that is expected to be irradiated with the processing light in a second scan area of the surface that extends along the first axis and a position of which is different from that of the first scan area along the second axis.

Supplementary Note 107

The processing system according to the supplementary note 106, wherein
the irradiation expected area is an area that extends along the first axis,
it is determined whether the irradiation expected area is irradiated with the processing light by the first scan operation of the irradiation expected area is irradiated with the processing light by the second scan operation on the basis of a positional relationship between the irradiation completion point and an one end and other end of the irradiation expected area.

Supplementary Note 108

The processing system according to the supplementary note 107 irradiating the irradiation processing area with the processing light by an operation of the first and second scan operations that allows the irradiation expected area to be scanned with the processing light from an end of the one and the other end that is closer to the irradiation completion position toward an end of the one and the other end that is farther from the irradiation completion position.

Supplementary Note 109

The processing system according to the supplementary note 107 or 108,
irradiating the processing area with the processing light by an operation of the first and second scan operations that allows the irradiation expected area to be scanned with the processing light from the one end toward the other end, when the one end is closer to the irradiation completion area than the other end is, and
irradiating the processing area with the processing light by an operation of the first and second scan operations that allows the irradiation expected area to be scanned with the processing light from the other end toward the one end, when the other end is closer to the irradiation completion area than the one end is.

Supplementary Note 110

The processing system according to any one of the supplementary notes 107 to 109, wherein
a direction from the one end toward the other end is the first direction,
a direction from the other end toward the one end is the second direction, the processing system
irradiating the irradiation expected area with the processing light by the first scan operation, when the one end is closer to the irradiation completion area than the other end is, and
irradiating the processing area with the processing light by the second scan operation, when the other end is closer to the irradiation completion area than the one end is.

Supplementary Note 111

The processing system according to any one of the supplementary notes 108 to 110, wherein
a plurality of irradiation expected areas are set in the second scan area,
the processing system starts irradiating one irradiation expected area of the plurality of irradiation expected areas that has one end that is closest to the irradiation completion position.

Supplementary Note 112

The processing system according to the supplementary note 111, wherein
a plurality of irradiation expected areas are set in the second scan area,
the processing system irradiating the one irradiation expected area with the processing light by an operation of the first and second scan operations that allows the one irradiation expected area to be scanned with the processing light from the one end of the one irradiation expected area toward other end of the irradiation expected area that is different from the one end.

Supplementary Note 113

The processing system according to the supplementary note 112 irradiating another irradiation expected area of the plurality of irradiation expected areas that has an end that is closest to one irradiation completion point that is irradiated with the processing light at a timing when the first operation in the one irradiation expected area is completed, after completing the first operation in the one irradiation expected area

Supplementary Note 114

The processing system according to any one of the supplementary notes 93 to 113 changing a thickness of a part of the object by irradiating the object with the processing light.

Supplementary Note 115

The processing system according to any one of the supplementary notes 93 to 114 removing a part of the object by irradiating the object with the processing light.

Supplementary Note 116

The processing system according to any one of the supplementary notes 93 to 115 forming a structure having a desired shape by irradiating the surface of the object with the processing light.

Supplementary Note 117

The processing system according to any one of the supplementary notes 93 to 116 forming a structure by which a resistance of the object to a fluid is reducible.

Supplementary Note 118

The processing system according to any one of the supplementary notes 93 to 117 forming a periodical structure on the surface of the object.

Supplementary Note 119

A processing method of a movable body that moves in fluid, including:
irradiating a surface of an object with processing light; and
changing a relative position of a target irradiation area of the processing light on the surface of the object and the surface,
the processing method alternately repeating a first operation that scans the surface with the processing light along a first axis that is along the surface and a second operation that changes a relative position of the processing light and the surface along a second axis that intersects with the first axis and that is along the surface,
the first operation including a first scan operation that scans the surface with the processing light so that the target irradiation position relatively moves relative to the surface toward a first direction that is along the first axis and a second scan operation that scans the surface with the processing light so that the target irradiation position relatively moves relative to the surface toward a second direction that is along the first axis and that is a direction opposite to the first direction.

Supplementary Note 120

A processing system that irradiates a surface of an object with processing light from a light source to process the surface,
the processing system comprising:
a first optical system that is disposed on an optical path of the processing light from the optical source; and
a second optical system that is disposed on the optical path of the processing light from the optical source and that condenses the processing light on the surface,
a size of a beam cross-section at a converged position of the processing light through the first and second optical systems being larger than a size of a beam cross-section at a converged position of the processing light through the second optical system.

Supplementary Note 121

The processing system according to the supplementary note 120 allowing the size of the beam cross-section at the converged position of the processing light through the first and second optical systems to be larger than a size of a beam cross-section at a converged position of the processing light through the second optical system by an aberration that is rotationally symmetrical about an optical axis of the first optical system.

Supplementary Note 122

The processing system according to the supplementary note 121, wherein the aberration that is rotationally symmetrical about the optical axis includes a spherical aberration.

Supplementary Note 123

The processing system according to any one of the supplementary note 120 to 122, wherein
the light irradiation apparatus irradiates the surface with a plurality of processing lights,
the first optical system allows the plurality of processing lights to overlap partially in the surface.

Supplementary Note 124

The processing system according to the supplementary note 123, wherein
the light irradiation apparatus irradiates the surface with the plurality of processing lights simultaneously.

Supplementary Note 125

The processing system according to the supplementary note 123 or 124, wherein
the light irradiation apparatus irradiates the surface with first processing light of the plurality of processing lights and then irradiates the surface with second processing light of the plurality of processing lights that is different from the first processing light.

Supplementary Note 126

The processing system according to any one of the supplementary note 120 to 125, wherein
the first optical system includes a scattering surface that scatters the processing light.

Supplementary Note 127

The processing system according to any one of the supplementary note 120 to 126, wherein
the processing light with which the surface of the object is irradiated through the first and second optical systems has a shorter changed amount of a size of a cross-section, which intersects with an optical axis of the optical system, of the processing light near a converged position of the processing light in a direction along the optical axis, compared to the processing light with which the surface of the object is irradiated without the first optical system.

Supplementary Note 128

A processing system that irradiates a surface of an object with processing light from a light source to process the surface,
the processing system comprising:
a first optical system that is disposed on an optical path of the processing light from the optical source; and
a second optical system that is disposed on the optical path of the processing light from the optical source and that condenses the processing light on the surface,
the processing light with which the surface of the object is irradiated through the optical systems having a shorter changed amount of a size of a beam diameter of the processing light along a plane that intersects with an optical axis of the optical system near a converged position of the processing light in a direction along the optical axis, compared to the processing light with which the surface of the object is irradiated without the optical system.

Supplementary Note 129

The processing system according to the supplementary note 128, wherein
the first optical system is allowed to be inserted to and removed from the optical path of the processing light.

Supplementary Note 130

A processing method of a movable body that moves in fluid, including:
emitting processing light from a light source;
making the processing light from the optical source enter a first optical system; and
condensing the processing light on an object by using a second optical system,
a size of a beam diameter, which is at a converged position of the processing light, of the processing light with which a surface of the object is irradiated through the first and second optical systems being larger compared to the processing light with which the surface of the object is irradiated without the first optical system.

Supplementary Note 131

A processing method of a movable body that moves in fluid, including:
emitting processing light from a light source;
making the processing light from the optical source enter a first optical system; and
condensing the processing light on an object by using a second optical system,
the processing light with which the surface of the object is irradiated through the first and second optical systems having a shorter changed amount of a size of a beam diameter of the processing light along a plane that intersects with an optical axis of the optical system near a converged position of the processing light in a direction along the optical axis, compared to the processing light with which the surface of the object is irradiated without the first optical system.

Supplementary Note 132

A processing apparatus that irradiates a surface of an object with processing light to process the surface, comprising
a light irradiation apparatus that forms a first irradiation area on the surface that is irradiated with first processing light and forms a second irradiation area on the surface that is irradiated with second processing light,
the light irradiation apparatus emitting the first and second processing lights so that the first and second irradiation areas overlap with each other.

Supplementary Note 133

The processing system according to the supplementary note 132, wherein
the first irradiation area is scanned along a first direction on the surface.

Supplementary Note 134

The processing system according to the supplementary note 133, wherein
the second irradiation area is scanned along a second direction on the surface.

Supplementary Note 135

The processing system according to the supplementary note 134, wherein
the first irradiation area and the second irradiation area overlap at least partially in the first direction or the second direction.

Supplementary Note 136

The processing system according to the supplementary note 134 or 135, wherein
the first irradiation area and the second irradiation area overlap at least partially in a third direction that intersects with the first direction or the second direction on the surface.

Supplementary Note 137

The processing system according to the supplementary note 135 or 136, wherein
the first direction is same as or parallel to the second direction.

Supplementary Note 138

The processing system according to any one of the supplementary note 132 to 137, wherein
the light irradiation apparatus irradiates the surface with the first processing light and the second processing light non-simultaneously.

Supplementary Note 139

The processing system according to any one of the supplementary note 132 to 138, wherein
the light irradiation apparatus irradiates the surface with the first processing light and then irradiates the surface with the second processing light.

Supplementary Note 140

The processing system according to any one of the supplementary note 132 to 137, wherein
the light irradiation apparatus irradiates the surface with the first processing light and the second processing light simultaneously.

The feature of each embodiment described above is allowed to be combined appropriately. A part of the feature of each embodiment described above may not be used. The feature of each embodiment described above may be allowed to be replaced by the feature of other embodiment, if needed. Moreover, the disclosures of all publications and United States patents that are cited in each embodiment described above are incorporated in the disclosures of the present application by reference if it is legally permitted.

The present invention is allowed to be changed, if desired, without departing from the essence or spirit of the invention which can be read from the claims and the entire specification, and a processing apparatus, a processing method, a processing system and a processing method of movable body, each of which involves such changes, are also intended to be within the technical scope of the present invention.

DESCRIPTION OF REFERENCE CODES 1 processing apparatus
11 light irradiation apparatus
111 light source
112 multibeam optical system
1121 polarized beam splitter
1122, 1124 ¼ wavelength plate
1123, 1125 reflective mirror
1126c driving system
113 Galvano mirror
114 fθ lens
115b wavelength plate
117e intensity adjustment apparatus
1171e, 1172e intensity sensor
1173e wavelength plate
1174e driving system
117f
1171f polarized beam splitter
1172f, 1174f ¼ wavelength plate
1173f, 1175f reflective mirror
1176f wavelength plate
1181j enlargement optical system
1182j driving system
2 control apparatus
C concave part
CP1 concave structure
EA target irradiation area
ELk processing light
ELo source light
S processing target object
SF coat of paint
SYS processing system
SA processing shot area
SCA scan area
FA processing area
SC_startscan start position
SC_end scan end position
F_start processing start position
F_end processing end position

The invention claimed is:

1. A processing apparatus that irradiates an object with processing light to process the object,
the processing apparatus comprising:
a first optical system that divides incident light into first light and second light;
a second optical system that returns the first light, which is from the first optical system, to the first optical system as third light; and
a third optical system that returns the second light, which is from the first optical system, to the first optical system as fourth light,
the first optical system emitting the third light from the second optical system and the fourth light from the third optical system as a plurality of processing lights with which different positions on a surface of the object are irradiated, respectively.

2. A processing system that irradiates an object with processing light to process the object so that a pattern structure that extends in a desired direction is formed at the object,
the processing system comprising:
a first movable apparatus that is movable to change a relative position of an irradiation position of the processing light and a surface of the object in a first direction that is along the surface of the object; and
a second movable apparatus that is heavier and/or larger than the first movable apparatus and that is movable to change the relative position of the irradiation position of the processing light and the surface of the object in a second direction that is along the surface of the object and that intersects with the first direction,
the first and second movable apparatuses being aligned relative to the surface so that a first angle between an axis extending in the desired direction and an axis extending in the first direction is shorter than a second angle between the axis extending in the desired direction and an axis extending in the second direction.

3. A processing system comprising:
a light irradiation apparatus that irradiates a surface of an object with processing light; and
a position change apparatus that changes a relative position of a target irradiation area of the processing light on the surface of the object and the surface,
the processing system alternately repeating a first operation that scans the surface with the processing light along a first axis that is along the surface and a second operation that changes a relative position of the processing light and the surface along a second axis that intersects with the first axis and that is along the surface by using the light irradiation apparatus and the position change apparatus, the first operation including a first scan operation that scans the surface with the processing light so that the target irradiation position relatively moves relative to the surface toward a first direction that is along the first axis and a second scan operation that scans the surface with the processing light so that the target irradiation position relatively moves relative to the surface toward a second direction that is along the first axis and that is a direction opposite to the first direction.

4. A processing system that irradiates a surface of an object with processing light from a light source to process the surface, the processing system comprising:
a first optical system that is disposed on an optical path of the processing light from the light source; and
a second optical system that is disposed on the optical path of the processing light from the light source and that condenses the processing light on the surface,
a size of a beam cross-section at a converged position of the processing light through the first and second optical systems being larger than a size of a beam cross-section at a converged position of the processing light through the second optical system.

5. A processing method comprising:
acquiring pattern information relating to a pattern structure, the pattern structure being generated from a simulation model for simulating a movable body at which the pattern structure is formed, and the pattern structure extending along an extending direction on a surface of the movable body, and
processing the movable body by irradiating the movable body with processing light to form the pattern structure, which extends along the extending direction, based on the pattern information including information relating to the extending direction.

6. The processing method according to claim 5, wherein the pattern structure includes a periodical structure in which a plurality of concave structures or convex structures, each of which extends along the extending direction, are arranged along another direction that intersects the extending direction.

7. The processing method according to claim 5, wherein the pattern structure includes a riblet structure by which a resistance of the movable body to a fluid is reduced.

8. The processing method according to claim 7, wherein the simulation model includes a fluid simulation model for simulating the movable body in a fluid.

9. The processing method according to claim 5, wherein the pattern information includes information relating to the pattern structure optimized for the movable body based on the simulation model.

10. The processing method according to claim 5, wherein the pattern information includes structure information relating to at least one of a height of the pattern structure in a direction that intersects with the surface of the movable body, a width of the pattern structure in a direction that is along the surface of the movable body, an arrangement pitch of the pattern structure, and a shape of the pattern structure.

11. The processing method according to claim 5, wherein the acquiring the pattern information includes determining a characteristic of the pattern structure so that an effect of a reduction of a friction of the movable body is achieved by the pattern structure extending on the surface of the movable body.

12. The processing method according to claim 11, wherein
the pattern information includes information relating to a position at which the pattern structure having the determined characteristic should be formed.

13. The processing method according to claim 5, wherein the processing includes forming a concave part, which extends along the extending direction, on the surface of the movable body by performing a scanning of the processing light along the extending direction.

14. The processing method according to claim 13, wherein
the processing includes forming another concave part, which extends along the extending direction, at a position that is adjacent to the concave part along a direction intersecting the extending direction.

15. The processing method according to claim 13, wherein
a characteristic of the pattern structure includes a size of the concave part, a shape of the concave part, and the extending direction of the concave part, and
the processing includes changing a scanned position of the processing light based on the characteristic of the pattern structure.

16. The processing method according to claim 13, wherein
the pattern structure includes a structure in which a plurality of concave structures, each of which extends along the extending direction, are arranged along another direction that intersects the extending direction,
the pattern information includes information relating to a size of the concave structure, and
the processing includes:
forming the concave structures by irradiating the surface of the movable body with a plurality of processing lights; and
determining a state of an overlap between the plurality of processing lights based on the pattern information.

17. The processing method according to claim 16, wherein
the plurality of processing lights are overlapped along the another direction.

18. The processing method according to claim 5, wherein
the pattern structure includes a structure in which a plurality of concave structures, each of which extends along the extending direction, are arranged along another direction that intersects the extending direction, and
the processing includes forming the plurality of concave structures by irradiating a plurality of parts of the surface of the movable body with the processing lights simultaneously.

* * * * *